United States Patent
He et al.

(10) Patent No.: US 10,922,398 B2
(45) Date of Patent: *Feb. 16, 2021

(54) OPTICAL FINGERPRINT SENSOR WITH NON-TOUCH IMAGING CAPABILITY

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,878

(22) Filed: Feb. 17, 2020

(65) Prior Publication Data

US 2020/0218392 A1    Jul. 9, 2020

Related U.S. Application Data

(63) Continuation of application No. 15/983,034, filed on May 17, 2018, now Pat. No. 10,620,745.

(Continued)

(51) Int. Cl.
| | |
|---|---|
| *G06F 3/041* | (2006.01) |
| *G06F 21/32* | (2013.01) |
| *G06K 9/22* | (2006.01) |
| *G06K 9/00* | (2006.01) |
| *G02F 1/1333* | (2006.01) |
| *H01L 27/32* | (2006.01) |

(52) U.S. Cl.
CPC .......... *G06F 21/32* (2013.01); *G02F 1/13338* (2013.01); *G06K 9/0004* (2013.01);
(Continued)

(58) Field of Classification Search
CPC ......... G06F 3/0416; G06F 21/32; G06K 9/22; G06K 9/00033; G06K 9/00107;
(Continued)

(56) References Cited

U.S. PATENT DOCUMENTS 9,641,523 B2 * 5/2017 Langley .................. G06F 21/32
10,216,975 B1 * 2/2019 He ......................... G06K 9/0004
(Continued)

FOREIGN PATENT DOCUMENTS

CN          205158436 U      4/2016
CN          105787322 A      7/2016
(Continued)

*Primary Examiner* — Bobbak Safaipour

(57) ABSTRACT

The disclosed optical sensing technology can be implemented to provide optical fingerprint sensing while a user finger is located near a device while not in contact with the device for user authentication in accessing the device and can further provide optical fingerprint sensing while a user finger is in contact with the device. In some implementations, the optical fingerprint sensing can be performed on a finger in contact and non-contact instances to enhance the fingerprint sensing and to provide anti-spoofing in the optical sensing. For example, multiple fingerprint images can be captured when a finger is located near a device while not in contact with the device and when the finger is in contact with the device. The captured fingerprint images of the non-contact finger and the captured fingerprint images of the contact finger provide two different types of optical fingerprint sensing mechanisms and can collectively enhance the fingerprint sensing performance and anti-spoofing feature.

20 Claims, 70 Drawing Sheets

Related U.S. Application Data

(60) Provisional application No. 62/507,779, filed on May 17, 2017.

(52) U.S. Cl.
CPC ..... G06K 9/00033 (2013.01); G06K 9/00107 (2013.01); G06K 9/22 (2013.01); H01L 27/323 (2013.01); H01L 27/3244 (2013.01); *G06F 3/0416* (2013.01); *G06K 2009/0006* (2013.01); *G06K 2009/00932* (2013.01)

(58) Field of Classification Search
CPC ....... G06K 9/0004; G06K 2009/00932; G06K 2009/0006; G02F 1/13338; H01L 27/323; H01L 27/3244
See application file for complete search history.

(56) References Cited

U.S. PATENT DOCUMENTS

| | | | | |
|---|---|---|---|---|
| 10,325,142 | B2* | 6/2019 | He | G06K 9/0002 |
| 10,372,966 | B2* | 8/2019 | Suwald | G06K 9/00087 |
| 10,402,619 | B2* | 9/2019 | Yang | G06K 9/00073 |
| 10,410,037 | B2* | 9/2019 | He | G06K 9/00087 |
| 2009/0185722 | A1 | 7/2009 | Bonda et al. | |
| 2009/0232367 | A1 | 9/2009 | Shinzaki | |
| 2010/0008552 | A1 | 1/2010 | Shin et al. | |
| 2010/0026453 | A1 | 2/2010 | Yamamoto et al. | |
| 2010/0321481 | A1 | 12/2010 | Morin et al. | |
| 2015/0324570 | A1* | 11/2015 | Lee | G06K 9/00087 382/124 |
| 2016/0224816 | A1 | 8/2016 | Smith et al. | |
| 2017/0124370 | A1 | 5/2017 | He et al. | |
| 2017/0270342 | A1* | 9/2017 | He | G06F 21/32 |
| 2018/0114047 | A1* | 4/2018 | Kim | G06K 9/00026 |
| 2018/0247143 | A1* | 8/2018 | Cho | G06K 9/0004 |
| 2019/0026527 | A1* | 1/2019 | He | G02B 6/0026 |

FOREIGN PATENT DOCUMENTS

| | | |
|---|---|---|
| CN | 106227393 A | 12/2016 |
| CN | 106372587 A | 2/2017 |
| WO | 2016172713 A1 | 10/2016 |
| WO | 2017070711 A1 | 4/2017 |

\* cited by examiner

Transmission modification filter

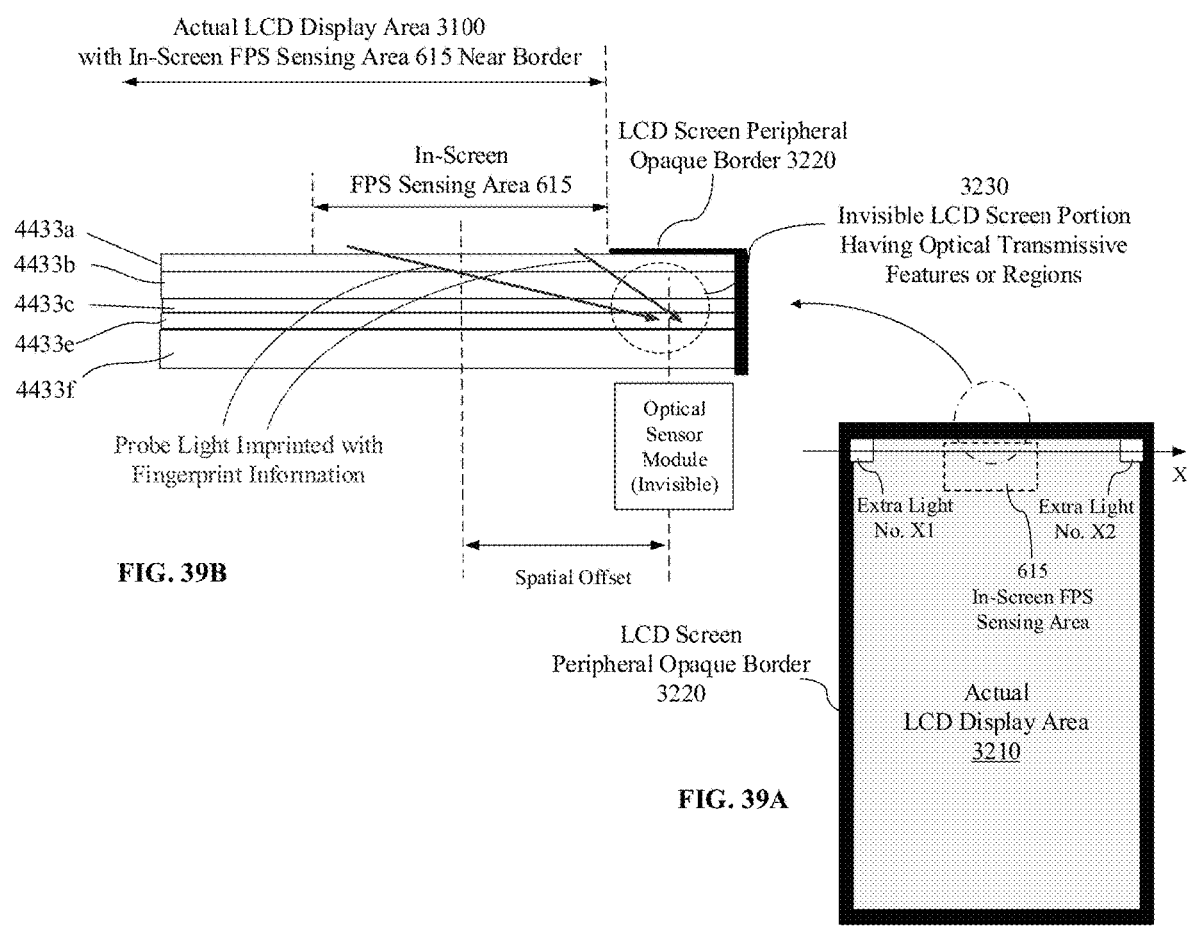

Control the extra illumination light sources outside the optical sensor module to sequentially produce different illumination probe light beams to illuminate a finger, one extra illumination light source at a time, from different directions, respectively, so that the probe light in each illumination probe light beam enters the finger and is scattered by internal tissues of the finger to cause a transmission of a portion of the scattered probe light inside the finger to through internal tissues of ridges and valleys of the finger to carry both (1) a first 2-dimensional transmissive pattern representing a fingerprint pattern formed by bridges and valleys of the finger, and (2) a first fingerprint tomographic pattern that is associated with the illumination of internal tissues of ridges and valleys of the finger in the first illumination direction and is embedded within the first 2-dimensional transmissive pattern

Operate the optical sensor module to capture fingerprint images carried by scattered probe light from scattering of the different illumination probe light beams inside the finger, respectively

Process the captured fingerprint images caused by the different illumination probe light beams, respectively, to extract spatial shifts in the captured fingerprint images associated with the different directions of the different illumination probe light beams and a 3-D tomographic profile of the fingerprint pattern that is superimposed on the scattered probe light from inside the finger

Process the extracted spatial shifts in the captured fingerprint images associated with the different directions of the different illumination probe light beams in determining whether the captured fingerprint images are from a person's finger

FIG. 48B

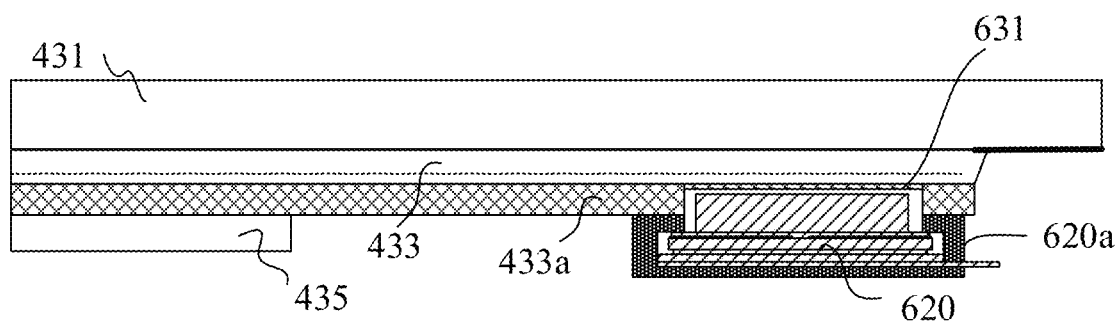
FIG. 61

OPTICAL FINGERPRINT SENSOR WITH NON-TOUCH IMAGING CAPABILITY

CROSS-REFERENCE TO RELATED APPLICATIONS

This patent document is a continuation of U.S. patent application Ser. No. 15/983,034, filed on May 17, 2018, which claims the benefits and priority of U.S. Provisional Patent Application No. 62/507,779, filed on May 17, 2017. The entire contents of the before-mentioned patent applications are incorporated by reference as part of the disclosure of this patent document.

TECHNICAL FIELD

This patent document generally relates to fingerprint recognition and its applications for securely accessing an electronic device or an information system.

BACKGROUND

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access for protecting the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allows safeguard the use of devices or systems that are controlled by computers or computer processors such as computer-controlled automobiles and other systems such as ATMs.

Secured access to a device such as a mobile device or a system such as an electronic database and a computer-controlled system can be achieved in different ways, including, for example, using user passwords. A password, however, may be easy to be spread or obtained and this nature of passwords can reduce the level of the security. Moreover, a user needs to remember a password to use electronic devices or systems, and, if the user forgets the password, the user needs to undertake certain password recovery procedures to get authenticated or otherwise regain the access to the device and such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

The examples of implementations described in this patent document provide fingerprint sensor designs that use optical sensors for sensing fingerprints. The described fingerprint sensor designs can be used in various devices, systems or applications, including mobile applications, and various wearable or portable devices (e.g., smartphones, tablet computers, wrist-worn devices), larger electronic devices or systems.

Certain implementations of the disclosed optical sensors allow for capturing images of a user's finger when the finger is near but not in contact with a device such as a mobile phone or tablet or other system and when the finger is in contact with the device to enable advanced fingerprint authentication features including more advanced and robust anti-spoof features for enhancing the access security.

In one aspect, for example, a method is provided for authenticating a user for accessing an electronic device by using an optical sensor module placed underneath an extended section of a top transparent layer of the electronic device and located adjacent to one end of a display panel placed underneath the top transparent layer. This method includes operating one or more probe light sources of the optical sensor module to produce probe light to illuminate a portion of the top transparent layer and an adjacent area above the top transparent layer above the display panel; operating an optical sensor array of optical detectors of the optical sensor module to detect reflected light from an object that is present above the top transparent layer and is not in contact with the top transparent layer to determine the presence of the object; and operating the one or more probe light sources and the optical sensor array to perform a first optical fingerprint sensing operation when the presence of the object is detected while the object is not in contact with the top transparent layer to capture one or more first optical images of the object to determine whether the captured one or more first optical images of the object contain a first stored fingerprint of a finger of an authorized user previously obtained from the authorized user by operating the one or more probe light sources and the optical sensor array when the finger of the authorized user was not in contact with the top transparent layer. In this method, an access to the electronic device is denied when the captured one or more first optical images of the object are determined not to contain the first stored fingerprint of the authorized user; and, when the first optical fingerprint sensing operation determines that the captured one or more first optical images of the object in the first optical fingerprint sensing operation are determined to contain the fingerprint of an authorized user, the one or more probe light sources and the optical sensor array are operated to perform a second optical fingerprint sensing operation when the object is in contact with the top transparent layer to capture one or more second optical images of the object to determine whether the captured one or more second optical images of the object contain a second stored fingerprint of the finger of the authorized user previously obtained from the authorized user by operating the one or more probe light sources and the optical sensor array when the finger of the authorized user was in contact with the top transparent layer. This method also includes denying an access to the electronic device when the captured one or more second optical images of the object are determined not to contain the second stored fingerprint of the authorized user; and granting an access to the electronic device when the captured one or more second optical images of the object are determined to contain the second stored fingerprint of the authorized user.

The above method can be implemented in various ways and can include various features. For example, the method can include operating a touch sensor formed underneath the top transparent layer to determine whether an object is in contact with the top transparent layer. For example, the method can include operating the one or more probe light sources of the optical sensor module to emit the probe light at an optical wavelength that penetrates into a human skin surface so that the optical sensor module captures images containing tissue structures below the skin surface to provide anti-spoof fingerprint sensing, and, may also include operating the one or more probe light sources of the optical sensor module to emit the probe light at an infrared (IR) optical wavelength that penetrates into a human skin surface.

For example, the method can include operating the one or more probe light sources of the optical sensor module to emit the probe light at two or more different optical wavelengths at which a human live finger exhibits different optical properties; and operating the optical sensor array to measure returned probe light at the two or more different wavelengths to compare an extinction ratios of the probe light at the two or more different wavelengths to determine whether the object is a finger from a live person. In this regard, the method may further include operating the optical sensor module to measure both (1) extinction ratios of the probe light at the two or more different wavelengths and (2) time-domain evolution of a press force from the object in contact with the top transparent layer to determine whether the received contact is from a live person.

For example, the method can include operating the display panel to display a marked fingerprint sensing area visible to a user below the area where the probe light is projected to indicate to a user where to place a finger for fingerprint sensing. The marked fingerprint sensing area is adjacent to the optical sensor module to allow the optical sensor module to receive returned probe light while a user finger is above the marked fingerprint sensing area and further allows the optical sensor module to capture returned light from a portion of a user finger when in contact with the marked fingerprint sensing area.

In another aspect, the disclosed technology can be implemented to provide an electronic device having an optical fingerprint sensing module. This device can include a display panel that displays images and contents and receives user contact inputs; and a top transparent layer formed over the display panel to provide a touch interface for receiving a user contact input and to allow viewing of the displayed images and contents of the display panel in which the top transparent layer includes an extended section extending beyond at least one end of the display panel. An optical sensor module is placed underneath the extended section of the top transparent layer and located adjacent to the one end of the display panel and the optical sensor module includes one or more probe light sources to produce probe light to illuminate the extended section of the top transparent layer and an adjacent area above the top transparent layer above the display panel so as to illuminate an object above or in contact with the top transparent layer for optical sensing, and an optical sensor array including optical detectors to detect reflected light from the object above or in contact with the top transparent layer to detect both (1) a first signal to provide a first indication of whether the object is a finger of an authorized user and (2) a second different signal to provide a separate second indication of whether the object is a finger of an authorized user. The device further includes an optical sensor controller coupled to the optical sensor module to control operations of the one or more probe light sources and the optical sensor array to trigger capturing of different images of the object including an image of the object when the object is above the top transparent layer without contacting the top transparent layer as part of the first signal and another image of the object when the object is in contact with the top transparent layer as part of the second signal. In this device, the optical sensor controller processes the captured images of the object, including both the captured image of the object when the object is above the top transparent layer without contacting the top transparent layer as part of the first signal and the other captured image of the object when the object is in contact with the top transparent layer as part of the second signal, to determine whether the object is a finger of an authorized user for the electronic device.

The above device can be implemented in various ways and can include various features. For example, in the device, the one or more probe light sources of the optical sensor module are configured to emit the probe light at an optical wavelength that penetrates into a human skin surface, the optical sensor array captures images formed by the probe light at the optical wavelength that penetrates into a human skin surface and containing tissue structures below the skin surface, and the optical sensor controller processes a captured image of the object at the optical wavelength that penetrates into a human skin surface containing tissue structures below the skin surface to include information on the tissue structures below the skin surface as part of determination of whether the object is a finger of an authorized user for the electronic device to provide anti-spoof fingerprint sensing. In addition, the one or more probe light sources of the optical sensor module may be configured to emit the probe light at an infrared (IR) optical wavelength that penetrates into a human skin surface.

For example, in the device, the one or more probe light sources of the optical sensor module can be configured to emit the probe light at an optical wavelength that penetrates into a human skin surface, the optical sensor array captures (1) images formed by the probe light at the optical wavelength that penetrates into a human skin surface and containing tissue structures below the skin surface, and (2) images representing a surface pattern of the skin surface such as a fingerprint pattern of ridges and valleys of a finger, and the optical sensor controller processes (1) the images formed by the probe light at the optical wavelength that penetrates into a human skin surface and containing tissue structures below the skin surface, and (2) the images representing a surface pattern of the skin surface such as a fingerprint pattern of ridges and valleys of a finger to form a 3-dimensional profile for determination of whether the object is a finger of an authorized user for the electronic device to provide anti-spoof fingerprint sensing.

For example, in the device, the optical sensor controller coupled to the optical sensor module can be operable to trigger capturing of different images of the object when object is above the top transparent layer without contacting the top transparent layer and is approaching the top transparent layer, when the object is in contact with the top transparent layer, and when the object is moving away from the top transparent layer.

For example, in the device, the one or more probe light sources of the optical sensor module can be structured to emit the probe light at two or more different optical wavelengths at which a human live finger exhibits different optical properties; and the optical sensor controller is structured to measure returned probe light at the two or more different wavelengths to compare an extinction ratios of the probe light at the two or more different wavelengths to determine whether the object is a finger from a live person. In addition, the optical sensor module may be structured to measure both (1) extinction ratios of the probe light at the two or more different wavelengths and (2) time-domain evolution of a press force from the object in contact with the top transparent layer to determine whether the received contact is from a live person.

For example, in implementing the above device, the display panel may be in various display configurations, including a liquid crystal display (LCD) panel, an organic light emitting diode (OLED) display panel, or an active matrix organic light emitting diode (AMOLED) display panel.

For example, in the device, the optical sensor module placed underneath the extended section of the top transparent layer can be structured to project the probe light from the one or more probe light sources over an area above the display panel to allow capturing of returned probe light from an object in the area above the display panel to capture images of the object when the object is not in contact with the top transparent layer. In this regard, the display panel may be operated to display a marked fingerprint sensing area visible to a user below the area where the probe light is projected to indicate to the user where to place a finger for fingerprint sensing, and the marked fingerprint sensing area may be adjacent to the optical sensor module to allow the optical sensor module to receive returned probe light while a user finger is above the marked fingerprint sensing area and further allows the optical sensor module to capture returned light from a portion of a user finger when in contact with the marked fingerprint sensing area. In addition, the optical sensor module may include an optical imaging aperture formed by a microlens that captures returned probe light from an object to form an image from the captured returned probe light on the optical sensor array, or an optical imaging aperture formed by a pinhole that captures returned probe light from an object to form an image from the captured returned probe light on the optical sensor array.

For example, in the device, the optical sensor module may include (1) an optical imaging aperture for capturing returned probe light to be imaged to the optical sensor array, and (2) an optical probe light transparent opening that is displaced away from the optical imaging aperture and is above each optical probe light source to export the probe light above the top transparent layer for fingerprint sensing. The optical sensor module may also include a color coating that interfaces with and is below the top transparent layer to cover space between the optical imaging aperture and each optical probe light transparent opening, and the color coating may be at least partially transparent to the probe light.

For example, in the device, the optical sensor module can include an optical filter above the optical sensor array to transmit the probe light while blocking background light from reaching the optical sensor array. Specifically, the optical filter may be structured to reduce infrared light from reaching the optical sensor array.

For example, the device can further include a trigger sensor separate from the optical sensor module and located underneath the top transparent layer, the trigger sensor being structured to sense presence of an object before the object touches the top transparent layer and to trigger a first optical fingerprint sensing operation by the optical sensor module while the object is not in contact with the top transparent layer. The optical sensor controller processes captured optical images from the first optical fingerprint sensing operation by the optical sensor module to determine whether the object is a finger of an authorized user for the electronic device and an access is denied when the determination based on the first optical fingerprint sensing operation is negative. When the determination based on the first optical fingerprint sensing operation is positive, the optical sensor module is operated to perform a second optical fingerprint sensing operation by capturing fingerprint images when the object contacts the top transparent layer to further determine whether the object is a finger of an authorized user for the electronic device and the access is granted only after the determination of the second optical fingerprint sensing operation is positive. In addition, the trigger senor separate from the optical sensor module may include a capacitive sensor that measures a capacitance associated with the object positioned above the top transparent layer; or the trigger senor separate from the optical sensor module may include an ultrasound sensor that directs a sound signal to the object and to detect a reflected sound signal from the object positioned above the top transparent layer.

For yet another example, the device can include a support transparent layer formed below the top transparent layer and engaged to the top transparent layer, the support transparent layer including an opening underneath the extended section of the top transparent layer and is located adjacent to the one end of the display panel and the optical sensor module can be placed inside the opening of the support transparent layer underneath the extended section of the top transparent layer. In this regard, the top transparent layer and the support transparent layer may be glass transparent substrates.

As yet another example, the device may include a touch sensor formed underneath the top transparent layer and structured to determine whether an object is in contact with the top transparent layer.

In another aspect, the disclosed technology can be implemented provide optical fingerprint sensing by capturing images in non-contact and contact configurations while placing the optical sensor module at various positions in a device. Specifically, a method is provided for authenticating a user for accessing an electronic device by using an optical sensor module of the electronic device to include operating one or more probe light sources of the optical sensor module to produce probe light to illuminate an adjacent area of the electronic device; operating an optical sensor array of optical detectors of the optical sensor module to detect reflected light from an object that is present in the illuminated adjacent area to determine the presence of the object; operating the one or more probe light sources and the optical sensor array to perform a first optical fingerprint sensing operation when the presence of the object is detected while the object is not in contact with the electronic device to capture one or more first optical images of the object to determine whether the captured one or more first optical images of the object contain a first stored fingerprint of a finger of an authorized user previously obtained from the authorized user by operating the one or more probe light sources and the optical sensor array when the finger of the authorized user was not in contact with the electronic device; denying an access to the electronic device when the captured one or more first optical images of the object are determined not to contain the first stored fingerprint of the authorized user; when the first optical fingerprint sensing operation determines that the captured one or more first optical images of the object in the first optical fingerprint sensing operation are determined to contain the fingerprint of an authorized user, operating the one or more probe light sources and the optical sensor array to perform a second optical fingerprint sensing operation when the object is in contact with the electronic device to capture one or more second optical images of the object to determine whether the captured one or more second optical images of the object contain a second stored fingerprint of the finger of the authorized user previously obtained from the authorized user by operating the one or more probe light sources and the optical sensor array when the finger of the authorized user was in contact with the electronic device; denying an access to the electronic device when the captured one or more second optical images of the object are determined not to contain the second stored fingerprint of the authorized user; and granting an access to the electronic device when the captured one or more second optical images of the object are determined to contain the second stored fingerprint of the authorized user.

The above method can be implemented in various ways and can include various features. For example, the optical sensor module can be located in a button of the electronic device. In some implementations, the button of the electronic device can be on a side facet of the electronic device, a front side of the electronic device that includes a display panel. The button of the electronic device can be operable to perform another operation different from fingerprint sensing. The button of the electronic device may be a power button for turning on power of the electronic device.

For example, in implementing the above method, the electronic device can include a front side that includes a display panel, a back side opposite to the front side, and side surfaces between the front and back sides. The optical sensor module can be placed on a side surface of the electronic device, or on the back side of the electronic device, or on the front side of the electronic device. The optical sensor module may also be placed in a button formed on a front side of the electronic device and is located outside the display panel.

For another example, the above method may include operating the one or more probe light sources of the optical sensor module to emit the probe light at an optical wavelength that penetrates into a human skin surface so that the optical sensor module captures images containing tissue structures below the skin surface to provide anti-spoof fingerprint sensing. The one or more probe light sources of the optical sensor module may be configured to emit the probe light at an infrared (IR) optical wavelength that penetrates into a human skin surface.

For yet another example, the method may include operating the one or more probe light sources of the optical sensor module to emit the probe light at two or more different optical wavelengths at which a human live finger exhibits different optical properties; and operating the optical sensor array to measure returned probe light at the two or more different wavelengths to compare an extinction ratios of the probe light at the two or more different wavelengths to determine whether the object is a finger from a live person. In this regard, this method may further include operating the optical sensor module to measure both (1) extinction ratios of the probe light at the two or more different wavelengths and (2) time-domain evolution of a press force from the object in contact with the top transparent layer to determine whether the received contact is from a live person.

The disclosed technology can be implemented to provide other features.

For example, an electronic device having an optical fingerprint sensing module is provided to include a display panel that displays images and contents and receives user contact inputs; and an optical sensor module placed underneath the display panel and configured to detect a presence of a received contact input associated with a fingerprint to generate a first signal indicative of an image of a spatial pattern of the fingerprint and a second signal indicative of a biometric marker that is different from the spatial pattern of the fingerprint and represents a property of a live person, the optical sensor module including an optical sensor array positioned to receive reflected probe light that carries information of the received contact input and to produce an optical sensor signal. The optical sensor module captures different fingerprint patterns at different times to monitor time-domain evolution of the fingerprint ridge pattern.

For another example, an electronic device having an optical fingerprint sensing module is provided to include a display panel that displays images and contents and receives user contact inputs; and an optical sensor module placed underneath the display panel and configured to detect a presence of a received contact input associated with a fingerprint to generate a first signal indicative of an image of a spatial pattern of the fingerprint and a second signal indicative of a biometric marker that is different from the spatial pattern of the fingerprint and represents a property of a live person. The optical sensor module includes an optical sensor array positioned to receive reflected probe light that carries information of the received contact input and to produce an optical sensor signal. In some implementations, the optical sensor module further includes an optical filter layer between optical sensor array and the display panel to reduce background light such as sunlight or ambient light.

For another example, an electronic device having an optical fingerprint sensing function is provided to include a touch receiving surface including a touch area for receives a contact input; an optical sensor module that detects a presence of a received contact input associated with a fingerprint on the touch receiving surface to generate a first signal indicative of an image of a spatial pattern of the fingerprint and a second signal indicative of a biometric marker that is different from the spatial pattern of the fingerprint and represents a property of a live person. The optical sensor module includes: a light source to produce probe light projected onto the touch receiving surface, and an optical sensor array positioned to receive probe light from the touch receiving surface that carries information of the received contact input and to produce an optical sensor signal. The device may further include processing circuitry that is communicatively coupled to receive the optical sensor signal to process the first signal to determine whether the detected image matches a fingerprint pattern of an authorized user and to process the second signal to determine whether the biometric marker indicates that the contact input associated with the fingerprint is from a finger of a live person.

For another example, the optical fingerprint sensor of the disclosed technology can be implemented to provide one or more of the following features. The optical fingerprint sensor includes a light source, coupler, spacer, photo diode array, and cover glass. The spacer may be made of glass material, adhesive material, or even air gap or vacuum. The coupler may be made of glass material, adhesive material, or even air or vacuum. The cover glass may be partial of the display cover glass, or separate cover glass. Each of the mentioned coupler, spacer, and cover glass may be of multiple layers.

The disclosed technology can be used to provide flexibilities to control the signal contrast by matching the materials shapes and refractive indexes. By matching the probe light beam incident angle, divergent angle, and the materials of the involved coupler, spacer and cover glass, the probe light beam may be controlled to be totally reflected or partially reflected at the sensing surface for different touching materials.

In some implementations, the disclosed optical fingerprint sensor can be configured to provide a water-free fingerprint sensing effect. A typical smartphone cover glass has a refractive index of about 1.50. One design is to use low refractive index material (MgF2, CaF2, Polymer etc.) to form the coupler. The disclosed technology can be used to control the local probe light beam incident angle at the sensing surface to be about 68.5°. The total reflection angle is about 62.46° when water touches the sensing surface of the optical fingerprint sensor, and the total reflection angle is about 73.74° when the ridges of a fingerprint touch the sensing surface. The total reflection angle is about 41.81° when nothing touches the sensing surface. In this design, at the water soaking area, the probe light is totally reflected to the photo diode array; at the fingerprint ridges touching positions, less than 5% of the probe light is reflected to the photo diode array; and at the dry fingerprint valleys positions, the probe light beam is also totally reflected to the photo diode array. This means that only the fingerprint ridges generate signals that are detected.

Sweat has a refractive index that is lower than the finger's skin. The disclosed technology provides a solution to distinguish the sweat pores in the fingerprint.

When air gap is used to form the coupler, total reflection at the sensing surface does not occur. The reflectance difference among different touching materials (the fingerprint ridges, fingerprint valleys, and other contaminations) can be used to detect the fingerprint image.

Due to the light path compression effect, the sensing area size may be greater than the photo diode array size.

The light source may be a point light source installed at proper distance.

The probe light beam may be collimated by spherical lenses, cylinder lenses, or aspheric lenses.

The probe light beam may be of proper divergent angle. The probe light beam may also be divergent or convergent.

Due to the light path compression effect, the coupler may be very thin. For example, less than 1 mm thickness CaF2 coupler can be used to realize even 10 mm sensing area size. In this example, the image compression ratio is 1:10. This helps to reduce the sensor cost.

The photo diode array is installed on one end of the coupler instead of under the coupler. This design leaves the flexibility to apply color paint, illumination light etc. to compensate the color or decorate the sensor area.

The probe light source may be modulated to help reduce the influence of the background light. The photo diode array is designed to work well in any illumination environments.

The cover glass thickness does not limit the fingerprint sensing.

The principle can be used to build optical touch panel.

In another aspect, the optical fingerprint sensor of the disclosed technology can be implemented to perform live-finger detection including the following:

The optical fingerprint sensor can detect whether the touching material is a live-finger and can improve the security of the sensor.

Specified light sources and detectors can be used to detect whether the object touching the sensing area is a live-finger or a nonliving material.

When single wavelength is used, the heartbeat detection provides a reliable criterion to detect whether the object touching the sensing area is a live-finger or a nonliving material, including the fingerprint of a live-finger.

When two or more wavelengths are used, the extinction ratio of the wavelengths are compared to detect whether the object touching the sensing area is a live-finger or a non-living material, including the fingerprint of a live-finger.

The fingerprint sensor light sources and photo diode array can be used to detect whether the object touching the sensing area is a live-finger or a nonliving material, including the fingerprint of a live-finger.

The dynamic fingerprint images can be used to detect whether the object touching the sensing area is a live-finger or a nonliving material, including the fingerprint of a live-finger.

The dynamic fingerprint images can also be used to detect the press force when a live finger is touching the sensing area.

Multiple security level can be set up for different security requirement tasks.

In yet another aspect, the optical fingerprint sensor can be implemented to enable various decorative elements including the following:

The bottom surface of the coupler can be painted with same color or pattern layers to match with the platform surface color.

The bottom surface of the coupler can be painted with different color or pattern layers to show new styles outlooking.

Color light sources can be installed around the coupler to decorate the sensor area.

In yet another aspect, the optical fingerprint sensor packaged as a separate button can perform the same fingerprint detection and live-finger detection as described above. In addition, the optical fingerprint sensor package as a separate button can be implemented to perform the following features:

The cover glass and related spacer material feature flexibility in the thickness according to the applications.

Especially, it is a practical package not to use cover glass and spacer material.

Another practical design is to use a thin layer of cover glass to protect the coupler. The cover glass may be of high hardness.

To use colored glass or other optical materials to build the cover is also practical.

The package method provides a solution to build a compact button that can detect the fingerprint with improved security.

Other mechanical parts may be integrated to make the module strong.

In yet another example for implementing the disclosed technology, an electronic device having an optical fingerprint sensing module is provided to include a touch sensing display panel including a touch sensing and displaying area for displaying images and contents and for receiving user contact inputs; a top transparent cover formed on top of the touch sensing display panel and operable as a top touch sensing surface for a user to provide user contact input to the touch sensing display panel and to transmit light for a user to view images displayed by the touch sensing display panel; and an optical sensor module placed underneath the top transparent cover and displaced from the touch sensing display panel. The optical sensor module is configured to detect a presence of a received contact input associated with a fingerprint on the top touch sensing surface to generate a first signal indicative of an image of a spatial pattern of the fingerprint and a second signal indicative of a biometric marker that is different from the spatial pattern of the fingerprint and represents a property of a live person. The optical sensor module includes a probe light source to produce probe light projected onto the top touch sensing surface, and an optical sensor array positioned to receive reflected probe light from the top touch sensing surface that carries information of the received contact input and to produce an optical sensor signal. The probe light source produces probe light of two different wavelengths with different optical absorptions by blood. The first signal indicative of the image of the spatial pattern of the fingerprint is captured by the optical sensor array by sensing the reflected probe light at each of the two different wavelengths, and the second signal indicative of the biometric marker is carried by differences in the reflected probe light at the two different wavelengths.

In yet another aspect, the disclosed technology can be implemented to provide an electronic device having an optical fingerprint sensing module to include a display panel that displays images and contents and receives user contact inputs; a top transparent layer formed over the display panel to provide a touch interface for receiving a user contact input and to allow viewing of the displayed images and contents of the display panel; and an optical sensor module placed underneath the top transparent layer and the display panel. The optical sensor module includes one or more probe light sources to produce probe light to illuminate the extended section of the top transparent layer and an adjacent area above the top transparent layer above the display panel so as to illuminate an object above or in contact with the top transparent layer for optical sensing, and an optical sensor array including optical detectors to detect reflected light from the object above or in contact with the top transparent layer to detect both (1) a first signal to provide a first indication of whether the object is a finger of an authorized user and (2) a second different signal to provide a separate second indication of whether the object is a finger of an authorized user. This device includes an optical sensor controller coupled to the optical sensor module to control operations of the one or more probe light sources and the optical sensor array to trigger capturing of different images of the object including an image of the object when the object is above the top transparent layer without contacting the top transparent layer as part of the first signal and another image of the object when the object is in contact with the top transparent layer as part of the second signal. The optical sensor controller processes the captured images of the object, including both the captured image of the object when the object is above the top transparent layer without contacting the top transparent layer as part of the first signal and the other captured image of the object when the object is in contact with the top transparent layer as part of the second signal, to determine whether the object is a finger of an authorized user for the electronic device.

In implementations, the top transparent layer can include a designated fingerprint sensing area for a user to place a finger for fingerprint sensing; the optical sensor module can be located underneath the designated fingerprint sensing area to receive light from the top transparent layer to detect a fingerprint, wherein the optical sensor module includes an optical sensor array of optical detectors to convert the received light that carries a fingerprint pattern of the user into detector signals representing the fingerprint pattern; and the device can further include extra illumination light sources located outside the optical sensor module at different locations to produce different illumination probe beams to illuminate the designated fingerprint sensing area on the top transparent layer in different illumination directions where each extra illumination light source is structured to produce probe light in an optical spectral range with respect to which tissues of a human finger exhibit optical transmission to allow probe light in each illumination probe beam to enter a user finger over the designated fingerprint sensing area on the top transparent layer to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger; and the device can further include a probe illumination control circuit coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

The above and other aspects and features are described in greater detail in the attached drawings, the description and the claims.

BRIEF DESCRIPTION OF THE DRAWINGS

FIGS. 39A, 39B, 40A, 40B, 40C, 41 and 42 show examples of the invisible under-LCD optical sensor module design by placing optical transmissive features or regions under the opaque border frame of the LCD screen.

FIGS. 43A, 43B, 44A, 44B, 45, 46, 47, 48A and 48B illustrate examples for obtaining both optical reflective and transmissive patterns to improve the optical fingerprint sensing.

FIG. 61 shows an example of an under-OLED screen optical sensor module based on a pinhole-lens assembly that uses a housing to block the environmental light.

DETAILED DESCRIPTION

Figure 1A:
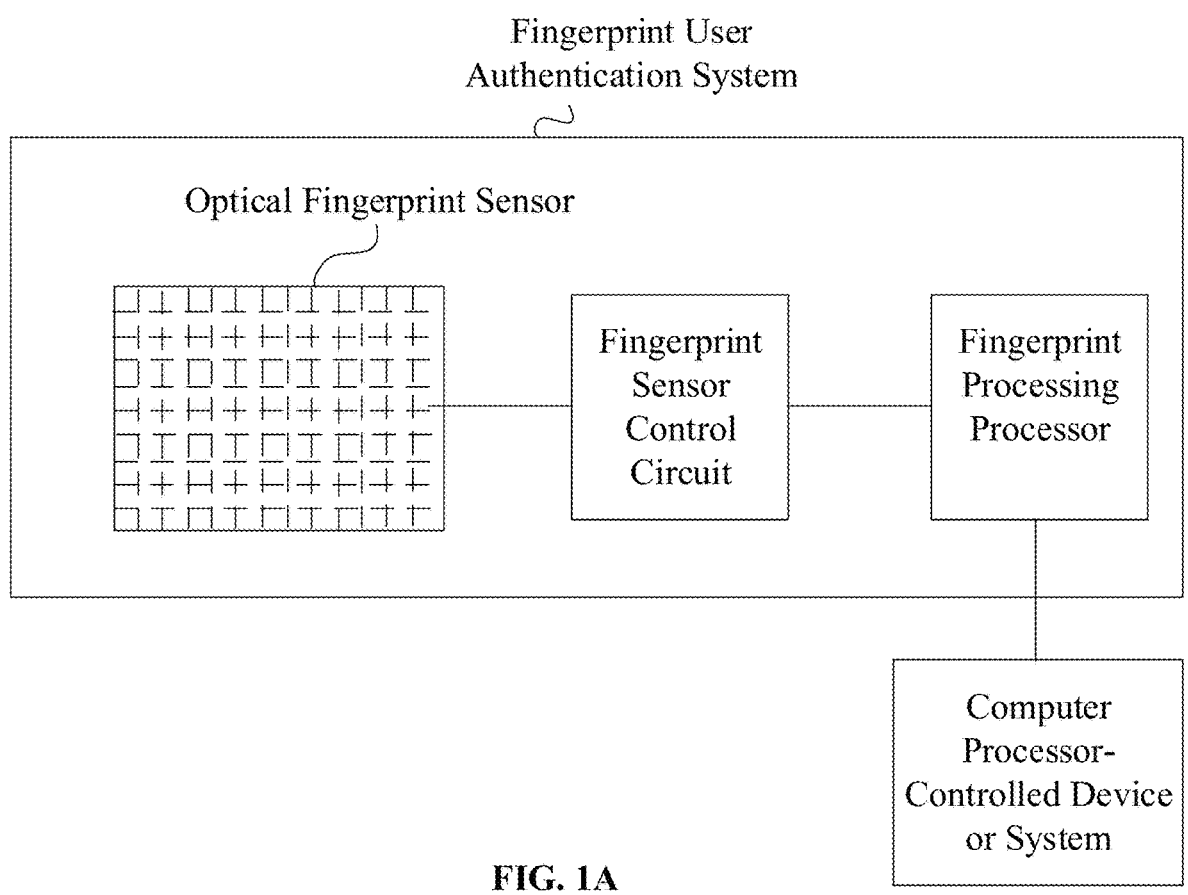
FIG. 1A is a block diagram of an example of an optical sensing based fingerprint user authentication system that controls the access to a computer processor controlled device or system.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on the top surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imagining information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed for folded or complex optical paths to reach the optical detector array, thus allowing for flexibility in placing an optical fingerprint sensor in a device that is not available for a capacitive fingerprint sensor. Optical sensor modules based on the disclosed technology in this patent document can be an under-screen optical sensor module that is placed below a display screen in some designs to capture and detect light from a finger placed on or above the top sensing surface of the screen. As disclosed in this patent document, optical sensing can also be used to, in addition to detecting and sensing a fingerprint pattern, detect other parameters such as whether a detected fingerprint is from a finger of a live person and to provide anti-spoofing mechanism, or certain biological parameters of the person.

The optical sensing technology and examples of implementations described in this patent document provide an optical sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide while light illumination to the LCD pixels with optical filters to produce colored LCD pixels, a display screen having light emitting display pixels without using backlight where each individual pixel generates light for forming a display image on the screen such as an organic light emitting diode (OLED) display screens, or electroluminescent display screens.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint sensor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a blood flow dynamics change. Those and other changes can be measured by optical sensing based on the disclosed optical sensor technology and can be used to calculate the touch force. This touch force sensing can be used to add more functions to the optical sensor module beyond the fingerprint sensing.

With respect to useful operations or control features in connection with the touch sensing aspect of the display screen, the disclosed optical sensor technology can provide triggering functions or additional functions based on one or more sensing results from the optical sensor module to perform certain operations in connection with the touch sensing control over the display screen. For example, the optical property of a finger skin (e.g., the index of refraction) tends to be different from other artificial objects. Based on this, the optical sensor module may be designed to selectively receive and detect returned light that is caused by a finger in touch with the surface of the display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the display screen which, the pixels are put in a "sleep" mode by being turned off while one or more illumination light sources (e.g., LEDs) for the under-panel optical sensor module or selected display pixels in an LED display are turned on in a flash mode to intermittently emit flash light to the screen surface for sensing any touch by a person's finger or palm. Under this design, the optical sensor module operates the one or more illumination light sources to produce the "sleep" mode wake-up sensing light flashes so that the optical sensor module can detect returned light of such wake-up sensing light caused by the finger touch on the display screen and, upon a positive detection, the entire display screen is turned on or "woken up". In some implementations, the wake-up sensing light can be in the infrared invisible spectral range so a user will not experience any visual of a flash light. The display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the display screen is turned on and in the other frame when the display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

In some implementations, an optical sensor module based on the disclosed optical sensor technology can be coupled to the backside of the display screen without requiring creation of a designated area on the surface side of the display screen that would occupy a valuable device surface real estate in some electronic devices such as a smartphone, a tablet or a wearable device. This aspect of the disclosed technology can be used to provide certain advantages or benefits in both device designs and product integration or manufacturing.

Notably, among other features, the disclosed optical sensing technology can be implemented to provide optical fingerprint sensing while a user finger is located near a device while not in contact with the device for user authentication in accessing the device and can further provide optical fingerprint sensing while a user finger is in contact with the device. In some implementations (e.g., FIGS. 14-16 and 20-21 and their applications for optical sensing implementations with LCD and OLED displays), the optical fingerprint sensing can be performed on a finger in both contact and non-contact instances to enhance the fingerprint sensing and to provide anti-spoofing in the optical sensing. For example, multiple fingerprint images can be captured when a finger is located near a device while not in contact with the device and when the finger is in contact with the device. The captured fingerprint images of the non-contact finger and the captured fingerprint images of the contact finger provide two different types of optical fingerprint sensing mechanisms and can be used collectively to enhance the fingerprint sensing performance and anti-spoofing feature.

Each user has unique inner topographical features in their fingers that are below the skin surface and such inner features are not usually captured or available in various fingerprint sensors. Notably, such unique topographical features below the skin surface are difficult to duplicate by fake fingerprint pattern duplicating techniques many of which are designed to mimic or reproduce external images representing the external surface pattern of the skin surface such as a 2-dimensional fingerprint pattern of ridges and valleys on the external surface of a finger. The features of the external surface pattern of ridges and valleys on the external surface of a finger tend to vary in shape in connection with the contact conditions of the finger, e.g., a captured image of the fingerprint pattern when a finger is not pressed against a surface would tend to reflect the shapes of ridges and valleys of the finger in their natural positions would be different from the captured image of the same finger when a finger is deformed in shape when being pressed against a surface. Such external fingerprint variation in shape in connection with the contact condition of the finger can vary with the amount or level of pressing when the finger is pressed under different pressing forces or conditions, thus further complicating the fingerprint detectability or reliability in fingerprint sensing.

The disclosed optical sensing technology in this patent document can be used to or implemented to capture unique inner topographical features below the skin surface in user fingers to improve the detection accuracy of the optical fingerprint sensing and thus the security provided by fingerprint authentication.

Figure 1B:
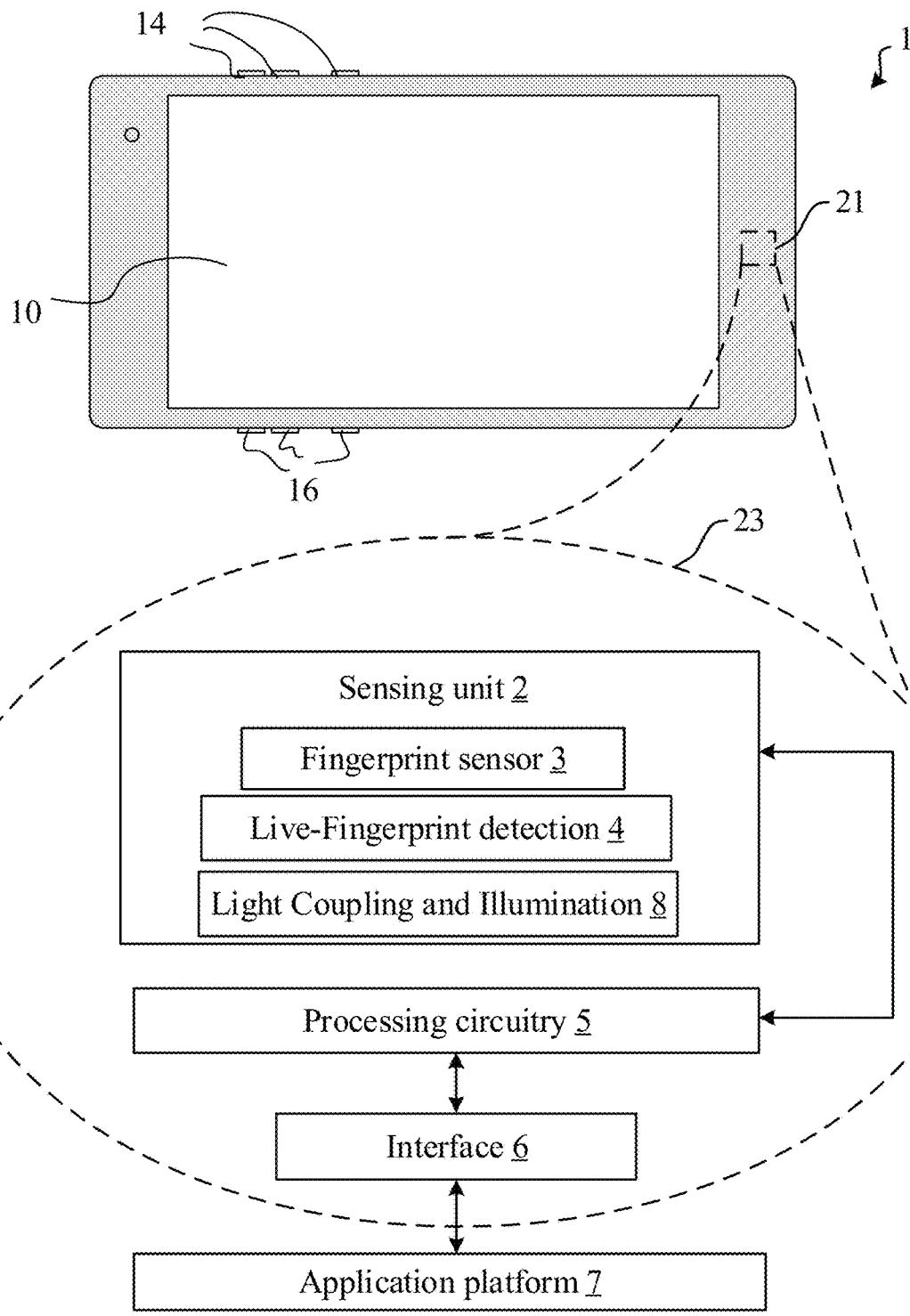
FIG. 1B is a block diagram showing an exemplary fingerprint sensor device implementing in a mobile device such as a smartphone based on the design in FIG. 1A.

FIG. 1A is a block diagram of an example of an optical sensing based fingerprint user authentication system that controls the access to a computer processor controlled device or system. The system uses an optical fingerprint sensor with an array of optical detectors to capture an optical image of received light that carries the fingerprint pattern from a finger that is touched on the optical fingerprint sensor sensing surface that is illuminated by an illumination light beam. The system includes a fingerprint sensor control circuit that receives the outputs from the optical detectors in the optical fingerprint sensor, and a digital fingerprint processing processor which may include one or more processors for processing fingerprint patterns and determining whether an input fingerprint pattern is one for an authorized user. The fingerprint sensing system may compare a captured fingerprint to a stored fingerprint to enable or disable functionality in a device or system that is secured by the fingerprint user authentication system. For example, the fingerprint user authentication system at an ATM may determine the fingerprint of a customer requesting to access funds. Based on a comparison of the customer's fingerprint to one or more stored fingerprints, the fingerprint user authentication system may cause the ATM system to allow access to funds and may identify the customer in order to associate an appropriate account to credit or deduct the requested funds. A wide range of devices or systems may be used in connection with the disclosed optical fingerprint sensors, including mobile applications, and various wearable or portable devices (e.g., smartphones, tablet computers, wrist-worn devices), larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others. FIG. 1B illustrates an example for a smartphone or a portable device where the fingerprint user authentication system is a module integrated to the smart phone.

Fingerprint sensing is useful in mobile applications and other applications that use secure access. For example, fingerprint sensing can be used to provide secure access to a mobile device and secure financial transactions including online purchases. It is desirable to include robust and reliable fingerprint sensors features suitable for mobile devices. For example, it is desirable for fingerprint sensors in mobile devices to have a small footprint and thin to fit into the highly limited space in mobile devices; it is also desirable to include a protective cover to protect such a fingerprint sensor from various contaminants.

The optical sensing technology described in this patent document for fingerprint sensing can be implemented to provide high performance fingerprint sensing and can be packaged in compact sizes to fit into mobile and other small device packages. In capacitive fingerprint sensors, the sensing is based on measuring the capacitance between the sensing electrode and a finger surface due to their capacitive coupling. As the protective cover over the capacitive sensor pixels becomes thicker, the electrical field sensed by each capacitive sensor pixel disperses quickly in space leading to a steep reduction in the spatial resolution of the sensor. In connection with this reduction of the sensing spatial resolution, the sensor signal strength received at each sensor pixel also reduces significantly with the increase in thickness of the protective cover. Thus, when the protective cover thickness exceeds a certain threshold (e.g., 300 µm), it can become more difficult for such capacitive sensors to provide a desired high spatial resolution in sensing fingerprint patterns and to reliably resolve a sensed fingerprint pattern with an acceptable fidelity.

The disclosed technology provides optical fingerprint sensor designs in thin optical fingerprint sensor packages for easy integration into a mobile device or other compact devices. In some implementations, the optical fingerprint sensors of the disclosed technology use matched light coupling solutions to provide optical fingerprint sensing at low cost, high performance, and flexible package structures. The disclosed optical fingerprint sensors may also be configured to provide live-finger detection to improve the fingerprint sensing security. Examples of implementations of the disclosed technology can be used for a wide range of devices and systems including those with a display structure. The optical fingerprint sensor based on the disclosed technology can be integrated under the same cover of a display such as a touch sensing display device or be packaged in a discrete device that is located at various locations on the device. In addition, disclosed optical fingerprint sensor solutions may be used to provide separate fingerprint sensing when a finger is at a non-contact position and an in a contact position and the fingerprint sensing at both contact and non-contact positions can be combined to enhance the fingerprint sensing and anti-spoofing.

The performance of the optical fingerprint sensors based on the disclosed technology is not limited by the package cover thickness that may hinder capacitive fingerprint sensors. In this regard, an optical fingerprint sensor based on the disclosed technology can be implemented into a thin package by using suitable optical imaging capture configurations, including configurations that are free of imaging lenses or prisms that tend to render the optical imaging modules bulky. Implementations of optical fingerprint sensors based on the disclosed technology can be provide color matching design features to allow the colors of the optical fingerprint sensing areas to be in certain desired colors, e.g., matching colors of the surrounding structures.

In some implementations, the optical fingerprint sensors of the disclosed technology can be packaged under the platform screen cover glass without modifying the cover thickness and color. The optical fingerprint sensor can include an optical sensor array, e.g., a photo diode array, or a CMOS sensor array, and the optical sensor array can be dimensioned to a compact size due to the contribution of the compressed light path structure. Moreover, the design provides flexibility to decorate the sensor area, for example, with color light illumination.

In some implementations, in addition to the optical sensing of a fingerprint, optical sensing of a biometric indication is provided to indicate whether an input of the fingerprint pattern is from a live person. This additional optical sensing feature can be used to meet the needs for defeating various ways that may compromise the secured or authorized access to fingerprint-protected devices or systems. For example, a fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device or system. Hence, a fingerprint pattern, although a unique biometric identifier, may not be by itself a completely reliable or secure identification. The techniques, devices and systems described in this document supplement the disclosed optical sensing based fingerprint authentication technology further improve the security level by using an optical sensing technique to determine whether the input fingerprint is from a live person.

Fingerprint Sensor Circuitry and Live Finger Detection

FIG. 1B is a block diagram showing an exemplary fingerprint sensor device 23 implementing in a mobile device such as a smartphone, a tablet or a portable computing device 1 with a touch sensing display screen or touch panel 10 for both touch sensing user inputs and display images and functions of the device 1. This is specific implementation example of the general optical fingerprint sensing controlled system in FIG. 1A. The touch panel or sensing display screen 10 can be implemented based on various touch sensing display designs, including, a display screen having light emitting display pixels without using backlight where each individual pixel generates light for forming a display image on the screen such as an organic light emitting diode (OLED) display screens or electroluminescent display screens or other display screens such as LCD-based touch sensing display screens. The touch sensing display panel includes a touch sensing and displaying area for both displaying images and contents and for receiving contact inputs from a user.

A fingerprint sensor device marker 21 is shown in FIG. 1B to illustrate an exemplary position of the fingerprint sensor device 23 with respect to the mobile device 1. The fingerprint sensor device 23 includes a sensing unit or circuitry 2 that performs fingerprint scanning, live-fingerprint detection, and sensing area decorative functions. The sensing unit 2 is communicatively coupled to processing circuitry 5 that handles signal flows from the sensing unit 2 and to process the signals associated with fingerprint scanning and live-fingerprint judgment, etc.

An interface 6 bridges a signal flow between the fingerprint sensor device 23 and an application platform or a host device 7, which is the smartphone 1 in this example. Examples of the application platform 7 include the smart phone 1, a tablet computer, a laptop computer, a wearable device, and other electronic device where a secure access is desired. For example, the interface 6 can communicate with a central processor (either directly or through other components, such as a bus or an interface) of the smartphone 1 to provide sensor data from the fingerprint sensor device 23 under the fingerprint sensor device marker 21 including fingerprint image data and information indicative of whether the detected fingerprint making the contact input belongs to a live fingerprint.

In the illustrated example in FIG. 1B, the sensing unit 2 includes a fingerprint sensor 3, a live-fingerprint detector 4, and a light coupling and illumination unit 8. The fingerprint sensor 3 captures a fingerprint pattern and can be implemented using one or more optical techniques. The live-fingerprint sensor 4 can include circuitry for analyzing fingerprint image dynamics. The live finger sensor 4 can include circuitry, such as optical sensors, for sensing additional biometric markers, such as heartbeat or heart rate from the scanned fingerprint.

The live finger sensor 4 is designed to detect whether a fingerprint is from a finger of a live person and this live finger detection or judgment is based on the fact that a finger of a live person may exhibit certain motions or physical traits that are typically associated with a live person, e.g., a pulsing signal due to blood flows through the user's vessels. For example, blood cells manifest different optical absorption spectral signatures at visible wavelengths (e.g., a higher optical absorption) and near IR wavelengths (e.g., a lower optical absorption than that is a visible wavelength). Such different optical absorption signatures by blood can be optically captured by the liver finger sensor 4. Other signatures of blood flows may be reflected by pressure variations in blood vessels. In some implementations, the live finger sensor 4 can include a pressure sensor, an optical sensor, or other sensors that can detect the moving, stretching, or pulsing of a live finger. For example, an optical sensor can include a light source, such as a light emitting diode (LED) or a laser diode (LD) to emit light and a light detector, such as a photodiode to detect scattered light scattered from the finger responsive to the emitted light. When the light propagates through the finger tissues or the blood cells, the light is partially absorbed and partially scattered. The live finger movement or the blood flow causes a change in the light absorption cross-section. The photodiode detects this kind of change and the detected signal can be used to indicate whether a fingerprint that is being presented to the device is from a live person.

The light coupling and illumination unit 8 creates a probe light beam at the fingerprint sensing surface which generates a reflected probe light beam into an optical sensor array (e.g., a photo diode array or CMOS sensor array) of the sensing unit. The fingerprint signals are generated when the probe light beam meets with the finger skin that touches the sensing surface. The fingerprint sensor 3 acquires the fingerprint signals by detecting the reflection differences of the probing light beam at the sensing surface across a fingerprint pattern where locations of the skin of fingerprint ridges in a finger in contact with the sensing surface creates a lower optical reflection than the optical reflections at locations of fingerprint valleys in the finger where the finger skin does not contact the sensing surface. The spatial distribution the above reflection differences across the touched sensing surface by the finger is carried by the reflected optical probe light beam as an optical image that is detected by the array of optical detectors in the fingerprint sensor 3.

The disclosed technology provides for two fingerprint sensor packaging techniques to implement fingerprint detection and live-finger detection. The first packaging technique is to package the fingerprint sensor under the screen cover glass of the platform, such as a smartphone. The second packaging technique is to package the fingerprint sensor as a separate fingerprint sensing button.

Fingerprint Sensor Packaged Under the Screen Cover Glass

Figure 2:
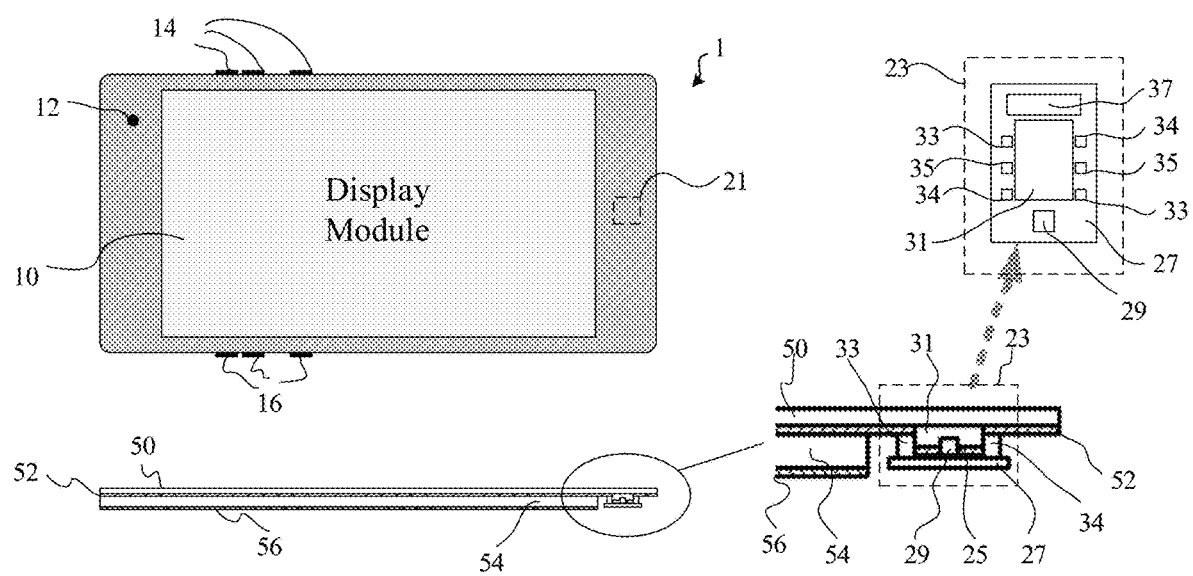
FIG. 2 is a diagram showing an exemplary optical fingerprint sensor packaged under a screen cover glass of a platform, such as a smart phone.
Figure 3A:
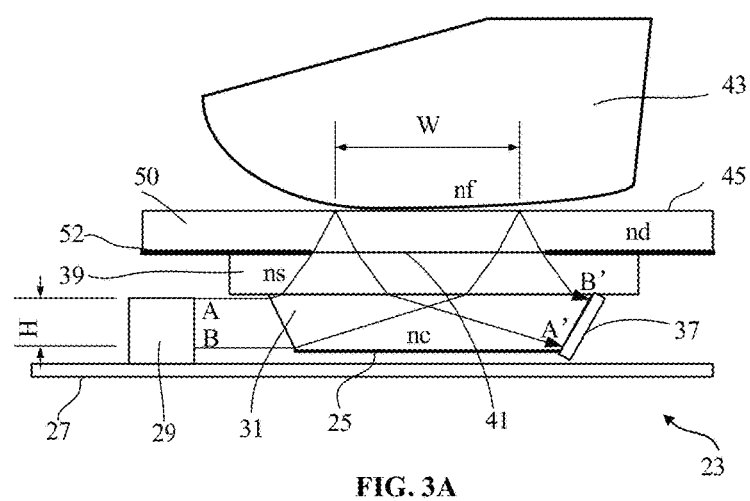
FIGS. 3A-3B are diagrams showing exemplary fingerprint sensing light paths.
Figure 3B:
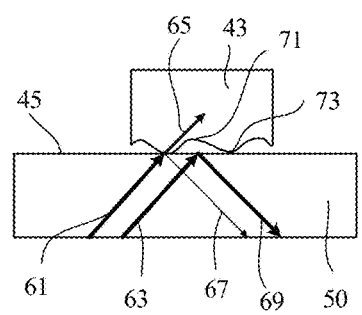

FIG. 2 is a diagram showing an exemplary optical fingerprint sensor packaged under a screen cover glass of a platform, which can be a communication or computing device such as a smartphone, a tablet or a portable electronic device. FIGS. 3A-3B further illustrate an exemplary fingerprint sensing light paths of the device in FIG. 2.

In FIG. 2, the exemplary optical fingerprint sensor 23 is packaged under a top transparent layer 50 which may be a screen cover glass, such as an enhanced cover glass of a platform 1. The location of the optical fingerprint sensor 23 is shown by a fingerprint sensor mark 21 in the top-down view in the upper right-hand side of the device surface having a device display 10 (typically, a touch panel assembly) shown in FIG. 2. The illustrated device surface of the smartphone platform 1 includes the touch panel assembly 10, other sensors 12, such as a camera, and physical buttons 14 and 16 on one or more sides for performing certain operations of the device. There are various structures under the cover glass 50, including, e.g., a color material layer 52, display layers 54 (e.g., OLED layers or LCD layers) as part of the display screen in the touch panel assembly 10, and bottom layers 56 of the display screen in the touch panel assembly 10. A set of touching sensing layers may also be placed to overlay the display layers 54 under the top cover glass 50 (e.g., between the display layers 54 and the top cover glass 50) to provide desired touching sensing functions. Therefore, the optical fingerprint sensor 23 is placed adjacent to and outside of the display module represented by the display layers 54 but both the optical fingerprint sensor 23 and the display layers 54 are under the common contiguous top glass cover 50.

Figure 12:
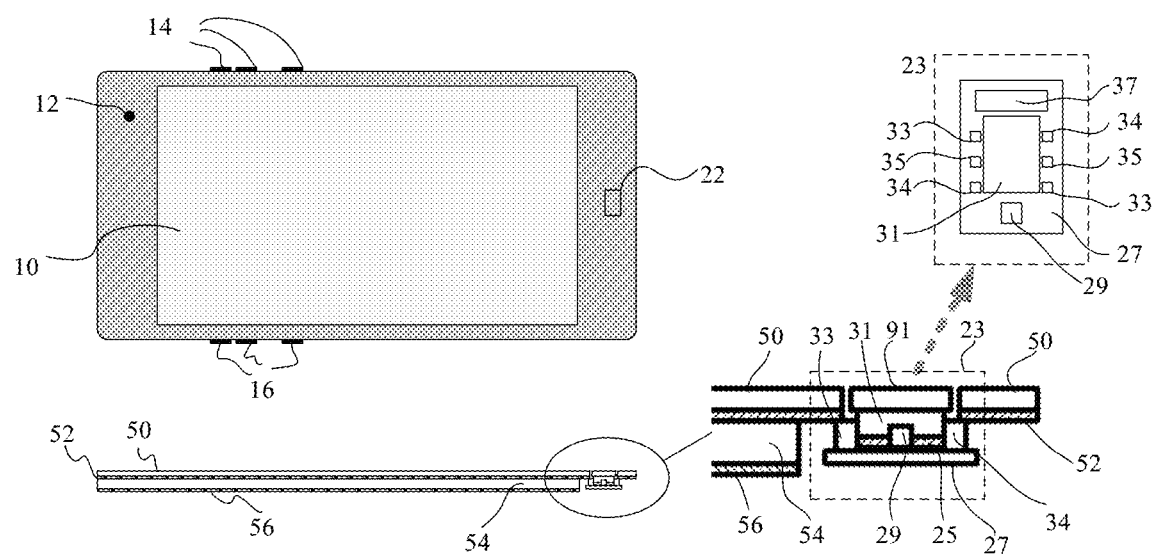
FIG. 12 is a diagram showing an exemplary optical fingerprint sensor packaged as a separate button.

In the example of the optical fingerprint sensor design in FIG. 2, the packaging design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. Under the illustrated design in FIG. 2 and FIG. 1B, the fingerprint sensor 23 formed in the area underneath fingerprint sensor device marker 21 for optical fingerprint is located under the top cover glass or layer 50 so that the top surface of the cover glass or layer 50 serves as the top surface of the device as a contiguous and uniform glass surface across both the display screen of the touch display assembly 10 and the optical detector sensor module 23. In the examples shown in FIGS. 1-6, the optical sensor module is located on one side of the transparent substrate 50 as a glass cover that is contiguous without any opening at or near the optical sensor module. This design is different various smartphones with a fingerprint sensor and provides unique features and benefits. This design for integrating optical fingerprint sensing and the touch sensitive display screen under a common and uniform surface provides benefits, including improved device integration, enhanced device packaging, enhanced device resistance to failure and wear and tear, and enhanced user experience. In some implementations of the optical sensing of fingerprints and other sensing operations, such as the design example in FIG. 12, the optical sensor module may be packaged in a discrete device configuration in which the optical sensor module is embodied a distinct structure that has a structural border or demarcation with the display screen or the top cover glass 50, e.g., a button-like fingerprint sensor structure in an opening of the top glass cover in some mobile phone designs to provide a capacitive fingerprint sensor button or areas. The design in FIG. 12 is based on all optical sensing or a hybrid sensing with both capacitive sensing and optical sensing and thus is different from other button-like fingerprint sensor structures based on capacitive sensing.

The optical fingerprint sensor 23 disposed under the cover glass 50 can include an optical coupler 31 that is made of an optical transparent material with a refractive index nc (greater than 1) and is disposed over a matched color material layer 25, and a probe light source 29 that emits probe light to illuminate a finger placed over the cover glass 50 for optical fingerprint sensing by the optical fingerprint sensor 23. The matched coupler 31, the matched color material layer 25, and the probe light source 29 are disposed over a circuit 27, such as a flexible printed circuit (FPC) with desired circuit elements. Also disposed on the FPC 27 are one or more light sources 33 that produce probe light for liveness detection as further illustrated in the examples associated with FIGS. 7-9, optical detectors 34 such as photo diodes for detecting probe light from the light sources 33 after interacting with the finger to provide liveness detection, light sources 35 for decorating illumination, and an optical detector array 37 of optical detectors such as a photodiode array for capturing the fingerprint pattern or information.

As shown in FIGS. 2 and 3, in some implementations, two optional color material layers 25 and 52 can be provided and designed to be color matched to each other and used to visually conceal or camouflage optical fingerprint sensor 23 disposed under the cover glass 50. The color material layer 25 is placed underneath the optical fingerprint sensor 23 (e.g., on the lower surface of the transparent coupler 31) and the color material layer 52 is placed under the cover glass 50 and above the optical fingerprint sensor 23 to cover the area that is not covered by the color material layer 25 so that the two color-matched material layers 25 and 52 collectively form a more or less uniform appearance when viewed from the above the cover glass 50. In the examples in FIGS. 2 and 3, the top color matched material layer 52 has an opening that defines an optical sensing area on the fingerprint sensing surface 45 on the top of the cover glass 50 to allow for the probe light from the light source 29 to illuminate a finger placed over the cover glass 50 for optical fingerprint sensing, and to allow light from the finger to be collected by the optical fingerprint sensor 23.

FIG. 3A shows an example of the optical fingerprint sensor 23 and FIG. 3B illustrates optical fingerprint sensing based on reflected probe light for capturing a spatial variation in optical reflection at valleys and ridges on the exterior of a finger.

As shown in FIG. 3A, the light coupler 31 is fixed onto the cover glass 50 and an underlying spacer material 39 placed between the light coupler 31 and the lower surface of the cover glass 50 to provide two different light coupling functions. First, the light coupler 31 couples the probe light from the light source 29 towards the top of the top cover glass 50 to illuminate a finger placed over the cover glass 50 for optical fingerprint sensing, and, second, the light coupler 31 couples the probe light and other light coming from the finger and the cover glass 50 to pass through the light coupler 31 along a different optical path as the beam A'B' to reach the optical detector array 37 for optical fingerprint sensing. In the specific design shown in FIGS. 3A-3B, 3A, the coupler 31 is made from a solid transparent material with two angled flat facets, one to receive light from the probe light source 29 and another one to interface with the optical detector array 37 to direct returned light from the top sensing surface 45 to the optical detector array 37. The probe light source 29 is fixed at a proper position so that the probe light beam or a portion of the probe light beam may be projected into the coupler 31 at desired angles. In implementations, the coupler 31, the spacer material 39, and the cover glass 50 can each be made of multiple layers. The optical detector array 37 is fixed at a proper position to receive the reflected probe light beam as part of the received beam A'B' for capturing the optical image of the fingerprint pattern carried by the reflected probe light beam.

Probe light source 29 projects probe light beam AB into coupler 31 which further directs the probe light beam AB through the opening of the optional color material layer 52 onto the fingerprint sensing surface 45 on the top of the cover glass 50 to illuminate the finger in contact. The light beam AB is coupled into cover glass 50 with the help of the spacer material 39 placed underneath the cover glass 50. When nothing is placed on the top sensing surface 45 of the cover glass 50, a portion or all of the probe light beam power is reflected into the spacer 39, and this reflected light enters into coupler 31 and forms the reflected probe light beam as part of the received beam A'B' at the optical detector array 37. The reflected probe light beam as part of the received beam A'B' is received by the matched optical sensor array 37 (e.g., a photo diode array) which converts the optical image carried by the reflected probe light beam A'B' into an array of detector signals for further processing.

When a finger 43 touches the sensing surface 45 of the cover glass 50, the fingerprint ridges 73 change the local surface reflectance in the contact area as shown by FIG. 3B. A portion 61 of the probe light incident on each finger ridge 73 is refracted as light 65 that is scattered in the finger 43, the rest is reflected as light 67 by the finger ridge 73. The fingerprint valleys are separate from the sensing surface 45 and generally do not significantly change the local surface reflection at the sensing surface 45. The incident light 63 that is incident on the fingerprint valleys is reflected as light 69 by the sensing surface 45. The reflected probe light beam which is part of the received light beam A'B' carries the fingerprint signals. Similarly, when something other than a finger skin touches the sensing surface 45 of the cover glass 50, the reflected probe light beam as part of the received light beam A'B' carries the touching material information, which is different from a live fingerprint.

In the example of the optical sensor in FIGS. 2 and 3, the materials of the coupler 31, spacer 39, and cover glass 50 may be of a proper level of optical transparency so that the probe light beam can transmit in and through the materials to reach the top sensing surface 45 and, once returned back from the top sensing surface 45, can transmit to the optical detector array 37. The propagation directions of the probe light beam to and from the top sensing surface 45 are affected by the refractive index nc of the coupler 31, the refractive index ns of the spacer material 39, the refractive index nd of the cover glass 50, and the refractive index nf of the touching material such as a person's finger.

The desired probe light beam angles may be realized by the proper design of the light source 29 and the end surface tilting angle of the coupler 31. The divergent angle of the probe light beam is controlled by the structures of the light source 29 and the shape of the coupler 31's end surface.

To obtain a clear fingerprint image without an optical lens, the emitting area of the light source 29 may be designed to be small to effectuate a point light source in some implementations, or the probe light beam may be collimated in other implementations. A small LED light source can be installed as the light source 29 and is located far away from the coupler 31 as practical to achieve this in the optical system shown in FIGS. 3A 3B.

The optical structures and configurations of the light source 29, the coupler 31, the spacer material 39, the cover glass 50, and the placement of the optical detector array 37 in the optical sensor module, including matching proper refractive indexes (nc, ns, nd, nf) of the materials in the optical fingerprint sensor and initiating the probe light beam incident angles, can be used to cause the probe light beam to be totally reflected or partially reflected at the sensing surface 45. For example, such an optical sensor can be designed so that the probe light beam is totally reflected when the touch material is water having a refractive index of about 1.33 at 589 nm, and partially reflected when the touch material is finger skin having a refractive index of about 1.44 at 589 nm. Such and other designs can cause a variation in the optical reflection spatial profile at the ridges and valleys of a finger in contact with the top sensing surface 45 to obtain a spatial pattern in the reflected probe light representing the fingerprint pattern on the outer skin of a finger.

In the example in FIGS. 3A 3B, the probe beam AB size can be H at the incident end facet of the coupler 31 for receiving the probe light. The probe beam size may be W at the sensing surface 45 once being redirected by the coupler 31 upward to illuminate the sensing surface 45. By matching the refractive indexes of all of the materials and the shape of the coupler 31 and spacer 39, the illuminated dimension W on the sensing surface 45 may be set to be greater than H. Under this condition, the reflected probe beam in the received probe light beam A'B' may have a beam size smaller than the probe light beam at the sensing surface 45 caused by a compression due to the refraction of the reflected probe beam from the top sensing surface 45, to the coupler 31 and to the optical detector array 37. The compression ratio is typically decided by refractive indexes nc and nd. This is an effective method to image a large area with a small detector array without using an imaging lens. In addition, by adjusting the probe light beam divergent angle and the photo diode array tilting angle, the compression ratio can be further adjusted at all dimensions. The reflection from the coupler-spacer interface and from the spacer-cover interface constitutes optical noise and can be removed in the processing of the outputs of the optical detectors in the optical sensor array 37.

In some implementations, the probe light source 29 may be modulated to allow for an improved optical detection by the optical fingerprint sensor 23, e.g., implementing a lock-in detection based on the modulation frequency for modulating the probe light source 29. The matched photo diode array 37 can be designed to have a high efficiency and to work in various optical illumination environments.

Fingerprint Sensing via Air or Vacuum Coupler

Figure 4:
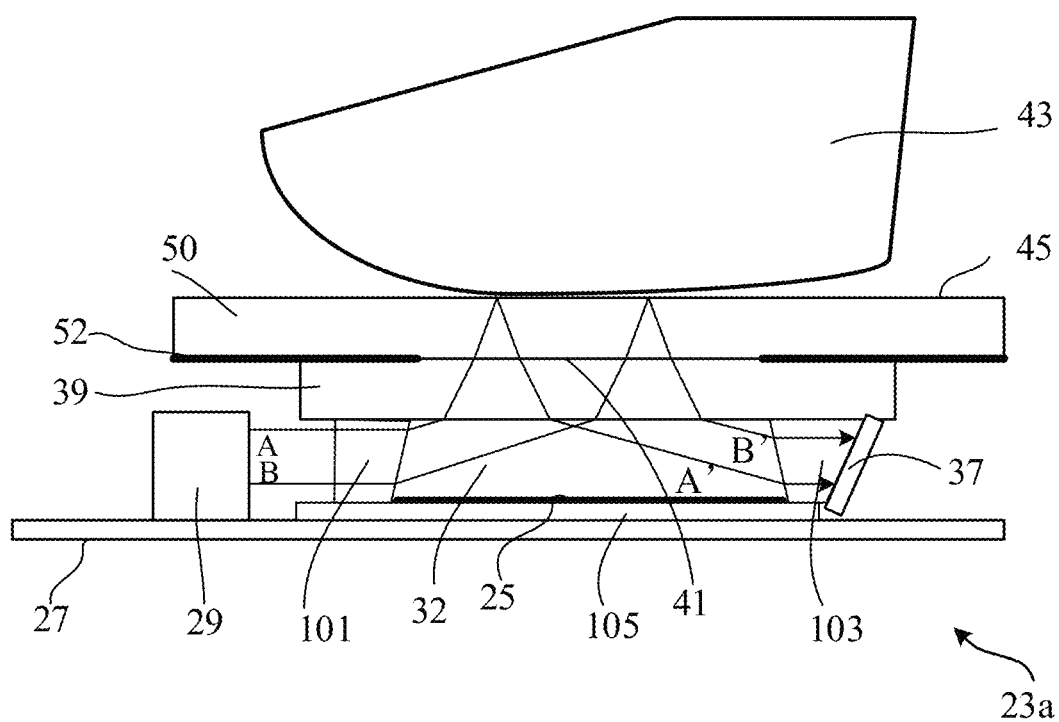
FIG. 4 is a diagram of an exemplary optical fingerprint sensor with an air or vacuum coupler.

FIG. 4 is a diagram of an exemplary optical fingerprint sensor 23a with an air or vacuum coupler. The optical fingerprint sensor 23a of FIG. 4 is similar to the optical fingerprint sensor 23 shown in FIGS. 2 and 3A-3B in certain aspects. In the optical fingerprint sensor 23a, a coupler 32 made of air or vacuum (with an index of 1) is implemented rather than the coupler 31 of FIGS. 2 and 3A-3B with a transparent material with an index greater than 1. Also, a light path window may be implemented to direct the probe light to the finger 43.

The probe light source 29 and a matched prism 101 are provided under the top transparent glass 50 and are structured to cooperate to couple the probe light beam AB generated by the probe light source 29 towards the sensing surface 45 on the top of the top transparent glass 50. The prism 101 is placed between the probe light source 29 and the air or vacuum coupler 32 and is structured to have a first facet to receive and redirect the initially horizontal probe light beam AB by optical refraction at a second opposing angled facet to propagate upward through the air or vacuum coupler 32 towards the sensing surface 45. An optically transmissive spacer material 39 may be placed underneath the top transparent glass 45 to facilitate the optical sensing operation by the optical detector array 37 and, in some implementations, include anti-reflection coatings to reduce undesired optical reflection in the optical paths in connection with the optical sensing at the optical detector array 37. On the other side of the air or vacuum coupler 32 in the optical path leading to the optical detector array 37, a second prism 103 with an angled facet is provided to receive returned light from the sensing surface 45 and to direct the received light, including the reflected probe light beam A'B', towards the optical detector array 37 through a second facet of the prism 103. The optical detector array 37 (e.g., a photo diode array) produces an array of detector output signals for optical sensing. Different from FIG. 2 or 3A-3B where the optical coupler 31 formed of a solid transparent material includes a lower surface to hold the color matched material layer 25 below the optical fingerprint sensor module 23, the color matched color layer 25 in the optical fingerprint sensor 23a in FIG. 4 is formed on (e.g., painted on) a substrate 105 located on the lower side of the air or vacuum coupler 32 above the FPC 27. This substrate 105 in the illustrated example in FIG. 4 also provides support for the two prisms 101 and 103.

In the optical fingerprint sensor 23a in FIG. 4, the optical configuration of the cover glass 50 for receiving the probe light is configured so that the total internal reflection does not happen in the cover glass 50. Due to differences of the optical interfacing conditions of the cover glass 50 with respect to fingerprint ridge positions and fingerprint valley positions, when a finger 43 touches the sensing surface 45, the reflectance at the fingerprint ridge positions differs from the reflectance at the fingerprint valley positions. This difference varies spatially and represents a 2-dimensional pattern of ridges and valleys of on the external surface of the finger with different fingerprint signals at different locations that are carried by the reflected probe beam A'B'.

Because the air or vacuum coupler 32 can be implemented at a relatively low cost and can be easily made of a range of different sizes by placing the two prisms 103 and 105 at desired spacings from each other, this design can be used to construct optical touch panels with a range of different display sizes without substantially increasing the costs.

Fingerprint Sensing-A Sample Design

Figure 5A:
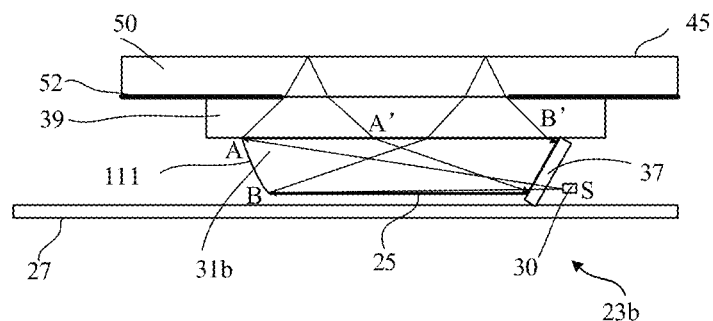
FIGS. 5A-5C are block diagrams showing an exemplary optical fingerprint sensor for fingerprint sensing.
Figure 5B:
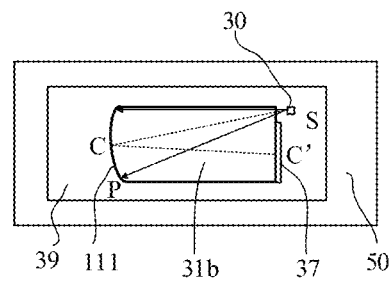
Figure 5C:
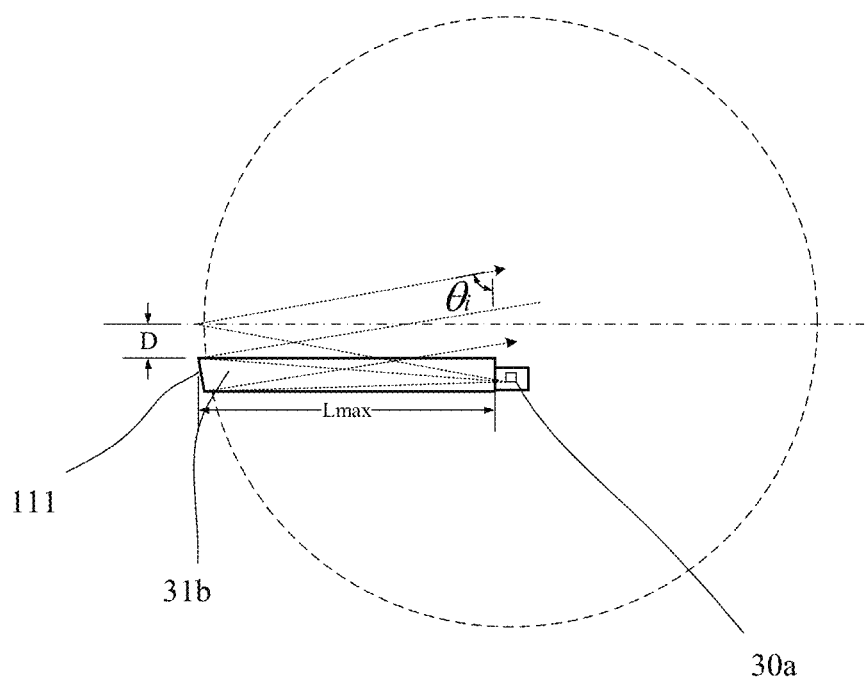

FIGS. 5A, 5B and 5C show an exemplary optical fingerprint sensor 23b for fingerprint sensing. FIG. 5A shows the sectional view of different layers of the optical fingerprint sensor 23b, FIG. 5B shows a top view of the same optical fingerprint sensor 23b, and FIG. 5C shows a side view of the same optical fingerprint sensor 23b.

The specific design of the optical coupler 31b in the optical fingerprint sensor 23b shown in FIGS. 5A, 5B and 5C is a different design from the optical coupler 31b for the optical fingerprint sensor 23 of FIGS. 2 and 3A-3B. Specifically, one surface 111 of the coupler 31b on the left side as shown in FIG. 5A has a curved (spherical or aspheric surface) mirror shape for imaging. A probe light source 30 is placed at the focus point of the curved mirror surface 111 of the coupler 31b so that the light rays reflected by the curved mirror surface 111 are parallel rays or the reflected probe beam is a collimated beam that propagates towards the top sensing surface 45 for illuminating a finger. In some implementations, a pinhole can be used on the probe light source 30 to spatially confine the probe light so that a modified light source 30a only projects a portion of the light beam to the curved mirror surface 111, and the influence of the scattered light is reduced or eliminated. The coupler 31b is set to be off center with proper distance D when the curved surface 111 is fabricated. Therefore, the curved mirror surface 111 of the coupler 31b is tilted properly so that the collimated light beam from the curved mirror surface 111 is incident into the spacer material 39 and the cover glass 50 with desired angles. For example, divergent light beam ASB is collimated and projected to the sensing surface 45. The reflected probe light beam A'B' is detected by the photo diode array 37. Correspondingly, the central light SC is reflected back to the optical detector array 37 (e.g., a photo diode array) at or near a center C'.

In the example shown in FIGS. 5A-5C, the light beams are propagated mostly in the coupler 31b. The structure can be made compact and robust. In the example shown in FIGS. 5A-5C, the material of the coupler 31b can be of a single material, or multiple material compounds.

The optical fingerprint sensor of the disclosed technology can be implemented to provide one or more of the following features. The optical fingerprint sensor includes a light source, a coupler, a spacer, a photo diode array, and a cover glass. The spacer may be made to include a glass material, an adhesive material, or may be formed by an air gap or vacuum layer. The coupler may be made to include a glass material, an adhesive material, or a layer of air or vacuum. The cover glass for the optical sensor may be configured as part of the display cover glass in some designs, or may be a separate cover glass in other designs. Each of the coupler, spacer, and cover glass may include multiple layers in various implementations.

The disclosed technology provides flexibilities in controlling the signal contrast in the optical sensing at the optical detector array 37 by matching the shapes of the materials and refractive indexes of the materials. By matching the probe light beam incident angle, divergent angle, and the materials of the involved coupler, spacer and cover glass along the optical path of the illumination probe light, the probe light beam may be controlled to be totally reflected or partially reflected at the sensing surface for different touching materials.

The disclosed optical fingerprint sensor may be configured to operate to effectuate a water-free effect when interfacing with a finger for optical fingerprint sensing. For example, a smartphone cover glass in various smartphones may have a refractive index of about 1.50. One design is to use a low refractive index material (MgF2, CaF2, Polymer etc.) to form the coupler 31 or 31b in the above design examples. For example, the disclosed technology can be used to control the local probe light beam incident angle at the sensing surface 45 of the cover glass 50 to be about 68.5°. The total reflection angle is about 62.46° when water is present on or in contact with the sensing surface 45 of the optical fingerprint sensor, and the total reflection angle is about 73.74° when the ridges of a fingerprint touch the sensing surface 45. The total reflection angle is about 41.81° when nothing touches the sensing surface 45. In this design, at the water soaking area on the top sensing surface 45, the probe light is totally reflected towards the photo diode array 37 at locations where the fingerprint ridges touch the top sensing surface 45 so that less than 5% of the probe light is reflected to the photo diode array 37; and at the dry fingerprint valleys positions, the probe light beam is also totally reflected to the photo diode array 37. Under this design, the optical reflection varies from the ridges to valleys of the finger and reflection caused by the fingerprint ridges generates stronger optical signals that are detected to create a high contrast optical image of the fingerprint pattern at the photo diode array 37.

Human sweat has a refractive index that is lower than the finger's skin. Therefore, based on the differences in optical reflection in the above design, the disclosed technology provides a solution to distinguishing the sweat pores in the fingerprint. When an air gap is used to form the coupler such as the example shown in FIG. 4, the total reflection at the sensing surface does not occur. The reflectance difference among different touching materials (the fingerprint ridges, fingerprint valleys, and other contaminations) can be used to detect the fingerprint image.

Due to the light path compression effect in the above optical designs in FIGS. 2 through 5, the sensing area size at the sensing surface 45 on the cover glass 50 may be greater than the photo diode array size of the photo diode array 37. The light path compression effect can be utilized to design the coupler 31 or 31b to be very thin, thus reducing the overall thickness of the optical sensing module. For example, less than 1 mm thickness CaF2 coupler can be used to realize a 10 mm sensing area size on the top sensing surface where the image compression ratio can be set around 1:10 by designing the various components in the optical sensing module. This feature can be used to reduce the sensor thickness and the sensor cost. In the examples in FIGS. 2 through 5, the photo diode array 37 is installed on one end of the coupler 31 or 31b instead of under the coupler. This design leaves the flexibility to apply color paint, illumination light etc. to compensate the color or decorate the sensor area.

In implementations, the light source for optical sensing may be a point light source installed at a proper distance. In some implementations, the probe light beam may be collimated by spherical lenses, cylinder lenses, or aspheric lenses. In some implementations the light source be placed a distance to be sufficiently far away from the sensing area 45. The probe light beam may be of a proper divergent angle in some designs. The probe light beam may be divergent or convergent in various designs.

In some implementations, the probe light source may be modulated to improve the optical sensing by reducing the influence of the background light which is not modulated and thus can be distinguished from the modulated probe light via a phase sensitive detection similar to detection based on a lock-in amplifier. The photo diode array is designed to work well in any illumination environments. Under the above optical design, the cover glass thickness does not limit the optical fingerprint sensing. The principle can be used to build optical touch panel.

Live-Fingerprint Detection

Figure 6:
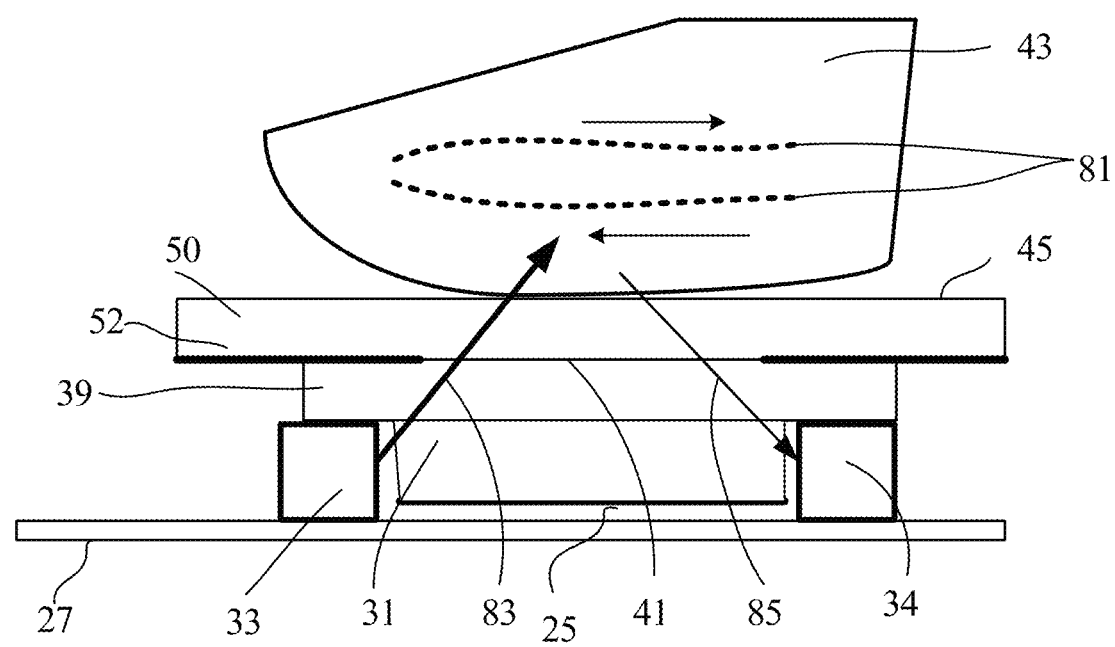
FIG. 6 is a diagram illustrating exemplary live-fingerprint detection.

FIG. 6 shows an exemplary live-fingerprint detection design in an optical sensing module. The live-fingerprint detection part of the optical sensing module can be implemented by one or more designated light source 33 and one or more designated optical detectors 34 for live finger detection in the example of the optical sensing module in FIG. 2 that are separate from the light source 29 for providing illumination for optical fingerprint sensing and the optical detector array 37 for optical fingerprint sensing. FIG. 6 shows only the placement of the one or more designated light source 33 and one or more designated optical detectors 34 for live finger detection relative to the optical coupler 31 without showing other components of the optical sensing module such as the light source 29 for providing illumination for optical fingerprint sensing and the optical detector array 37 for optical fingerprint sensing.

Alternatively, in other implementations, the live-fingerprint detection can be performed by the same the light source 29 and the optical detector array 37 for fingerprint sensing without using a separate optical sensing as shown in FIG. 2. The live fingerprint detection in FIG. 6 can be performed by a finger print sensor, such as one of the optical fingerprint sensors 23 in FIGS. 3A-3B, 23a in FIG. 4, or 23b in FIGS. 5A-5C, in a way similar to what is now described below in the specific example in FIG. 6.

In FIG. 6, the one or more light sources 33 and the receiving photodetector (PD) array 34 are isolated by a matched optical coupler 31 so that the emitting light beams from the one or more light sources 33 cannot directly reach the photodetector (PD) 34 for sensing whether a fingerprint is from a live finger. The optical coupler 31 directs the light beams from the light sources 33 to propagate through the light path window 41 on the top cover glass 50 (which can be formed by an opening of the color material layer 52 on the bottom of the top cover glass 50) and transmit into the touching material 43, for example, a finger. For a live-fingerprint of a live-person, the blood flow 81 in the finger exhibits certain optical absorption characteristics at different probe wavelengths and also varies with the heartbeat, the pressing force against the sensor, the breathing or other parameters. Accordingly, the received probe light at the optical detector 34 would carry detectable information associated with optical absorption characteristics at different probe wavelengths, the heartbeat, the pressing force against the sensor, the breathing, micro movement of the finger, or other parameters and thus can be processed to use such information to determine whether a touched object is from a live person. When the probe light beam 83 from the light sources 33 is coupled by the optical coupler 31 to enter the material being monitored, the tissues in the material scatter a portion 85 of the probe light 83 into the receiving PD array 34. By analyzing the signals received, a sequence of signals can be obtained and analyzed for live finger detection.

The fingerprint sensor photo diode array 37 may also be used to detect the scattered light from the touching materials and thus may also be used for live-fingerprint detection. For example, the micro movement of the fingerprint can be used to indicate whether the fingerprint is from a live-finger. A sequence of fingerprint images is used to recover the signal amplitude and bright spots distribution change with time. A fake, non-live-finger manifests different dynamics from a live-finger.

Figure 7:
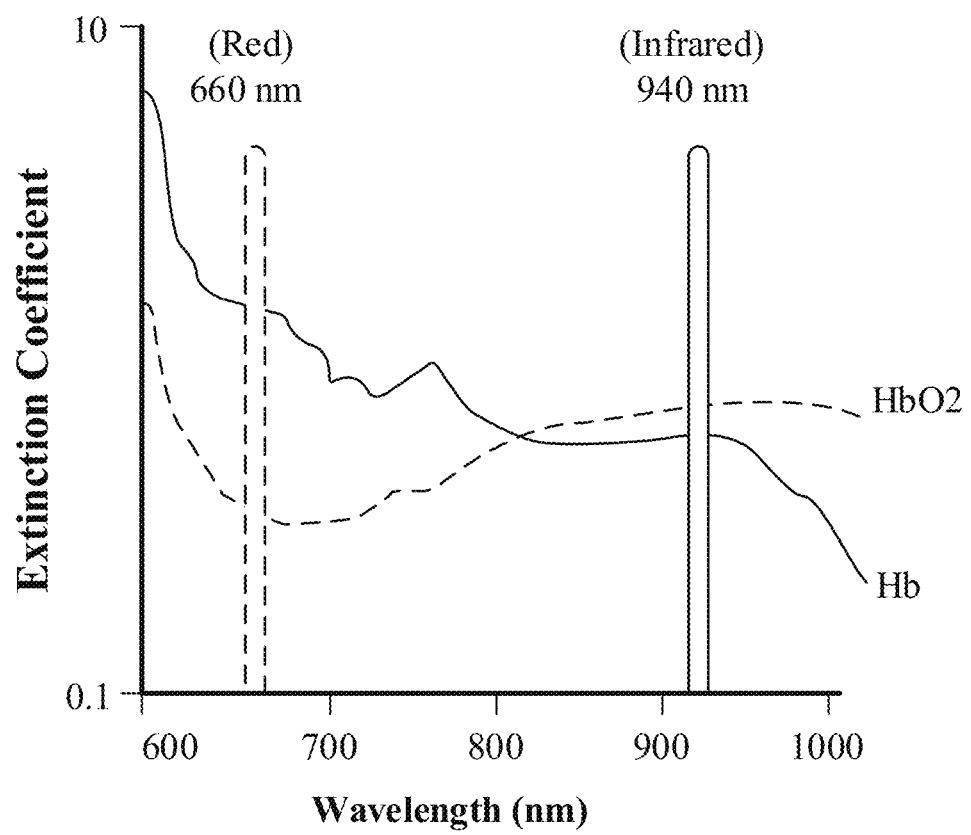
FIG. 7 shows exemplary extension coefficients of materials being monitored.

FIG. 7 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a visible wavelength and an IR wavelength, the differences in the optical absorption can be captured determine whether the touched object is a finger from a live person.

Figure 8:
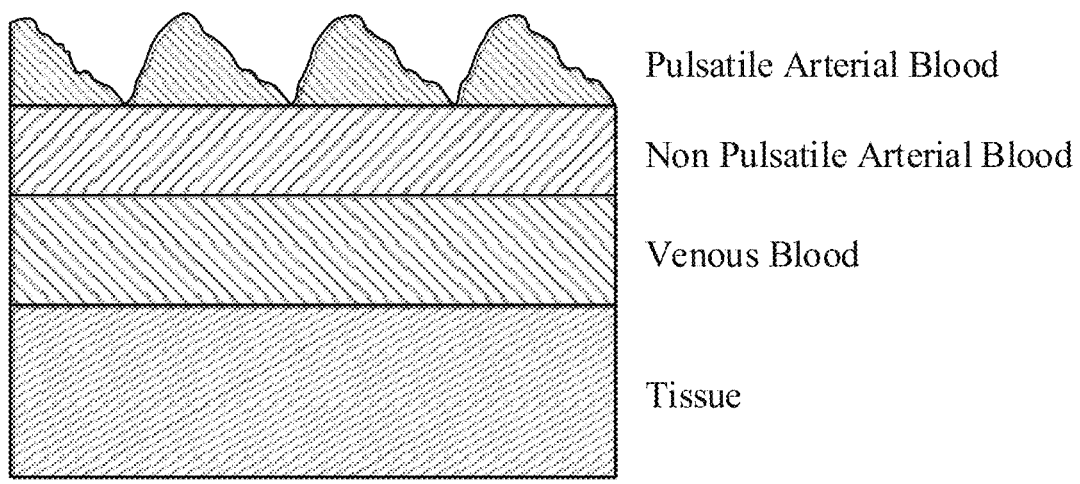
FIG. 8 shows blood flow in different parts of a tissue.

FIG. 8 shows the blood flow in different parts of a tissue. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 9:
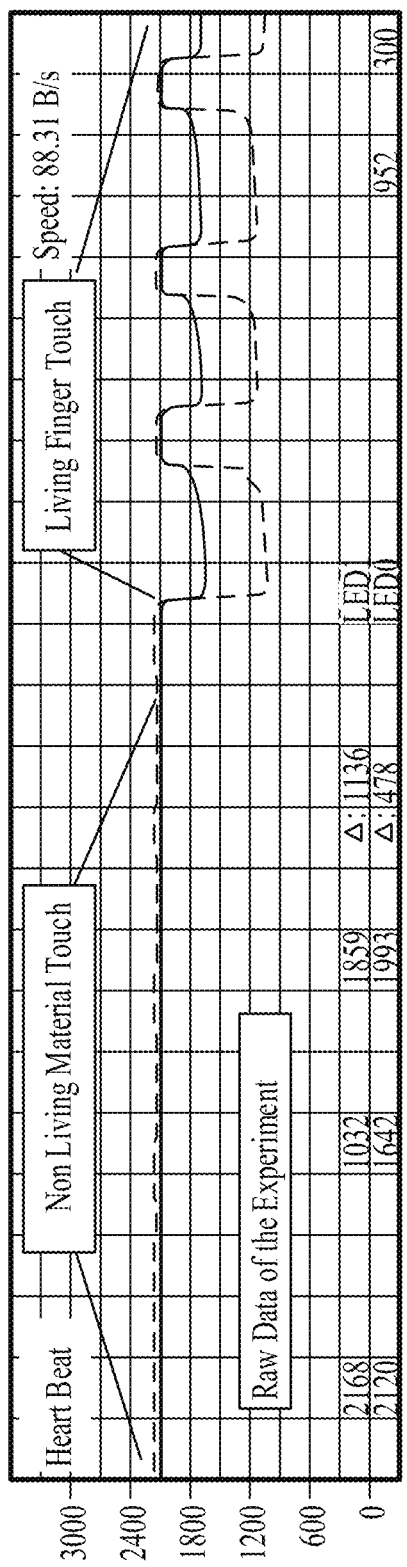
FIG. 9 shows a comparison between a nonliving material (e.g., a fake finger) and a live-finger.

FIG. 9 shows a comparison between a nonliving material (e.g., a fake finger) and a live-finger. Referring to FIG. 6, the light source 33 and the corresponding designed detector 34 in the optical fingerprint sensor can also operate as a heartbeat sensor to monitor a living organism. One or multiple light wavelengths can be provided from the light source 33. When two or more wavelengths of light are used (e.g., red light around 660 nm and IR light at 940 nm), the extinction ratio difference can be used to quickly determine whether the monitored material is a living organism, such as live fingerprint. In the example shown in FIG. 8B, two light sources are used to emit probe light at different wavelengths, one at a visible wavelength and another at an IR wavelength as illustrated in FIG. 7.

When a nonliving material touches the optical fingerprint sensor, the received signal reveals strength levels that are correlated to the surface pattern of the nonliving material and the received signal does not contain signal components associated with a finger of a living person. However, when a finger of a living person touches the optical fingerprint sensor, the received signal reveals signal characteristics associated with a living person, including different strength levels because the extinction ratios are different for different wavelengths. This method does not take long time to know whether the touching material is a part of a living person. In FIG. 9, the pulse-shaped signal reflects multiple touches instead of blood pulse. Similar multiple touches with a nonliving material does not show the difference caused by a living finger.

The above optical sensing of different optical absorption behaviors of the blood at different optical wavelengths can be performed in a short period for live finger detection and can be faster than optical detection of a person's heart beat using the same optical sensor.

In LCD displays, the LCD backlighting illumination light is white light and thus contains light at both the visible and IR spectral ranges for performing the above live finger detection at the optical sensor module. The LCD color filters in the LCD display module can be used to allow the optical sensor module to obtain measurements in FIGS. 7, 8 and 9. In addition, the designated light sources for producing the illumination light for optical sensing can be operated to emit probe light at the selected visible wavelength and IR wavelength at different times and the reflected probe light at the two different wavelengths is captured by the optical detector array to determine whether touched object is a live finger based on the above operations shown in FIGS. 7, 8 and 9. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

In an implementation where the live-fingerprint detection can be implemented by a designed optical system such as the light source 33 and optical detector 34 in the example in FIG. 2 that are separate from the light source 29 and the optical detector array 37 for fingerprint sensing, the designated light source 33 is operated to emit probe light at the selected visible wavelength and IR wavelength, e.g., at different times, and the reflected probe light at the two different wavelengths is captured by the designated optical detector 34 to determine whether touched object is a live finger based on the above operations shown in FIGS. 7 and 9.

Alternatively, in an implementation, live-fingerprint detection can be performed by the same the light source 29 and the optical detector array 37 for fingerprint sensing without using a separate optical sensing component designated for live finger detection. Under this design using the light source 29 and the optical detector array 37 for both fingerprint sensing and the live-fingerprint detection, the light source 29 is operated to emit probe light at the selected visible wavelength and IR wavelength at different times and the reflected probe light at the two different wavelengths is captured by the designated optical detector 34 to determine whether touched object is a live finger based on the above operations shown in FIGS. 7 and 9. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Security Level Set Up

Figure 10:
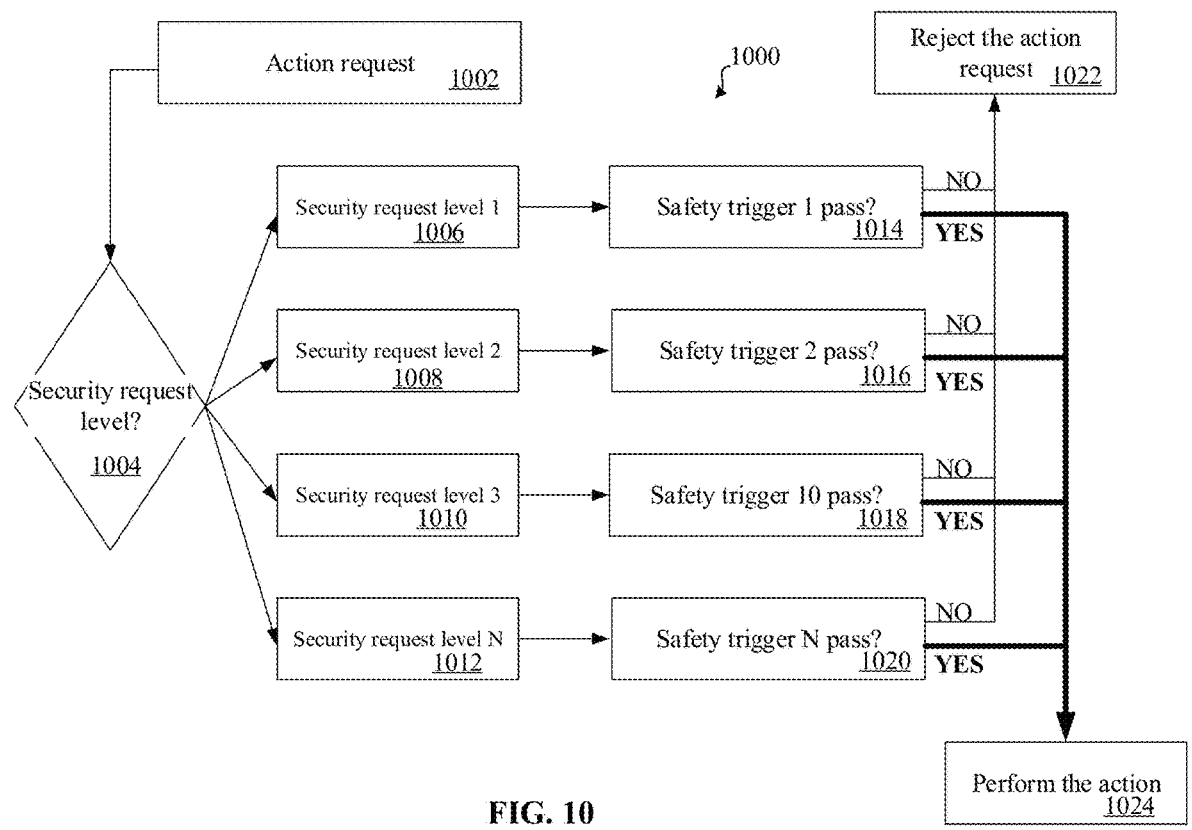
FIG. 10 shows a process flow diagram of an exemplary process 1000 for setting up different security levels for authenticating a live finger.

FIG. 10 shows a process flow diagram of an exemplary process 1000 for setting up different security levels for authenticating a live finger based on the disclosed optical sensing technology for fingerprint sensing. Different security level criterions may be set up based on the type of action requested. For example, a regular action request is required to pass security level 1 check. A request for a financial transaction for an amount below a threshold, such as under $100 payment needs to pass security level 2. A financial transaction for an amount over the threshold may require a higher security level clearance. Different security level action is triggered after different safety level evaluation. The safety levels corresponding to different security levels can be set up by combining different live-finger signatures. For example, single light source signals can be used to set up safety level 1 gate, two light source signals can be combined to set up safety level 2 gate, and so on.

The method 1000 can begin or be triggered when an action is requested (1002). The requested action is analyzed to determine an appropriate security level (1004). When determined that that security level 1 (the lowest security level) is required (1006), the safety trigger level 1 is required to be passed (1014). When the fingerprint analysis passes the safety trigger level 1, the requested action is performed (1024). However, when the fingerprint analysis fails the safety trigger level 1, the requested action is denied (1022).

Similarly, when determined that that security level 2 is required (1008), the safety trigger level 2 is required to be passed (1016). When the fingerprint analysis passes the safety trigger level 2, the requested action is performed (1024). When the fingerprint analysis fails the safety trigger level 2, the requested action is denied (1022).

When determined that that security level 3 is required (1010), the safety trigger level 10 is required to be passed (1018). If the fingerprint analysis passes the safety trigger level 10, the requested action is performed (1024). If, however, the fingerprint analysis fails the safety trigger level 10, the requested action is denied (1022).

When determined that that security level N is required (1012), the safety trigger level N is required to be passed (1020). If the fingerprint analysis passes the safety trigger level N, the requested action is performed (1024). If, however, the fingerprint analysis fails the safety trigger level N, the requested action is denied (1022).

The optical fingerprint sensor of the disclosed technology can be implemented to perform live-finger detection with various features. The optical fingerprint sensor can detect whether the touching material is a live-finger and can improve the security of the sensor. Specified light sources and detectors can be used to detect whether the object touching the sensing area is a live-finger or a nonliving material. When probe light at a single wavelength is used for illumination, the heartbeat detection or other live finger characteristics (micromovement of the finger) can be used to provide a reliable criterion to detect whether the object touching the sensing area is a live-finger or a nonliving material, including the fingerprint of a live-finger. When two or more wavelengths are used, the extinction ratio of the wavelengths are compared to detect whether the object touching the sensing area is a live-finger or a nonliving material, including the fingerprint of a live-finger. The fingerprint sensor light sources and photo diode array can be used to detect whether the object touching the sensing area is a live-finger or a nonliving material, including the fingerprint of a live-finger. The dynamic fingerprint images can be used to detect whether the object touching the sensing area is a live-finger or a nonliving material, including the fingerprint of a live-finger. Multiple security level can be set up for different security requirement tasks.

Sensor Area Decorating

Figure 11:
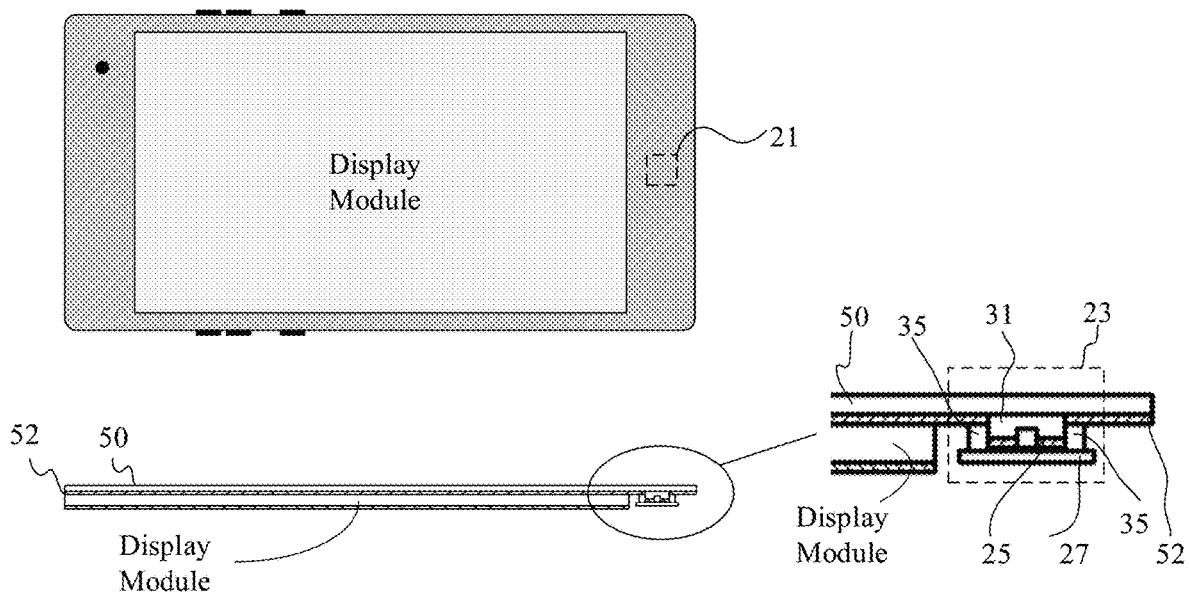
FIG. 11 is a diagram showing an exemplary optical fingerprint sensor for sensor area decorating.

FIG. 11 is a diagram showing an exemplary optical fingerprint sensor for sensor area decorating where an optical fingerprint sensor 23 is placed under the top cover glass 50 and is located adjacent to and outside the display module. When the optical fingerprint sensor 23 is installed under the cover glass 50 that is structured to include an optical window that transmits light for providing the light path for optical sensing. Specifically, a portion of the cover glass' color coating material 52 is removed to form this optical window for optical sensing. Because the fingerprint sensor detector is arranged to be at one end of the coupler 31, the bottom of the coupler 31 may be painted with color layers 25 so that the color layers 52 and 25 collectively provide a perception of a contiguous structure to a user. The painted color layers 25 can be selected to match with the platform surface color. For example, to use same color or pattern under the coupler so that the sensor becomes invisible. In some implementations, the matched coupler 31 may also be painted with a desired or different color or pattern to achieve certain or different decorative effects or styles. The matched coupler 31 may also be painted with certain patterns or signs, such as homing button sign.

The design provides an attractive option to further decorate the sensor area. For example, one or more designated decorating light sources 35 may be provided to provide a designed decorating lighting to the optical sensing area, e.g., emitting light at different colored light wavelengths to illuminate the sensor area. This decorating lighting feature can be useful in dark environments when the bell rings on the smartphone to indicate where the fingerprint sensing area is located.

The optical fingerprint sensor can be implemented to enable various decorative elements including the following: the bottom surface of the coupler can be painted with same color or pattern layers to match with the platform surface color; the bottom surface of the coupler can be painted with different color or pattern layers to show new styles outlooking; and color light sources 35 can be installed around the coupler to decorate the sensor area.

Fingerprint Sensor Packaged as a Separate Button

As an alternative implementation, the optical fingerprint sensors 23 in FIGS. 3A-3B, 23a in FIG. 4, and 23b in FIG. 5A placed under a contiguous cover glass 50 can be packaged as a separate physical fingerprint sensor button with a physical demarcation with other parts of the cover glass 50.

FIG. 12 is a diagram showing an exemplary optical fingerprint sensor packaged as a separate button that is located on a front side of a mobile device where the device display panel is located. This button can function, in addition to housing the optical fingerprint sensor module, as a home button for certain operations of the device, a wake-up button for waking up the device from a power saving mode, or other operation of the device.

Figure 13:
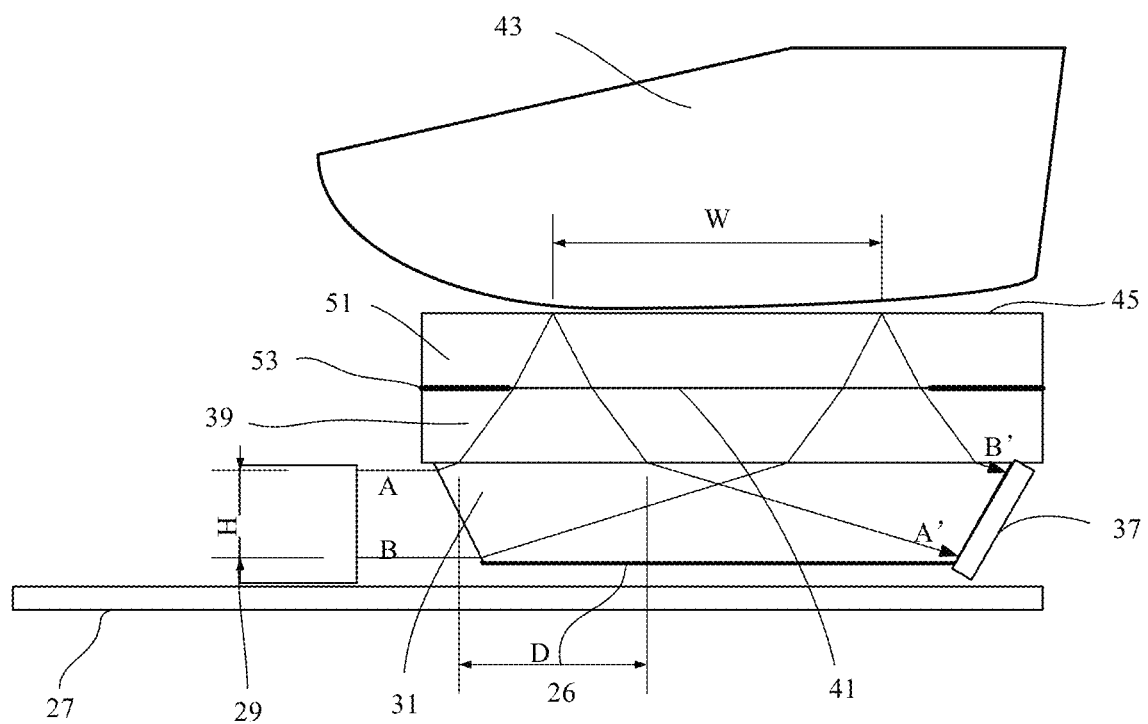
FIG. 13 is a diagram showing exemplary fingerprint and live-finger detection using the optical fingerprint sensor packaged as a separate button.

FIG. 13 is a diagram showing exemplary fingerprint and live-finger detection using the optical fingerprint sensor packaged as a separate button shown in FIG. 12. The optical fingerprint sensor of FIGS. 12 and 13 can be implemented as the optical fingerprint sensors 23 in FIGS. 3A-3B, 23a in FIG. 4, and 23b in FIG. 5A but packaged as a separate button. Thus, the fingerprint sensing and live-finger detecting is also the same as or similar to those described above. A matched coupler 31 is used to set up the photo diode array 37 position and provide package flexibility to the visible area. The aforementioned features regarding the different components of the optical fingerprint sensor in FIGS. 12 and 13 may be implemented substantially the same as the optical fingerprint sensors 23 in FIGS. 3A 3B, 23a in FIG. 4, and 23b in FIG. 5A including the light sources. However, to implement the optical fingerprint sensor as a separate button, the rigidity or the strength of the material for the cover glass 51 may be required at a higher level than the designs in FIGS. 3-5 under the contiguous cover glass 50.

The spacer material 39 and the cover glass 51 add a position shift of D to the probe light beam AB. When the thickness of the cover glass 51 and the spacer material 19 is reduced to zero, specifically by excluding the cover glass and spacer, the probe light beam shift D is eliminated. For example, a 10 mm sensing size can be realized with less than 1 mm thickness CaF2. Also, the photo diode array 37 should match with the light path to realize proper resolution and guarantee the performance in all illumination environments.

The optical fingerprint sensor packaged as a separate button shown in FIGS. 12 and 13 can perform the same fingerprint detection and live-finger detection as the optical fingerprint sensor of FIGS. 2-11. In addition, the optical fingerprint sensor package as a separate button can be implemented to perform the following features.

The cover glass and related spacer material may be implemented to provide design flexibility in the thickness according to the needs of various applications. In some implementations, a practical package may be designed not to use cover glass and spacer material. Another example for a practical design is to use a thin layer of cover glass to protect the coupler where the thin cover glass may be of a high hardness. To use colored glass or other optical materials to build the cover is also practical. When designing a compact button that provide the optical sensor for optical fingerprint sensing with improved security, various mechanical parts may be integrated to enhance the rigidity or strength of the module.

The optical fingerprint sensor designs disclosed in this document can be implemented in various ways (e.g., under a device cover glass alongside with the device display or in a button structure) and are a separate sensing module from the device display screen. Such optical sensor designs do not interfere with operations, engineering or installation of the device display screen and do not interfere functions and features that are associated with or integrated with the display screens such as touch sensing user interface operations and structures. As such, the disclosed optical sensor technology can be used for devices based on various display technologies or configurations, including, a display screen having light emitting display pixels without using backlight where each individual pixel generates light for forming a display image on the screen such as an organic light emitting diode (OLED) display screens including an active matrix organic light emitting diode (AMOLED) display panel, electroluminescent display screens and other displays with backlighting such as the ubiquitous liquid crystal display (LCD) screens.

Figure 14:
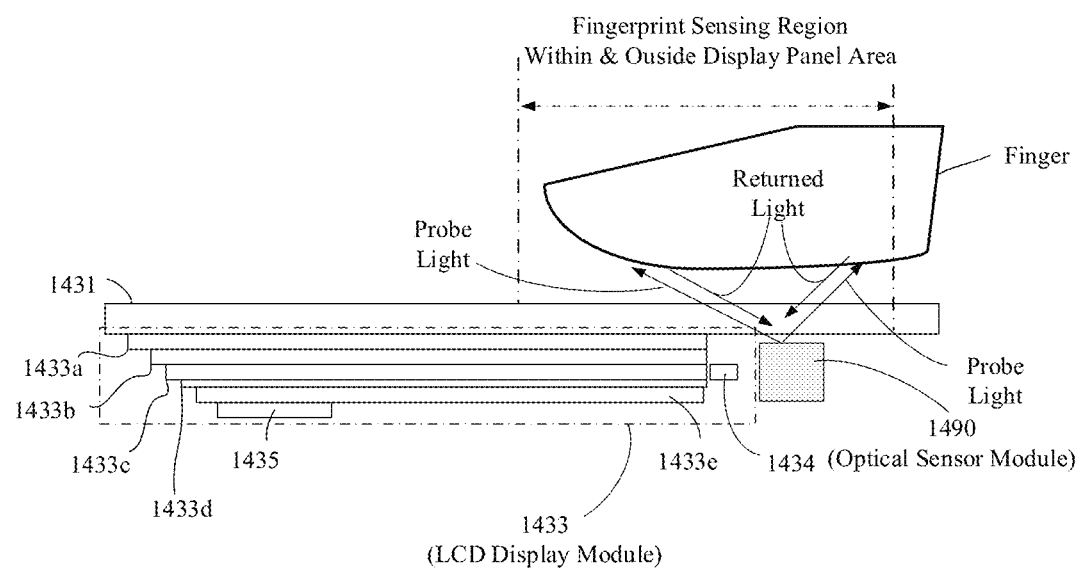
FIGS. 14 and 15 show examples of devices using LCD and OLED display modules in connection with an optical sensor module based on the disclosed technology.
Figure 15:
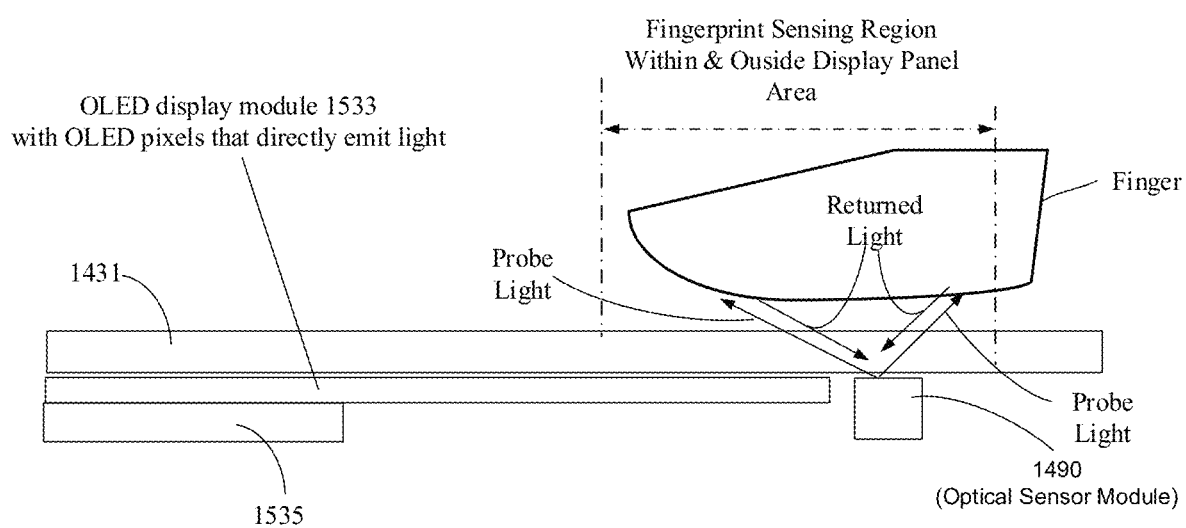

FIGS. 14 and 15 illustrate examples of LCD and OLED display screens for devices that incorporate optical sensing functions based on the disclosed technology, including optical fingerprint sensing and additional optical sensing for determining whether an object in contact is from a live person.

FIG. 14 shows an example of a structure of an LCD display panel that includes a LCD display panel structure to display images; a LCD backlighting light module coupled to the LCD screen to produce backlighting light to the LCD screen for display images; and a top transparent layer formed over the device screen as an interface for being touched by a user for the touch sensing operations and for transmitting the light from the display structure to display images to a user. The LCD) screen structure can be integrated with a touch sensing structure that provides touch sensing user interface operations in connection with operating with the device.

As a specific example, FIG. 14 illustrates a smartphone with a LCD-based touch sensing display system 1433. The touch sensing display system 1433 is placed under a top cover glass 1431 which serves a user interface surface for various user interfacing operations, including, e.g., touch sensing operations by the user, displaying images to the user, and an optical sensing interface to receive a finger for optical fingerprint sensing and other optical sensing operations. The optical sensor module 1490 for optical fingerprint sensing and other optical sensing operations can be placed in various locations of the device, e.g., at one end of the LCD display module 1433 and under the same top glass cover 1431 as shown. The display system 1423 is a multi-layer liquid crystal display (LCD) module 1433 that includes LCD display backlighting light sources 1434 (e.g., LED lights) that provide the white backlighting for the LCD module 1433, a light waveguide layer 1433c coupled to the LCD display backlighting light sources 1434 to receive and guide the backlighting light, LCD structure layers 1433a (including, e.g., a layer of liquid crystal (LC) cells, LCD electrodes, transparent conductive ITO layer, an optical polarizer layer, a color filter layer, and a touch sensing layer), a backlighting diffuser 1433b placed underneath the LCD structure layers 1433a and above the light waveguide layer 1433c to spatially spread the backlighting light for illuminating the LCD display pixels in the LCD structure layers 1433a, and an optical reflector film layer 1433d underneath the light waveguide layer 1433c to recycle backlighting light towards the LCD structure layers 433a for improved light use efficiency and the display brightness. The example illustrated in FIG. 14 includes a device electronics/circuit module 1435 for the LCD display and touch sensing operations, one or more other sensors 1425 such as an optical sensor for monitoring the light level of the surroundings, optional side buttons 1427 and 1429 for controls of certain smartphone operations.

Among various locations for the optical sensor module 1490 disclosed in this document, in some implementations, the optical sensor module 1490 may be placed next to the display as shown in FIGS. 1B, 2, 11 and alongside with the LCD display module 1433 that is either under the common top cover glass 1431 (as shown here in FIG. 14 and also in FIGS. 1B, 2 and 11) or in a separate discrete structure (FIG. 12). In such implementations, the fingerprint sensing area can include a region above the top glass cover 1431 near an edge of but within the LCD display panel of the LCD display module 1433 by designing probe light sources for the optical sensor module to capture returned probe light from a finger placed in this region in addition to capturing returned probe light from a finger that is directly on top of the optical sensor module outside the LCD display module 1433. This region can be marked to be visible to a user for placing a finger for fingerprint sensing. In some implementations, selected LCD pixels in this region can be operated to turn on to mark this region or the border of this region in the LCD display panel to allow a user to identify the region for placing a finger for fingerprint sensing. In other implementations, one or more illumination light sources may be added underneath the LCD module to produce illumination light to illuminate the border or the region on the top glass cover 1431 to be visible to the user. By providing the one or more illumination light sources, the region can be optically marked for easy identification by a user for fingerprint sensing regardless whether the LCD display is turned off or turned on. The light from LCD pixels that is present in this region within the LCD display can also be used to add illumination light to a finger in addition to the illumination by probe light that is produced by and projected from the optical sensor module. FIG. 14 marks the fingerprint sensing region that includes both the sensing region within an edge of the display panel area and the sensing region outside the display panel area.

FIG. 15 shows an example of an OLED display screen for a device that incorporates optical sensing functions based on the disclosed technology, including optical fingerprint sensing and additional optical sensing for determining whether an object in contact is from a live person. The OLED display screen is part of the OLED display module 1533 that is driven by a driver electronic module or circuit 1535. Similar to the LCD-based device example in FIG. 14, the optical sensor module 1490 is provided in FIG. 15 for optical fingerprint sensing and other optical sensing operations and can be placed in various locations of the device, e.g., at one end of the OLED display module 1533 and under the same top glass cover 1431 as shown. In some implementations, the optical sensor module 1490 may be placed next to the display as shown in FIGS. 1B, 2, 11 and alongside with the LCD display module 1433 that is either under the common top cover glass 1431 (as shown here in FIG. 14 and also in FIGS. 1B, 2 and 11) or in a separate discrete structure (FIG. 12). In such implementations, the fingerprint sensing region can include both the sensing region within an edge of the display panel area and the sensing region outside the display panel area as illustrated in FIG. 15. The fingerprint sensing region within the OLED display area can be marked to be visible to a user for placing a finger for fingerprint sensing. In some implementations, selected OLED pixels in this region can be operated to turn on to mark this region or the border of this region in the OLED display area to allow a user to identify the region for placing a finger for fingerprint sensing. In other implementations, one or more illumination light sources may be added underneath the OLED module to produce illumination light to illuminate the border or the region on the top glass cover 1431 to be visible to the user. By providing the one or more illumination light sources, the region within the OLED display area can be optically marked for easy identification by a user for fingerprint sensing regardless whether the OLED display is turned off or turned on. The light from OLED pixels that is present in this region within the OLED display can also be used to add illumination light to a finger in addition to the illumination by probe light that is produced by and projected from the optical sensor module.

In addition to fingerprint detection by optical sensing, the optical sensor module based on the disclosed technology in this document can also be implemented to perform optical sensing for measuring other parameters. For example, the disclosed optical sensor technology can be used not only to use optical sensing to capture and detect a pattern of a finger that is associated with a person, but also to use optical sensing or other sensing mechanisms to detect whether the captured or detected pattern of a fingerprint is from a live person's hand by a "live finger" detection mechanism.

For example, optical sensing of other user parameters can be based on the fact that a live person's finger tends to be moving or stretching due to the person's natural movement or motion (either intended or unintended), the optical absorption characteristics as disclosed in the examples in FIGS. 7, 8 and 9, or pulsing when the blood flows through the person's body in connection with the heartbeat and blood flow. As explained with respect to FIGS. 7, 8 and 9, the ratio obtained at different probe wavelengths can be used to determine whether the touched object is from a finger of a living person or a fake fingerprint pattern of a man-made material.

For example, the optical sensor module may include a sensing function for measuring a glucose level or a degree of oxygen saturation based on optical sensing in the returned light from a finger or palm. For example, as a person touches the display screen, a change in the touching force can be reflected in one or more ways, including fingerprint pattern deforming, a change in the contacting area between the finger and the screen surface, fingerprint ridge widening, or a blood flow dynamics change. Such changes can be measured by optical sensing based on the disclosed optical sensor technology and can be used to calculate the touch force. This touch force sensing adds more functions to the optical sensor module beyond the fingerprint sensing.

For another example, a portion of the light from the display pixels (e.g., OLED or LCD pixels) can enter the finger tissues. This part of light power is scattered by the finger tissues and a part of this scattered light may be collected by the optical sensor array in the optical sensor module. The light intensity of this scattered light depends on the finger's skin color, or the blood concentration in the finger tissue. Such information carried by the scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

As to obtaining information on the user's skin color by optical sensing, measurements of the optical intensities of returned light from a finger illuminated probe light at different optical wavelengths of the probe light can be used to obtain the skin color information. The different optical wavelengths of the probe light for illuminating the finger can be achieved in different ways when implementing the disclosed optical sensing technology. For example, the optical sensor module can include different probe light sources at different optical wavelengths. For another example, when implementing the optical sensing in a device with an OLED display panel, the OLED display panel contains different color pixels, e.g., adjacent red, green and blue pixels within one color OLED pixel and can be controlled to provide desired colored light to illuminate the finger for the measuring the skin color. Specifically, color of pixels within each color pixel of the OLED display panel can be selected to turn on to illuminate the finger at different colors. The light intensities of the scattered light by the finger under the illumination of the probe light at different colors/optical wavelengths can be recorded at the optical sensor array and this intensity information at the different optical wavelengths can be used to represent the user's skin color and can be used as a user identification parameter. In this regard, when a user registers a finger for fingerprint authentication operation for a device, the optical fingerprint sensor measures intensities of the scatter light from finger at two different colors or wavelengths A and B, as measured intensities Ia and Ib, respectively. The ratio of Ia/Ib could be recorded and stored as a user authentication data point and is used to compare with a later measurement of the ratio of Ia/Ib obtained when user's finger is placed on the sensing area as part of the fingerprint sensing operation to gain access to the device. This method can help reject the spoof device which may not match user's skin color.

For another example, people have unique topographical or tissue features in their fingers that are below the skin surface and such features are not usually captured or available in various fingerprint sensors. Such unique topographical or tissue features below the skin surface are difficult to duplicate by fake fingerprint pattern duplicating techniques, and such features tend to vary when a finger is not pressed against a surface and when a finger is deformed in shape when being pressed against a surface. The optical sensing based on the disclosed technology in this document can be implemented to use probe light at an optical wavelength that penetrates into a human skin surface (e.g., at an IR wavelength) to capture optical images containing information on the tissue structures below the skin surface and such captured images can be processed to obtain the information on the tissue structures below the skin surface as part of determination of whether the finger under measurement is a finger of an authorized user for the electronic device to provide anti-spoof fingerprint sensing. In implementations, the disclosed technology can be implemented to provide optical fingerprint sensing by capturing images in non-contact and contact configurations to provide different user authentication mechanism by using the same optical sensor module.

The user authentication can be based on the combination of the both the optical sensing of the fingerprint pattern and the positive determination of the presence of a live person to enhance the access control.

With respect to useful operation or control features in connection with the touch sensing aspect of a display screen, the disclosed optical sensor technology can provide triggering functions or additional functions based on one or more sensing results from the optical sensor module to perform certain operations in connection with the touch sensing control over the display screen. For example, the optical property of a finger skin (e.g., the index of refraction) tends to be different from other artificial objects. Based on this, the optical sensor module may be designed to selectively receive and detect returned light that is caused by a finger in touch with the surface of the display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the display screen. For example, designed extra light sources for optical sensing and the designed extra light sources may be provided and, in operation, the designed extra light sources may be turned on in a flash mode to intermittently emit flash light to the screen surface for sensing any touch by a person's finger or palm while the display screen can be placed in a sleep mode to save power. In some implementations, the wake-up sensing light can be in the infrared invisible spectral range so a user will not experience any visual of a flash light.

Figure 16:
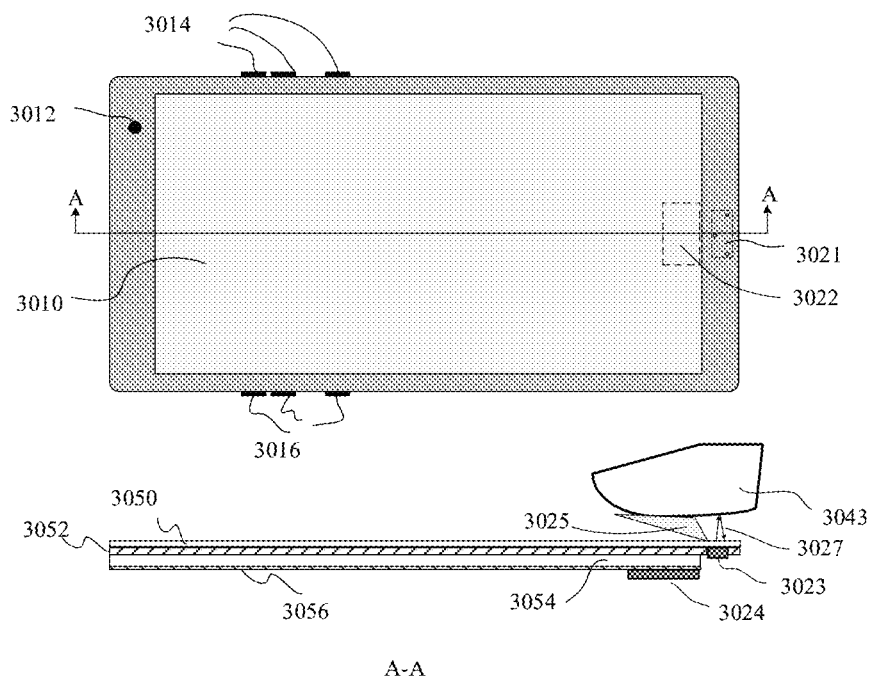
FIGS. 16, 17, 18, 19, 20 and 21 illustrate examples of features for implementing an optical sensor module to allow for optical sensing of an object in contact and non-contact conditions.

FIG. 16 shows an example of an electronic device in form of a mobile device having an optical fingerprint sensing module based on the disclosed technology. The optical sensing features in this example can be applied to other electronic devices, e.g., tablets and other portable devices and larger electronic devices with optical fingerprint sensing. The device includes a touch sensing display panel assembly 3010 which includes a display module having display layers 3054 and bottom layers 3050. An optical sensor module 3023 is located near or adjacent to the display panel assembly 3010 to provide a fingerprint sensor area 3021 outside the display panel area and a fingerprint sensing region 3022 inside the display panel area as a virtual fingerprint sensor area since the optical sensor module is located in the fingerprint sensor area 3021 outside the display panel area. The device can also include one or more other sensors 3012 (e.g., a front camera), control buttons such as side control buttons 3014 for performing various device operations.

In FIG. 16, the illustrated device includes a display module that displays images and contents and receives user contact inputs. The display module 3010 includes a display panel with different display layers 3054 and bottom layers 3050. A top transparent layer 3050 is formed over the display panel with display layers 3054 to provide a touch interface for receiving a user contact input and to allow viewing of the displayed images and contents of the display panel. As illustrated, a user can place a finger 3043 over the device for fingerprint sensing in accessing the device. The top transparent layer 3050 includes an extended section extending beyond at least one end of the display panel. An optical sensor module 3023 is placed underneath the extended section of the top transparent layer 3056 and adjacent to the one end of the display panel 3010. As disclosed in this patent document, the optical sensor module 3023 includes one or more probe light sources to produce probe light to illuminate the extended section of the top transparent layer 3050 and an adjacent area above the top transparent layer 3050 above the display panel so as to illuminate an object above or in contact with the top transparent layer 3050 for optical sensing. The field of view of the illuminated area above the display panel is marked as 3025 in FIG. 16 and the corresponding area shown in the top transparent layer 3050 is marked by the fingerprint sensing region 3022 inside the display panel area. This is also illustrated in FIGS. 14 and 15 for LCD and OLED display panels. This feature allows a finger to be optically imaged by the optical sensor module 3023 as the finger is placed in the field of view of the illuminated area above sensing region 3022 of the display panel without being in contact with the top transparent layer 3050. The optical sensor module 3023 can also perform optical sensing operation when the finger is in contact with the top transparent layer 3050.

The optical sensor module 3023 includes an optical sensor array for capturing optical images from the returned probe light and/or other light returned from the finger 3043. The optical sensor array includes optical detectors, e.g., CMOS photo detectors or photodiodes, to detect reflected light from the object above or in contact with the top transparent layer to detect a presence of a received contact input associated with both (1) a first signal to provide a first indication of a fingerprint to generate a first signal indicative of an image of a spatial pattern of whether the object is a finger of an authorized user fingerprint and (2) a second signal indicative of a second different signal to provide a separate second indication of whether the object is a finger of an authorized user.

The optical sensor module 3023 may include one or more trigger sensors for detecting whether an object is present or approaching. Such a trigger sensor can generate a trigger probe 3027 and detected the returned trigger probe to determine whether an object is approaching the sensor module, and to detect and evaluate the approaching object at a proper distance from the display cover 3050. The trigger probe can be an optical signal such as a probe light beam. In other implementations, a trigger sensor can be an acoustic trigger sensor that uses a sound signal as the probe, or an electric signal such as a capacitance sensor.

In implementations, the device in FIG. 16 can include a support transparent layer 3052 formed below the top transparent layer 3050 and is engaged to the top transparent layer 3050 as a unified top transparent cover. As illustrated, the support transparent layer 3052 in this example includes an opening that is underneath the extended section of the top transparent layer 3050 and is located adjacent to the one end of the display panel. The optical sensor module 3023 is placed inside the opening of the support transparent layer 3052 underneath the extended section of the top transparent layer 3050. The top transparent layer 3050 and the support transparent layer 3052 may be glass transparent substrates or high-strength transparent materials including crystalized materials. The use of the support transparent layer 3052 can enhance the overall structure strength and to securely hold the optical sensor module 3023.

Referring to FIGS. 1A and 1B, the device in FIG. 16 includes an optical sensor controller coupled to the optical sensor module to control operations of the one or more probe light sources and the optical sensor array to trigger capturing of different images of the object including an image of the object when the object is above the top transparent layer without contacting the top transparent layer as part of the first signal and another image of the object when the object is in contact with the top transparent layer as part of the second signal. The optical sensor controller processes the captured images of the object, including both the captured image of the object when the object is above the top transparent layer without contacting the top transparent layer as part of the first signal and the other captured image of the object when the object is in contact with the top transparent layer as part of the second signal, to determine whether the object is a finger of an authorized user for the electronic device.

Various optical fingerprint sensing operations can be performed by using the device in FIG. 16. For example, when an object or finger touches the display cover 3050, the optical sensor module 3023 can use the returned probe light to capture the images of the object or finger in the regions above the areas 3022 and 3021 before the object or finger touches the top transparent layer 3050. Once the object or finger touches the top transparent layer 3050, the touch sensor in the display further evaluates the object to avoid spoof.

The probe light sources are integrated in the optical sensor module 3023 to illuminate the object to generate returned probe light from the illuminated object back to the optical sensor module 3023 for imaging by the optical sensor array inside the optical sensor module 3023. In some applications, at least one probe light source may be designed to emit probe light at an optical wavelength that penetrates into a human skin surface, e.g., at one or more optical wavelengths in the infrared (IR) or near IR spectral range. Under this operation, the optical sensor array captures (1) images formed by the probe light at the optical wavelength that penetrates into a human skin surface and containing tissue structures below the skin surface, and (2) images representing a surface pattern of the skin surface such as a fingerprint pattern of ridges and valleys of a finger. Accordingly, the optical sensor controller processes (1) the images formed by the probe light at the optical wavelength that penetrates into a human skin surface and containing tissue structures below the skin surface, and (2) the images representing a surface pattern of the skin surface such as a fingerprint pattern of ridges and valleys of a finger to form a 3-dimensional profile for determination of whether the object is a finger of an authorized user for the electronic device to provide anti-spoof fingerprint sensing.

This use of the probe light allows imaging of the inner tissues of the finger to generate a user-specific signature is difficult to duplicate by a fake finger pattern device and can be used as an anti-spoof mechanism as part of the user authentication process for accessing the device. In particular, the above user-specific signature containing inner tissue information under the user finger skin is captured during the user registration process for the device by using the optical sensor module 3023 and is stored for comparison in a user access operation. A fake pattern is unlikely to match such a signature due to the use of the information of inner tissues of the finger below the skin surface and the imaging by the same optical sensor module 3023 for capturing the information of inner tissues of the finger below the skin surface.

In addition, a finger exhibits different surface patterns and inner tissue structures when the finger is free from shape deformation without being in contact with the top transparent layer 3050 and when the finger is pressed against the top transparent layer 3050 to undergo some deformation in shape so that using different stored signatures captured by the optical sensor module 3023 when the finger is not in contact with the top transparent layer 3050 and when the finger is pressed against the top transparent layer 3050 provide enhanced anti-spoof features. One aspect of the disclosed technology in this patent document is to use such different surface patterns and inner tissue structures including information captured when a finger is not in contact with the top sensing surface to provide improved fingerprint detection security.

In FIG. 16, in addition to illumination provided by the probe light from the optical sensor module 3023, the display light from the display pixels (e.g., LCD or OLED pixels) may also be used to provide additional illumination for optical sensing operations. In some implementations, one or more extra illumination light sources 3024 may be provided outside the optical sensor module 3023 to assist with the illumination of the object or finger. In the example shown in FIG. 16, the one or more extra illumination light sources 3024 are shown to be located below the display module.

One technical challenge in optical fingerprint sensing is the undesired background light, especially when the device in FIG. 16 is used in outdoor settings or an environment with strong background lighting. To address this, the optical sensor module 3023 can include an optical filter above the optical sensor array to transmit the probe light while blocking background light from reaching the optical sensor array. For example, the optical filter may be structured to reduce infrared light from reaching the optical sensor array, a strong background source from the sunlight. Such an optical filter can be a bandpass filter or one or more filter coatings that are integrated in the detection light path. Each illumination light source can be operated in a flash mode to produce high illumination brightness in a short period time.

Figure 17:

FIG. 17 shows an example of a front side of a mobile device showing an in-display optical fingerprint sensing region 3022 inside the display screen and the position of the optical sensor module located outside the display screen which may be implemented by various designs, including the design examples in FIGS. 14, 15 and 16. The in-display optical fingerprint sensing region 3022 is illuminated to be visible to a user and this illumination can be achieved by using the display pixels or extra light sources. In some designs, the optical sensor module position may be aligned to be in the frame edge area of the display.

Figure 18:
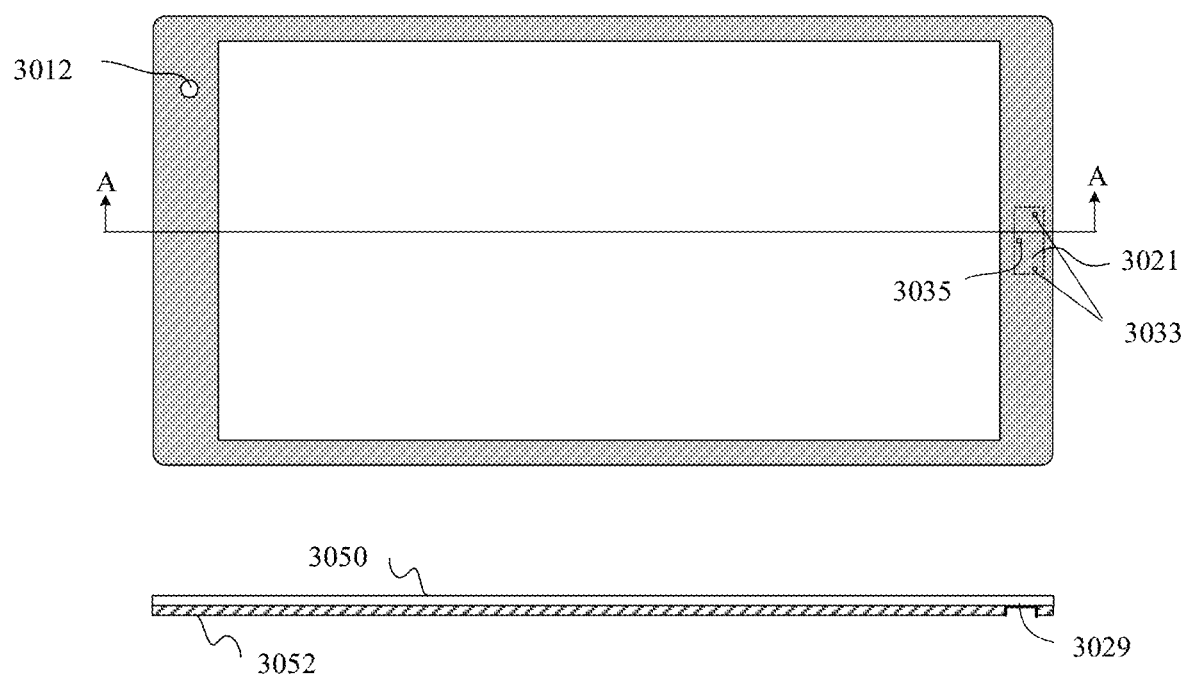

FIG. 18 shows a color coating feature that can be implemented in the optical sensor module design in FIG. 16. Specifically, FIG. 18 shows a multi-layered structure of the display cover. For example, the cover may include one top layer 3050 and a support layer 3052, which can be engaged to each other via different ways, including using an adhesive. In some designs, the top layer 3050 can be very thin (e.g., 200 to 400 microns or other thickness) and the optical sensor module 3023 may be small, e.g., a dimension of around a few mm. A color coating 3029 is formed under the top transparent layer inside the opening of the support layer 3052. The color coating 3029 may be patterned to include light source windows 3033 for transmitting probe light from the illumination light sources and a sensing light path window 3035. In some designs, the color coating 3029 may be optically opaque. In other designs, the color coating 3029 may be transparent or partially transparent to the probe light from the light sources where the windows 3033 may not be needed.

Figure 19:
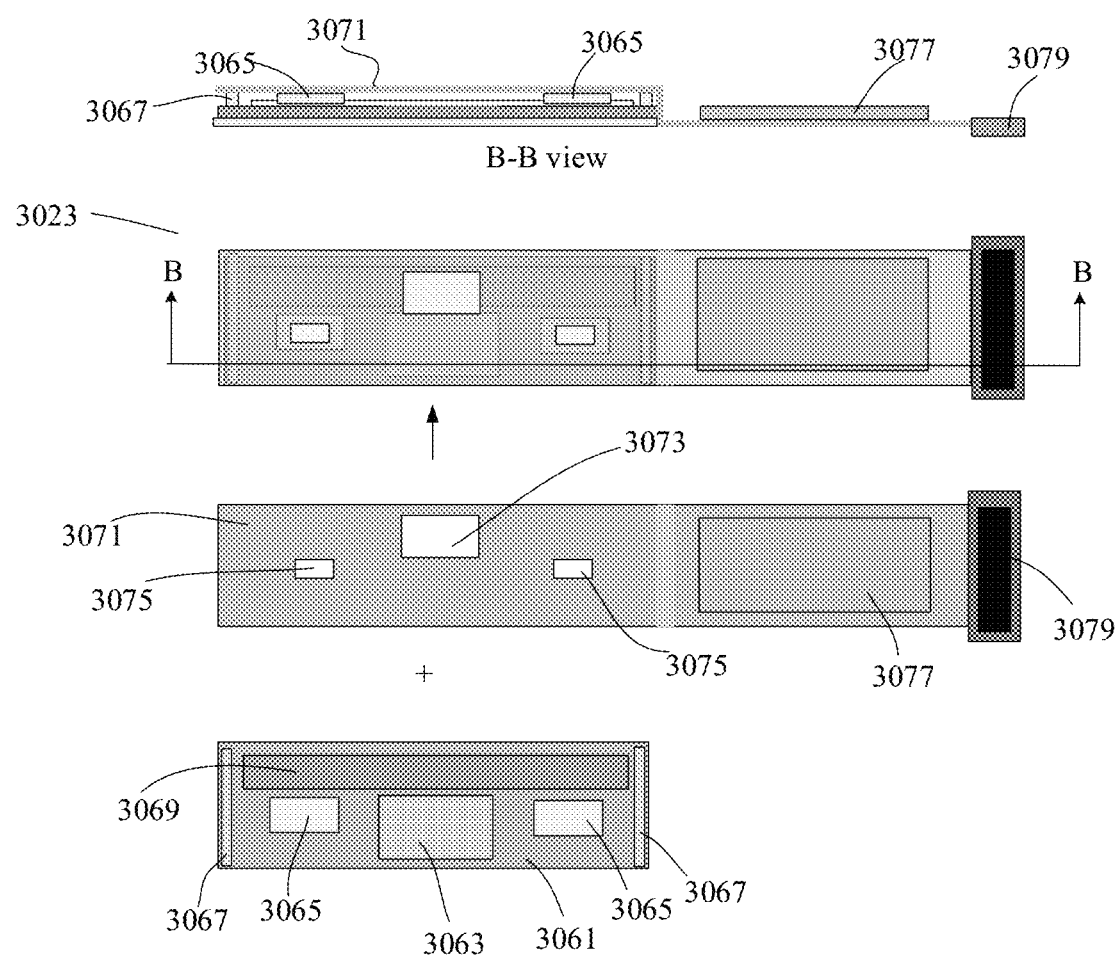

FIG. 19 shows examples of the circuitry construction in the optical sensor module in FIGS. 16 and 18, including the optical sensor array 3063 which may be a photodiode array, probe or illumination light sources (LEDs etc.) 3065, and related circuits 3069 integrated on a chip board 3061. Flexible printed circuit (FPC) 3071 is bonded onto the sensor chip board 3061 via bonding pads 3067. Processing electronics 3077 and connector 3079 are mounted on the FPC 3071. The FPC 3071 can be patterned to include openings for light source windows 3075 and detection light path widow 3073 formed in the color coating 3029 shown in FIG. 18.

In some implementations, the light sources 3065 may be directly mounted under the FPC 3071. The optical filter for reducing background light can be optical filter coatings formed on the surface of the photodiode array 3063. Furthermore, in some designs, an enhancement side wall structure may be included in the module.

Figure 20:
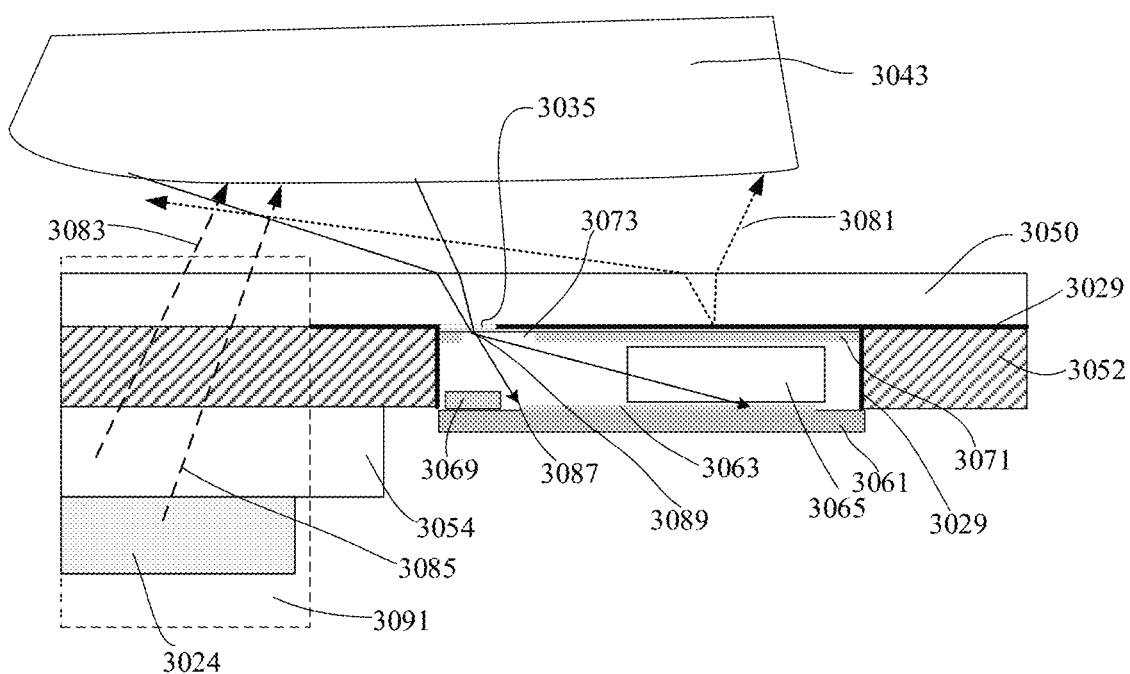

FIG. 20 shows examples of various details in the structure and operation of the optical sensor module 3023 in FIGS. 16, 17, 18 and 19. The support layer 3052 under the display cover 3050 can be made a through hole to hold the optical sensor module 3023. The wall of the hole is painted with color coating 3029 as the sensor module wall that blocks undesired background or environmental light. An optical imaging or light collection module 3089 is provided to capture returned light from an object or finger for imaging by the optical sensor array 3063. This optical imaging module 3089 may include a pinhole or micro lens that is mounted under the cover top layer 3050 in some implementations. The sensing light path window 3035, the pinhole/ micro lens 3089 and the detection light path window 3073 can be aligned so that the optical sensor array 3063 can receive the image signal light 3087 in the field of view that covers the in-display fingerprint sensing region 3022.

In some implementations, the light 3081 from light sources 3065, the light 3083 from display 3054, the light 3085 from extra light source 3024 may be used to illuminate the finger. Multiple light wavelengths are included for the light sources to realize fingerprint detection and anti-proof function. For example, live finger spectrum signature can be used to check if the finger is alive. For example, if red or near IR light is used as light source, the sensor can image deeper tissues under the skin, such as the dermis. With this signature, the fingerprint can be imaged with sufficient information regardless of the conditions of the finger or the sensing surface, dry, wet, or worn-out fingerprint patterns with shallow finger ridge-valley features. In this approach, the fingerprint can be imaged when the finger is not pressed on the display. In addition to the 2-D fingerprint patterns, the finger profile information included in the database also includes 3D fingerprint information that contains inner tissue structures of a finger under the skin. Notably, the image of deeper tissue can be difficult to be duplicated in fake fingerprint and therefor the disclosed optical fingerprint sensing improves the fingerprint detection accuracy with built-in anti-spoofing feature.

Figure 21:
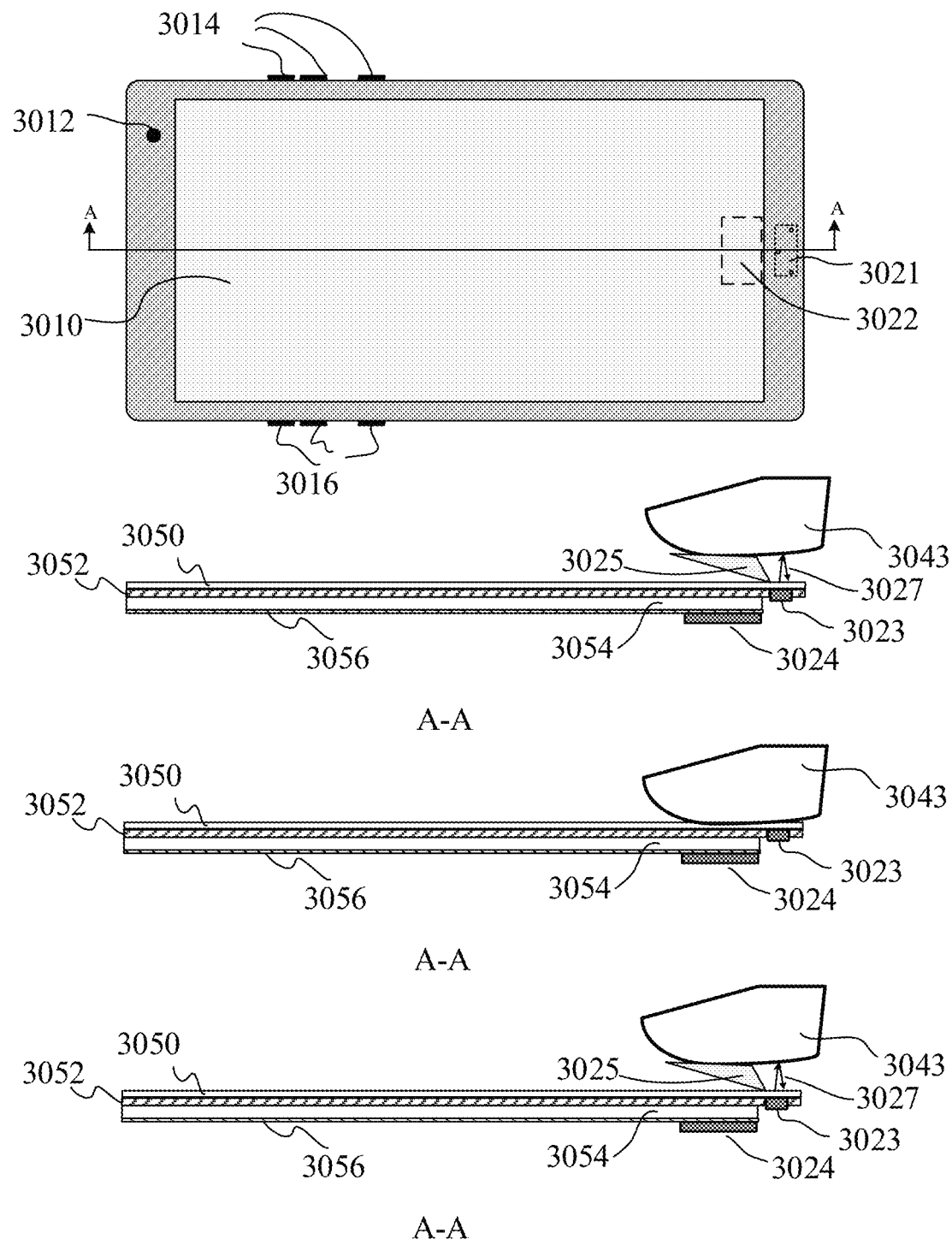

FIG. 21 shows examples of capturing images of a finger in contact and non-contact conditions in the device design in FIG. 16. As illustrated, the optical sensor controller may be operated to trigger capturing of different images of the object when (1) the object is above the top transparent layer without contacting the top transparent layer and is approaching the top transparent layer (top), (2) the object is in contact with the top transparent layer (middle), and (3) the object is moving away from the top transparent layer (bottom). Those different images can be optically captured and used to further improve the anti-spoof function of the fingerprint sensing.

Figure 22:
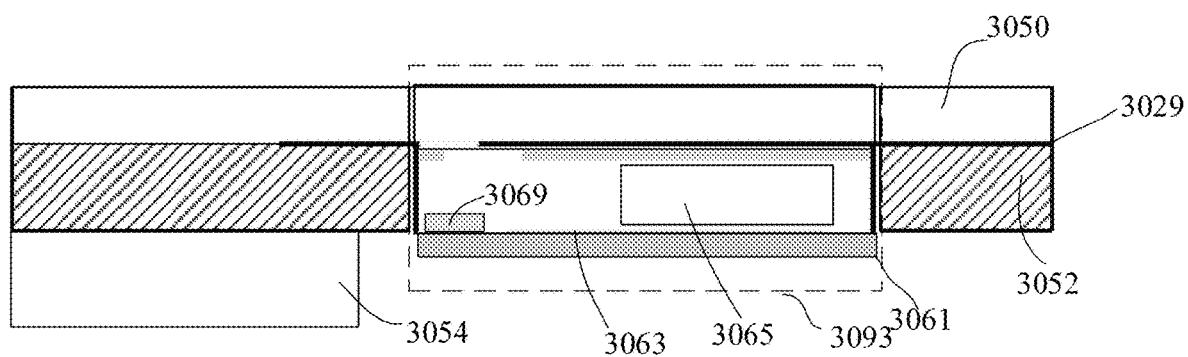
FIG. 22 illustrates an example of an optical sensor module to allow for optical sensing of an object in contact and non-contact conditions in form of a discrete sensor structure similar to the design in FIG. 12.

FIG. 22 further shows an example of an optical sensor module design based on the discrete "button" structure formed in a peripheral area of the top transparent cover as shown in FIG. 12.

Figure 23:
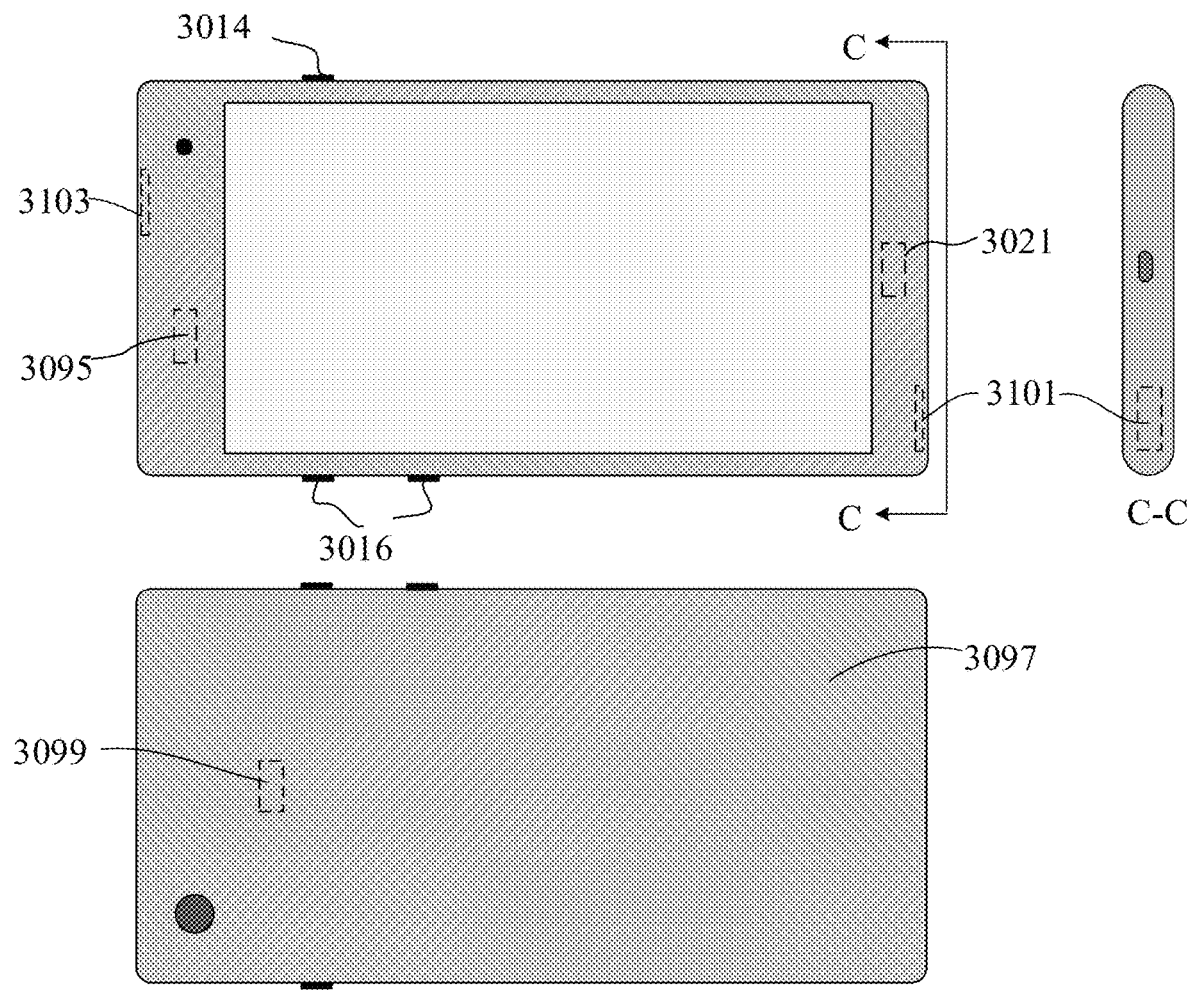
FIG. 23 illustrates examples of placing the optical sensor module in a device.

The optical sensor module designs based on the disclosed technology can be implemented in various locations on the front facet, back facet and sides of a device and in various configurations. FIG. 23 illustrates some examples. For example, the optical sensor module may be located inside a button of the electronic device. In some designs, the button of the electronic device is on a side facet, a back facet or a front side of the electronic device. The button of the electronic device is operable to perform another operation different from fingerprint sensing, e.g., a power button for turning on or off power of the electronic device.

Figure 24:
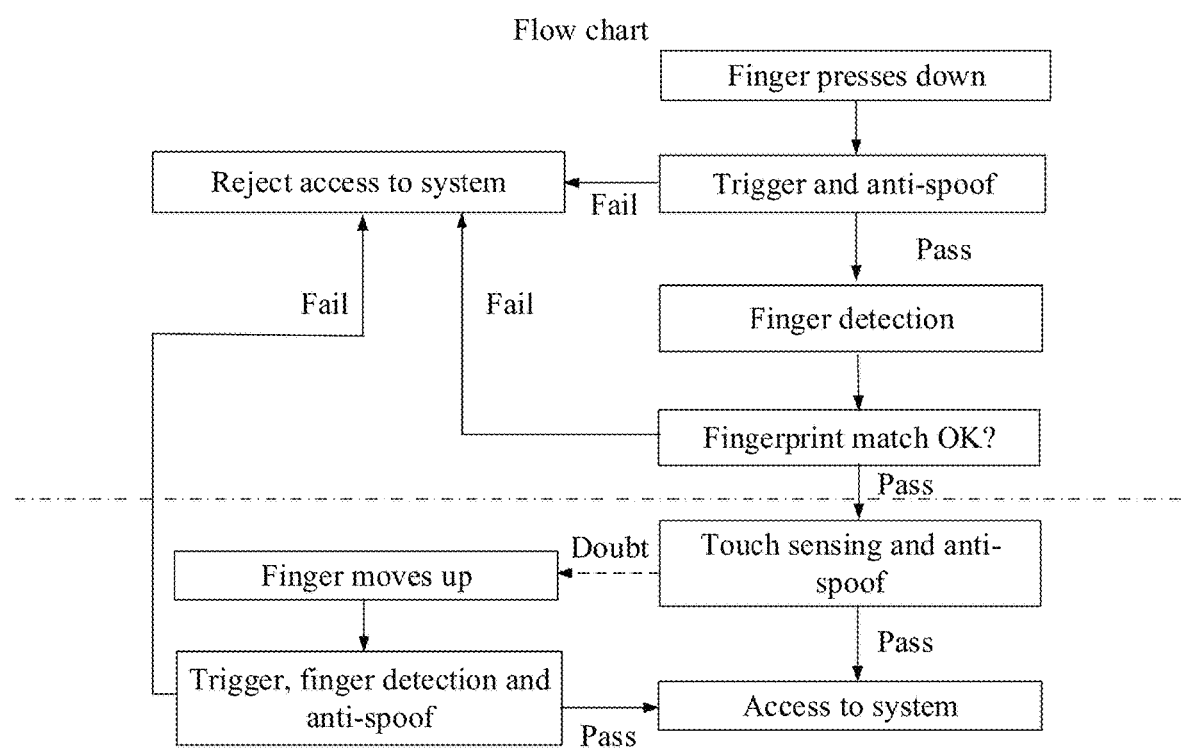
FIG. 24 shows an example of operating an optical sensor module to allow for optical sensing of an object in contact and non-contact conditions.

FIG. 24 shows a flowchart illustrating one example of a method for operating an optical sensor module to authenticate a user for accessing an electronic device. This method includes operating one or more probe light sources of the optical sensor module to produce probe light to illuminate an adjacent area of the electronic device; operating an optical sensor array of optical detectors of the optical sensor module to detect reflected light from an object that is present in the illuminated adjacent area to determine the presence of the object; and operating the one or more probe light sources and the optical sensor array to perform a first optical fingerprint sensing operation when the presence of the object is detected while the object is not in contact with the electronic device to capture one or more first optical images of the object to determine whether the captured one or more first optical images of the object contain a first stored fingerprint of a finger of an authorized user previously obtained from the authorized user by operating the one or more probe light sources and the optical sensor array when the finger of the authorized user was not in contact with the electronic device. Based on the above, the access to the electronic device is denied when the captured one or more first optical images of the object are determined not to contain the first stored fingerprint of the authorized user.

The above processing is represented by the processing operations located above the dashed line in FIG. 24.

Next, when the first optical fingerprint sensing operation determines that the captured one or more first optical images of the object in the first optical fingerprint sensing operation are determined to contain the fingerprint of an authorized user, the method provides additional user authentication as illustrated by processing operations located below the dashed line in FIG. 24.

Specifically, the method includes operating the one or more probe light sources and the optical sensor array to perform a second optical fingerprint sensing operation when the object is in contact with the electronic device to capture one or more second optical images of the object to determine whether the captured one or more second optical images of the object contain a second stored fingerprint of the finger of the authorized user previously obtained from the authorized user by operating the one or more probe light sources and the optical sensor array when the finger of the authorized user was in contact with the electronic device. Accordingly, the access to the electronic device is denied when the captured one or more second optical images of the object are determined not to contain the second stored fingerprint of the authorized user. And, the access to the electronic device is granted when the captured one or more second optical images of the object are determined to contain the second stored fingerprint of the authorized user.

The optical sensors for sensing optical fingerprints disclosed above can be used to capture high quality images of fingerprints to enable discrimination of small changes in captured fingerprints that are captured at different times. Notably, when a person presses a finger on the device, the contact with the top touch surface over the display screen may subject to changes due to changes in the pressing force.

Figure 25:
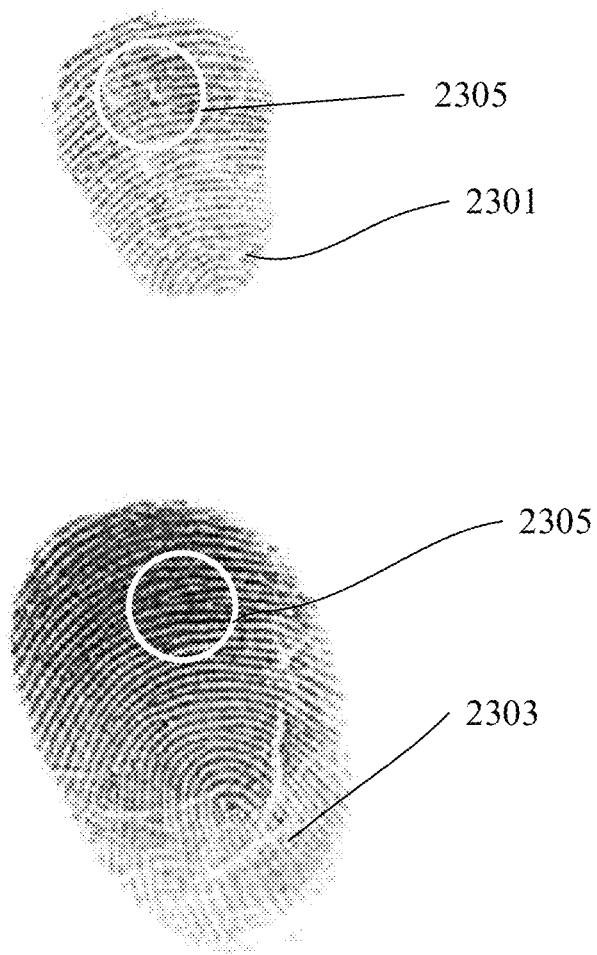
FIG. 25 shows two different fingerprint patterns of the same finger under different press forces to illustrate the operation of the optical sensor module for capturing different fingerprint patterns at different times to monitor time-domain evolution of the fingerprint ridge pattern.

Referring to FIG. 25, the contact profile area increases with an increase in the press force, meanwhile the ridge-print expands with the increase in the press force. Conversely, the contact profile area decreases with a decrease in the press force, meanwhile the ridge-print contracts or shrinks with the decrease in the press force. FIG. 25 shows two different fingerprint patterns of the same finger under different press forces: the lightly pressed fingerprint 2301 and the heavily pressed fingerprint 2303. The returned probe light from a selected integration zone 2305 of the fingerprint on the touch surface can be captured by a portion of the optical sensors on the optical sensor array that correspond to the selected integration zone 2305 on the touch surface. The detected signals from those optical sensors are analyzed to extract useful information as further explained below.

When a finger touches the sensor surface, the finger tissues absorb the light power thus the receiving power integrated over the photo diode array is reduced. Especially in the case of total inner reflection mode that does not sense the low refractive index materials (water, sweat etc.), the sensor can be used to detect whether a finger touches the sensor or something else touches the sensor accidentally by analyzing the receiving power change trend. Based on this sensing process, the sensor can decide whether a touch is a real fingerprint touch and thus can detect whether to wake up the mobile device based on whether the touch is a real finger press. Because the detection is based on integration power detection, the light source for optical fingerprint sensing at a power saving mode.

In the detailed fingerprint map, when the press force increases, the fingerprint ridges expand, and more light is absorbed at the touch interface by the expanded fingerprint ridges. Therefore within a relatively small observing zone 2305, the integrated received light power change reflects the changes in the press force. Based on this, the press force can be detected.

Accordingly, by analyzing the integrated received probe light power change within a small zone, it is possible to monitor time-domain evolution of the fingerprint ridge pattern deformation. This information on the time-domain evolution of the fingerprint ridge pattern deformation can then be used to determine the time-domain evolution of the press force on the finger. In applications, the time-domain evolution of the press force by the finger of a person can be used to determine the dynamics of the user's interaction by the touch of the finger, including determining whether a person is pressing down on the touch surface or removing a pressed finger away from the touch surface. Those user interaction dynamics can be used to trigger certain operations of the mobile device or operations of certain apps on the mobile device. For example, the time-domain evolution of the press force by the finger of a person can be used to determine whether a touch by a person is an intended touch to operate the mobile device or an unintended touch by accident and, based on such determination, the mobile device control system can determine whether or not to wake up the mobile device in a sleep mode.

In addition, under different press forces, a finger of a living person in contact with the touch surface can exhibit different characteristics in the optical extinction ratio obtained at two different probe light wavelengths as explained with respect FIGS. 7, 8 and 9. Referring back to FIG. 25, the lightly pressed fingerprint 2301 may not significantly restrict the flow of the blood into the pressed portion of the finger and thus produces an optical extinction ratio obtained at two different probe light wavelengths that indicates a living person tissue. When the person presses the finger hard to produce the heavily pressed fingerprint 2303, the blood flow to the pressed finger portion may be severely reduced and, accordingly, the corresponding optical extinction ratio obtained at two different probe light wavelengths would be different from that of the lightly pressed fingerprint 2301. Therefore, the optical extinction ratios obtained at two different probe light wavelengths vary under different press forces and different blood flow conditions. Such variation is different from the optical extinction ratios obtained at two different probe light wavelengths from pressing with different forces of a fake fingerprint pattern of a man-made material.

Therefore, the optical extinction ratios obtained at two different probe light wavelengths can also be used to determine whether a touch is by a user's finger or something else. This determination can also be used to determine whether to wake up the mobile device in a sleep mode.

For yet another example, the disclosed optical sensor technology can be used to monitor the natural motions that a live person's finger tends to behave due to the person's natural movement or motion (either intended or unintended) or pulsing when the blood flows through the person's body in connection with the heartbeat. The wake-up operation or user authentication can be based on the combination of the both the optical sensing of the fingerprint pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the display screen, a change in the touching force can be reflected in one or more ways, including fingerprint pattern deforming, a change in the contacting area between the finger and the screen surface, fingerprint ridge widening, or a blood flow dynamics change. Those and other changes can be measured by optical sensing based on the disclosed optical sensor technology and can be used to calculate the touch force. This touch force sensing can be used to add more functions to the optical sensor module beyond the fingerprint sensing.

The following sections provide additional technical details for implementing optical fingerprint sensing of a user finger which is located near a device while not in contact with the device in addition to performing the optical fingerprint sensing while a user finger is in contact with the device. Different from the prior examples in FIGS. 14-16 and FIGS. 20-21, the examples provided below are under-LCD or under OLED optical sensors that use light that propagates through the top cover glass, the touch sensing layers and the LCD or OLED display layers to perform the optical sensing.

Figure 26A:
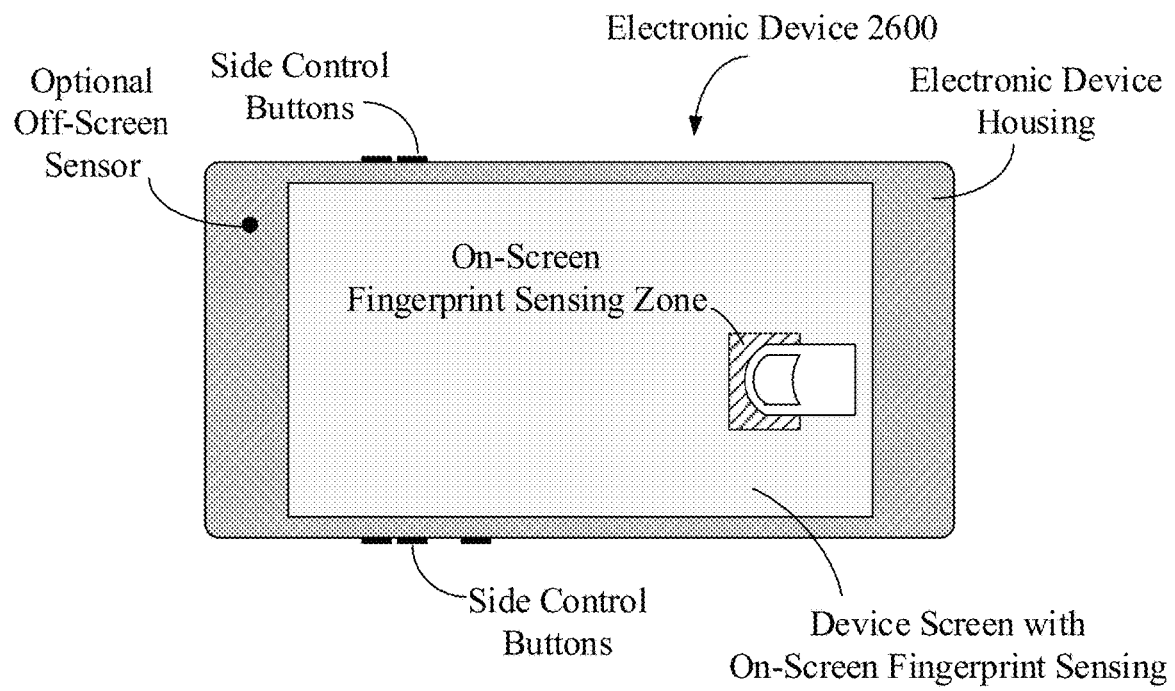
FIGS. 26A and 26B illustrate one exemplary implementation of an electronic device having a touch sensing display screen assembly and an optical sensor module positioned underneath the touch sensing display screen assembly.
Figure 26B:
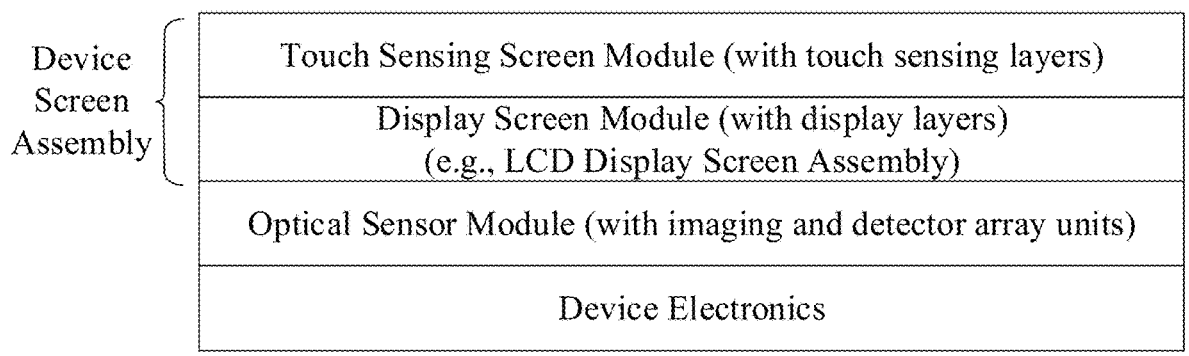

As a specific example, FIGS. 26A and 26B illustrate one exemplary implementation of an electronic device 2600 having a touch sensing display screen assembly and an optical sensor module positioned underneath the touch sensing display screen assembly. In this particular example, the display technology can be implemented by a LCD display screen with backlight for optically illuminating the LCD pixels or another display screen having light emitting display pixels without using backlight (e.g., an OLED display screen). The electronic device 2600 can be a portable device such as a smartphone or a tablet and can be the device 1 as shown in FIG. 1.

FIG. 26A shows the front side of the device 2600 which may resemble some features in some existing smartphones or tablets. The device screen is on the front side of the device 2600 occupying either entirety, a majority or a significant portion of the front side space and the fingerprint sensing function is provided on the device screen, e.g., one or more sensing areas for receiving a finger on the device screen. As an example, FIG. 26A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 2600 may have, in various implementations, side facets that support side control buttons that are common in various smartphones on the market today. Also, one or more optional sensors may be provided on the front side of the device 2600 outside the device screen as illustrated by one example on the left upper corner of the device housing in FIG. 26A.

FIG. 26B shows an example of the structural construction of the modules in the device 2600 relevant to the optical fingerprint sensing disclosed in this document. The device screen assembly shown in FIG. 26B includes, e.g., the touch sensing screen module with touch sensing layers on the top, and a display screen module with display layers located underneath the touch sensing screen module. An optical sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical sensor module is the device electronics structure containing certain electronic circuits for the optical sensor module and other parts in the device 2600. The device electronics may be arranged inside the device housing and may include a part that is under the optical sensor module as shown in FIG. 26B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen is an LCD display having LCD layers and a thin film transistor (TFT) structure or substrate. A LCD display panel is a multi-layer liquid crystal display (LCD) module that includes LCD display backlighting light sources (e.g., LED lights) emitting LCD illumination light for LCD pixels, a light waveguide layer to guide the backlighting light, and LCD structure layers which can include, e.g., a layer of liquid crystal (LC) cells, LCD electrodes, transparent conductive ITO layer, an optical polarizer layer, a color filter layer, and a touch sensing layer. The LCD module also includes a backlighting diffuser underneath the LCD structure layers and above the light waveguide layer to spatially spread the backlighting light for illuminating the LCD display pixels, and an optical reflector film layer underneath the light waveguide layer to recycle backlighting light towards the LCD structure layers for improved light use efficiency and the display brightness. For optical sensing, one or more separate illumination light sources are provided and are operated independently from the backlighting light sources of the LCD display module.

Referring to FIG. 26B, the optical sensor module in this example is placed under the LCD display panel to capture the returned light from the top touch sensing surface and to acquire high resolution images of fingerprint patterns when user's finger is in touch with a sensing area on the top surface. In other implementations, the disclosed under-screen optical sensor module for fingerprint sensing may be implemented on a device without the touch sensing feature.

Figure 27A:
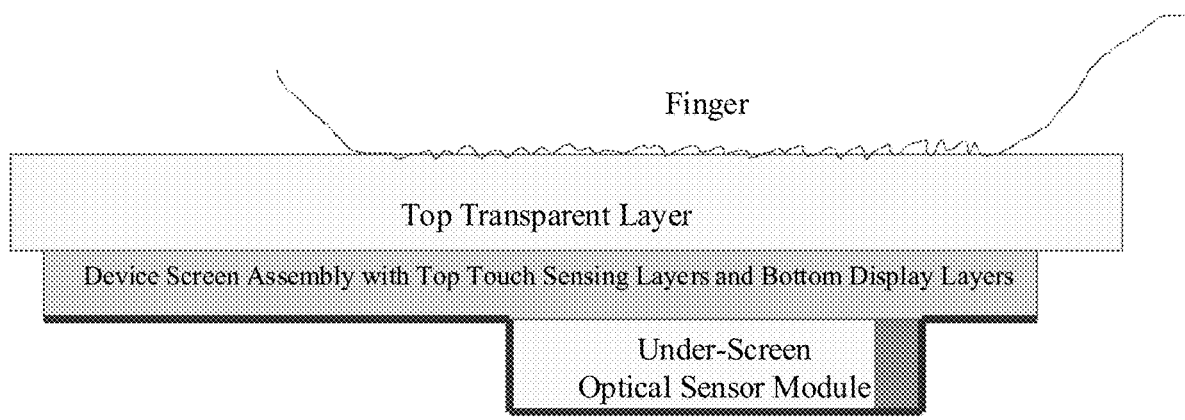
FIGS. 27A and 27B illustrate an example of a device that implements the optical sensor module in FIGS. 26A and 26B.
Figure 27B:
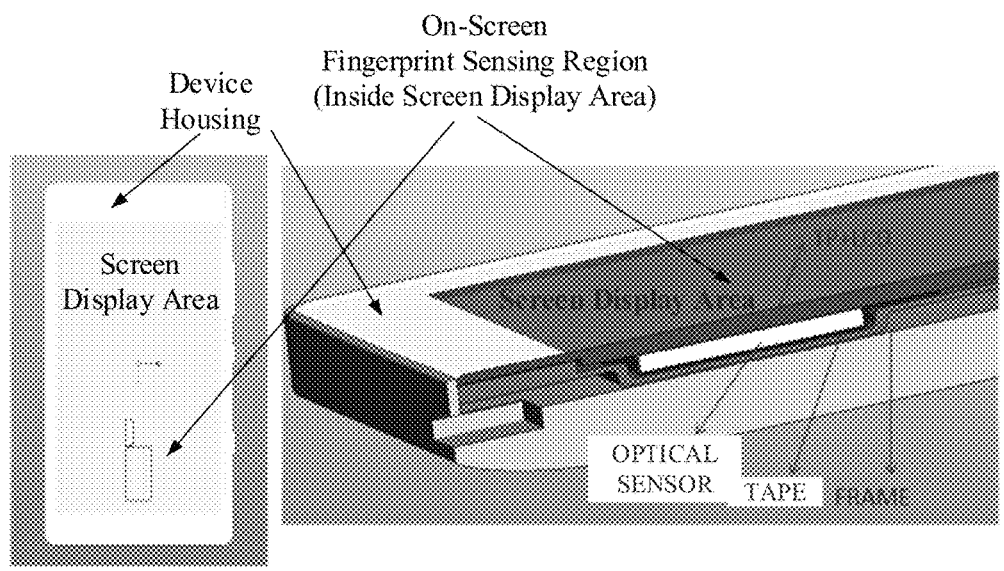

FIGS. 27A and 27B illustrate an example of a device that implements the optical sensor module in FIGS. 26A and 26B. FIG. 27A shows a cross sectional view of a portion of the device containing the under-screen optical sensor module. FIG. 27B shows, on the left, a view of the front side of the device with the touch sensing display indicating a fingerprint sensing area on the lower part of the display screen, and on the right, a perspective view of a part of the device containing the optical sensor module that is under the device display screen assembly. FIG. 27B also shows an example of the layout of the flexible tape with circuit elements.

In the design examples in FIGS. 26A, 26B, 27A and 27B, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 27A) so that the top surface of the cover glass serves as the top surface of the mobile device as a contiguous and uniform glass surface across both the display screen layers and the optical detector sensor that are vertically stacked and vertically overlap. This design for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Referring back to FIGS. 26A and 26B, the illustrated under-screen optical sensor module for on-screen fingerprint sensing may be implemented in various configurations.

In one implementation, a device based on the above design can be structured to include a device screen that provides touch sensing operations and includes a LCD display panel structure for forming a display image, a top transparent layer formed over the device screen as an interface for being touched by a user for the touch sensing operations and for transmitting the light from the display structure to display images to a user, and an optical sensor module located below the display panel structure to receive light that returns from the top transparent layer to detect a fingerprint.

This device and other devices disclosed in this document can be further configured to include various features.

For example, a device electronic control module can be included in the device to grant a user's access to the device if a detected fingerprint matches a fingerprint an authorized user. In addition, the optical sensor module is configured to, in addition to detecting fingerprints, also detect a biometric parameter different form a fingerprint by optical sensing to indicate whether a touch at the top transparent layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the LCD display panel and to turn off power to the backlighting of the LCD display panel in a sleep mode, and the device electronic control module may be configured to wake up the display panel structure from the sleep mode when the optical sensor module detects the presence of a person's skin at the designated fingerprint sensing region of the top transparent layer. More specifically, in some implementations, the device electronic control module can be configured to operate one or more illumination light sources in the optical sensor module to intermittently emit light, while turning off power to the LCD display panel (in the sleep mode), to direct the intermittently emitted illumination light to the designated fingerprint sensing region of the top transparent layer for monitoring whether there is a person's skin in contact with the designated fingerprint sensing region for waking up the device from the sleep mode.

For another example, the device can include a device electronic control module coupled to the optical sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical sensor module below the display panel structure can include a transparent block in contact with the display panel substrate to receive light that is emitted from the display panel structure and returned from the top transparent layer, an optical sensor array that receives the light and an optical imaging module that images the received light in the transparent block onto the optical sensor array. The optical sensor module can be positioned relative to the designated fingerprint sensing region and structured to selectively receive returned light via total internal reflection at the top surface of the top transparent layer when in contact with a person's skin while not receiving the returned light from the designated fingerprint sensing region in absence of a contact by a person's skin.

For yet another example, the optical sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Specific examples of under-screen optical sensor modules for on-screen fingerprint sensing are provided below.

Figure 28A:
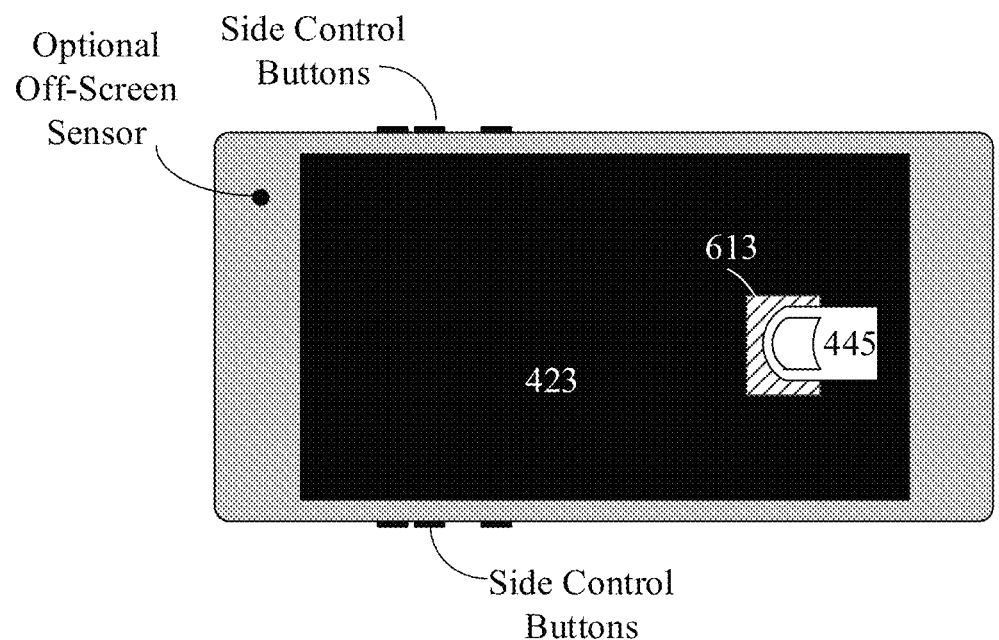
FIGS. 28A and 28B show an example of one implementation of an optical sensor module under the display screen assembly for implementing the design in FIGS. 26A and 26B.
Figure 28B:
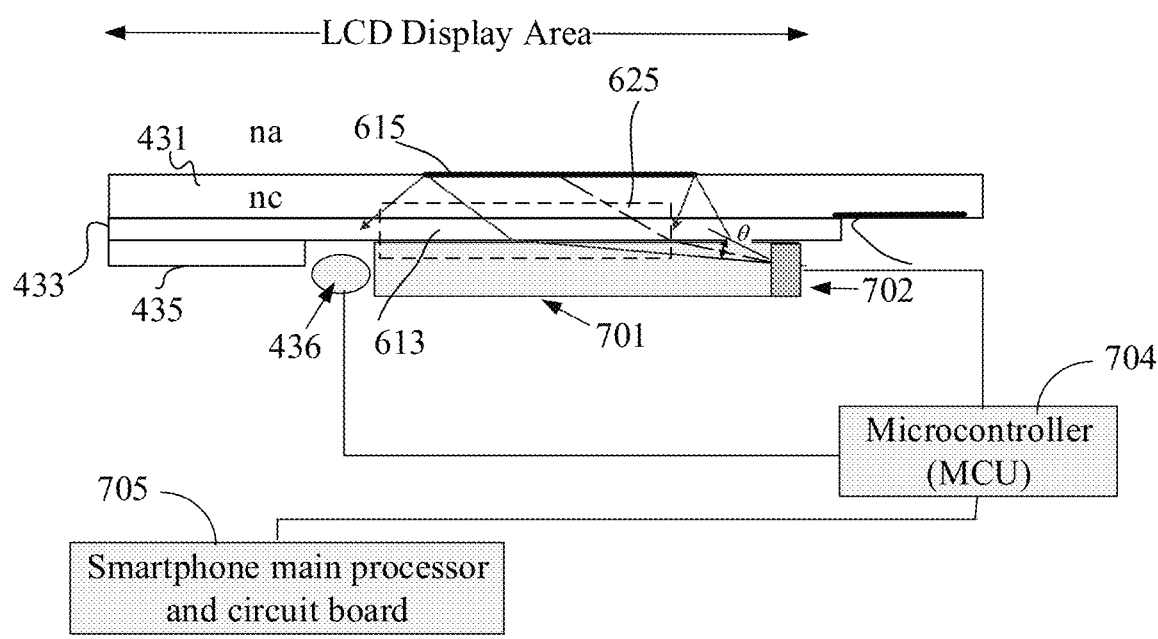

FIG. 28A and FIG. 28B show an example of one implementation of an optical sensor module under the display screen assembly for implementing the design in FIGS. 26A and 26B. The device in FIGS. 28A-28B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include a LCD display module 433 under the top transparent layer 431. The LCD display layers allow partial optical transmission so light from the top surface can partially transmit through the LCD display layers to reach the under-LCD optical sensor module. For example, LCD display layers include electrodes and wiring structure optically acting as an array of holes and light scattering objects. A device circuit module 435 may be provided under the LCD display panel to control operations of the device and perform functions for the user to operate the device.

The optical sensor module 702 in this particular implementation example is placed under LCD display module 433. One or more illumination light sources, e.g., an illumination light source 436 under the LCD display module 433 or/and another one or more illumination light sources located under the top cover glass 431, are provided for providing the illumination light or probe light for the optical sensing by the optical sensor module 702 and can be controlled to emit light to at least partially pass through the LCD display module 433 to illuminate the fingerprint sensing zone 615 on the top transparent layer 431 within the device screen area for a user to place a finger therein for fingerprint identification. The illumination light from the one or more illumination light sources 436 can be directed to the fingerprint sensing area 615 on the top surface as if such illumination light is from a fingerprint illumination light zone 613. Another one or more illumination light sources located under the top cover glass 431 may be placed adjacent to the fingerprint sensing area 615 on the top surface to direct produced illumination light to reach the top cover glass 431 without passing through the LCD display module 433. As illustrated, a finger 445 is placed in the illuminated fingerprint sensing zone 615 as the effective sensing zone for fingerprint sensing. A portion of the reflected or scattered light in the zone 615 is directed into the optical sensor module underneath the LCD display module 433 and a photodetector sensing array inside the optical sensor module receives such light and captures the fingerprint pattern information carried by the received light. The one or more illumination light sources 436 are separate from the backlighting sources for the LCD display module and are operated independently from the backlighting light sources of the LCD display module.

In this design of using one or more illumination light sources 436 to provide the illumination light for optical fingerprint sensing, each illumination light source 436 maybe controlled in some implementations to turn on intermittently with a relatively low cycle to reduce the power used for the optical sensing operations. The fingerprint sensing operation can be implemented in a 2-step process in some implementations: first, the one or more illumination light sources 436 are turned on in a flashing mode without turning on the LCD display panel to use the flashing light to sense whether a finger touches the sensing zone 615 and, once a touch in the zone 615 is detected, the optical sensing module is operated to perform the fingerprint sensing based on optical sensing and the LCD display panel may be turned on.

In the example in FIG. 28B, the under-screen optical sensor module includes a transparent block 701 that is coupled to the display panel to receive the returned light from the top surface of the device assembly, and an optical imaging block 702 that performs the optical imaging and imaging capturing. Light from the one or more illumination light sources 436, after reaching the cover top surface, e.g., the cover top surface at the sensing area 615 where a user finger touches, is reflected or scattered back from the cover top surface. When fingerprint ridges in close contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the LCD display module 433, and, after passing through the small holes of the LCD display module 433, reaches the interface with the low index optically transparent block 701 of the optical sensor module. The low index optically transparent block 701 is constructed to have a refractive index less than a refractive index of the LCD display panel so that the returned light can be extracted out of the LCD display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 28B, a control circuit 704 (e.g., a microcontroller or MCU) is coupled to the imaging sensing block 702 and to other circuitry such as the device main processor 705 on a main circuit board.

In this particular example, the optical light path design is such the light ray enters the cover top surface within the total reflect angles on the top surface between the substrate and air interface will get collected most effectively by the imaging optics and imaging sensor array in the block 702. In this design, the image of the fingerprint ridge/valley area exhibits a maximum contrast. Such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sun light or room light) may enter the image sensor through the LCD panel top surface, through holes in the LCD display assembly 433. Such background light can create a background baseline in the interested images from fingers and is undesirable. Different methods can be used to reduce this baseline intensity. One example is to tune on and off the illumination light source 436 at a certain frequency f and the image sensor accordingly acquires the received images at the same frequency by phase synchronizing the light source driving pulse and image sensor frame. Under this operation, only one of the image phases contain light from the light source. By subtracting even and odd frames, it is possible to obtain an image which most consists of light emitted from the modulated illumination light source. Based on this design, each display scan frame generates a frame of fingerprint signals. If two sequential frames of signals by turning on the illumination light in one frame and off in the other frame are subtracted, the ambient background light influence can be minimized or substantially eliminated. In implementations, the fingerprint sensing frame rate can be one half of the display frame rate.

A portion of the light from the one or more illumination light sources 436 may also go through the cover top surface and enter the finger tissues. This part of light power is scattered around and a part of this scattered light may be eventually collected by the imaging sensor array in the optical sensor module. The light intensity of this scattered light depends on the finger's skin color, the blood concentration in the finger tissue and this information carried by this scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

The one or more illumination light sources 436 in FIG. 28B can be designed to emit light of different colors or wavelengths and the optical sensor module can capture returned light from a person's finger at the different colors or wavelengths. By recording the corresponding measured intensity of the returned light at the different colors or wavelengths, information associated with the user's skin color can be determined. As an example, when a user registers a finger for fingerprint authentication operation, the optical fingerprint sensor also measures intensity of the scatter light from finger at color A, and B, as intensity Ia, Ib. The ratio of Ia/Ib could be recorded to compare with later measurement when user's finger is placed on the sensing area to measure fingerprint. This method can help reject the spoof device which may not match user's skin color.

The one or more illumination light sources 436 can be controlled by the same electronics 704 (e.g., MCU) for controlling the image sensor array in the block 702. The one or more illumination light sources 436 can be pulsed for a short time, at a low duty cycle, to emit light intermittently and to provide pulse light for image sensing. The image sensor array can be operated to monitor the light pattern at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the one or more illumination light sources 436 for performing the optical fingerprint sensing), and use the normal mode to acquire a full fingerprint image. The image sensor array in the block 702 will send the acquired fingerprint image to the smartphone main processor 705 which can be operated to match the captured fingerprint image to the registered fingerprint database. If there is a match, the smartphone will unlock the phone, and start the normal operation. If the captured image is not matched, the smartphone will feedback to user that the authentication is failed. User may try again, or input passcode.

In the example in FIGS. 28A and 28B, the under-screen optical sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 28B. The optically transparent block 701 and the front end of the imaging sensing block 702 before the photodetector sensing array forma a bulk imaging module to achieve proper imaging for the optical fingerprint sensing. Due to the optical distortions in this imaging process, a distortion correction can be used, as explained above, to achieve the desired imaging operation.

Figure 29A:
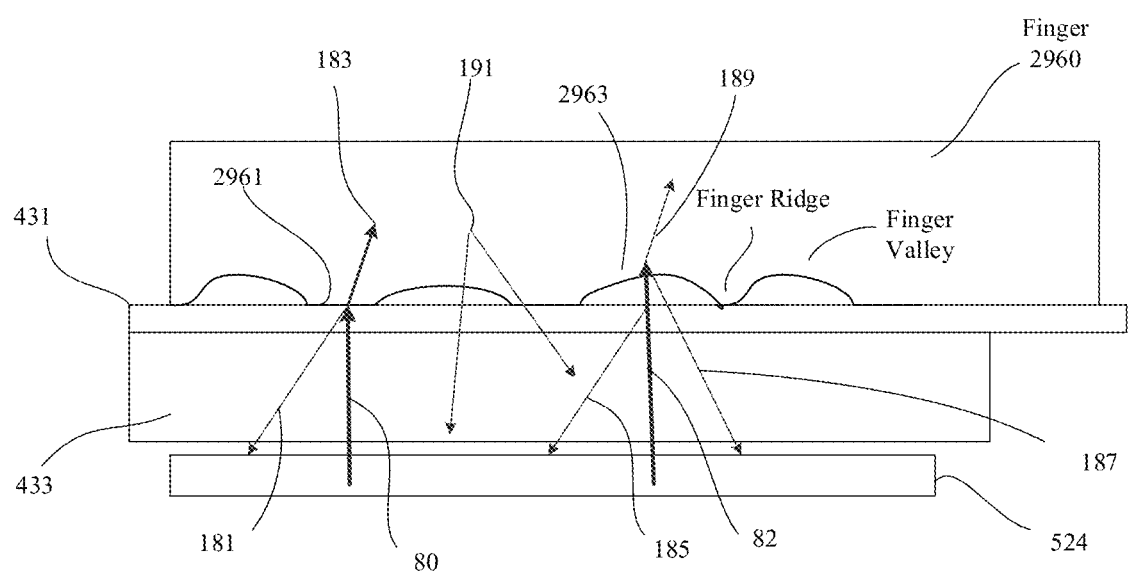
FIGS. 29A, 29B and 29C illustrate signal generation for the returned light from the sensing zone on the top sensing surface under two different optical conditions to facilitate the understanding of the operation of the under-screen optical sensor module.
Figure 29B:
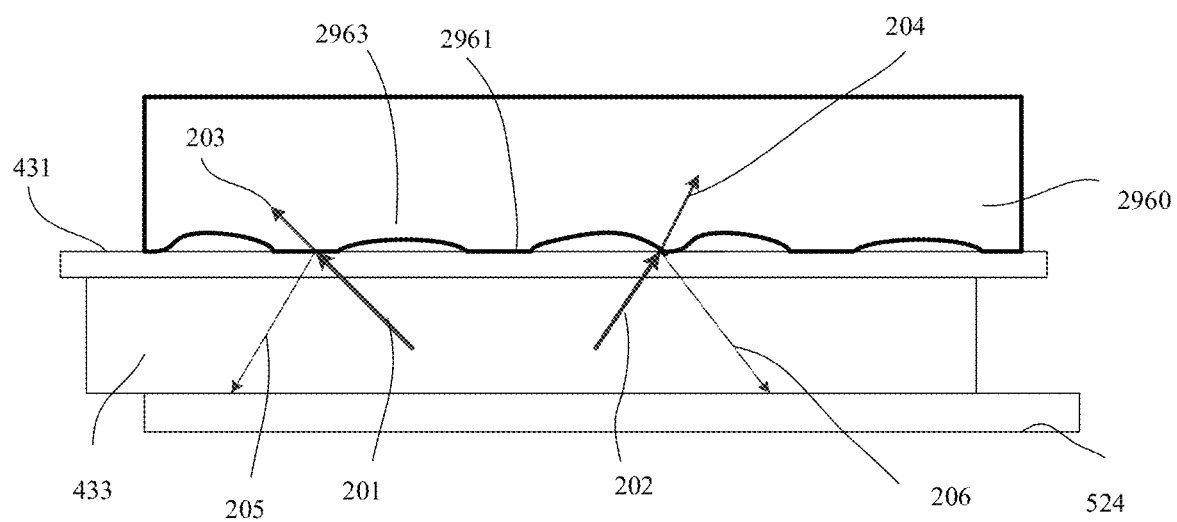
Figure 29C:
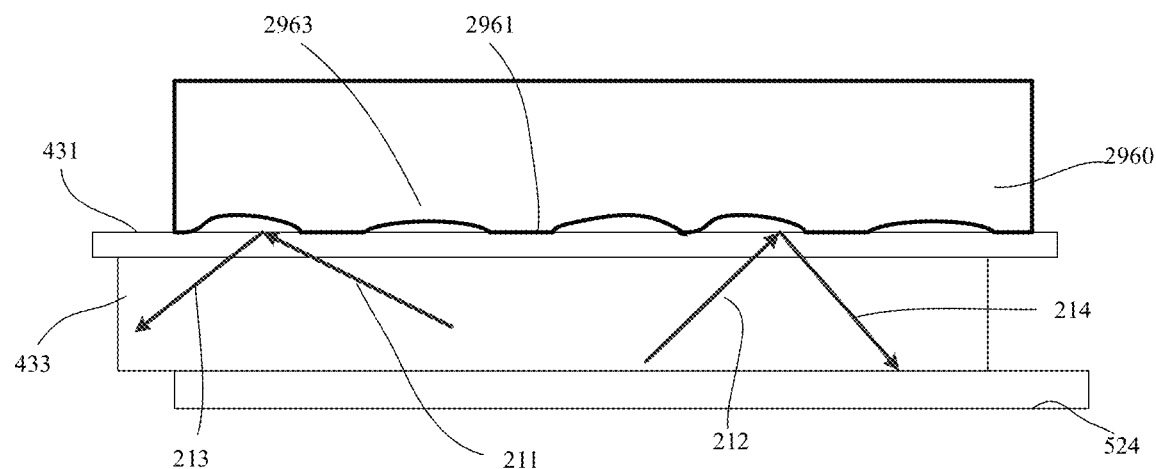

In the optical sensing by the under-screen optical sensor module in FIGS. 28A and 28B and other designs disclosed herein, the optical signal from the sensing zone 615 on the top transparent layer 431 to the under-screen optical sensor module include different light components. FIGS. 29A, 29B and 29C illustrate signal generation for the returned light from the sensing zone 615 under different optical conditions to facilitate the understanding of the operation of the under-screen optical sensor module.

FIG. 29A shows an example of how illumination light from the one or more illumination light sources 436 propagates through the OLED display module 433, after transmitting through the top transparent layer 431, and generates different returned light signals including light signals that carry fingerprint pattern information to the under-screen optical sensor module. For simplicity, two illumination rays 80 and 82 at two different locations are directed to the top transparent layer 431 without experiencing total reflection at the interfaces of the top transparent layer 431. Specifically, the illumination light rays 80 and 82 are perpendicular or nearly perpendicular to the top layer 431. A finger 2960 is in contact with the sensing zone 615 on the e top transparent layer 431. As illustrated, the illumination light beam 80 reaches to a finger ridge in contact with the top transparent layer 431 after transmitting through the top transparent layer 431 to generate the light beam 183 in the finger tissue and another light beam 181 back towards the LCD display module 433. The illumination light beam 82 reaches to a finger valley located above the top transparent layer 431 after transmitting through the top transparent layer 431 to generate the reflected light beam 185 from the interface with the top transparent layer 431 back towards the LCD display module 433, a second light beam 189 that enters the finger tissue and a third light beam 187 reflected by the finger valley.

In the example in FIG. 29A, it is assumed that the finger skin's equivalent index of refraction is about 1.44 at 550 nm and the cover glass index of refraction is about 1.51 for the top transparent layer 431. The finger ridge-cover glass interface reflects part of the beam 80 as reflected light 181 to bottom layers 524 below the LCD display module 433. The reflectance can be low, e.g., about 0.1% in some LCD panels. The majority of the light beam 80 becomes the beam 183 that transmits into the finger tissue 2960 which causes scattering of the light 183 to produce the returned scattered light 191 towards the LCD display module 433 and the bottom layers 524. The scattering of the transmitted light beam 189 from the LCD pixel 73 in the finger tissue also contributes to the returned scattered light 191.

The beam 82 at the finger skin valley location 2963 is reflected by the cover glass surface (e.g., about 3.5% as the reflected light 185 towards bottom layers 524, and the finger valley surface reflects about 3.3% of the incident light power (light 187) to bottom layers 524. The total reflection may be about 6.8%. The majority light 189 is transmitted into the finger tissues 2960. Part of the light power in the transmitted light 189 in the figure tissue is scattered by the tissue to contribute to the scattered light 191 towards and into the bottom layers 524.

Therefore, the light reflections from various interface or surfaces at finger valleys and finger ridges of a touching finger are different and the reflection ratio difference carries the fingerprint map information and can be measured to extract the fingerprint pattern of the portion that is in contact with the top transparent layer 431 and is illuminated the OLED light.

FIGS. 29B and 29C illustrate optical paths of two additional types of illumination light rays at the top surface under different conditions and at different positions relative to valleys or ridges of a finger, including under a total reflection condition at the interface with the top transparent layer 431.

The illustrated illumination light rays generate different returned light signals including light signals that carry fingerprint pattern information to the under-screen optical sensor module. It is assumed that the cover glass 431 and the LCD display module 433 are glued together without any air gap in between so that illumination light with a large incident angle to the cover glass 431 will be totally reflected at the cover glass-air interface. FIGS. 29A, 29B and 29C illustrate examples of three different groups divergent light beams: (1) central beams 82 with small incident angles to the cover glass 431 without the total reflection (FIG. 29A), (2) high contrast beams 201, 202, 211, 212 that are totally reflected at the cover glass 431 when nothing touches the cover glass surface and can be coupled into finger tissues when a finger touches the cover glass 431 (FIGS. 29B and 29C), and (3) escaping beams having very large incident angles that are totally reflected at the cover glass 431 even at a location where the finger issue is in contact.

For the central light beams 82, the cover glass surface reflects about 0.1%~3.5% to light beam 185 that is transmitted into bottom layers 524, the finger skin reflects about 0.1%~3.3% to light beam 187 that is also transmitted into bottom layers 524. The reflection difference is dependent on whether the light beams 82 meet with finger skin ridge 2961 or valley 2963. The rest light beam 189 is coupled into the finger tissues inside the finger 2960.

For high contrast light beams 201 and 202, the cover glass surface reflects nearly 100% to light beams 205 and 206 respectively if nothing touches the cover glass surface. When the finger skin ridges touch the cover glass surface and at light beams 201 and 202 positions, most of the light power is coupled into the finger tissues in the finger 2960 by light beams 203 and 204.

For high contrast light beams 211 and 212, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues in the finger 2960.

As illustrated in FIG. 29A, light beams that are coupled into finger tissues in the finger 2960 will experience random scattering by the figure tissues to form low-contrast light 191 and part of such low-contrast light 191 will pass through the LCD display module 433 to reach to the optical sensor module.

Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design in FIGS. 26A and 26B.

For example, the specific implementation in FIG. 28B based on optical imaging by using a bulk imaging module in the optical sensing module can be implemented in various configurations. FIGS. 30A-30C, 31, 8A-8B, 9, 10A-10B, 11 and 12 illustrate examples of various implementations and additional features and operations of the under-screen optical sensor module designs for optical fingerprint sensing.

Figure 30A:
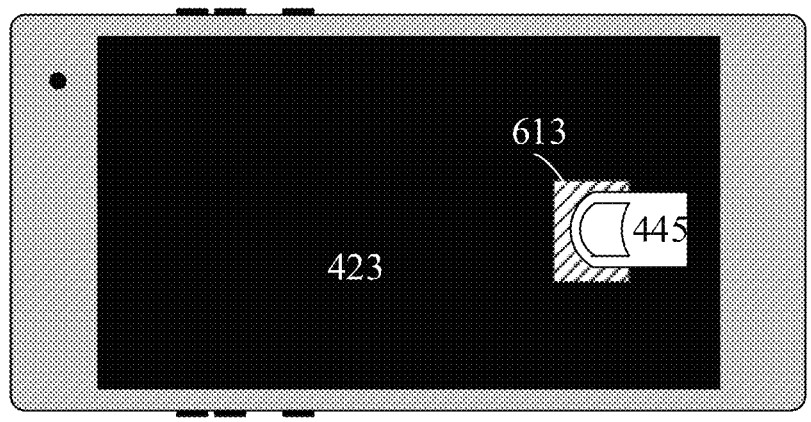
FIGS. 30A-30C show example designs of under-screen optical sensor modules.
Figure 30B:
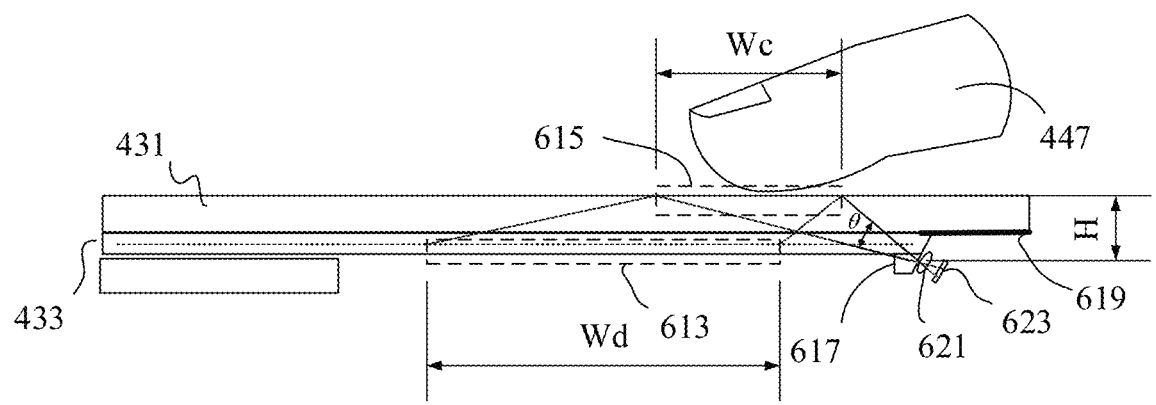
Figure 30C:
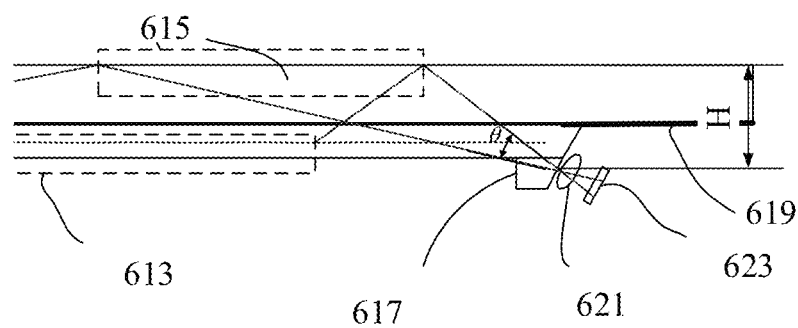

FIGS. 30A, FIG. 30B and FIG. 30C show an example of an under-screen optical sensor module based on optical imaging via a lens for capturing a fingerprint from a finger 445 pressing on the display cover glass 423. FIG. 30C is an enlarged view of the optical sensor module part shown in FIG. 30B. The under-screen optical sensor module as shown in FIG. 30B is placed under the LCD display module 433 includes an optically transparent spacer 617 that is engaged to the bottom surface of the LCD display module 433 to receive the returned light from the sensing zone 615 on the top surface of the top transparent layer 431, an imaging lens 621 that is located between and spacer 617 and the photodetector array 623 to image the received returned light from the sensing zone 615 onto the photodetector array 623. Like the imaging system in the example in FIG. 28B, this imaging system in FIG. 30B for the optical sensor module can experience image distortions and a suitable optical correction calibration can be used to reduce such distortions, e.g., the distortion correction methods described for the system in FIG. 28B.

Similar to the assumptions in FIGS. 29A, 29B and 29C, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass top surface, and the total reflection angle is about 73.7° if the finger skin touches the cover glass top surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired part of the cover glass surface in the sensing zone 615. For example, the viewing angle may be aligned to detect the total inner reflection of the LCD display assembly. Specifically, the viewing angle θ is aligned to sense the effective sensing zone 615 on the cover glass surface. The effective sensing cover glass surface 615 may be viewed as a mirror so that the photodetector array effectively detects an image of the fingerprint illumination light zone 613 in the LCD display that is projected by the sensing cover glass surface 615 onto the photodetector array. The photodiode/photodetector array 623 can receive the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometrics of the optical detection path are known, the fingerprint image distortion caused in the optical path in the optical sensor module can be corrected.

Consider, as a specific example, that the distance H in FIG. 30B from the detection module central axis to the cover glass top surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top transparent layer 431.

In various implementations of the under-screen optical sensor module technology for fingerprint sensing disclosed herein, the optical imaging of the illuminated touched portion of a finger to the optical sensor array in the under-screen optical sensor module can be achieved without using an imaging module such as a lens by imaging the returned light from the touched portion of the finger under optical illumination. One technical challenge for optical fingerprint sensing without an imaging module is how to control the spreading of the returned light that may spatially scramble returned light from different locations on the touched portion of the finger at the optical sensor array so that the spatial information of different locations may be lost when such returned light reaches the optical sensor array. This challenge can be addressed by using optical collimators or an array of pinholes to replace the optical imaging module in the under-screen optical sensor module for detecting a fingerprint by optical sensing. A device for implementing such optical fingerprint sending can include a device screen that provides touch sensing operations and includes a display panel structure having light emitting display pixels, each pixel operable to emit light for forming a portion of a display image; a top transparent layer formed over the device screen as an interface for being touched by a user for the touch sensing operations and for transmitting the light from the display structure to display images to a user; and an optical sensor module located below the display panel structure to receive light that is emitted by at least a portion of the light emitting display pixels of the display structure and is returned from the top transparent layer to detect a fingerprint, the optical sensor module including an optical sensor array that receives the returned light and an array of optical collimators or pinholes located in a path of the returned light to the optical sensor array. The array of optical collimators is used to collect the returned light from the display panel structure and to separate light from different locations in the top transparent layer while directing the collected returned light to the optical sensor array.

The imaging by using collimators relies on using different collimators at different locations to spatially separate light from different regions of a fingerprint to different optical detectors in the optical detector array. The thickness or length of each collimator along the collimator can be designed to control the narrow field of optical view of each collimator, e.g., the light from only a small area on the illuminated finger is captured by each collimator and is projected onto a few adjacent optical detectors in the optical detector array. As an example, the thickness or length of each collimator along the collimator can be designed to be large, e.g., a few hundred microns, so that the field of optical view of each collimator may allow the collimator to deliver imaging light to a small area on the optical detector array, e.g., one optical detector or a few adjacent optical detectors in the optical detector array (e.g., an area of tens of microns on each side on the optical detector array in some cases).

Figure 31:
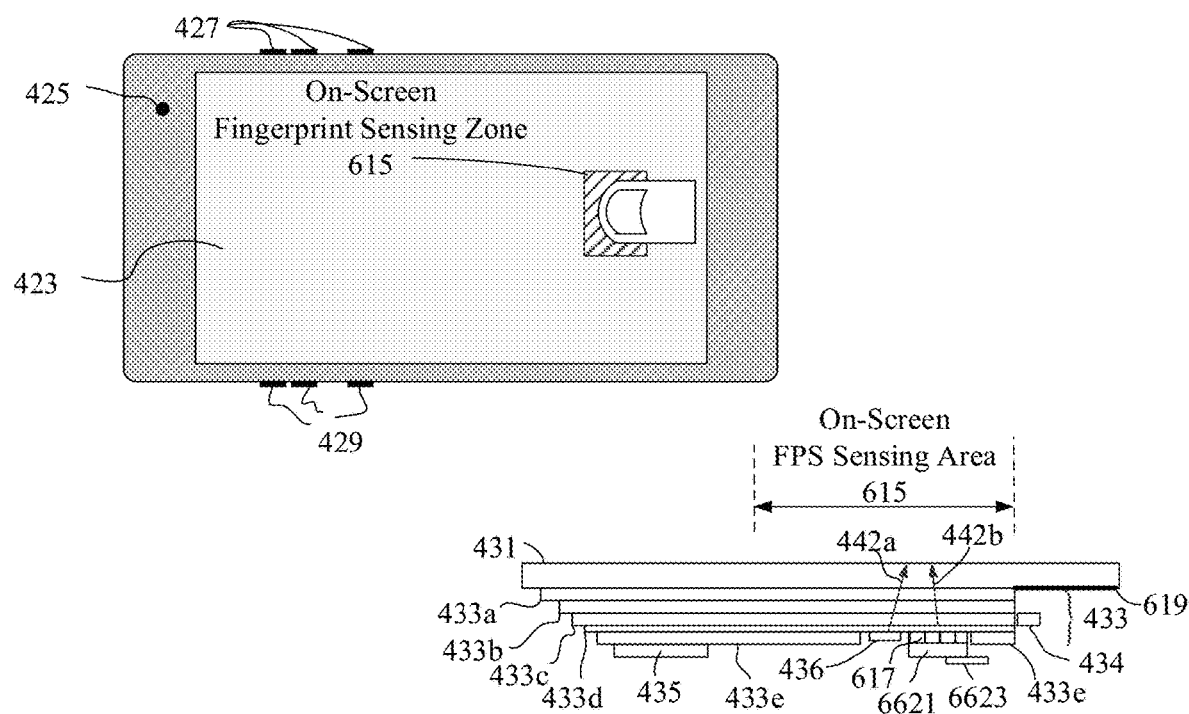
FIG. 31 illustrates an example of various designs for fingerprint sensing using an under-screen optical sensor module.

FIG. 31 shows an example of a smartphone having a liquid crystal display (LCD) display and an under-screen optical sensor module that includes an optical module for collecting and directing light to an optical detector array for optical fingerprint sensing. The LCD-based touch sensing display system 423 implements an optical sensing module with a photo detector array 6621 under the LCD display system 423. The optical module 617 placed between the LCD display screen and the optical sensor array in the under-screen optical sensor module can be configured in various designs to couple desired returned light from the display panel while filtering out background light in the optical detection by the optical sensor array. In some designs, the optical module 617 may include one or more imaging lenses as described in this document, a lens-pinhole assembly as described in this document, or an array of optical collimators or pinholes.

The touch sensing display system 423 is placed under a top cover glass 431 which serves as a user interface surface for various user interfacing operations, including, e.g., touch sensing operations by the user, displaying images to the user, and an optical sensing interface to receive a finger for optical fingerprint sensing and other optical sensing operations where probe light is directed from inside the device to the top cover glass 431 to illuminate the finger. The display system 423 is a multi-layer LCD module 433 that includes LCD display backlighting light sources 434 (e.g., LED lights) that provide the white backlighting for the LCD module 433, a light waveguide layer 433c coupled to the LCD display backlighting light sources 434 to receive and guide the backlighting light, LCD structure layers 433a (including, e.g., a layer of liquid crystal (LC) cells, LCD electrodes, transparent conductive ITO layer, an optical polarizer layer, a color filter layer, and a touch sensing layer), a backlighting diffuser 433b placed underneath the LCD structure layers 433a and above the light waveguide layer 433c to spatially spread the backlighting light for illuminating the LCD display pixels in the LCD structure layers 433a, and an optical reflector film layer 433d underneath the light waveguide layer 433c to recycle backlighting light towards the LCD structure layers 433a for improved light use efficiency and the display brightness. When the LCD cells in the sensing window are turned on, most of the LCD structure layers 433a (include liquid crystal cells, electrodes, transparent ITO, polarizer, color filter, touch sensing layer etc.) become partially transparent although the micro structure may extinct partial of the probe light energy. The light diffuser 433b, the light waveguide 433c, the reflector film 433d, and the LCD module frame are treated to hold the fingerprint sensor and provide transparent or partially transparent sensing light path so that a portion of the reflected light from the top surface of the cover glass 431 can reach a photo detector array 621 with an under-LCD-screen optical sensor module for fingerprint sensing and other optical sensing operations. As illustrated, this optical sensor module under the LCD screen includes various fingerprint sensor parts, e.g., an optical module 617 for collecting and directing reflected probe light to the photo detector array 621, and an optical sensor circuit module 6623 that receives and conditions the detector output signals from the photo detector array 6621. The photodiode array 6621 may be a CMOS sensor of CMOS sensing pixels, a CCD sensor array or a suitable optical sensor array that is sensitive to light.

The example illustrates includes an electronics module 435 for the LCD display and touch sensing operations, one or more other sensors 425 such as an optical sensor for monitoring the light level of the surroundings, optional side buttons 427 and 429 for controls of certain smartphone operations.

In the example in FIG. 31, the light sources in the illustrated example include the display back lighting light sources 434 and the extra designated probe light sources 436. The light beams 442a from extra designated probe light sources 436 and the light beams 442b from the display light sources 434 can be used as the sensor probe light for illuminating a finger in contact with the top glass cover 431 to generate the desired reflected probe light carrying the fingerprint pattern and other information to the optical sensor module.

When the LCD cells in the sensing window are turned on, most of the LCD structure layers 433a (include liquid crystal cells, electrodes, transparent ITO, polarizer, color filter, touch sensing layer etc.) become partially transparent although the micro structure may extinct partial of the probe light energy. The light diffuser 433b, the light waveguide 433c, the reflector film 433d, and the LCD module frame are treated to hold the fingerprint sensor and provide transparent or partially transparent sensing light path.

Based on the disclosed under LCD screen optical sensing designs, a person's finger, either in direct touch with the LCD display screen or in a near proximity about the LCD display screen, can produce the returned light back into the LCD display screen while carrying information of a portion of the finger illuminated by the light output by the LCD display screen. Such information may include, e.g., the spatial pattern and locations of the ridges and valleys of the illuminated portion of the finger. Accordingly, the optical sensor module can be integrated to capture at least a portion of such returned light to detect the spatial pattern and locations of the ridges and valleys of the illuminated portion of the finger by optical imaging and optical detection operations. The detected spatial pattern and locations of the ridges and valleys of the illuminated portion of the finger can then be processed to construct a fingerprint pattern and to perform fingerprint identification, e.g., comparing with a stored authorized user fingerprint pattern to determine whether the detected fingerprint is a match as part of a user authentication and device access process. This optical sensing based fingerprint detection by using the disclosed optical sensor technology uses the LCD display screens as an optical sensing platform and can be used to replace existing capacitive fingerprint sensors or other fingerprint sensors that are basically self-contained sensors as "add-on" components without using light from display screens or using the display screens for fingerprint sensing for mobile phones, tablets and other electronic devices.

Notably, an optical sensor module based on the disclosed optical sensor technology can be coupled to the backside of the LCD display screen without requiring a designated area on the display surface side of the LCD display screen that would occupy a valuable device surface real estate in some electronic devices such as a smartphone, a tablet or a wearable device. Such an optical sensor module can be placed under the LCD display screen that vertically overlaps with the display screen area, and, from the user's perspective, the optical sensor module is hidden behind the display screen area. In addition, because the optical sensing of such an optical sensor module is by detecting the light from the LCD display screen and is returned from the top surface of the display area, the disclosed optical sensor module does not require a special sensing port or sensing area that is separate from the display screen area. Accordingly, different from fingerprint sensors in other designs, including, e.g., Apple's iPhone/iPad devices or Samsung Galaxy smartphone models where the fingerprint sensor is located at a particular fingerprint sensor area or port (e.g., the home button) on the same surface of the display screen but located in a designated non-displaying zone that is outside the display screen area, the optical sensor module based on the disclosed optical sensor technology can be implemented in ways that would allow fingerprint sensing to be performed at any location on the LCD display screen by using unique optical sensing designs by routing the returned light from the finger into an optical sensor and by providing proper optical imaging mechanism to achieve high resolution optical imaging sensing. In this regard, the disclosed optical sensor technology provides a unique on-screen fingerprint sensing configuration by using the same top touch sensing surface that displays images and provides the touch sensing operations without a separate fingerprint sensing area or port outside the display screen area.

In addition to fingerprint detection by optical sensing, the optical sensing may be used to measure other parameters. For example, the disclosed optical sensor technology can measure a pattern of a palm of a person given the large touch area available over the entire LCD display screen (in contrast, some designated fingerprint sensors such as the fingerprint senor in the home button of Apple's iPhone/iPad devices have a rather small and designated off-screen fingerprint sensing area that is highly limited in the sensing area size not suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism based on the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a blood flow dynamics change. Such changes can be measured by optical sensing based on the disclosed optical sensor technology and can be used to calculate the touch force. This touch force sensing adds more functions to the optical sensor module beyond the fingerprint sensing.

With respect to useful operation or control features in connection with the touch sensing aspect of the LCD display screen, the disclosed optical sensor technology can provide triggering functions or additional functions based on one or more sensing results from the optical sensor module to perform certain operations in connection with the touch sensing control over the LCD display screen. For example, the optical property of a finger skin (e.g., the index of refraction) tends to be different from other artificial objects. Based on this, the optical sensor module may be designed to selectively receive and detect returned light that is caused by a finger in touch with the surface of the LCD display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the LCD display screen which, for example, may include designed extra light sources for optical sensing and the designed extra light sources may turned on in a flash mode to intermittently emit flash light to the screen surface for sensing any touch by a person's finger or palm while the LCD display screen can be placed in a sleep mode to save power. In some implementations, the wake-up sensing light can be in the infrared invisible spectral range so a user will not experience any visual of a flash light.

An optical sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical sensor module based on the disclosed optical sensor technology can be configured as a non-invasive module that can be easily integrated to a LCD display screen without requiring changing the design of the LCD display screen for providing a desired optical sensing function such as fingerprint sensing. In this regard, an optical sensor module based on the disclosed optical sensor technology can be independent from the design of a particular LCD display screen design due to the nature of the optical sensor module: the optical sensing of such an optical sensor module is by detecting the light from the LCD display screen and is returned from the top surface of the display area, and the disclosed optical sensor module is coupled to the backside of the LCD display screen for receiving the returned light from the top surface of the display area and thus does not require a special sensing port or sensing area that is separate from the display screen area. Accordingly, such an optical sensor module can be used to combine with LCD display screens to provide optical fingerprint sensing and other sensor functions on a LCD display screen without using a specially designed LCD display screen with hardware especially designed for providing such optical sensing. This aspect of the disclosed optical sensor technology enables a wide range of LCD display screens to be used in smartphones, tablets or other electronic devices with enhanced functions from the optical sensing of the disclosed optical sensor technology.

For example, for an existing phone assembly design that does not provide a separate fingerprint sensor as in the Apple iPhones or Samsung models, such an existing phone assembly design can integrate the under-screen optical sensor module as disclosed herein without changing the touch sensing-display screen assembly to provide an added on-screen fingerprint sensing function. Because the disclosed optical sensing does not require a separate designated sensing area or port as in the case of the Apple iPhones/Samsung phones with a front fingerprint sensor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Simply put, no external sensing port and no extern hardware button are needed on the exterior of a device are needed for adding the disclosed optical sensor module for fingerprint sensing. The added optical sensor module and the related circuitry are under the display screen inside the phone housing and the fingerprint sensing is conveniently performed on the same touch sensing surface for the touch screen.

For another example, due to the above described nature of the optical sensor module for fingerprint sensing, a smartphone that integrates such an optical sensor module can be updated with improved designs, functions and integration mechanism without affecting or burdening the design or manufacturing of the LCD display screens to provide desired flexibility to device manufacturing and improvements/upgrades in product cycles while maintain the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical sensor module. Also, improved on-screen optical sensing for fingerprint sensing or other optical sensing functions by such an optical sensor module can be added to a new product release by using a new version of the under-screen optical sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices.

The optical sensor technology disclosed herein uses the light for displaying images in a display screen that is returned from the top surface of the device display assembly for fingerprint sensing and other sensing operations. The returned light carries information of an object in touch with the top surface (e.g., a finger) and the capturing and detecting this returned light constitute part of the design considerations in implementing a particular optical sensor module located underneath the display screen. Because the top surface of the touch screen assembly is used as a fingerprint sensing area, the optical image of this touched area should be captured by an optical imaging sensor array inside the optical sensor module with a high image fidelity to the original fingerprint for robust fingerprint sensing. The optical sensor module can be designed to achieve this desired optical imaging by properly configuring optical elements for capturing and detecting the returned light.

In designing optical sensor modules under LCD display modules, various technical features or properties of LCD display modules should be considered and factored into the overall optical sensor module designs to improve the optical sensing operation. The following sections described several design examples.

One common component in various LCD display modules is a light diffuser which may a sheet that diffuses the incident light to different directions to achieve a large viewing angle and the spatial uniformity of the display. The presence of this LCD diffuser layer, however, can degrade the optical detection by the under-LCD optical sensor module.

Figure 31A:
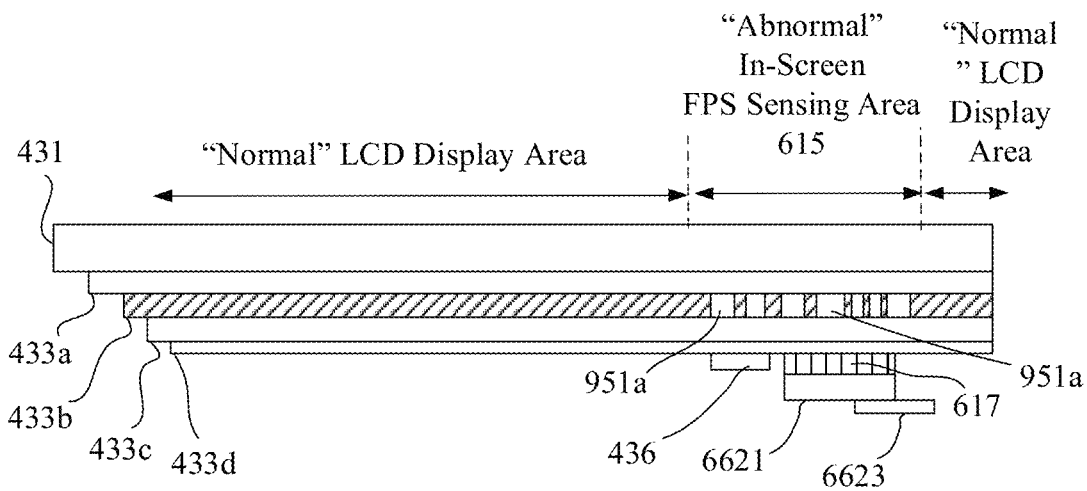
FIGS. 31A, 31B and 31C show examples of LCD diffuser designs for improved under-LCD optical sensing.
Figure 31B:
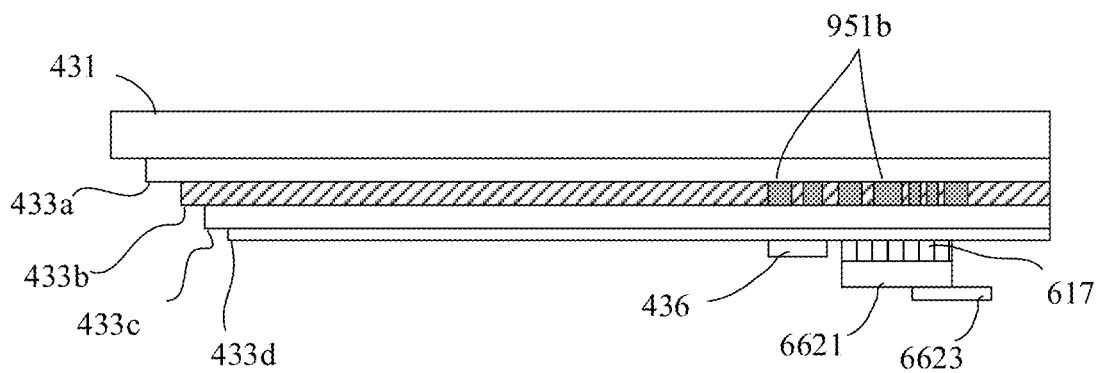

FIGS. 31A and 31B show a LCD light diffuser layer 433b located between the LCD waveguide layer 433c and other LCD layers 433a. In some LCD assemblies, the cover glass layer 431 may be separated by a distance from the underlying diffuser sheet 433b (e.g., several millimeters in some LCD devices), and the optical module 617 is separated from the diffuser sheet 433b by the light waveguide board 433c (which may be sub mini-meters thick). Under this structure, the strong diffusion in the diffuser sheet 433b can significantly reduce the signal contrast in the signal light that passes through the LCD display module 433 to reach the optical detector array 6621. The light diffusion at the LCD diffuser layer 433b, although desirable for display operations, degrades the fingerprint detection performance.

This undesired effect of the LCD diffuser layer 433b may be mitigated by using different techniques. Two examples are illustrated in FIGS. 31A and 31B.

FIG. 31A shows one example in which holes 951a can be made in the corresponding area or all over the diffuser sheet 433b in the LCD display module in the section of the diffuser sheet 433b above the optical sensor module to improve the transmission of the returned light from the top cover glass 431 to the optical detector array 6621. The hole sizes, shapes and distribution can be selected based on the specific design needs. For example, the hole size may be larger than the probe light wave lengths so as to avoid strong diffraction. The inclusion of the holes 951a in the LCD diffuser layer 433b in this design is to prove optical transmission paths to the optical sensor module.

FIG. 31B shows another example where the diffuser sheet can be structured to include low diffusion optical transparent spots 951b where the light diffusion is weak in the region above the optical sensor module to improve the transmission of the light to the optical sensor module. The transparent spot sizes, shapes and distribution e can be selected based on the specific design needs. For example, the hole size may be larger than the probe light wave lengths so as to avoid strong diffraction, and the spot distribution be such that to allow efficient reception of the returned light from the top cover glass 431 through the LCD display layers. If the diffuser sheet is made of a rough surface material that diffracts or diffuses light, a selected material can be selectively applied to the rough surface to provide some transparent material to reduce the original optical diffusion of the rough surface. Examples for suitable materials include epoxy, wax, or oil and can effectively modify the diffusion.

For a given LCD diffuser layer, a long wavelength light source may be selected to generate the probe or illumination light so that the diffuser scattering for such light is weak so that more light can pass through the diffuser layer to reach the optical sensor module.

For another example, referring to FIGS. 31A and 31B, various LCD display modules include an optical reflector layer or film 433d in LCD below the LCD waveguide layer 433c to reflect the unused light back to the LCD layers for enhancing the display brightness. However, the presence of this optical reflector film 433d can block most of the light from reaching the optical sensor module under the LCD and thus can adversely affect the optical fingerprint sensing. This optical reflector layer can be modified in a way that maintains the desired optical reflection under the LCD waveguide layer in most locations while allowing for desired optical transmission at the location of the under-LCD optical sensor module. In some implementations, the optical module 617 for the optical sensor under the LCD can be fixed to touch the reflector film 433d.

Figure 31C:

FIG. 31C shows another example for providing transparent light paths for guiding light from one or more illumination light sources 436 to improve the fingerprint sensing of the detection module without significant diffusion by the diffusion layer. For example, holes 969 may be selectively formed in the light diffuser film 433b to improve light transmission to the under-LCD optical fingerprint sensor. To avoid the influence of the display performance, the light path holes may be tilted to maintain some level of light diffusion function in the area of the holes 969. In addition, such holes 969 may be designed to be small, e.g., 0.3 mm or less, to further enhance diffusion of the backlighting while still providing improved optical imaging at the under-LCD optical fingerprint sensor. In implementations, the light path holes may be empty with air, may be filled with a transparent material.

In some designs, the light path holes 969 may not be limited at a certain area but may be distributed all over the light diffuser film 433b, e.g., the holes 969 may be evenly distributed in the entire film 433b. This design eliminates the undesired spatial non-uniform illumination created by the selected holes 969 in certain area but not in other areas. In some designs, the light path holes 969 may be distributed in a spatial gradient pattern so that any change in the LCD illumination caused by the holes 969 would be gradual and less visible.

Figure 31D:
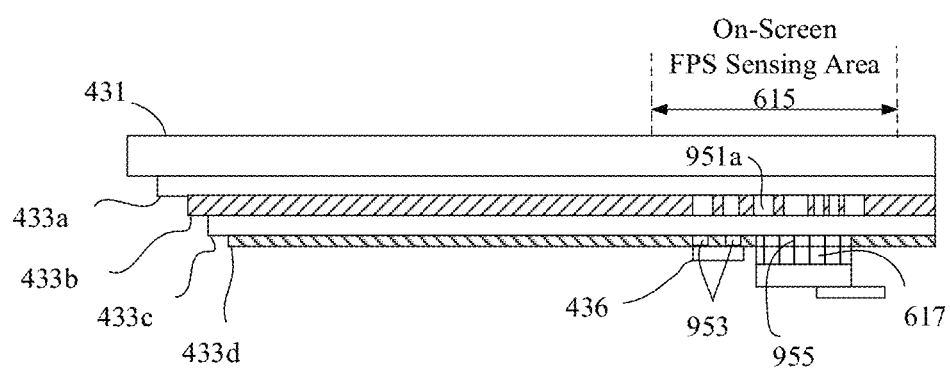
FIGS. 31D and 31E show examples of LCD reflector designs for improved under-LCD optical sensing.

FIG. 31D shows one example for modifying the optical reflector layer by including or forming light-transmitting holes in the region of the optical sensor module location in the optical reflector film to allow optical reflection for LCD display in most parts of the optical reflector film while providing the optical module 617 with transparent light paths for receiving light reflected from the finger on top of the LCD. The hole sizes, shapes and distribution can be configured to meet the needs of optical sensing. For example, the hole size may be larger than the probe light wave lengths so as to avoid strong diffraction. For example, the collimator unit aperture may be around 40 microns in diameter and the diffuser sheet hole size may be 5 microns, 10 microns, 30 microns, 40 microns, or 100 microns and so on. Each collimator unit aperture may have one or multiple holes in the optical reflector layer to provide desired light paths for optical sensing. The non-uniformity in the detection can be calibrated. If the collimator unit apertures are discrete with large pitch distance (for example 1 mm or so), the holes in the reflector film may be drilled with the same pitch distance.

Figure 31E:
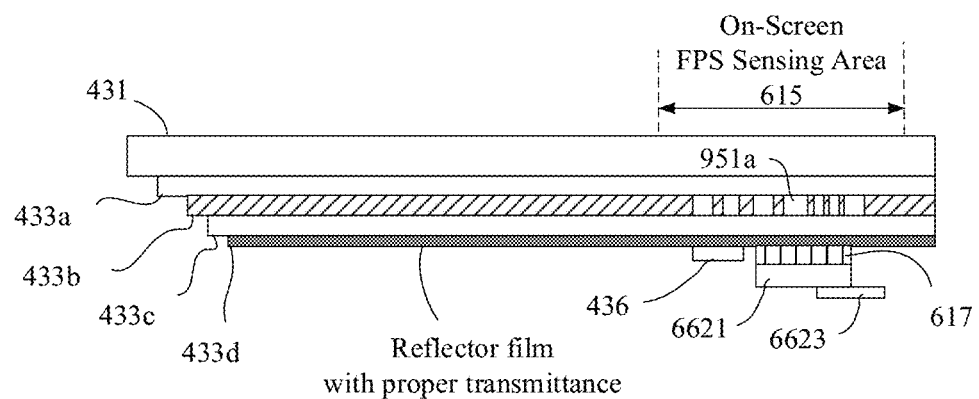

FIG. 31E shows another example for modifying the optical reflector layer in the LCD in which the optical reflectance of the optical reflector film may be modified to allow for some degree of optical transmission for optical sensing by the underlying optical sensor. Various commercial LCD reflector films use flexible plastic material as substrate and the optical transmittance of such plastic materials may be sufficient for transmitting sufficient light to the optical sensor module for fingerprint sensing.

In the above designs for the LCD diffuser layer and LCD reflector layer, the holes may be formed in a region where the one or more illumination light sources are located to allow sufficient transmission of the illumination light to pass through the LCD display module layers to reach the top cover glass for illuminating a finger for the optical sensing operation.

In the above designs, the optical sensor module is located underneath the LCD display module and thus is under the LCD waveguide layer which is designed to guide the backlighting light from the backlighting light source to the LCD display area. The backlighting light from the display light sources 434 (e.g., LEDs) is guided by the waveguide 433c and is diffused by the LCD diffuser layer to leave the waveguide 433c to provide the needed backlighting for the LCD. The light may be uniformly leaked from one side surface of the waveguide 433c and is then diffused by the diffuser sheet 433b. In some LCDs, about half of the diffused light may propagate towards the optical module 617 and becomes strong background light in the optical sensing detection.

One or more extra light sources 436 can be provided in connection with the optical sensor module: to illuminate the finger and to provide the light carrying the fingerprint pattern information to the optical sensor module underneath the LCD. Due to the location of the illumination light sources 436 (e.g., below the reflector film 433*d* next to or adjacent to the optical sensor), the light guide function of the waveguide 433*c* is not effective to the light from the illumination light sources 436 so that the light from the 436 can be more efficiently reach the top surface of the LCD panel for illuminating a finger.

In addition, the illumination light sources 436 can be designed to emit illumination at one or more optical wavelengths different from the LCD display illumination light wavelengths from the LCD display backlighting light sources 434. The illumination light sources 436 can be used for both fingerprint sensing and other sensing functions.

The above design for selecting the illumination light at one or more optical wavelengths that are different from the optical wavelength of the backlighting light for the LCD display may be used to reduce power consumption. Using the display backlighting light sources for the fingerprint detection requires the display backlighting light sources to be turned on for performing optical fingerprint sensing. This design consumes more power when compared to the above design where the illumination light for optical sensing is different from the backlighting light in optical wavelength in part to allow for optical sensing operation without turning on the LCD backlighting light. The above design for selecting the illumination light at one or more optical wavelengths that are different from the optical wavelength of the backlighting light for the LCD display enables flexible selection of the illumination light sources to gain additional advantages. For example, infrared light can be used as the illumination sources 436 so that the LCD diffuser layer becomes more transparent to the IR illumination light for desired higher transmission of the IR illumination light. For another example, the illumination light sources can be selected to provide multiple wavelengths for other functions such as anti-spoof liveness sensing, heartbeat sensing etc.

In designing an optical sensor module under LCD, the locations and spatial distribution of the illumination light sources 436 can be used to adjust the observing angle so as to optimize the sensing quality.

In some designs, the LCD display panel can be controlled to provide a local flash mode to illuminate the fingerprint sensing area by operating selected LCD display pixels underneath the sensing area. This can be provided in an optical sensor module under the LCD display panel, e.g., FIGS. 28A and 28B based on an optical imaging design or FIG. 32 based on optical imaging via an assembly of a lens and a pinhole. In the event of acquiring a fingerprint image, the LCD display pixels in the sensing window area and the illumination light sources can be turned on momentarily to produce high intensity illumination for optical sensing of a fingerprint, and, at the same time, the photo detection sensor array is turned on to capture the fingerprint image in sync with the turning on of the illumination light. The time to turn on the illumination light can be relatively short but the emission intensity can be set to be high. For this reason, this mode for optical fingerprint sensing is a flash mode that enable the photo detector sensor array to detect a larger amount of light to improve the image sensing performance.

The optical sensors for sensing optical fingerprints disclosed above can be used to capture high quality images of fingerprints to enable discrimination of small changes in captured fingerprints that are captured at different times. Notably, when a person presses a finger on the device, the contact with the top touch surface over the display screen may subject to changes due to changes in the pressing force. When the finger touches the sensing zone on the cover glass, changes in the touching force may cause several detectable changes at the optical sensor array: (1) fingerprint deforming, (2) a change in the contacting area, (3) fingerprint ridge widening, and (4) a change in the blood flow dynamics at the pressed area. Those changes can be optically captured and can be used to calculate the corresponding changes in the touch force. The touch force sensing adds more functions to the fingerprint sensing.

In various implementations of the under-screen optical sensor module technology for fingerprint sensing disclosed herein, an imaging module having at least one imaging lens can be used to achieve the optical imaging of the illuminated touched portion of a finger onto the optical sensor array in the under-screen optical sensor module. The lensing effect of the imaging module is in part for controlling the spatial spreading of the returned light that may spatially scramble returned light from different locations on the touched portion of the finger at the optical sensor array so that the spatial information on the returned light corresponding to the fingerprint pattern on a finger can be preserved by the imaging lens with a desired spatial imaging resolution when the imaging lens directs the returned light to reach the optical sensor array. The spatial imaging resolution of an imaging module having a single imagine lens or an assembly of two or more imaging lenses is proportional to the numerical aperture of the imaging module. Accordingly, a high-resolution imaging lens requires a large numerical aperture and thus a lens with a large diameter. This aspect of a lens-based imaging module inevitably requires a bulking lens system to produce a high-resolution imaging system. In addition, a given imaging lens has a limited field of view which increases as the focal length decreases and decreases as the focal length increases.

In many fingerprint sensing applications such as optical fingerprint sensors implemented under a display screen in a mobile device, it is desirable to have a compact imaging system with a high spatial imaging resolution and a large field of view. In view of the trade-offs in various imaging features of a lens-based imaging system discussed above, a compact optical imaging system for optical fingerprint sensing is provided below by combining a lens-based imaging system to achieve a high spatial imaging resolution via the lens and a reduced size in the captured image at the optical detector array to reduce the size the optical detector array via the same lens. The pinhole is placed in front of the lens to produce a field of view in optical imaging by effectuating a pinhole camera while without requiring a large diameter lens. A conventional pinhole camera can include a small aperture for optical imaging and can produce a large field of view while suffering a limited image brightness due to the small aperture and a low spatial imaging resolution. A combination of an imaging lens and a pinhole camera, when properly designed, can benefit from the high spatial imaging resolution of the imaging lens and the large field of view of the pinhole camera.

Figure 32:
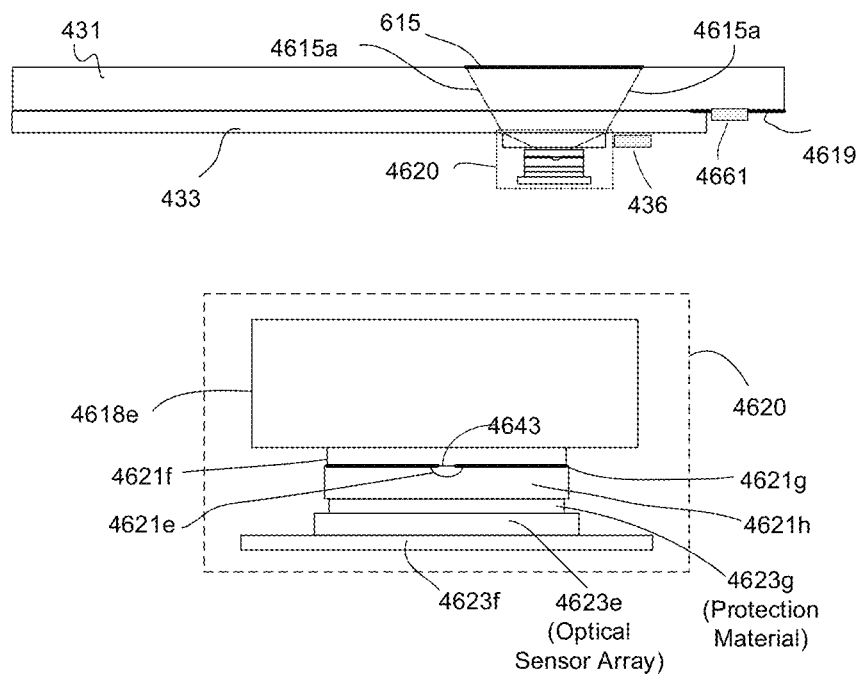
FIGS. 32-38 show examples and operations of an under-screen optical sensor module based on a pinhole-lens assembly.

FIG. 32 shows one example of an optical sensor module 4620 placed under an LCD display screen where a pinhole and a lens are used to form the optical imaging system for the optical sensor module 4620. One or more illumination light sources 436 are provided at a location under the LCD display module 433 to produce illumination light to pass through the LCD display module 433 and the top transparent layer 431 which includes a sensing zone 615 on the top surface of the transparent layer 431. One or more illumination light sources 4661 are provided under the top transparent layer 431 provided to produce illumination light to sensing zone 615 on the top surface of the transparent layer 431. The one or more illumination light sources 436 may be located in or next to the optical sensor module 4620 to provide, in addition to providing illumination for fingerprint sensing, a breathing light indicator to indicate that the optical fingerprint sensing is in progress or the optical sensor module 4620 is turned on or activated.

In the illustrated example in FIG. 32, the optical sensing module 4620 is a compact module by using a micro lens 4621e with a small diameter that can be about the same size of the pinhole so slightly larger than the pinhole. The micro lens 4621e is engaged to a pinhole structure 4621g that is optically opaque and may be a layer of a blackened or metal material formed on a surface of a pinhole substrate 4621f of an optically transparent material with an opening as the pinhole 4643. The micro lens 4621e is placed on the lower side of the pinhole substrate 4621f. In operation, the optical layers above the pinhole 4643 in the pinhole structure 4621g are structured to produce a large optical field of view in collecting the returned light from the LCD display panel and to transmit the collected light towards the optical sensor array 4623e. The optical detectors in the optical sensor array 4623e respond to the received optical pattern to produce detector signals and a detector circuit module 4623f is coupled to the optical sensor array 4623e to receive and process the detectors signals. Detector circuit module 4623f may include, in some implementations, a flexible printed circuit (PFC). The micro lens 4621e receives the transmitted light from the pinhole and to focus the received light onto the optical sensor array 4623e for optical imaging at an enhanced spatial imaging resolution at the optical sensor array 4623e when compared to a lower spatial imaging resolution of the pinhole in projecting light onto the optical sensor array 4623e without the micro lens 4621e. In this design, the low resolution of the pinhole is compensated by using the micro lens 4621e and the limited field of view of the micro lens 4621e is compensated by the large field of view of the assembly of the low-index layer 4618e, a high-index layer 4621f and the pinhole 4643.

In the illustrated example of using the pinhole-lens assembly for optical imaging in FIG. 32, the object plane of the pinhole-lens assembly is near the top effective sensing zone 615 on the top surface of the transparent layer 4431 such as a cover glass for the touch sensing LCD display panel and the imaging plane of the pinhole-lens assembly is the receiving surface of the optical detectors of the optical sensor array 4623e. In addition to the pinhole substrate 4621f, an optically transparent spacer 4618e with a refractive index lower than that of the pinhole substrate 4621f is provided between the pinhole substrate 4621f and the LCD display panel. This use of a lower index material above the pinhole substrate 4621f is part of the optical design to achieve a large field of view for receiving light from the LCD display panel. In some implementations, the lower-index spacer 4618e may be an air gap. This design provides an optical interface of two different optical materials between lower-index spacer 4618e and the higher-index pinhole substrate 4621f and the optical refraction at this interface converts a large field of view (FOV) (e.g., around 140 degree in some cases) of incident light from the LCD display panel in the lower-index spacer 4618e into a smaller FOV in the higher-index pinhole substrate 4621f. Accordingly, the output light rays produced by the pinhole-lens assembly have a relatively small FOV.

This design of reducing the FOV is advantageous in several aspects. First, the optical input FOV in the lower-index spacer 4618e of the optical sensor module 4620 is a large FOV. Second, the actual FOV handled at by the pinhole-lens assembly located below the higher-index pinhole substrate 4621f is a reduced FOV with respect to the optical input FOV so that light rays with large incident angles are limited by this reduced FOV. This is beneficial because image distortions caused by light rays at large incident angles at the pinhole-lens assembly are reduced by this reduced FOV. In addition, this reduced FOV at the pinhole-lens assembly reduces the undesired pinhole shading effect that would distort the brightness distribution of the image at the optical sensor array.

Different from a convention pinhole camera with uses a pinhole with a diameter around 40 microns in some pinhole camera designs, the pinhole 4643 formed in the opaque layer 4621g is designed to have a diameter much larger than the typical size of a pinhole in a pinhole camera, e.g., greater than 100 microns, or 200 microns (e.g., 250 microns) in some designs. In this combination of the lens and the pinhole, the use of the high-index material for the pinhole substrate 4612f just above the pinhole 4643 and the use of the lower-index layer 4618e above the pinhole substrate 4612f allows the pinhole 4643 to have a diameter much larger than the typical size of a pinhole in a pinhole camera while still achieving a large FOV. For example, in some implementations, the diameter of the pinhole 4643 may be about the same as or similar to the radius of curvature of the curve surface of the lens 4621e when structured as a half ball lens with a flat surface facing the pinhole 4643 and a partial spherical surface that directs the light from the pinhole 4643 towards the photodetector array 4621e.

Additional design features can also be implemented to improve the overall optical performance and the compactness of the optical imaging system based on the pinhole-lens assembly. For example, as illustrated in FIG. 32, additional optical layers can be placed between the lens-pinhole assembly and the photodiode array 4623e. In this example, an optically transparent spacer 4621h and a protection material 4623g are provided in the light path from the pinhole-lens assembly to the optical sensor array 4623e. In some implementations, the spacer 4621h may be a low-index layer such as an air gap, and the protection material 4623g may be a layer covering the top of the optical detectors of the optical sensor array 4623e and having a refractive index higher than that of the spacer 4621h. The layers 4621h and 4623g can be structured to reduce or eliminate the imaging distortion at the optical sensor array 4623e. When light is refracted at media interfaces, the nonlinearity in the directions of refracted rays exists and creates image distortions at the optical sensor array 4623e. Such distortions become more pronounced when the incident angles are large. To reduce such distortions, the optical thickness ratio of spacer 4621h and 4623g can be selected in light of the optical structure of the pinhole-lens assembly and the optical objective field of the pinhole-lens assembly (e.g., the optical layers from the top sensing surface of the top glass layer 4431 to the pinhole substrate 4621f).

Optical distortions occur at each interface of different optical materials along the optical path of light from the top of the LCD display panel to the optical sensor array 4623e. One design technique for reducing such optical distortions is to provide optically matching structures on lower side of the pinhole-lens assembly (i.e., the optical layers on the imaging side of the pinhole-lens assembly) to corresponding to optical structures on the upper side of the pinhole-lens assembly (i.e., the optical layers on the object side of the pinhole-lens assembly) so that an optical distortion incurred at one interface along the optical path from the LCD panel to the pinhole-lens assembly in the object side of the pinhole-lens assembly is countered or offset by optical refraction at a matching interface along the optical path from the pinhole-lens assembly to the optical sensor array 4623e in the imaging side of the pinhole-lens assembly. The optical matching layers in the imaging side of the pinhole-lens assembly are designed by taking into account of the optical power of the lens in the pinhole-lens assembly. In a pinhole imaging system with the pinhole 4643 alone without the lens 4621e, optical distortions are present when the media are not matched between the object and the image fields. Such optical distortions may be in form of a barrel distortion when the FOV is large by using a grid pattern placed over the top sensing surface to test the distortions. The barrel distortions caused by the un-matched optical layers between the object and the image fields of the pinhole 4643 is undesirable because they directly impact the accuracy of the fingerprint pattern captured by the optical sensor array 4623e. It is noted that the level of such distortions is usually higher in the central part of the imaging field at the optical sensor array 4623e than the peripheral part.

To mitigate such distortions, material layers below the pinhole 4643 and the lens 4621e in the imaging field can be structured in terms of their refractive indices and thickness values to reverse the distortions introduced by the material layers in the object side. This is achieved by matching the refraction behavior at large incident angles so as to correct the image to be linearly formed on the detector surface. For example, in a pinhole imaging system with an imaging magnification at ⅕, if there are a glass layer of 2 mm thick and an air gap layer of 1 mm thick above the pinhole 4643, a glass layer of 0.4 mm thick and an air gap of 0.25 mm thick can be provided below the pinhole 4643 and above the optical sensor array 4623e to reduce the optical distortions at the optical sensor array 4623e. This technique can be applied to provide matching layers below the pinhole 4643 for complex material layers above the pinhole 4643.

Figure 33:
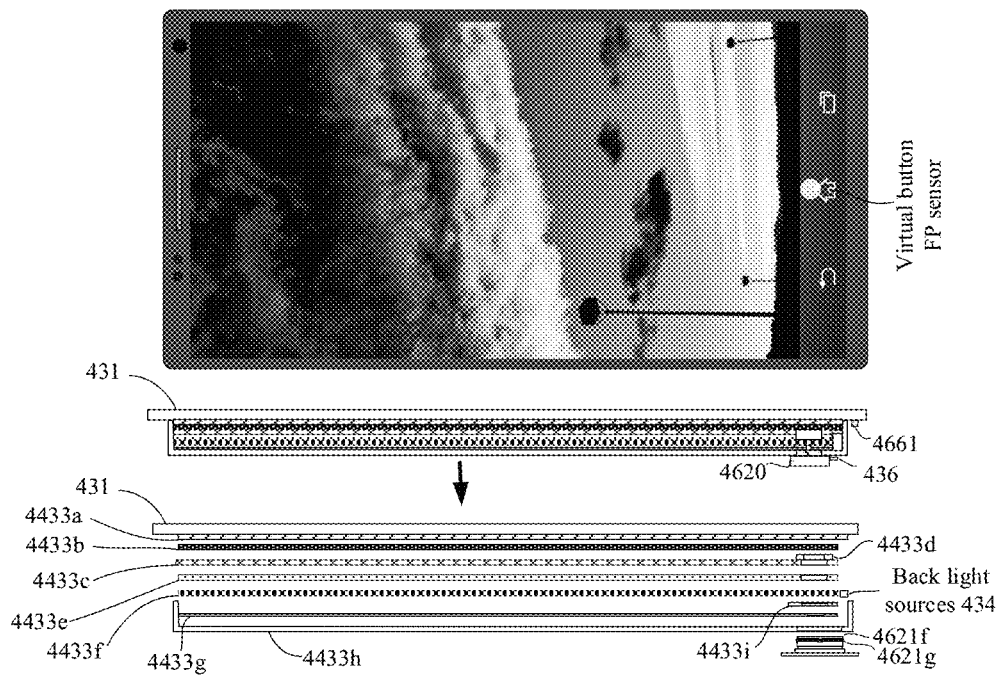

FIG. 33 shows an example of different layers in the LCD display module above the optical sensor module. In this embodiment, the sensor module 4620 is integrated under the LCD display system. Illumination light sources 4661 and extra light sources 436 are also integrated in or close to the sensor module 4620. The virtual button for the optical fingerprint (FP) sensing shown within the LCD display screen near the edge is virtual because there is no separate physical button for fingerprint sensing and is a displayed area that is indicated as the effective sensing zone 615 (FIG. 32) for fingerprint sensing.

In the example in FIG. 33, the materials in the LCD backlighting components of the LCD display module are designed to provide optical transmission paths to allow returned probe light from the top sensing zone to reach the underlying optical sensor module below the LCD display module. Light transmitting holes or slits can be formed in such materials. To modify the appearance of the display at the optical sensor position to make the optical sensor less visible, a diffuser film 4433d may be integrated with the prisms 4433c above the backlighting waveguide layer 4433f to diffuse the light towards the LCD pixels for uniform illumination, and additional diffuser 4433i may be integrated with the mirror film 4433g that is below the backlighting waveguide layer 4433f and reflects or recycles backlighting light back to the LCD layers to improve the illumination efficiency. In some implementations, the additional diffuser films 4433d and 4433i may be shaped as stripes around edges around the optical sensor module to diffuse the light scattered in the light paths so that the light path edges around the optical sensor module under the LCD display module are hidden and or less visible.

Figure 34:
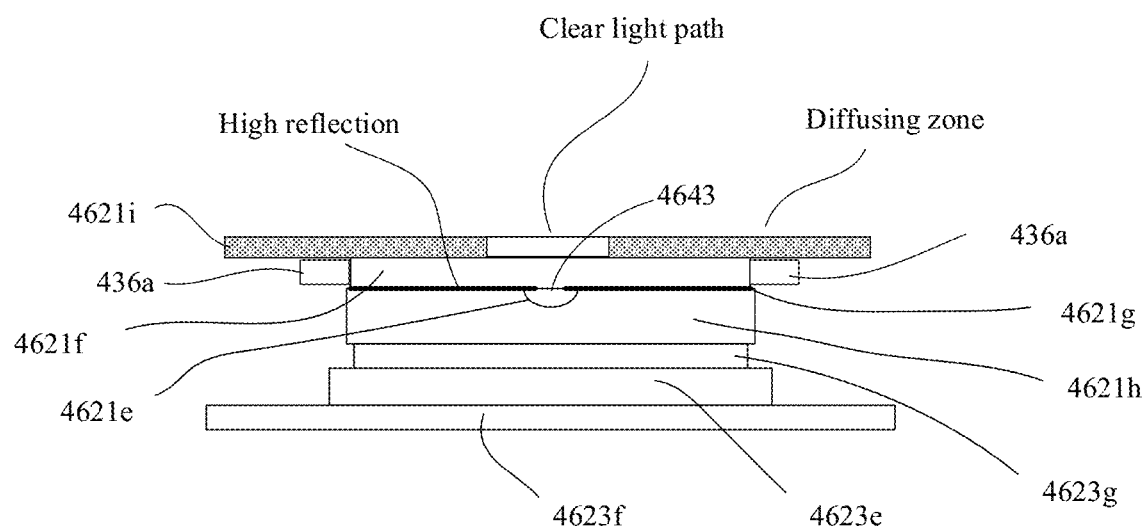

FIG. 34 shows an example implementation of the design in FIG. 32 where the pinhole layer coating 4621g on the bottom surface of the pinhole substrate 4621f is structured to have a high optical reflection at its upper side facing the pinhole substrate 4621f. This feature is used to compensate the regional reflection of the mirror film hole above the optical sensor module 4620.

In some implementations, an additional diffuser layer 4621i may be applied on top of the pinhole substrate 4621f as shown in FIG. 34 to cause optical diffusion and the central part of the additional diffuser layer 4621i can include a clear light path to receive the returned light from the LCD display module for optical sensing.

Furthermore, FIG. 34 shows an example location of one or more extra light sources 436a installed under the additional diffuser layer 4621i. The light emitted from the extra light sources 436a is scattered by the diffuser 4621i. The extra light sources may emit light of different optical wavelengths, e.g., including wavelengths for finger illumination and other wavelengths for other functions, such as breathing light function etc.

Figure 35:
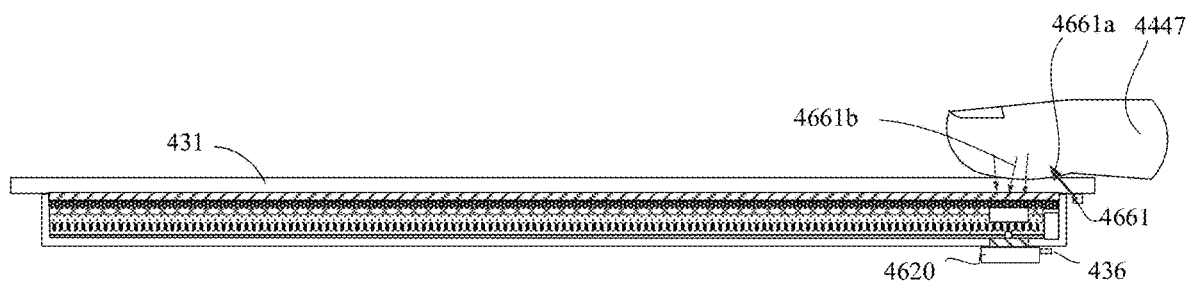

FIG. 35 shows an example where one or more under cover glass light sources 4661 are provided to illuminate the touching finger 4447 for optical sensing. The light produced by one or more under cover glass light sources 4661 is represented by light 4661a and can transmit into the finger tissues or propagate through the corneum of the finger skin. For example, when light 4661a transmits into the finger tissues, the light is scattered. A part of the scattered light comes out as the signal light 4661b and is detected by the optical sensor module 4620. This signal light 4661b carries the fingerprint information. The signal light 4661b is incident to the sensing zone on the top glass at a large angle and tends to capture and carry the fingerprint information when the skin is wet or dry. Hence, using the one or more under cover glass light sources 4661 can improve the sensor's detection performance and reliability.

Figure 36:
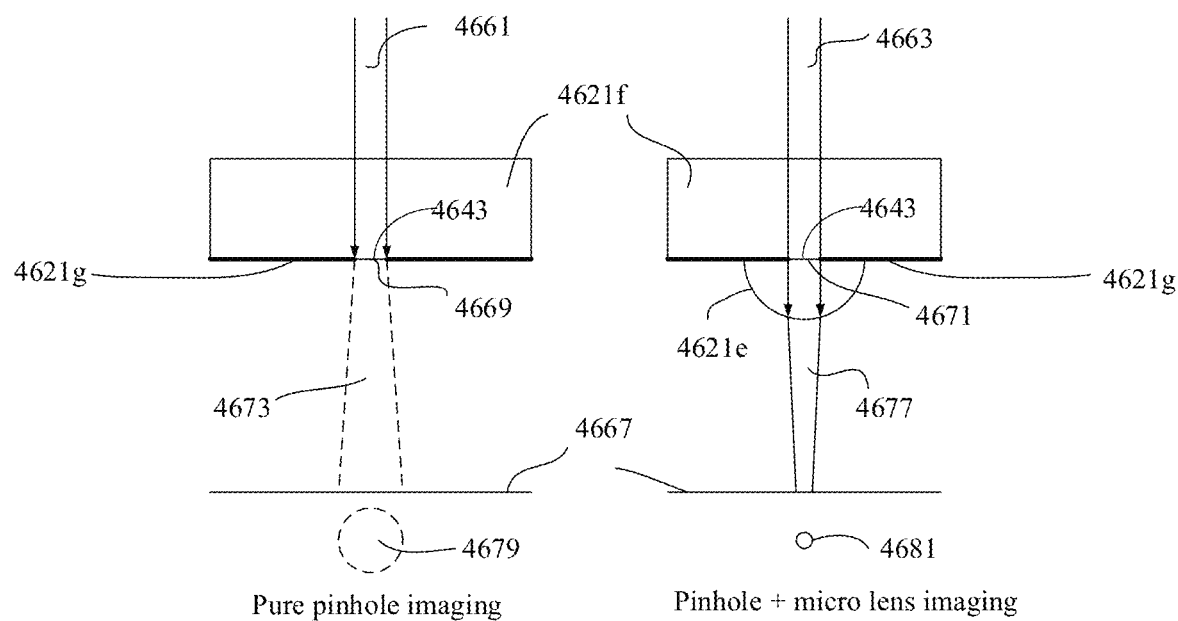

The pinhole-lens assembly for optical imaging in the example in FIG. 32 can achieve a higher spatial imaging resolution to capture fine features in the captured images beyond the spatial imaging resolution of the system with the pinhole 4643 alone without the lens 4621e. This higher spatial imaging resolution is a result of having the lens 4621e. FIG. 36 illustrates the imaging operation of the pinhole alone and the imaging operation of the pinhole-lens assembly.

Referring to the left part of FIG. 36 showing a pinhole imaging system without the lens, the pinhole 4643 diffracts the incident light beam 4661 to produce a diffracted the output light beam 4673 that is divergent due to the diffraction by the pinhole 4643. This divergent light beam 4673 forms an image light spot 4679 at the imaging plane 4667 that reflects the resolution of this imaging system.

The right part in FIG. 36 shows a micro lens 4621e is added under the pinhole 4643 and the curvature of the micro lens 4621e modifies the wave-front of the light beam diffracted by the pinhole 4643 to produce a light spot 4681 at the imaging plane 4667 which is smaller than the light spot 4679 produced by the pinhole 4643 alone without the lens 4621e.

Figure 37:
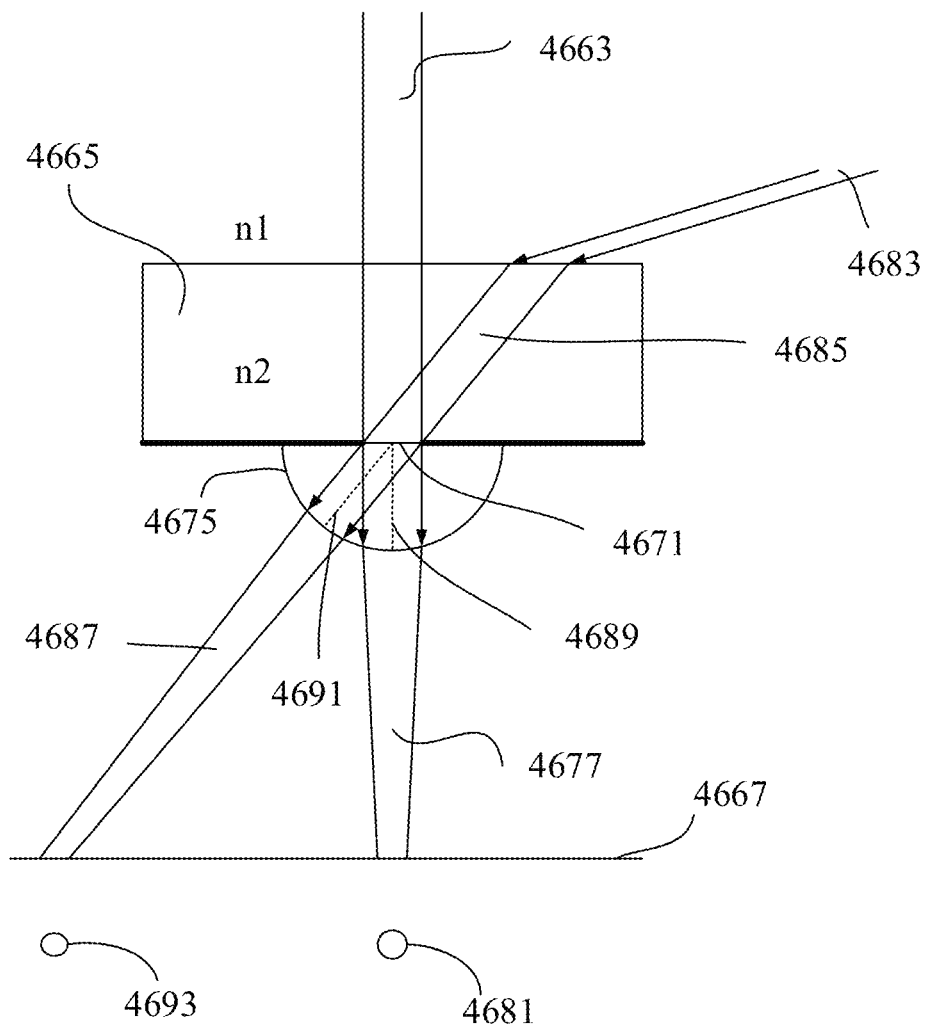

The pinhole-lens assembly can be implemented to provide a compact optical sensor module 4620 in the example in FIG. 32. Due to the refraction at the media interfaces, the light propagation angle can be controlled by using different optical materials. For example, as shown in FIG. 37, if the refractive index n1 in the media above the pinhole substrate 4621f is lower than the refractive index n2 of the pinhole substrate 4621f, a light beam 4683 with a large incident angle is bent to a beam 4685 with a smaller angle after entering the pinhole substrate 4621f Therefore, an extremely large field of view can be realized for receiving input light at the object side of the pinhole-lens assembly by using a higher index material for the pinhole substrate 4621f. In some implementations, a large FOV (e.g., close to or above 140 degrees) may be achieved by using a high-index material for the pinhole substrate 4621f to create a sufficiently large difference between the refractive indices the pinhole substrate 4621f and the layer above the pinhole substrate 4621f.

The above design for achieving a large diffraction bending of light rays at the top surface of the pinhole substrate 4621f can be used to reduce the thickness of the optical sensor module by incorporating some low refractive index gaps (such as air gaps) in the light path. In addition, the image uniformity of the image from the pinhole-lens assembly can be improved because the tilting angles of light rays entering the lens underneath the pinhole substrate are reduced with a smaller FOV due to the large refraction on the top of the pinhole substrate 4621e.

In the pinhole-lens assembly, the micro lens is placed underneath the pinhole 4643 and thus the optical aperture of the micro lens is small due to the small opening of the pinhole 4643. As such, the micro lens exhibits lower aberrations because light rays from the pinhole 4643 collected by the micro lens generally are close to the axis of the curved surfaces of the micro lens.

In implementing this pinhole-lens assembly, the center of the pinhole 4643 is placed at or close to the center of the micro lens surface. In the example in FIG. 37, a half ball lens is shown as an example and is engaged onto (e.g., being glued) a pinhole board to achieve this configuration. The flat surface of the half ball lens 4621e faces up to engage to the pinhole 4643 and the center of the flat surface of the half ball lens 4621e is at or near the center of the pinhole 4643. Under this design, any incident light, at both small or large incident angles to the flat surface of the half ball lens 4621e via the pinhole 4643, would have its light ray direction to coincide with a radial direction of the half ball lens 4621e which is the optical axis of the lens in that direction. This configuration reduces optical aberrations. For light beams 4663 and 4683 with different incident angles at the top of the pinhole substrate 4621f, their light paths are modified after entering the pinhole substrate 4621f to be close to the respective optical axes 4689 and 4691 of the half ball lens surface. Therefore, under this specific design, the image light spots 4681 and 4693 formed by the light beams 4663 and 4683 exhibit low optical aberrations although they have different incident angles.

Figure 38:
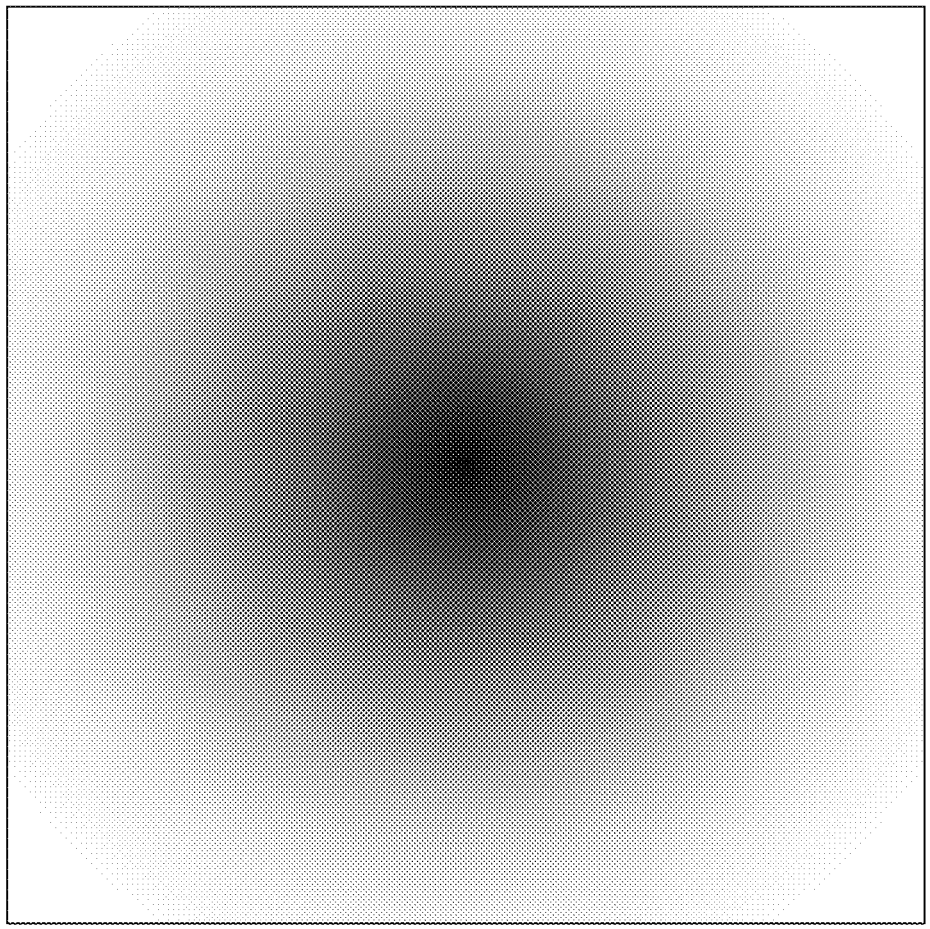

The pinhole-lens assembly is subject to an aperture shading effect which causes the final image at the imaging plane (the optical sensor array 4623e) to appear brighter in the center and darker in the peripheral area with a gradual change in brightness along the radial direction from the center towards the peripheral area. This effect degrades the image captured at the optical sensor array 4623e and can be reduced by using a corrective optical filtering that modifies the spatial brightness distribution. For example, an optical filter with a spatial gradient transmission profile can be inserted in the optical path of the light received by the optical sensor module, e.g., a location between the OLED display panel and the optical sensor array. This gradient transmission filter is structured to exhibit a high optical attenuation at or near a center of the pinhole and a decreasing optical attenuation from the center of the pinhole radially outward to counter a spatial variation of an optical intensity distribution of light caused by the pinhole. FIG. 38 shows an example of an optical attenuation profile for such a gradient transmission filter with a radial gradient attenuation that decreases from the center towards the edge.

In implementations, the gradient transmission filter may include one or more coatings may be made on a surface of the light path to correct the image brightness non-uniformity, e.g., the display bottom surface, the module parts surface, or top surface of the optical sensor array. In addition to countering the spatial un-uniformity by the aperture shading effect, the filter may be further configured to correct other types of brightness non-uniformity and may also include features that can reduce other optical distortions and optical aberrations.

The above disclosed optical sensor modules that uses a pinhole-lens assembly for optical imaging onto an optical sensor array may also be used to construct optical sensor modules located under a top glass cover but is placed next to an LCD display screen that is placed under the same top glass cover.

Invisible Under-LCD Optical Fingerprint Sensor Designs

In principle, designs of an optical sensor module under the LCD display screen, due to their optical sensing configurations, provide some flexibility in placing the optical fingerprint sensing region in the LCD screen almost anywhere in the LCD screen. Since the fingerprint sensing area 615 is within the LCD screen display area and is used along with other parts of the LCD screen for displaying images during the normal operation of the device, the LCD screen display area that corresponds to the fingerprint sensing area 615 can be controlled to display an image in the area or the boundary of the fingerprint sensing area 615 so that the fingerprint sensing area 615 is visibly marked for the user to place a finger for performing a fingerprint sensing operation. When one or more extra illumination light sources 4663 or 4661 are implemented for the under-LCD optical sensing, the one or more extra illumination light sources 4663 or 4661 may be used to illuminate the fingerprint sensing area 615 to mark the area to be visible for the fingerprint sensing without turning on the LCD screen, or in other implementations, with the LCD screen to turn on to use the LCD pixels at the fingerprint sensing area 615 to mark the fingerprint sensing area 615.

One of challenges for placing an optical sensor module under the LCD display screen is to obtain sufficient optical transmission for the probe light used for optical sensing to pass through the LCD display screen such that there is sufficient light carrying the fingerprint information from the fingerprint sensing area 615 on the top surface of the top transparent layer 4431. This can be important for optical sensing because insufficient optical transmission of probe light through the LCD displays screen may adversely affect the optical sensing sensitivity, the optical imaging contrast and the signal-to-noise ratio of the optical detection at the under-LCD-screen optical sensor module.

As described in examples illustrated in FIGS. 31 through 31E, various layers in the LCD screen stack can be modified to improve the optical transmission of the probe light at the optical sensor module and the image contrast of the optical sensing. For example, transmissive features or regions may be formed in the path leading to the under-LCD optical module in the LCD diffusion layer above the LCD backlighting waveguide layer and/or the reflector film or layer below the LCD backlighting waveguide layer. However, such transmissive features or regions in the in the LCD screen stack may cause an undesired visual effect in the appearance of the displayed images by the LCD screen.

Referring to FIG. 31A, for example, the inclusion of the holes 951a in the LCD diffuser layer 433b for enhancing the local optical transmission in the LCD screen at the optical sensor module 6621 can reduce the local optical diffusion while increasing the local optical transmission at the holes 951a so that the LCD display in the region of the holes 951a appears to be slightly brighter than the surrounding LCD display regions without the holes 951a in their LCD diffuser layer 433b. As labeled in FIG. 31A, the in-screen fingerprint sensing (FPS) area 615 contains local holes 951a are somewhat "abnormal" in its display appearance but the surrounding screen areas are "normal" display areas without such holes 951a that appear to be slightly dimmer than the in-screen FPS sensing area 615 when the LCD screen is operated to display images in normal screen operations. In example in FIG. 31D, transmissive features or regions may also be formed in the reflector film or the backlighting waveguide in the LCD screen stack and localized in the region where the optical sensor module is.

Therefore, the localized presence of the transmissive features or regions in the LCD screen stack in the region where the under-LCD optical sensor module may render this region in the LCD screen to appear to have a slightly different screen brightness from the remainder parts of the LCD screen without such transmissive features or regions, specially the surrounding areas in the LCD screen. Accordingly, this visual difference in the screen brightness at the region where the under-LCD optical sensor module renders the in-screen FPS sensing area 615 to visible to users although this difference may be less noticeable to some users. Although this visual difference for the in-screen FPS sensing area 615 is acceptable or even helpful during the optical fingerprint sensing operation, this visual difference is not desirable when the LCD screen is operated for normal display operations.

One aspect of the technology disclosed in this patent document is to design the under-LCD optical sensing module and associated features to reduce this difference in the appearance of the displayed images in the in-screen FPS sensing area 615 and other "normal" regions in the LCD screen so that the in-screen FPS sensing area 615 completely or substantially blends with other "normal" regions in the LCD screen and thus is "invisible" to a user when the LCD screen is operated to use the in-screen FPS sensing area 615 and other "normal" regions in the LCD screen for normal display operations.

Since the transmissive features or regions in the LCD screen above the optical sensor module are needed for better optical sensing operation, one way to improve the local optical transmission of the LCD screen for the under-LCD optical sensing without making such a region to be visible to a user is to place such the transmissive features or regions in the LCD screen above the optical sensor module at a location that is not visible to a user when viewing the LCD screen.

In many commercially produced LCD screens, an optically opaque border is present in the peripheral sides of the LCD screen, like a peripheral opaque border frame surrounding the central area of the LCD screen. FIG. 39A illustrates a top view of the LCD display screen where a peripheral opaque border frame 3220 is formed on the four sides of the LCD screen and block the LCD display pixels in the border regions on the four sides of the LCD screen so that only the central LCD display area 3210 exposed by the opening of the peripheral opaque border frame 3220 is visible to a user during the display operation.

Accordingly, as illustrated in FIGS. 39A and 39B, the under-LCD optical sensor module can be placed under the LCD screen near or within the area covered by the peripheral opaque border frame 3220 so that the LCD screen portion 3230 under the peripheral opaque border frame 3220 above the optical sensor module can be modified to provide one or more desired localized transmissive features or regions in the LCD screen stack for directing probe light carrying the fingerprint information to the optical sensor module.

Referring to FIG. 39B which shows a cross section view of the different layers under the marked circular region in FIG. 39A, the LCD screen portion 3230 with optical transmissive features or regions for directing light to the optical sensor module is placed under the peripheral opaque border frame 3220 and thus is largely invisible to the user when viewing the LCD-displayed images because the peripheral opaque border frame 3220 is above and conceals the LCD screen portion 3230 from the view of the user. Notably, different from some other examples of under-LCD optical sensing designs, the center of the in-screen FPS sensing area 615 is spatially offset from the center of the LCD screen portion 3230 with optical transmissive features or regions. Accordingly, the location of the underlying optical sensor module is spatially shifted in position off the in-screen FPS sensing area 615 because the underlying optical sensor module is placed under the peripheral opaque border frame 3220 rather than being directly underneath the in-screen FPS sensing area 615.

This design of placing the LCD screen portion 3230 with optical transmissive features or regions either partially or entirely under the peripheral opaque border frame 3220 for directing probe light into the under-LCD optical sensor module is referred to as an "invisible" optical sensor design. This design can conceal both the localized transmissive features or regions in the LCD screen portion 3230 of the LCD screen stack and the underlying optical sensor module from being visible even when one or more extra illumination lights 4663 or 4661 are provided for illuminating the area above the in-screen FPS sensing area 615 where a user is to place a finger for optical fingerprint sensing and other optical sensing operations.

Under this arrangement, the in-screen FPS sensing area 615 can no longer be placed anywhere in the LCD screen but should be in the LCD screen near the location of the LCD screen portion 3230 having localized transmissive features or regions so that a portion of the light from the in-screen FPS sensing area 615 that reaches the LCD screen portion 3230 under the peripheral opaque border frame 3220 can be directed through the LCD screen to reach the underlying optical sensor module for optical sensing. It is noted that, in various implementations of this design, the LCD screen portion 3230 having localized transmissive features or regions is designed to provide a light receiving path (at least partially covered by the peripheral opaque border frame 3220) from the in-screen FPS sensing area 615 to the under-LCD optical sensor module to improve the optical detection performance while the illumination of the in-screen FPS sensing area 615 can be implemented independent of this special design. For example, the one or more extra illumination lights 4663 or 4661 can be placed at desired locations to direct illumination light to the in-screen FPS sensing area 615 without necessarily going through the LCD screen portion 3230 having localized transmissive features or regions to reach the in-screen FPS sensing area 615.

The above described design of placing the LCD screen portion 3230 having localized transmissive features or regions to be at least partially covered by the peripheral opaque border frame 3220 can be applied to various configurations of the under-LCD optical sensor module for implementing the design in FIG. 32. For example, the under-LCD optical sensor module using a projector system for collecting light from the in-screen FPS sensing area 615 in FIG. 28B, or an imaging system having a lens located below the LCD screen in an optical path to the optical sensor array to collect the probe light from the in-screen FPS sensing area 615 and to project the collected probe light towards the optical sensor array in FIG. 30B, or a lens-less optical system by using an array of optical collimators or pinholes to collect the probe light from the in-screen FPS sensing area 615 and to project the collected probe light towards the optical sensor array as shown in FIG. 31, or a combination of a pinhole and a lens downstream from the pinhole to receive the transmitted probe light from the pinhole and to focus the received probe light onto the optical sensor array for optical imaging as shown in FIGS. 32 through 38.

Figure 40A:
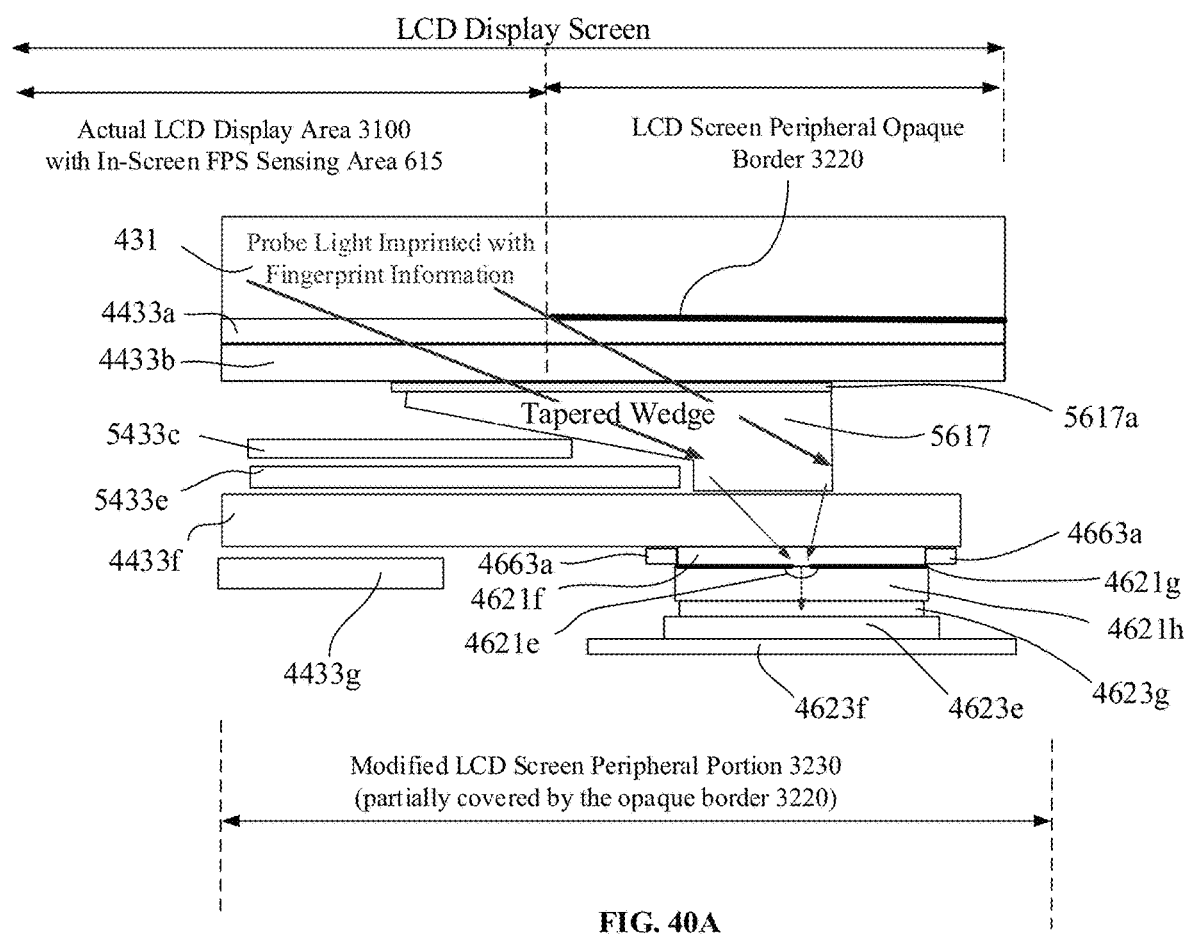
Figure 40B:
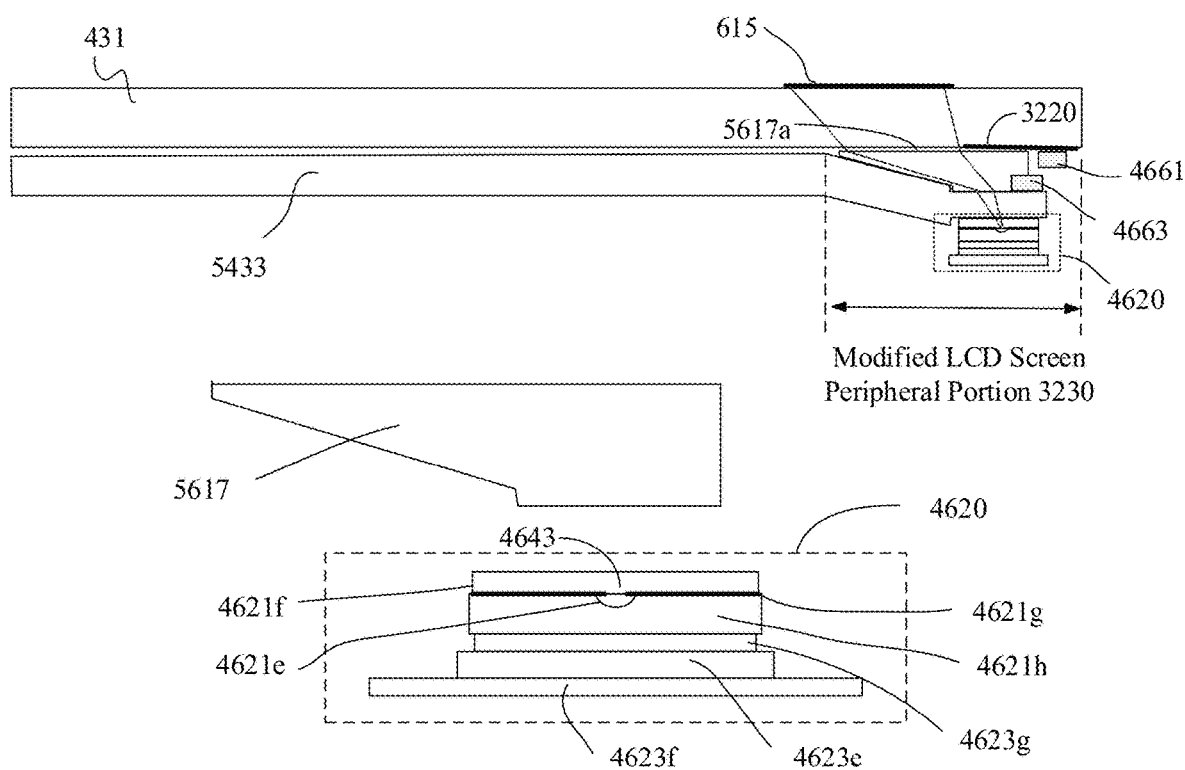
Figure 40C:
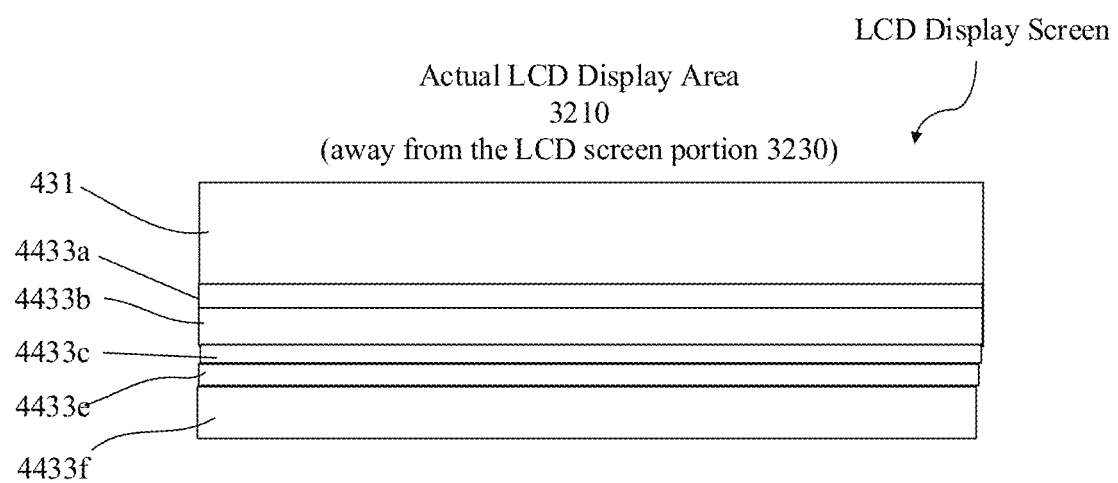

Referring back to FIG. 32, the LCD screen portion 3230 having localized transmissive features or regions that is partially or entirely covered by the peripheral opaque border frame 3220 can be use various designs to increase the optical transmission of the LCD screen portion 3230 in addition to forming transmission holes or more transmissive regions than the other parts of the LCD screen. FIGS. 40A, 40B and 40C show one specific example where a peripheral segment of the LCD screen is modified to form the LCD screen portion 3230 by providing improved optical transmission in the modified LCD screen portion 3230 in which the underlying optical sensor module 4620 as shown uses a combination of a pinhole and a lens shown in FIG. 32 to collect light for the optical sensor array as an example.

In this design example, as shown in FIGS. 40A and 40B, the under-LCD optical sensor module uses a pinhole 4643 and a micro lens 4621e together to form an optical system for collecting light from the FPS sensing area 615 on the top transparent layer 431 and for directing the collected light onto the optical sensor array 4623e in the optical sensor module 4620 to achieve a large field of view and a high imaging resolution at the same time. See FIGS. 25 through 31 and associated description for more details. The spacer 4621h may be a low-index material layer such as an air gap, and the protection material 4623g may be a band pass filter. FIG. 40B shows that one or more under cover glass extra illumination light sources 4661 are provided to illuminate the finger to be detected and to generate probe light in the optical path from the in-screen FPS sensing area 615 to the LCD screen portion 3230 to the optical sensor module. Extra light sources 4663 may be placed adjacent to or just above the optical sensor module 4620 to provide local illumination for finger illumination. These light sources can also function as a breathing light to indicate the operational state of the optical sensor module. As further explained in later sections, other light sources, such as environmental light sources, can also be used as probe light sources for optical sensing.

FIGS. 40A, 40B and 40C show that a peripheral segment of the LCD screen is modified to form the LCD screen portion 3230 by peeling off a small segment of the LCD prism and diffusion films 4433c and 4433e and the other layers underneath the LCD prism and diffusion films 4433c and 4433e. The peripheral segments of the LCD prism and diffusion films 4433c and 4433e are removed to create a void for optical transmission to form modified LCD prism and diffusion films 5433c and 5433e as shown in FIG. 40A. This void is used to insert an optical coupler 5617 below the LCD layers 4433b and above the backlighting waveguide layer 4433f. This optical coupler 5617 can be implemented as a wedged optical coupler with a tapered wedge section to extend into the space between the peeled and modified LCD prism and diffusion films 5433c and 4433e and this tapered wedge section can reach into the LCD screen region 3100 that is not covered by the peripheral opaque border frame 3220 as a light path for better collection of light from the in-screen FPS sensing area 615. This feature in this optical coupler 5617 only impacts a small area of the LCD screen near the peripheral opaque border frame 3220 so that the impact to the display quality is not pronounced. A thin spacer 5617a is formed between the bottom surface of the LCD layers 4433b and the top surface of the optical coupler 5617 and may be, e.g., a soft optically clear or transparent adhesive layer. As such, probe light from the in-screen FPS sensing area 615 passes through the thin spacer 5617a and is collected and directed by the optical coupler 5617 into the backlighting waveguide layer 4433f.

Another modification to the peeled LCD peripheral segment is to remove a small peripheral segment of the optical reflector film layer 4433g as a modified optical reflector film layer 5433g to expose the bottom surface of the backlighting waveguide layer 4433f for placing the optical sensor module 4620. The top surface of the optical sensor module 4620 in this example is the pinhole substrate 4621f which is placed against the bottom surface of the backlighting waveguide layer 4433f to receive the light directed by the optical coupler 5617. In this example, the optical path from the in-screen FPS sensing area 615 through the top transparent layer 431, through the touch sensing layer 4433a, the LCD layers 4433b, the spacer 5617a, the optical coupler 5617, and the backlighting waveguide layer 4433f into the optical sensor module 4620 contains no air gaps. In other implementations, an air gap may be present in the above optical path.

FIG. 40B shows the general geometry of the LCD screen portion 3230 based on the above modification of the peripheral segment of the LCD screen where two types of extra illumination light sources 4661 and 4663 are placed below the top transparent layer 431 and above the backlighting waveguide layer 4433f.

FIG. 40C shows that, other than the peripheral segment of the LCD screen portion 3230, other parts of the LCD screen are not modified.

Figure 41:
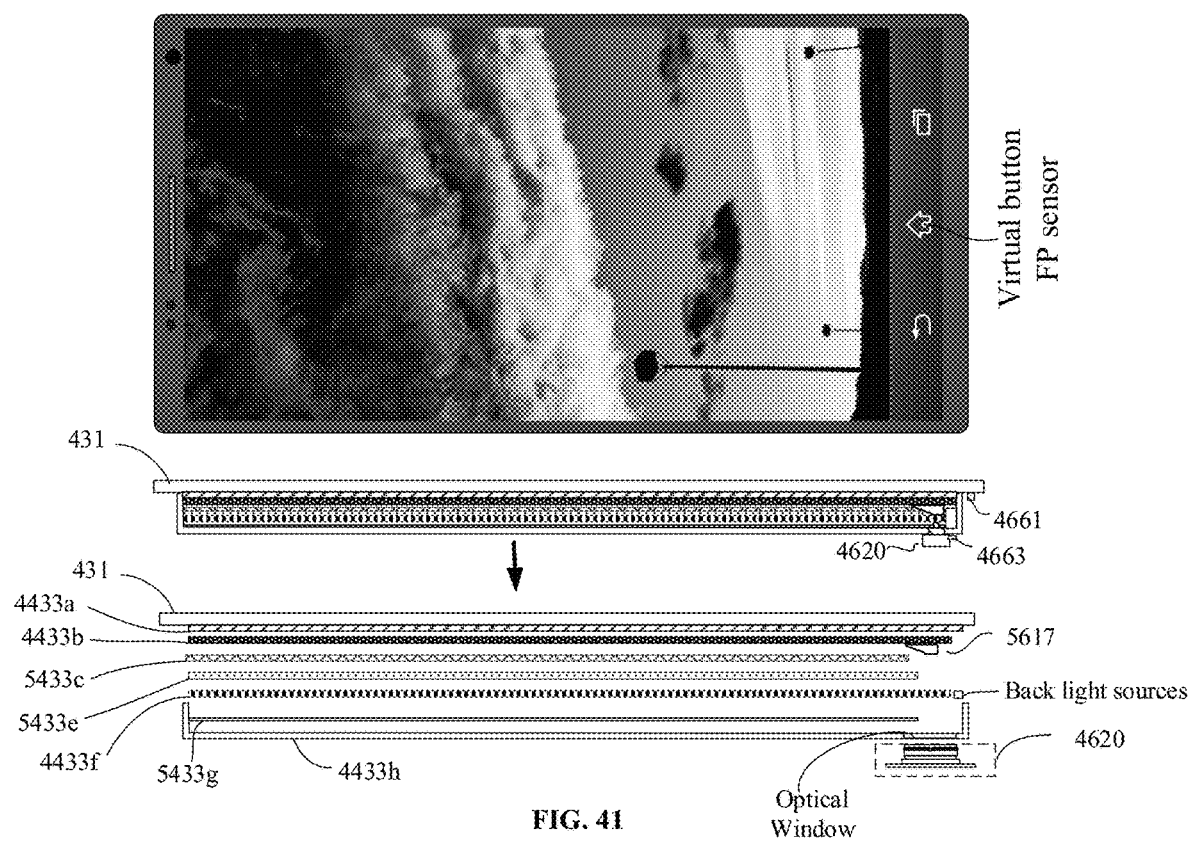

FIG. 41 shows an implementation of the design in FIGS. 40A-40C where the optical sensor module 4620 is integrated under the LCD assembly, especially at a position close to the backlighting light sources 434 at one end of the LCD screen structure. The light path of the sensor is out of the LCD display's working zone so that the sensor is hidden under the LCD opaque border from the viewer and is substantially invisible. A LCD housing 4433h below the modified LCD reflector film layer 5433g is above the optical sensor module 4620 and has an optical transparent window at the optical sensor module 4620 to allow the collected light to enter the optical sensor module 4620.

In summary, the above invisible optical sensor module design for an electronic device capable of detecting a fingerprint by optical sensing (e.g., smartphones, tablets, and others) is based on a LCD screen that provides touch sensing operations and includes a LCD display panel structure to display images and a peripheral opaque border surrounding a central area of the LCD display panel structure and covering a narrow peripheral border of the LCD display panel structure. The LCD display panel structure includes a backlighting module to produce backlight for displaying the images in the central area of the LCD display panel structure within the peripheral opaque border. One or more optical sensing illumination probe light sources are provided to produce probe light to illuminate a sensing area of the top transparent layer for optical sensing. An under-LCD optical sensor module is located below the LCD screen and positioned underneath the peripheral opaque border to be spatially offset from central area of the LCD display panel structure to receive returned probe light that passes through the LCD screen for optical sensing. The LCD display panel structure includes one or more extra transmission holes or regions within an area that is at least partially covered by the peripheral border and is positioned above the optical sensor module to allow probe light to pass through the LCD display panel structure to reach the optical sensor module for optical sensing. The one or more extra transmission holes or regions within the area that is at least partially covered by the peripheral border may include, in some implementations, an optical coupler to transmit the light. In some designs, this optical coupler may be placed below the LCD layer and above the LCD backlighting waveguide layer while the optical sensor module is placed under the LCD backlighting waveguide layer at a location where a portion of the LCD optical reflector film is removed or has an opening or void.

2-D And 3-D Fingerprint Sensing By Under-LCD Optical Fingerprint Sensor

In practical implementations of the disclosed under-LCD optical sensing, the performance of optical sensing for fingerprint sensing and other sensing functions in an electronic device equipped with optical fingerprint sensing may be degraded by the presence of undesired background light from the environment where a portion of the background light may enter the optical sensor module. Such background light causes the optical detectors in the under-LCD optical sensor module to produce a noise signal that undesirable reduces the signal to noise ratio of the optical fingerprint sensing detection. In some conditions, such background noise can be high to a degree that may overwhelm the signal level of the useful signal that carries the optical fingerprint information or other useful information (e.g., biometric information) and could potentially cause unreliable optical sensing operation or even malfunction of the optical sensing. For example, one of sources for the undesired background light at the optical sensor module may be from the daylight from the sun and the impact of the sunlight can be particularly problematic for outdoor operations or in a sheltered environment with strong sunlight. For another example, other light sources present at locations at or near the location of the device with the disclosed optical fingerprint sensing may also lead to the undesired background light at the optical sensor module.

The undesired impact of the background light at the optical sensor module may be mitigated by reducing the amount of the undesired background light that can enter the optical sensor module, enhancing the optical signal level of the optical sensing signal carrying the fingerprint or other useful information, or a combination of both background reduction and enhancing optical sensing signal level. In implementations, the background reduction can be achieved by using one or more optical filtering mechanisms in connection with the under-LCD optical sensor module. In enhancing the optical signal level of the optical sensing signal carrying the fingerprint or other useful information, one or more extra illumination light sources may be added to the device to provide optical illumination light that can be separately controlled from the LCD display light from the LCD backlighting illumination light sources.

Using extra illumination light sources for optical fingerprint sensing and other optical sensing functions can also provide independent control over various features in providing illumination light for optical sensing, e.g., the selection of the illumination light wavelengths separate from the LCD display light in terms of the optical transmission property of human tissues, providing illumination for optical sensing operations beyond the spectral range in the LCD display light, controlling the mode of the illumination for optical sensing such as the timing or/and duration of illumination separate from the LCD display light, achieving a sufficiently high illumination level while maintaining an efficient use of power to prolong the battery operating time (an important factor for mobile computing or communication devices), and strategic placing the extra illumination light sources at certain locations to achieve illumination configurations that are difficult or impossible when using the LCD display light for illumination for optical sensing.

In addition, unlike many fingerprint sensing technologies that detect 2-dimensional spatial pattern of a fingerprint, the disclosed optical fingerprint sensing technology can be implemented to capture not only a 2-dimensional spatial pattern of external ridges and valleys of a fingerprint but also internal fingerprint pattern associated with the external ridges and valleys of a finger under the finger skin. The disclosed optical fingerprint sensing by capturing information on the internal fingerprint pattern associated with the external ridges and valleys of a finger under the finger skin is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users), In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

Figure 42:
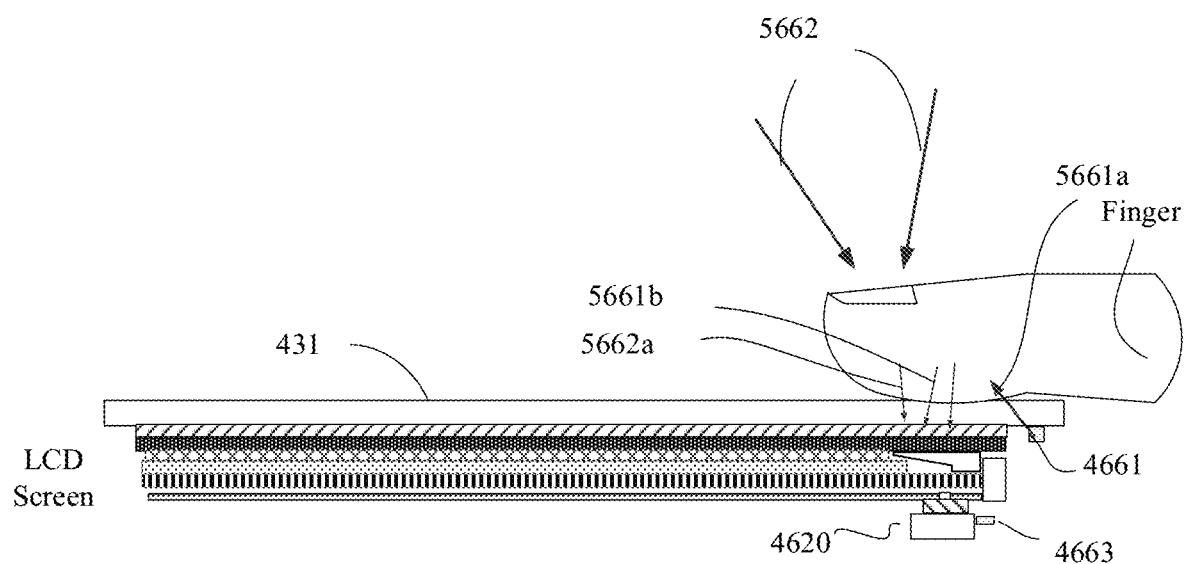

FIG. 42 shows different light signals present in a device that implements the invisible under-LCD optical sensing design disclosed in connection with the examples in FIGS. 32 through 34. In the illustrated example in FIG. 42, one or more extra light sources 4661 are placed at one side of the LCD module near the optical sensing area 615 on the top of the top transparent layer 431 to produce illumination light for optical sensing, e.g., an illumination light beam 5661*a* that passes through the top transparent layer to illuminate a touching finger at the optical sensing area 615. A portion of the light from the illumination light beam 5661*a* can enter the finger and is scattered by the finger tissues. A portion of the scattered light (e.g., 5661*b*) transmits through the finger to enter the top transparent layer 431 in the FPS sensing area 615 and can be collected by the optical coupler 5617 for sensing by the optical sensor array 4620. As will be explained in detail below, the portion 5661b of the scattered light that comes out of the finger to enter the top transparent layer 431 carries the fingerprint information and thus can be detected to extract the user fingerprint information.

FIG. 42 further shows one or more illumination light sources 4663 that are located adjacent to the optical sensor module 4620 and are under the LCD module. The light for such an illumination light source 4663 can be directed to the top transparent layer 431 by passing through the LCD module. Referring back to FIGS. 29A, 29B and 29C, the light from the illumination light source 4663 at the optical sensing area 615 encounter the finger ridges 2961 (e.g., light rays 80, 201) and valleys 2963 (e.g., light rays 82, 211 and 212) to cause reflections 181, 205 and 206 from the ridges 5661 and reflections 185, 213 and 214 from the valleys 2963 from the top surface of the top transparent layer 431 in contact with the finger. The reflection rays from the different locations have different signal amplitudes and thus are imprinted with the fingerprint pattern as a 2-D fingerprint pattern. In addition, part of each of incident light rays from below the top transparent layer 431 enters the finger, e.g., light rays 183 from the light rays 80, light rays 189 from the light rays 82, light rays 203 from light rays 201 and light rays 204 from light rays 202, and is scattered by internal finger tissues to produce scattered light 191 towards the top transparent layer 431 which can be collected by the optical coupler 5617 to be received by the optical sensor module 4610. Similar to the portion 5661b of the scattered light that comes out of the finger to enter the top transparent layer 431 in FIG. 42, the scattered light 191 caused by the scattering in FIGS. 29A and 29B due to illumination light from the illumination light sources 4663 carries the fingerprint information and thus can be detected to extract the user fingerprint information.

In addition to the light from the illumination light sources 4661 and 4663, incident light 5662 at the top side of the finger can come from different light sources, such as the environmental light from the sunlight, the room light by lights or other sources. The incident light 5662 can transmit into the finger tissues or propagate through the corneum of the finger skin to produce scattered light by scattering from the finger tissues. Partial of such scattered light (e.g., scattered light rays 5662a) propagates to transmit through the finger to enter the top transparent layer 431 and thus carries the fingerprint information.

Therefore, different light from different sources can carry fingerprint information and can be detected to extract the fingerprint pattern. As further explained below, the optical signals 5661b and 5662a always carry the fingerprint information under varying skin conditions, e.g., the skin is wet, dirty or dry. Therefore, detection of optical signals 5661b and 5662a at the under-LCD optical sensor array 4620 can improve the performance of the fingerprint detection and the reliability of the fingerprint sensing.

When light encounter a finger, the finger tissues show optical transmission to light at certain wavelengths. Therefore, optical signals 5661b and 5662a are generally light at such certain wavelengths.

Figure 43A:
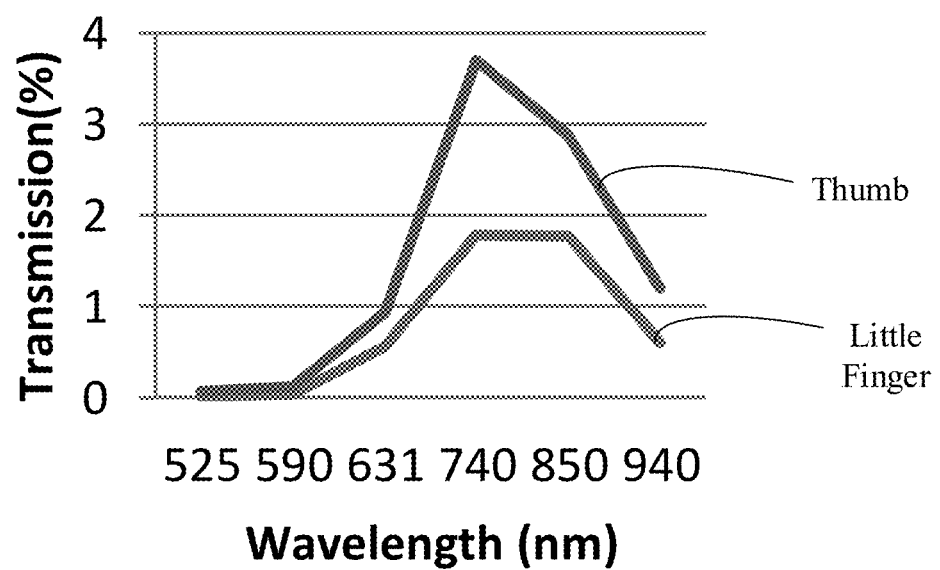

FIG. 43A shows an example of the optical transmission spectral profiles of a typical human thumb and litter finger at several different optical wavelengths from around 525 nm to around 940 nm. For short wavelengths, such as wavelengths less than 610 nm, less than 0.5% of the environmental light may pass through the finger. Red light and near IR light have higher transmission. The transmission of the environmental light through a finger goes to a wide range of directions due to scattering by the finger tissues and thus can mix with the signal light to be detected by the under-screen optical sensor module. When operated under the sunlight, the undesired environmental light from the sunlight must be handled carefully due to the high optical power of the sunlight to reduce or minimize the adverse impact to the optical fingerprint sensor performance. Referring back to FIG. 35, the optical signals 5661b and 5662a are within the spectral range between 650 nm and 950 nm where a finger shows more than 1% of optical transmission. Accordingly, the light sources 4661 may be selected to produce light within the spectral range between 650 nm and 950 nm. The light sources 4663 may also be selected within this spectral range.

Therefore, as shown in FIGS. 29A-29C and FIG. 42, incident illumination light rays can produce two types of optical reflection patterns representing the same 2-dimensaitonal fingerprint pattern of a finger: a low contrast optical reflective pattern formed by incident illumination light rays at small incident angles without the total internal reflection at both the finger ridges and valleys and a high contrast optical reflective pattern formed by incident illumination light rays at large incident angles based on a total internal reflection, mostly at the finger alleys.

The transmitted light from internally scattered light, such as the scattered light 191 in FIGS. 29A-29C and the scattered light 5561b and 5662a in FIG. 42, due to their propagation through the internal tissues of the finger and subsequent transmission through the finger skin to enter the top transparent layer 431, can carry an optical transmissive pattern of the finger that contains both (1) a 2-dimensional spatial pattern of external ridges and valleys of a fingerprint (2) an internal fingerprint pattern associated with internal finger tissue structures that give rise to the external ridges and valleys of a finger due to the propagation of the scattered light from the internal side of the finger towards the finger skin and transmits the finger skin. Accordingly, the scattered light inside the finger can be measured by the optical sensor array and the measurements can be processed for fingerprint sensing.

Notably, the internal fingerprint pattern associated with internal finger tissue structures that give rise to the external ridges and valleys of a finger is not substantially affected by the sensing surface condition of the top surface of the top transparent layer 431 or the skin conditions of the finger (e.g., dirty, wet/dry or aged finger patterns) and may still provide sufficient information for fingerprint sensing when the external fingerprint pattern on the external finger skin has a reduced ridge-valley contrast, is somewhat damaged or otherwise is not suitable for providing sufficient fingerprint information in the optical reflective pattern. While the external fingerprint pattern may be duplicated by using artificial materials for invading the fingerprint sensing, the internal fingerprint pattern of a user's finger imprinted in the optical transmissive pattern is extremely difficult to replicate and thus can be used as an anti-spoofing mechanism in the fingerprint sensing.

Figure 43B:
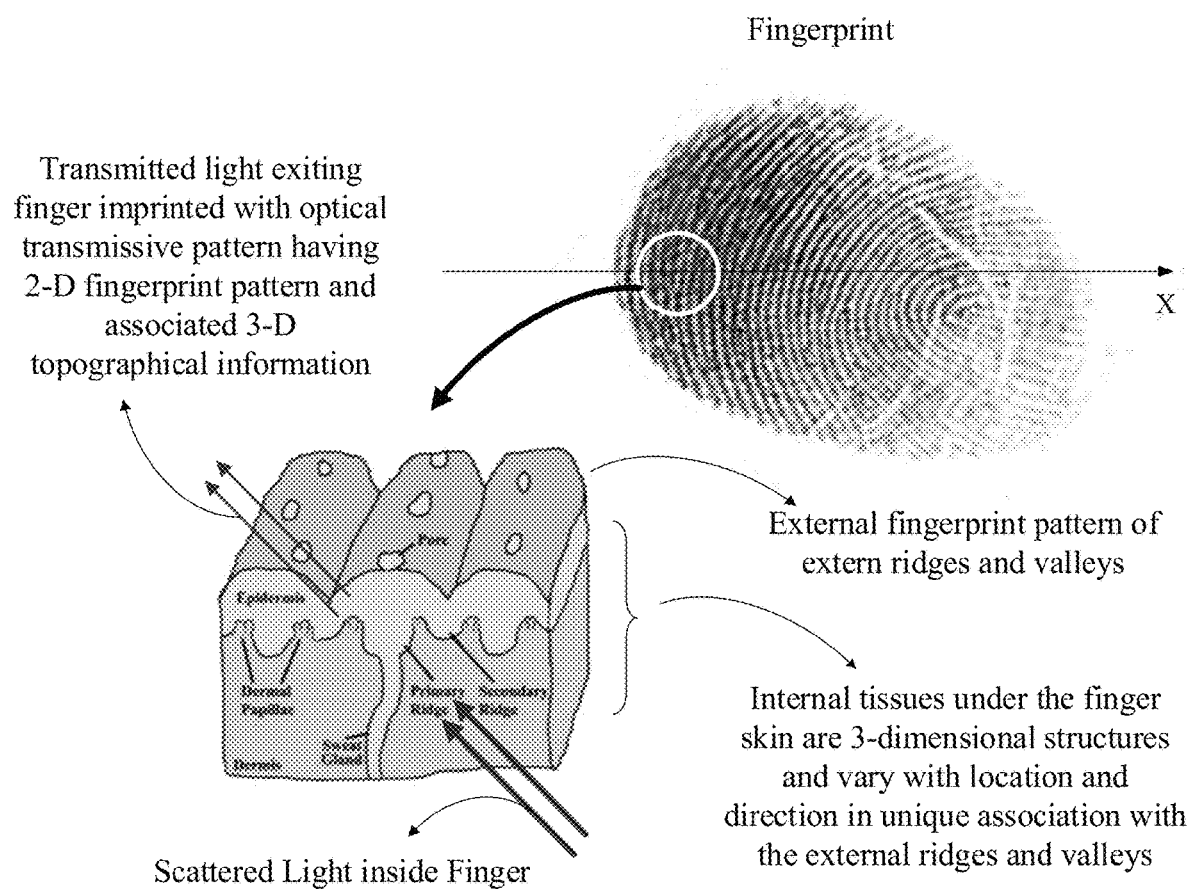

FIG. 43B shows an example of an external fingerprint pattern formed by external ridges and valleys of a person's finger and the internal finger issues that are under the skin and are uniquely associated with the external ridges and valleys. See, e.g., Chapter 2 of "The Fingerprint Sourcebook" by Holder et al. (U.S. Department of Justice, Office of Justice Programs, National Institute of Justice, Washington, D.C., 2011). As illustrated in FIG. 43B, the internal tissues include the papillary layer under the finger skin that has topographical features from which external ridges and valleys are formed as an expression of the underlying topographical features. In addition, the internal tissues also contain additional structures that are not identically replicated on the external ridges and valleys such as the internal primary and secondary ridges, the sweat glands connected to the primary ridges and other internal structures. As illustrated in FIG. 43B, when probe light propagates from the internal side of the finger outward to the finger skin, the probe light interacts with the internal tissues under the finger skin to carry not only the 2-dimmensional fingerprint pattern of the papillary layer that is identical to the external fingerprint pattern formed by the external ridges and valleys but also additional topographical information from the internal tissue structures that is not carried by the external ridges and valleys. Such additional topographical information from the internal tissue structures cannot be obtained from the optical reflective pattern obtained from the optical reflection off the external finger skin. The additional topographical information from the internal tissue structures below the finger skin is valuable information for fingerprint sensing and is 3-diementional since the internal tissue structures vary with both the lateral position under the skin and the depth from the skin surface (topographical information). Such additional topographical information from the internal tissue structures of a finger can be used, for example, to distinguish a natural finger from an artificial object manufactured with similar or identical external fingerprint pattern as the natural finger.

Referring to FIG. 43B, although only one beam of the internally scattered light is shown, different illumination probe light beams go through different parts of the under-skin internal tissue structures and thus are imprinted with different 3-D topographical information associated with the different optical paths in different directions of such illumination probe light beams. Imaging processing techniques can be used to process the optical transmissive patterns carried by such different illumination probe light beams to extract the topographical features associated with the under-skin internal tissue structures. The extracted topographical features can be synthesized to construct a 3-D representation or rendition of the under-skin internal tissue structures associated with the fingerprint pattern and this constructed 3-D representation of the under-skin internal tissue structures associated with the fingerprint pattern can be used as a unique and additional identification for the fingerprint pattern and can be used to distinguish a true fingerprint pattern from a real finger of a user from a fabricated fingerprint pattern that would invariably lack of the underlying internal tissue structures of the real finger. In particular, as the number of the different illumination probe light beams in the different directions increases, the more detailed topographical information on the under-skin internal tissue structures can be captured by the optical sensor module. In using the fingerprint for a secured access to the device, the fingerprint identification process can be designed to combine the identification of the 2-D fingerprint pattern and the additional examination of the extracted 3-D representation or rendition of the under-skin internal tissue structures associated with the fingerprint pattern to determine whether or not to grant the access. The extracted topographical features and the constructed 3-D representation or rendition of the under-skin internal tissue structures associated with the fingerprint pattern can be an anti-spoofing mechanism and can used alone or in combination with other anti-spoofing techniques to enhance the security and accuracy of the fingerprint sensing.

One way for the disclosed optical fingerprint sensing technology to capture additional topographical information from the internal tissue structures of a finger is by directing different illumination probe light beams at different directions to detect the different optical shadowing patterns produced by the internal tissue structures under the finger skin that are superimposed over the 2-dimensional fingerprint pattern that is common to all images obtained from the illumination by the different illumination probe light beams at different directions.

Figure 44A:
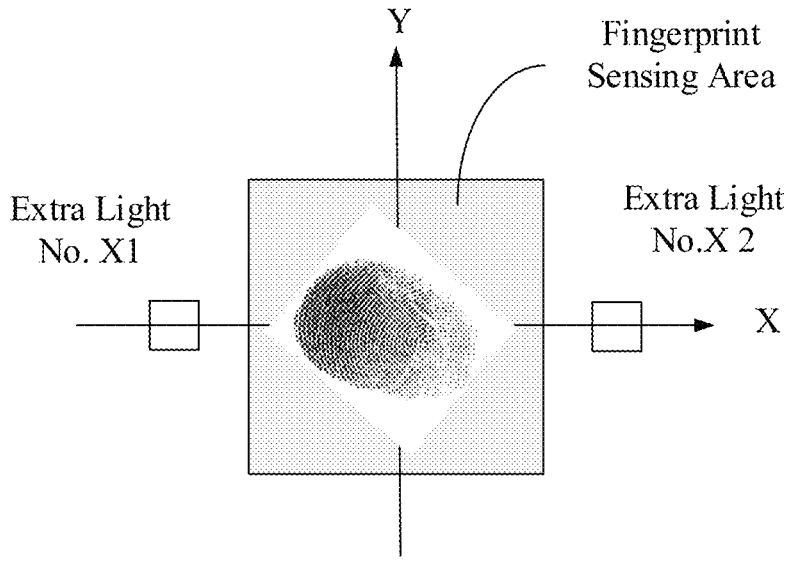

FIG. 44A shows that two extra illumination light sources X1 and X2 are placed on two opposite sides of the fingerprint sensing area on the top transparent layer 431 along the X direction so that they can direct two different illumination probe beams to the finger in opposite directions. The images from both illumination probe beams carry the same 2-D fingerprint pattern but different image shadowing patterns due to their different illumination directions with respect to the internal tissue structures under the finger skin. Specifically, the first extra illumination light source X1 is placed on the left side of the fingerprint sensing area along the X direction so that the first illumination probe beam from the first extra illumination light source X1 is from the left to the right in FIG. 44A.

Figure 44B:
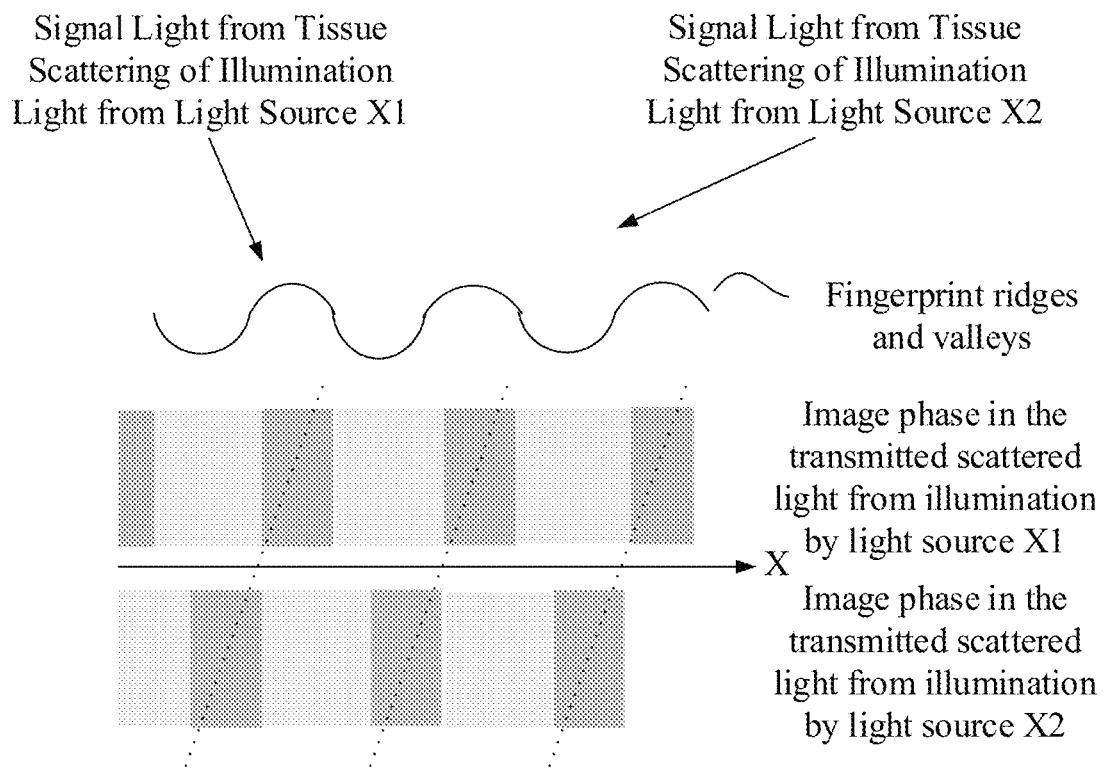

Turning now to FIG. 44B, the illumination by the first extra illumination light source X1 causes a shadowing pattern in the first fingerprint image at the under-OLED optical sensor array due to the interaction with the internal tissue structures under the finger skin and this shadowing pattern is shifted spatially towards the right in the X direction. The illumination by the second extra illumination light source X2 on the right side causes a shadowing pattern in the second fingerprint image at the under-OLED optical sensor array due to the interaction with the internal tissue structures under the finger skin and this shadowing pattern is shifted spatially towards the left in the X direction. In implementation of this technique, additional extra illumination light sources may be added, e.g., in the Y direction or in other directions.

In this example, the first illumination probe beam in the first illumination direction from the first extra illumination light source X1 leads to generation of the first scattered probe light by scattering of tissues inside the finger that propagates the internal tissues associated with ridges and valleys of the finger to carry both (1) a first 2-dimensional transmissive pattern representing a fingerprint pattern formed by bridges and valleys of the finger, and (2) a first fingerprint topographical pattern that is associated with the illumination of internal tissues of ridges and valleys of the finger in the first illumination direction and is embedded within the first 2-dimensional transmissive pattern. Similarly, the second illumination probe beam in the second illumination direction from the second extra illumination light source X2 leads to generation of the first scattered probe light by scattering of tissues inside the finger that propagates the internal tissues associated with ridges and valleys of the finger to carry both (1) a second 2-dimensional transmissive pattern representing the fingerprint pattern formed by bridges and valleys of the finger, and (2) a second fingerprint topographical pattern that is associated with the illumination of internal tissues of ridges and valleys of the finger in the second illumination direction and is embedded within the second 2-dimensional transmissive pattern. The two extra illumination light sources X1 and X2 are turned on sequentially at different times so that the optical sensor array can be operated to detect transmitted part of the first scattered probe light that passes through the top transparent layer and the display panel to reach the optical sensor array so as to capture both the first 2-dimensional transmissive pattern, and the first fingerprint topographical pattern and then the second 2-dimensional transmissive pattern and the second fingerprint topographical pattern. The shadowing patterns shown in FIG. 44B are embedded in the captured 2-D fingerprint patterns and are one form of the fingerprint topographical pattern that is associated with the illumination of internal tissues of ridges and valleys of the finger at a particular direction.

In various implementations, two or more extra illumination light sources can be located outside the optical sensor module at different locations to produce different illumination probe beams to illuminate the designated fingerprint sensing area on the top transparent layer in different illumination directions. Since this technique is based on the ability for the probe light to transmit through the finger tissues, each extra illumination light source should be structured to produce probe light in an optical spectral range with respect to which tissues of a human finger exhibit optical transmission to allow probe light to enter a user finger to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger. A probe illumination control circuit can be coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

One notable feature of the disclosed technique in FIG. 44B is the simplicity of the illumination arrangement, the optical detection and the signal processing which can lead to compact optical sensor packaging for mobile and other applications that desire compact sensing device packaging, and real-time processing since the detection and the subsequent processing are simple operations that can be achieved at high speed without complex signal processing. Various optical imaging techniques for capturing 3-D images require complex optical imaging systems and complex and time-consuming signal processing, such as optical coherence tomography (OCT) imaging based on complex OCT data processing such as fast Fourier transform (FFT) and others that are not suitable for 3-D optical fingerprint sensing in smartphones and other mobile devices.

In the examples above, the illumination light for obtaining an optical transmissive pattern of a finger can be from illumination light sources that are separate from the LCD display screen. In addition, a portion of the environmental or background light that is within the optical transmission spectral band of a finger (e.g., optical wavelengths between 650 nm and 950 nm) and penetrates through a finger may also be directed into the under-OLED optical sensor array to measure an optical transmissive pattern associated with a fingerprint pattern of the finger. Depending on the intensity of the environmental or background light (e.g., the natural daylight or sunlight), optical attenuation may be provided in the optical path to the optical sensor module to avoid detection saturation at the optical sensor array. In using a portion of the environmental or background light for obtaining the optical transmissive pattern of a finger in optical sensing, proper spatial filtering can be implemented to block the environmental light that does transmits through the finger from entering the optical sensor module since such environmental light does not carry internal fingerprint pattern and can adversely flood the optical detectors in the optical sensor module.

Therefore, the disclosed optical fingerprint sensing can use transmitted light through a finger to capture an optical transmissive pattern of the finger with information on the internal fingerprint pattern associated with the external ridges and valleys of a finger under the finger skin. The transmission of the light is through the finger tissues and the stratum corneum of the finger skin and thus is imprinted with the fingerprint information by the internal structural variations inside the finger skin caused by the fingerprint ridge area and valley area and such internal structural variations manifest light signals with different brightness patterns in different illumination directions caused by the finger tissue absorption, refraction, and reflection, by finger skin structure shading, and/or by optical reflectance difference at the finger skin. This optical transmissive pattern is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users), When extra light sources are provided for optical sensing, the illumination power for optical sensing is no longer limited by the optical power from the LCD display light. Such extra light sources can be designed to provide sufficient illumination for optical sensing to improve the optical detection signal to noise ration to offset the environmental light influence. In implantations, the extra light sources can be modulated without affecting the display function and lifetime. In addition, the extra light sources can be flashed with high output power for a short time during the fingerprint sensing so as to obtain optimized detection. In addition, the use of extra light sources can provide flexibility in the determination of whether a detected finger is a live finger so that fake fingerprint detection can be avoided. For example, green LEDs and near IR LEDs may be used as extra light sources to also assist the live finger detection as explained with reference to FIGS. 14 and 15 where finger tissues absorb the green light strongly so that the finger image manifests a desired large brightness gradient and the near IR light illuminates all through the finger so that the finger image brightness appears more uniform.

FIGS. 38, 39A-39B, and 40A-40C show specific examples for placing illumination light sources for obtaining optical transmissive patterns as illustrated in FIGS. 43A and 43B.

Figure 45:
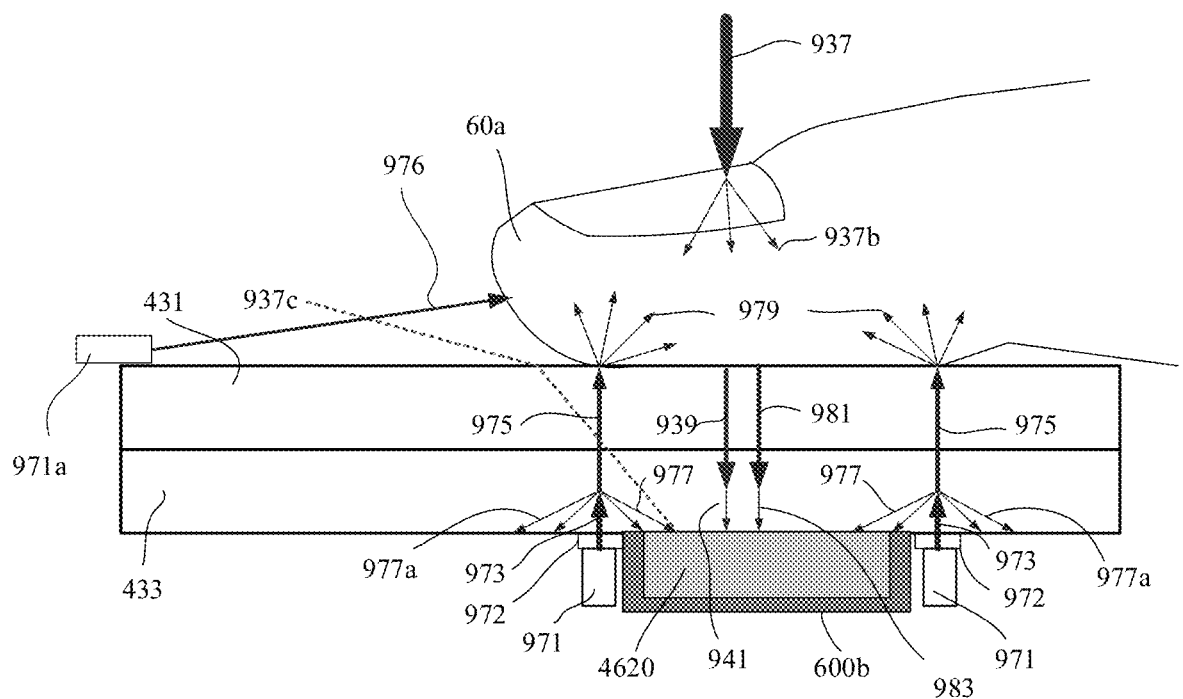

In FIG. 45, at least one extra illumination light source 971a is placed above the display panel and the top transparent layer 431 and is away from the designed fingerprint sensing area to direct the illumination beam 937 to the finger in the designated fingerprint sensing area above the top transparent layer 431 to enter the finger and to cause scattering inside the finger which contributes to the part of the signal 981 with an optical transmissive pattern for the optical fingerprint sensing. Two or more such light sources 971a may be so placed.

FIG. 45 further shows that extra illumination light sources 971 are also placed under the designated fingerprint sensing area to obtain both optical reflective pattern and contribution to the optical transmissive pattern. The extra light sources 971 are assembled in or adjacent the optical sensor module 4620 and are located generally under the designated fingerprint sensing area provided by the top transparent layer 431. Specifically, in this example, two or more extra light sources 971 are placed outside the optical sensor module 4620 and are outside the packaging walls 600b. Each extra light source 971 may be one light source or include multiple sources, for example, LED light sources. The extra light sources 971 may be operable to emit light at one single wavelength or at multiple wavelengths (for example, green LED, red LED, near IR LED). The extra light sources 971 may be modulated to produce modulated illumination light or be operated to turn on their emission at different phases. At the output port of each extra light source 971, a proper coupling material 972 is provided between each extra light source 971 and the LCD display module. The coupling material 972 may include a suitable optically transparent material to allow the probe light 973 from the extra light source 971 to be coupled into the display towards the finger on the cover 431 surface. In some implementations, it may be desirable to avoid large output angles of the probe light 973 in the display and the coupling material 972 may be configured to limit the probe light's numeral aperture. The coupling material 972 may be a low index material such as an air gap and may be structured to have a desired output aperture that limits the output angle of the probe light 973 in the display.

The LCD display module 433 scatters the probe light beam 973 into various directions. Some scattered light 977 propagates towards the optical sensor module 4620 at large angles and is less likely to enter the optical sensor module due to the absorption or blocking by the small aperture of the receiving optics of the optical sensor module. Some scattered light 977a propagates towards other directions that are away from the aperture of the optical sensor module and thus does not affect the optical sensing. Notably, a portion of the probe light 973 from each extra light source 971 passes through the LCD module 433 as the probe light 975 towards the top surface of the top transparent layer 431. This probe light 975 can interact with the finger over the top cover 431 in two ways for optical fingerprint sensing. First, a portion of the probe light 975 may be reflected back as explained in FIGS. 29A, 29B and 29C to the optical sensor module as an optical reflective pattern representing the external fingerprint pattern formed by the ridges and valleys. Second, another portion of the probe light 975 can be coupled into the finger 60a by optical transmission as explained in FIGS. 29A and 29B with reference to the scattered light 191 towards the under-LCD optical sensor module to carry an optical transmissive pattern associated with the fingerprint pattern and the internal tissue structures as explained in FIGS. 43A and 43B. The tissues in the finger 60a scatter the probe light 975 to produce scattered probe light 979 in various directions, including back scattered probe light 981 with the optical transmissive pattern for optical fingerprint sensing. The back scattered probe light 981 propagates back through the top transparent layer 431 to enter the LCD module 433 towards the optical sensor module. The LCD module 433 refracts or scatters the back scattered probe light 981, a portion of which becomes the probe light component 983 that can be detected by the photo-detector array in the optical sensor module 4620.

FIG. 45 further shows that background light present at the device can generally include two different portions the environmental or background light 937 incident to the finger 60a and environmental or background light 937c incident to the top transparent layer 431 without entering the finger 60a. Since the environmental or background light 937 propagates into finger 60a, the finger tissues scatter the received background light 937 as scattered background light 937b in different directions and mixes with the probe light 979. Some of the scattered light 939 in the scattered background light 937b propagates back towards the optical sensor module 4620 through the finger 60a. A portion of the environmental light 937c that does not go through the finger 60a, if is permitted to enter the optical sensor module 4620, it could adversely impact the optical sensing operation of the optical sensor module 4620. Therefore, it is desirable to reduce or eliminate the amount of the environmental light from entering the optical sensor module 4620 by optical filtering, by the design of the receiving optics or by controlling the operation and signal processing of the optical sensor module.

As exampled with respect to FIG. 43B, the scattered light 939 in the scattered background light 937b propagates towards the optical sensor module 4620 through the finger 60a and thus carries an optical transmissive pattern due to interactions with the finger including internal tissues associated with the external ridges and valleys of the finger. In some implementations, this light 939 from the environmental or background light may be detected for optical fingerprint sensing based on its optical transmissive pattern.

Figure 46:
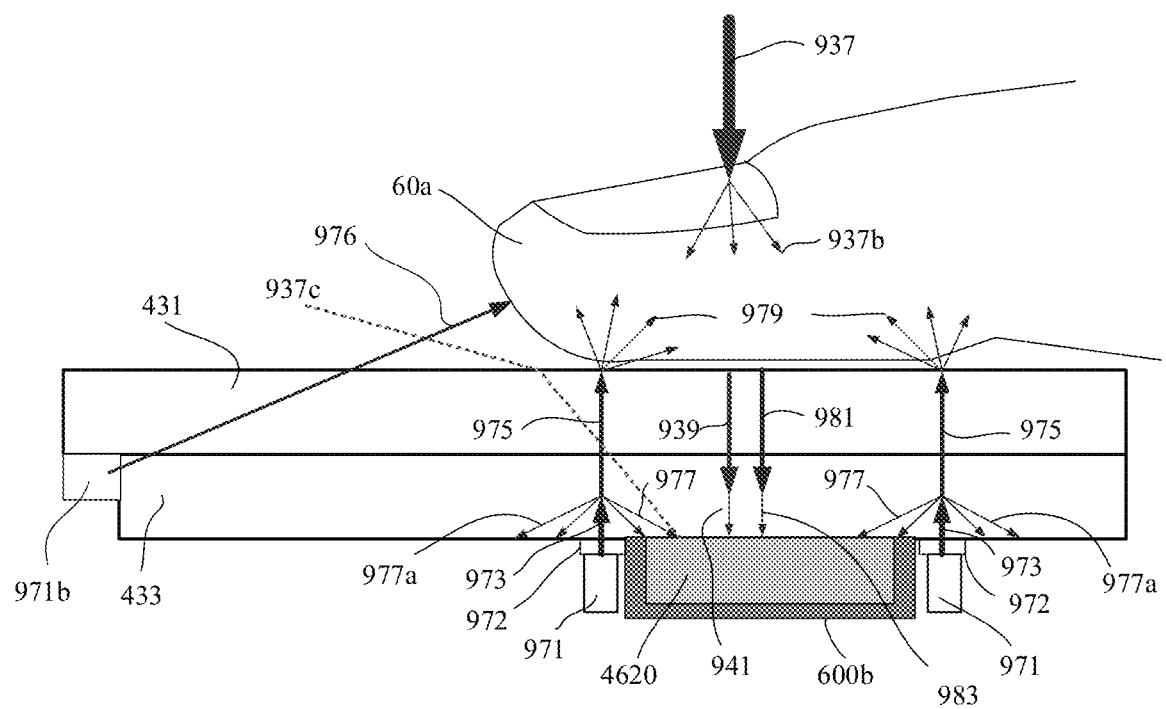

In FIG. 46, at least one extra illumination light source 971b is placed below the top transparent layer 431 and is away from the designed fingerprint sensing area to direct the illumination beam 937 to one side of the finger in the designated fingerprint sensing area above the top transparent layer 431 to enter the finger and to cause scattering inside the finger which contributes to the part of the signal 981 with an optical transmissive pattern for the optical fingerprint sensing. In this example, the one extra illumination light source 971b is placed side by side with the display panel below the top transparent layer 431. Two or more such light sources 971a may be so placed. FIG. 46 further shows that extra illumination light sources 971 are also placed under the designated fingerprint sensing area.

Figure 47:
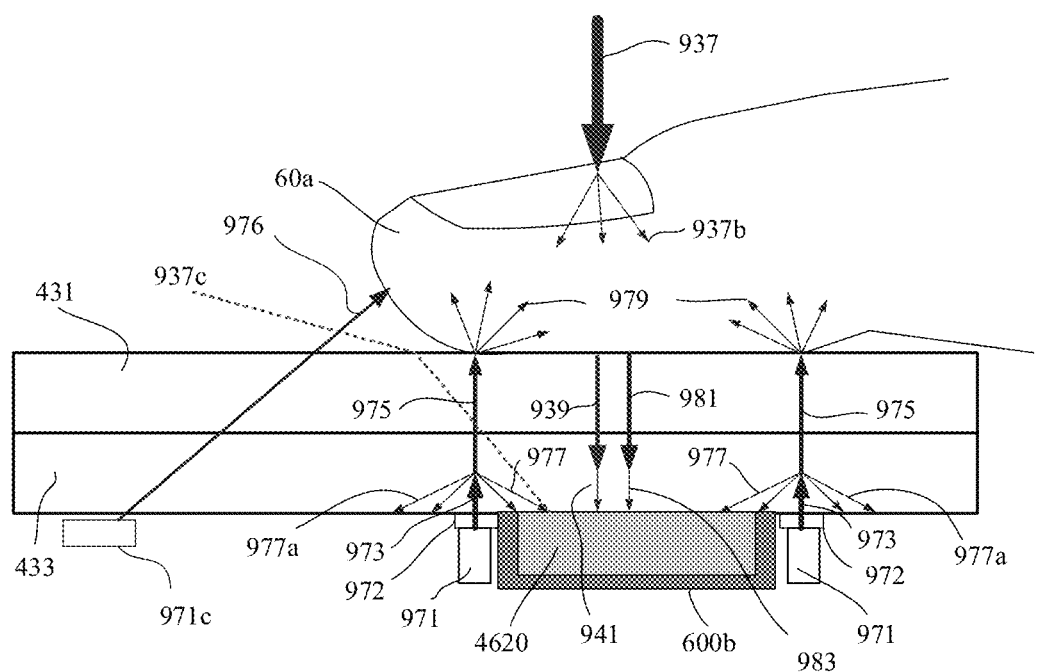

In FIG. 47, at least one extra illumination light source 971b is placed below the display panel and is away from the designed fingerprint sensing area to direct the illumination beam 937 to one side of the finger in the designated fingerprint sensing area above the top transparent layer 431 to enter the finger and to cause scattering inside the finger which contributes to the part of the signal 981 with an optical transmissive pattern for the optical fingerprint sensing. In this example, the one extra illumination light source 971b is placed side by side with the display panel below the top transparent layer 431. Two or more such light sources 971a may be so placed. FIG. 47 further shows that extra illumination light sources 971 are also placed under the designated fingerprint sensing area.

When extra illumination light sources are provided for optical sensing, the illumination power for optical sensing can be independent controlled from by the optical power of the LCD display light from the backlighting sources. Such extra illumination light sources can be designed to provide sufficient illumination for optical sensing to improve the optical detection signal to noise ration to offset the environmental light influence. In implantations, the extra illumination light sources can be modulated without affecting the display function and lifetime. In addition, the extra illumination light sources can be flashed with high output power for a short time during the fingerprint sensing so as to obtain optimized detection. Furthermore, the use of extra illumination light sources can provide flexibility in the determination of whether a detected finger is a live finger so that fake fingerprint detection can be avoided. For example, green LEDs and near IR LEDs may be used as extra light sources to also assist the live finger detection where finger tissues absorb the green light strongly so that the finger image manifests a desired large brightness gradient and the near IR light illuminates all through the finger so that the finger image brightness appears more uniform. For another example, extra illumination light sources can be used to provide optical fingerprint sensing based on optical transmissive patterns by optical transmission of the probe illumination light through the internal tissues associated with the external finger ridges and valleys.

Figure 48A:
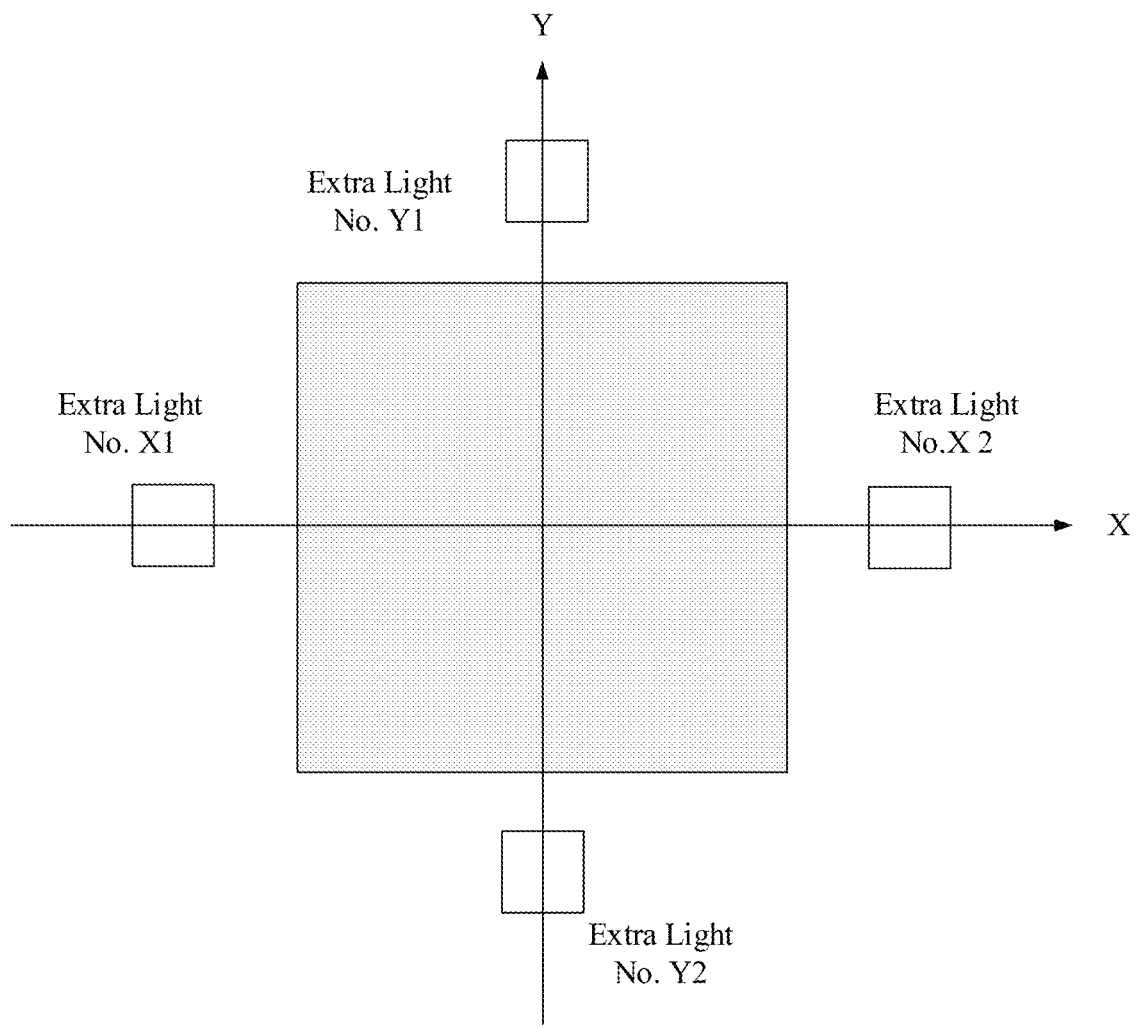

FIG. 48A shows an example for placing 4 extra illumination light sources in two orthogonal directions on opposite sides of the fingerprint sensing area based on the design in FIG. 43B. This example is one implementation of an electronic device capable of detecting a fingerprint by optical sensing that includes a display panel that includes light emitting display pixels operable to emit light for displaying images; a top transparent layer formed over the display panel as an interface for user touch operations and for transmitting the light from the display panel to display images, the top transparent layer including a designated fingerprint sensing area for a user to place a finger for fingerprint sensing; and an optical sensor module located below the display panel and underneath the designated fingerprint sensing area on the top transparent layer to receive light that is emitted by at least a portion of the light emitting display pixels and is returned from the top transparent layer to detect a fingerprint. The optical sensor module includes an optical sensor array of optical detectors to convert the returned light from the display panel that carries a fingerprint pattern of the user into detector signals representing the fingerprint pattern. This device further includes extra illumination light sources located outside the optical sensor module at different locations to produce different illumination probe beams to illuminate the designated fingerprint sensing area on the top transparent layer in different illumination directions. Each extra illumination light source can be structured to produce probe light in an optical spectral range with respect to which tissues of a human finger exhibit optical transmission to allow probe light in each illumination probe beam to enter a user finger over the designated fingerprint sensing area on the top transparent layer to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger. A probe illumination control circuit is coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

Specific implementations of the extra illumination light sources for obtaining optical transmissive patterns may vary from one design to another. FIG. 48B shows an operational flow for operating various devices with a display panel that may be implemented in various configurations such as OLED, LCD or others. The method or operation in FIG. 42B includes operating an electronic device to detect a fingerprint by optical sensing and the electronic device includes a display panel that displays images, a top transparent layer formed over the display panel as an interface for user touch operations and for transmitting the light from the display panel to display images, and an optical sensor array of optical detectors located under the display panel where the display panel.

FIG. 48B shows that a first illumination probe beam is directed to illuminate a designated fingerprint sensing area over the top transparent layer in a first illumination direction and to enter a user finger over the designated fingerprint sensing area to produce first scattered probe light by scattering of tissues inside the finger that propagates towards and passes the top transparent layer by transmission through internal tissues of ridges and valleys of the finger to carry both (1) a first 2-dimensional transmissive pattern representing a fingerprint pattern formed by bridges and valleys of the finger, and (2) a first fingerprint topographical pattern that is associated with the illumination of internal tissues of ridges and valleys of the finger in the first illumination direction and is embedded within the first 2-dimensional transmissive pattern. While under the illumination by the first illumination probe beam, the optical sensor array is operated to detect transmitted part of the first scattered probe light that passes through the top transparent layer and the display panel to reach the optical sensor array so as to capture both (1) the first 2-dimensional transmissive pattern, and (2) the first fingerprint topographical pattern.

Next, a second illumination probe beam, while turning off the first illumination light source, is directed to illuminate the designated fingerprint sensing area over the top transparent layer in a second, different illumination direction and to enter the user finger to produce second scattered probe light by scattering of tissues inside the finger that propagates towards and passes the top transparent layer by transmission through internal tissues of ridges and valleys of the finger to carry both (1) a second 2-dimensional transmissive pattern representing the fingerprint pattern, and (2) a second fingerprint topographical pattern that is associated with the illumination of the internal tissues of ridges and valleys of the finger in the second illumination direction and that is embedded within the second 2-dimensional transmissive pattern. The second topographical pattern is different from the first topographical pattern due to different beam directions of the first and second illumination probe beams. While under the illumination by the second illumination probe beam, the optical sensor array is operated to detect transmitted part of the second scattered probe light that passes through the top transparent layer and the display panel to reach the optical sensor array so as to capture both (1) the second 2-dimensional transmissive pattern, and (2) the second fingerprint topographical pattern.

Subsequently, a detected fingerprint pattern is constructed from the first and second transmissive patterns and the first and second fingerprint topographical patterns are processed to determine whether the detected fingerprint pattern is from a natural finger.

For invisible under-LCD optical sensor module design in FIGS. 39A and 39B, the in-screen FPS sensing area 615 is at an edge of the LCD display. Accordingly, one way to implement the sensing by sequentially illuminating the finger in different directions based on the design in FIG. 43B is to use two extra illumination light sources in two opposite directions on opposite sides of the fingerprint sensing area. This is shown in FIG. 39A where two illumination light sources X1 and X2 are placed in two sides of the in-screen FPS sensing area 615 to perform the sequential measurements.

2-D And 3-D Fingerprint Sensing By Under-OLED Optical Fingerprint Sensor

As discussed above, the optical designs and features disclosed above for optical sensing can be implemented in devices with OLED and other display screens. The following sections provide some specific examples of integrating optical sensing modules with OLED displays.

In some implementations of the disclosed optical sensor technology for an OLED display screen or another display screen having light emitting display pixels without using backlight, the image light produced by the OLED display screen, at or near the OLED display screen's top surface, may be reflected or scattered back into the OLED display screen as returned light when encountering an object such as a user finger or palm, or a user pointer device like a stylus. Such returned light can be captured for performing one or more optical sensing operations using the disclosed optical sensor technology. Due to the use of the light from OLED display screen's own OLED pixels for optical sensing, an optical sensor module based on the disclosed optical sensor technology can be, in some implementations, specially designed to be integrated to the OLED display screen in a way that maintains the display operations and functions of the OLED display screen without interference while providing optical sensing operations and functions to enhance overall functionality, device integration and user experience of the electronic device such as a smart phone or other mobile/wearable device or other forms of electronic devices or systems.

For example, an optical sensor module based on the disclosed optical sensor technology can be coupled to a display screen having light emitting display pixels without using backlight (e.g., an OLED display screen) to sense a fingerprint of a person by using the above described returned light from the light produced by OLED display screen. In operation, a person's finger, either in direct touch with the OLED display screen or in a near proximity of the OLED display screen, can produce the returned light back into the OLED display screen while carrying information of a portion of the finger illuminated by the light output by the OLED display screen. Such information may include, e.g., the spatial pattern and locations of the ridges and valleys of the illuminated portion of the finger. Accordingly, the optical sensor module can be integrated to capture at least a portion of such returned light to detect the spatial pattern and locations of the ridges and valleys of the illuminated portion of the finger by optical imaging and optical detection operations. The detected spatial pattern and locations of the ridges and valleys of the illuminated portion of the finger can then be processed to construct a fingerprint pattern and to perform fingerprint identification, e.g., comparing with a stored authorized user fingerprint pattern to determine whether the detected fingerprint is a match as part of a user authentication and device access process. This optical sensing based fingerprint detection by using the disclosed optical sensor technology uses the OLED display screens as an optical sensing platform and can be used to replace existing capacitive fingerprint sensors or other fingerprint sensors that are basically self-contained sensors as "add-on" components without using light from display screens or using the display screens for fingerprint sensing for mobile phones, tablets and other electronic devices.

The disclosed optical sensor technology can be implemented in ways that use a display screen having light emitting display pixels (e.g., an OLED display screen) as an optical sensing platform by using the light emitted from the display pixels of the OLED display screens for performing fingerprint sensing or other optical sensing functions after such emitted light interacts with an area on the top touch surface touched by a finger. This intimate relationship between the disclosed optical sensor technology and the OLED display screen provides a unique opportunity for using an optical sensor module to provide both (1) additional optical sensing functions and (2) useful operations or control features in connection with the touch sensing aspect of the OLED display screen.

In practical applications, the performance of optical sensing for fingerprint sensing and other sensing functions in an electronic device equipped with optical fingerprint sensing may be degraded by the presence of undesired background light from the environment where a portion of the background light may enter the optical sensor module. Such background light causes the optical detectors in the optical sensor module to produce a noise signal that undesirable reduces the signal to noise ratio of the optical fingerprint sensing detection. In some conditions, such background noise can be high to a degree that may overwhelm the signal level of the useful signal that carries the optical fingerprint information or other useful information (e.g., biometric information) and could potentially cause unreliable optical sensing operation or even malfunction of the optical sensing. For example, one of sources for the undesired background light at the optical sensor module may be from the daylight from the sun and the impact of the sunlight can be particularly problematic for outdoor operations or in a sheltered environment with strong sunlight. For another example, other light sources present at locations at or near the location of the device with the disclosed optical fingerprint sensing may also lead to the undesired background light at the optical sensor module.

The undesired impact of the background light at the optical sensor module may be mitigated by reducing the amount of the undesired background light that can enter the optical sensor module, enhancing the optical signal level of the optical sensing signal carrying the fingerprint or other useful information beyond the signal level by using the returned OLED display light, or a combination of both background reduction and enhancing optical sensing signal level. In implementations, the background reduction can be achieved by using one or more optical filtering mechanisms in connection with the under-screen optical sensor module. In enhancing the optical signal level of the optical sensing signal carrying the fingerprint or other useful information, one or more extra illumination light sources may be added to the device to provide additional optical illumination light beyond the signal level caused by the returned OLED display light.

Using extra illumination light sources for optical fingerprint sensing and other optical sensing functions can also provide independent control over various features in providing illumination light for optical sensing, e.g., the selection of the illumination light wavelengths separate from the OLED display light in terms of the optical transmission property of human tissues, providing illumination for optical sensing operations beyond the spectral range in the OLED display light, controlling the mode of the illumination for optical sensing such as the timing or/and duration of illumination separate from the OLED display light, achieving a sufficiently high illumination level while maintaining an efficient use of power to prolong the battery operating time (an important factor for mobile computing or communication devices), and strategic placing the extra illumination light sources at certain locations to achieve illumination configurations that are difficult or impossible when using the OLED display light for illumination for optical sensing.

In addition, unlike many fingerprint sensing technologies that detect 2-dimensional spatial pattern of a fingerprint, the disclosed optical fingerprint sensing technology can be implemented to capture not only a 2-dimensional spatial pattern of external ridges and valleys of a fingerprint but also internal fingerprint pattern associated with the external ridges and valleys of a finger under the finger skin. The disclosed optical fingerprint sensing by capturing information on the internal fingerprint pattern associated with the external ridges and valleys of a finger under the finger skin is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users), In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

Figure 49A:
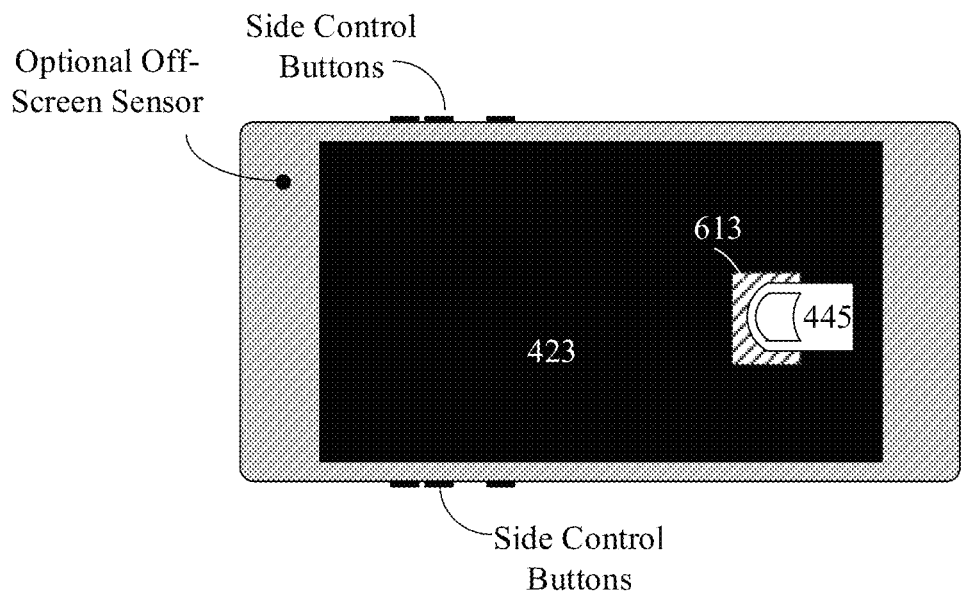
FIGS. 49A and 49B show an example of one implementation of an optical sensor module under the display screen assembly.
Figure 49B:
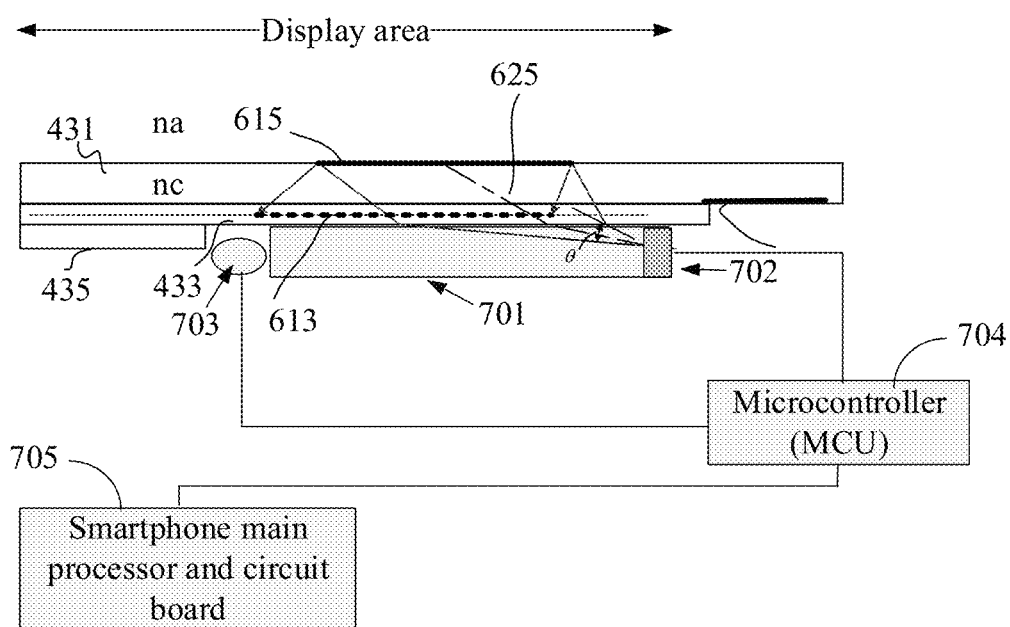

FIGS. 49A and FIG. 49B show an example of one implementation of an optical sensor module under the OLED display screen assembly. The device in FIGS. 49A-49B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include an OLED display module 433 under the top transparent layer 431. The OLED display module 433 includes, among others, OLED layers including an array of OLED pixels that emit light for displaying images. The OLED layers have electrodes and wiring structure optically acting as an array of holes and light scattering objects. The array of holes in the OLED layers allows transmission of light from the top transparent layer 431 through the OLED layers to reach the optical sensor module under the OLED layers and the light scattering caused by the OLED layers affects the optical detection by the under-screen optical sensor module for fingerprint sensing. A device circuit module 435 may be provided under the OLED display panel to control operations of the device and perform functions for the user to operate the device.

The optical sensor module in this particular implementation example is placed under OLED display module 433. The OLED pixels in a fingerprint illumination zone 613 can be controlled to emit light to illuminate the fingerprint sensing zone 615 on the top transparent layer 431 within the device screen area for a user to place a finger therein for fingerprint identification. As illustrated, a finger 445 is placed in the illuminated fingerprint sensing zone 615 as the effective sensing zone for fingerprint sensing. A portion of the reflected or scattered light in the zone 615 illuminated by the OLED pixels in the fingerprint illumination zone 613 is directed into the optical sensor module underneath the OLED display module 433 and a photodetector sensing array inside the optical sensor module receives such light and captures the fingerprint pattern information carried by the received light.

In this design of using the OLED pixels in the fingerprint illumination zone 613 within the OLED display panel to provide the illumination light for optical fingerprint sensing, the OLED pixels in the fingerprint illumination zone 613 can be controlled to turn on intermittently with a relatively low cycle to reduce the optical power used for the optical sensing operations. For example, while the rest of the OLED pixels in the OLED panel are turned off (e.g., in a sleep mode), the OLED pixels in the fingerprint illumination zone 613 can be turned on intermittently to emit illumination light for optical sensing operations, including performing optical fingerprint sensing and waking up the OLED panel. The fingerprint sensing operation can be implemented in a 2-step process in some implementations: first, a few of the OLED pixels in the fingerprint illumination zone 613 within the OLED display panel are turned on in a flashing mode without turning on other OLED pixels in the fingerprint illumination zone 613 to use the flashing light to sense whether a finger touches the sensing zone 615 and, once a touch in the zone 615 is detected, the OLED pixels in the fingerprint illumination zone 613 are turned on to activate the optical sensing module to perform the fingerprint sensing. Also, upon activating the optical sensing module to perform the fingerprint sensing, the OLED pixels in the fingerprint illumination zone 613 may be operated at a brightness level to improve the optical detection performance for fingerprint sensing, e.g., at a higher brightness level than their bright level in displaying images.

In the example in FIG. 49B, the under-screen optical sensor module includes a transparent block 701 that is coupled to the display panel to receive the returned light from the top surface of the device assembly that is initially emitted by the OLED pixels in the fingerprint sensing zone 613, and an optical imaging block 702 that performs the optical imaging and imaging capturing. Light from OLED pixels in the fingerprint illumination zone 613, after reaching the cover top surface, e.g., the cover top surface at the sensing area 615 where a user finger touches, is reflected or scattered back from the cover top surface. When fingerprint ridges in close contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the OLED pixels, and, after passing through the small holes of the OLED display module 433, reaches the interface with the low index optically transparent block 701 of the optical sensor module. The low index optically transparent block 701 is constructed to have a refractive index less than a refractive index of the OLED display panel so that the returned light can be extracted out of the OLED display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B is a control circuit 704 (e.g., a microcontroller or MCU) which is coupled to the imaging sensing block 702 and to other circuitry such as the device main processor 705 on a main circuit board.

In this particular example, the optical light path design is such the light ray enters the cover top surface within the total reflect angles on the top surface between the substrate and air interface will get collected most effectively by the imaging optics and imaging sensor array in the block 702. In this design the image of the fingerprint ridge/valley area exhibits a maximum contrast. Such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sun light or room light) may enter the image sensor through OLED panel top surface, through TFT substrate holes in the OLED display assembly 433. Such background light can create a background baseline in the interested images from fingers and is undesirable. Different methods can be used to reduce this baseline intensity. One example is to tune on and off the OLED pixels in the fingerprint illumination zone 613 at a certain frequency F and the image sensor accordingly acquires the received images at the same frequency by phase synchronizing the pixel driving pulse and image sensor frame. Under this operation, only one of the image phases has the lights emitted from pixels. By subtracting even and odd frames, it is possible to obtain an image which most consists of light emitted from the modulated OLED pixels in the fingerprint illumination zone 613. Based on this design, each display scan frame generates a frame of fingerprint signals. If two sequential frames of signals by turning on the OLED pixels in the fingerprint illumination zone 613 in one frame and off in the other frame are subtracted, the ambient background light influence can be minimized or substantially eliminated. In implementations, the fingerprint sensing frame rate can be one half of the display frame rate.

A portion of the light from the OLED pixels in the fingerprint illumination zone 613 may also go through the cover top surface, and enter the finger tissues. This part of light power is scattered around and a part of this scattered light may go through the small holes on the OLED panel substrate, and is eventually collected by the imaging sensor array in the optical sensor module. The light intensity of this scattered light depends on the finger's skin color, the blood concentration in the finger tissue and this information carried by this scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

An OLED display usually has different color pixels, e.g., adjacent red, green and blue pixels form one color OLED pixels. By controlling which color of pixels within each color pixel to turn on and recording corresponding measured intensity, the user's skin color may be determined. As an example, when a user registers a finger for fingerprint authentication operation, the optical fingerprint sensor also measures intensity of the scatter light from finger at color A, and B, as intensity Ia, Ib. The ratio of Ia/Ib could be recorded to compare with later measurement when user's finger is placed on the sensing area to measure fingerprint. This method can help reject the spoof device which may not match user's skin color. See the relevant description with respect to FIGS. 7, 8 and 9.

In some implementations, to provide a fingerprint sensing operation using the above described optical sensor module when the OLED display panel is not turn on, one or more extra LED light sources 703 designated for providing fingerprint sensing illumination can be placed on the side of the transparent block 701 as shown in FIG. 49B. This designated LED light 703 can be controlled by the same electronics 704 (e.g., MCU) for controlling the image sensor array in the block 702. The designated LED light 703 can be pulsed for a short time, at a low duty cycle, to emit light intermittently and to provide pulse light for image sensing. The image sensor array can be operated to monitor the light pattern reflected off the OLED panel cover substrate at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the OLED display panel (or at least the off the OLED pixels in the fingerprint illumination zone 613 for performing the optical fingerprint sensing), and use the normal mode to acquire a full fingerprint image. The image sensor array in the block 702 will send the acquired fingerprint image to the smartphone main processor 705 which can be operated to match the captured fingerprint image to the registered fingerprint database. If there is a match, the smartphone will unlock the phone, and start the normal operation. If the captured image is not matched, the smartphone will feedback to user that the authentication is failed. User may try again, or input passcode.

In the example in FIG. 49 (specifically, FIG. 49B), the under-screen optical sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B. The optically transparent block 701 and the front end of the imaging sensing block 702 before the photodetector sensing array form a bulk imaging module to achieve proper imaging for the optical fingerprint sensing. Due to the optical distortions in this imaging process, a distortion correction can be used, as explained above, to achieve the desired imaging operation.

When probe light is directed to a finger, a portion of the probe light can be reflected, diffracted or scattered at the finger skin surface to produce reflected, diffracted or scattered probe light without entering the internal side of the finger. This portion of the probe light without entering the finger can carry a 2-dimensional optical reflective pattern across the reflected probe light beam caused by the external ridges and valleys of the finger and can be detected to obtain the fingerprint pattern of the external ridges and valleys. This is explained with reference to the examples in FIGS. 50A and 50B in this subsection.

In addition, a portion of the probe light may enter the finger and is scattered by the internal tissues in the finger. Depending on the optical wavelength of the probe light inside the finger, the internal tissues in the finger be optically absorptive and thus can be severally attenuated except for probe light in an optical transmission spectral range roughly from 590 nm and 950 nm. The probe light that can transmit through the finger tissues carries an optical transmissive pattern across the beam and this transmitted probe light beam can carry both a 2-dimensional pattern of the ridges and valleys and an additional topographical information of the internal issues associated with the ridges and valleys due to the internal path through such internal tissues before exiting the finger skin. This optical transmissive pattern is explained with reference to FIGS. 43A, 43B, 48A and 48B.

In the optical sensing by the under-screen optical sensor module in FIGS. 49A-49B and other designs disclosed herein, the optical signal from the sensing zone 615 on the top transparent layer 431 to the under-screen optical sensor module include different light components.

Figure 50A:
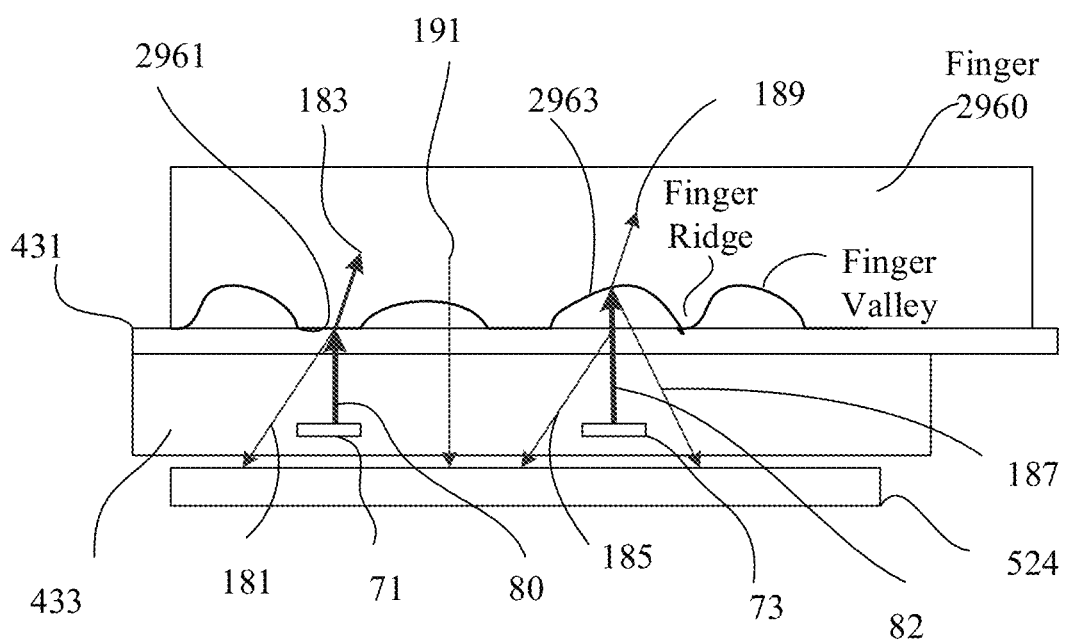
FIGS. 50A and 50B illustrate signal generation for the returned light from the sensing zone on the top sensing surface under two different optical conditions to obtain optical reflective patterns representing external fingerprint patterns formed on the outer skin of a finger and the operation of the under-screen optical sensor module.
Figure 50B:
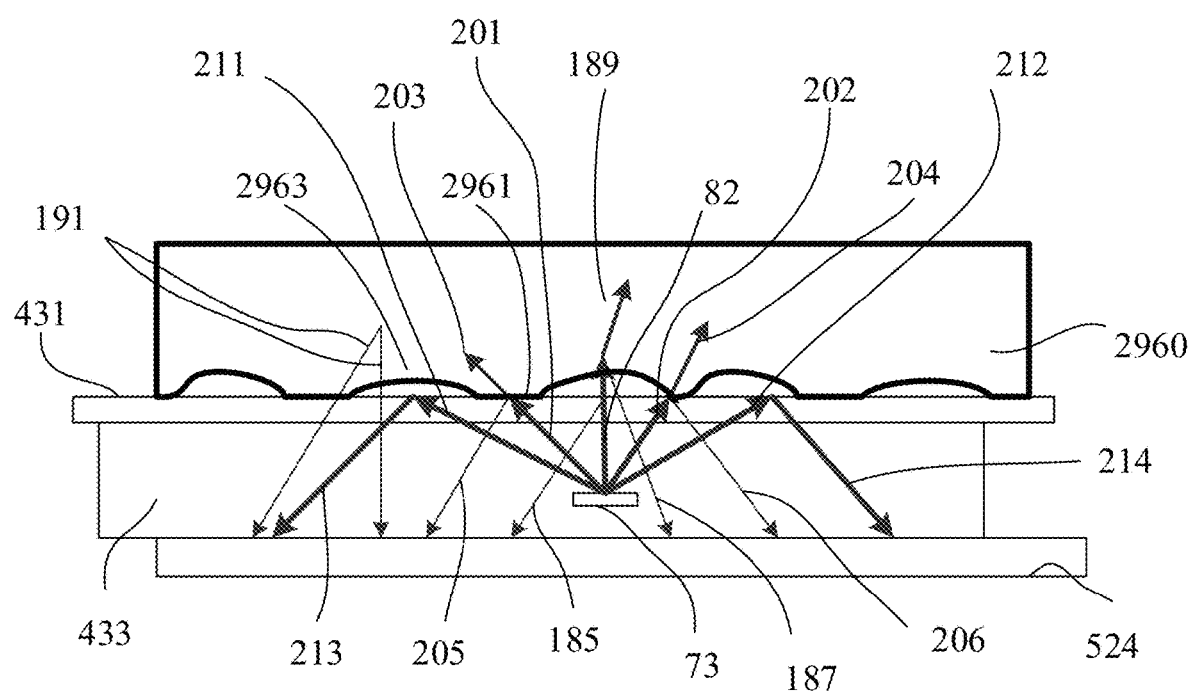

FIGS. 50A and 50B illustrate signal generation for the returned light from the sensing zone 615 for OLED-emitted light or other illumination light at different incident angle ranges under two different optical conditions to facilitate the understanding of the operation of the under-screen optical sensor module.

FIG. 50A shows optical paths of selected OLED-emitted light rays from OLED pixels in the OLED display module 433 that are incident to and transmit through the top transparent layer 431 at small incident angles at the top surface of the transparent layer 431 without the total internal reflection. Such OLED-emitted light rays at small incident angles generates different returned light signals including light signals that carry fingerprint pattern information to the under-screen optical sensor module. Specifically, two OLED pixels 71 and 73 at two different locations are shown to emit OLED output light beams 80 and 82 that are directed to the top transparent layer 431 in a direction that is either perpendicular to the top transparent layer 431 or at relatively small incident angles without experiencing the total reflection at the interfaces of the top transparent layer 431. In the particular example illustrated in FIG. 50A, a finger 2960 is in contact with the sensing zone 615 on the e top transparent layer 431 and a finger ridge 2961 is located above the OLED pixel 71 and a finger valley 2963 is located above the OLED pixel 73. As illustrated, the OLED light beam 80 from the OLED pixel 71 toward the finger ridge 2961 reaches the finger ridge 2961 in contact with the top transparent layer 431 after transmitting through the top transparent layer 431 to generate a transmitted light beam 183 in the finger tissue and another scattered light beam 181 back towards the OLED display module 433. The OLED light beam 82 from the OLED pixel 73 reaches the finger valley 2963 located above the top transparent layer 431 after transmitting through the top transparent layer 431 to generate the reflected light beam 185 from the interface with the top transparent layer 431 back towards the OLED display module 433, a second light beam 189 that enters the finger tissue and a third light beam 187 reflected by the finger valley surface.

In the example in FIG. 50A, it is assumed that the finger skin's equivalent index of refraction is about 1.44 at the optical wavelength of 550 nm and the cover glass index of refraction is about 1.51 for the top transparent layer 431. It is also assumed that the finger is clean and dry so that the void between adjacent finger valley and ridge is air. Under those assumptions, the display OLED pixel 71 is turned on at the finger skin ridge location 2961 to produce the beam 80. The finger ridge-cover glass interface reflects part of the beam 80 as reflected light 181 to bottom layers 524 below the OLED display module 433. The reflectance is low and is about 0.1%. The majority of the light beam 80 (around 99%) becomes the transmitted beam 183 that transmits into the finger tissue 60 which causes scattering of the light 183 to contribute to the returned scattered light 191 towards the OLED display module 433 and the bottom layers 524.

The OLED-emitted beam 82 from the OLED pixel 73 towards the external valley 63 first passes the interface of the top transparent layer 431 and the air gap due to the presence of the external valley 2963 to produce the reflected beam 185 and the remaining portion of the light beam 82 is incident onto the valley 2962 to produce the transmitted light beam 189 inside the finger and a reflected beam 187. Similar to the transmitted beam 183 at the finger ridge 2961, the transmitted light beam 189 from the OLED pixel 73 in the finger tissue is scattered by the finger tissues and a portion of this scattered light also contributes to the returned scattered light 191 that is directed to towards the OLED display module 433 and the under layers 524. Under the assumptions stated above, about 3.5% of the beam 82 from the display OLED group 73 at the finger skin valley location 2963 is reflected by the cover glass surface as the reflected light 185 to the bottom layers 524, and the finger valley surface reflects about 3.3% of the incident light power of the remainder of the beam 82 as the reflected light 187 to bottom layers 524. The total reflection represented by the two reflected beams 185 and 187 is about 6.8% and is much stronger than the reflection 181 at about 0.1% at a finger ridge 2961. Therefore, the light reflections 181 and 185/187 from various interface or surfaces at finger valleys 2963 and finger ridges 61 of a touching finger are different and form an optical reflective pattern in which the reflection ratio difference carries the fingerprint map information and can be measured to extract the fingerprint pattern of the portion that is in contact with the top transparent layer 431 and is illuminated the OLED light or other illumination light such as extra illumination light sources.

At each finger valley 2963, the majority of the beam 82 towards the finger valley 2963 (more than 90%) is transmitted into the finger tissues 2960 as the transmitted light 189. Part of the light power in the transmitted light 189 is scattered by internal tissues of the finger to contribute to the scattered light 191 towards and into the bottom layers 524. Therefore, the scattered light 191 towards and into the bottom layers 524 includes contributions from both the transmitted light 189 at finger valleys 2963 and transmitted light 183 at finger ridges 2961.

The example in FIG. 50A shows incident OLED-emitted light to the top transparent layer 431 at small incident angles without the total internal reflection in the top transparent layer 431. For OLED-emitted light incident to the top transparent layer 431 at relatively large incident angles at or greater than the critical angle for the total internal reflection, another higher-contrast optical reflective pattern can be generated to capture the 2-dimmensional fingerprint pattern of the external ridges and valleys of a finger. FIG. 50B shows examples of selected OLED-emitted light rays from an OLED pixel 73 in the OLED-display module 433 located under a finger valley 2963 where some of the illustrated light rays are under a total reflection condition at the interface with the top transparent layer 431 at locations adjacent to the particular finger valley 2963. Those illustrated examples of incident light rays generate different returned light signals including light signals that carry fingerprint pattern information to the under-screen optical sensor module. It is assumed that the cover glass 431 and the OLED display module 433 are glued together without any air gap in between so that an OLED light beam emitted by an OLED pixel 73 with a large incident angle to the cover glass 431 at or greater than the critical angle will be totally reflected at the cover glass-air interface. When the display OLED pixel 73 is turned on, the divergent light beams emitted by the OLED pixel 73 can be divided into three groups: (1) central beams 82 with small incident angles to the cover glass 431 without the total reflection, (2) high contrast beams 201, 202, 211, 212 that are totally reflected at the cover glass 431 when nothing touches the cover glass surface and can be coupled into finger tissues when a finger touches the cover glass 431, and (3) escaping beams having very large incident angles that are totally reflected at the cover glass 431 even at a location where the finger is in contact.

For the central light beams 82, as explained in FIG. 50A, the cover glass surface reflects about 0.1%~3.5% to produce the reflected light beam 185 that is transmitted into bottom layers 524, the finger skin reflects about 0.1%~3.3% at the air-finger valley interface to produce a second reflected light beam 187 that is also transmitted into bottom layers 524. As explained above with reference to FIG. 50A, the reflection difference in the reflected rays at small incident angles varies spatially and is dependent on whether the light beams 82 or light beams 80 meet with finger skin valley 2963 or ridge 2961. The rest of the such incident light rays with small incident angles becomes the transmitted light beams 189 and 183 that are coupled into the finger tissues in the finger 2960.

FIG. 50B shows high contrast light beams 201 and 202 as examples. The cover glass surface reflects nearly 100% as reflected light beams 205 and 206 respectively if nothing touches the cover glass surface at their respective incident positions. When the finger skin ridges touch the cover glass surface and at the incident positions of the illustrated OLED-emitted light beams 201 and 202, there is no longer the condition for the total internal reflection and thus most of the light power is coupled into the finger tissues in the finger 2960 as transmitted light beams 203 and 204. For such beams with large incident angles, this change between being under the total internal reflection condition in absence of a finger skin and being out of the total internal reflection condition with a significantly reduced reflection when a finger skin touches is used to produce a contrast pattern in the reflection.

FIG. 50B further shows additional high contrast light beams 211 and 212 as examples for which the cover glass surface reflects nearly 100% to produce corresponding reflected light beams 213 and 214 respectively under the total internal reflection condition if nothing touches the cover glass surface. For example, when the finger touches the cover glass surface and the finger skin valleys happen to be at the incident positions of the light beams 211 and 212, no light power is coupled into finger tissues in the finger 2960 due to the total internal reflection. If, by contrast, finger ridges happen to be at the incident positions of the light beams 211 and 212, the light power that is coupled into finger tissues 2960 increases due to the lack of the total internal reflection caused by the contact of the finger skin.

Similar to the situation in FIG. 50A, light beams (e.g., transmitted beams 203 and 204) that are coupled into finger tissues 2960 will experience random scattering by the finger tissues to form the scattered light 191 that propagates towards the bottom layers 524.

The illumination for the examples shown in FIG. 50B can be caused by illumination by the OLED-emitted light or illumination light from extra illumination light sources. In high contrast light beams illuminated area, finger skin ridges and valleys cause different optical reflections and the reflection difference pattern carries the fingerprint pattern information. The high contrast fingerprint signals can be achieved by comparing the difference.

Therefore, as shown in FIGS. 50A and 50B, incident illumination light rays from either OLED-emitted light or extra illumination light sources can produce two types of optical reflection patterns representing the same 2-dimensaitonal fingerprint pattern of a finger: a low contrast optical reflective pattern formed by incident illumination light rays at small incident angles without the total internal reflection and a high contrast optical reflective pattern formed by incident illumination light rays at large incident angles based on a total internal reflection.

In both FIGS. 50A and 50B, a portion of the incident illumination light rays from either OLED-emitted light or extra illumination light passes through the top transparent layer 431 and enters the finger to cause the scattered light 191 that propagates through the internal tissues of the finger and to penetrate through the finger skin to enter the top transparent layer 431 towards the bottom layers 524. As explained below, such scattered light 191, once transmitting through the internal tissues and the finger skin, carries an optical transmissive pattern of the finger that contains both (1) a 2-dimensional spatial pattern of external ridges and valleys of a fingerprint (2) an internal fingerprint pattern associated with internal finger tissue structures that give rise to the external ridges and valleys of a finger due to the propagation of the scattered light from the internal side of the finger towards the finger skin and transmits the finger skin. Accordingly, the scattered light 191 from the finger can be measured by the optical sensor array and the measurements can be processed for fingerprint sensing. Notably, the internal fingerprint pattern associated with internal finger tissue structures that give rise to the external ridges and valleys of a finger is not substantially affected by the sensing surface condition of the top surface of the top transparent layer 431 or the skin conditions of the finger (e.g., dirty, wet/dry or aged finger patterns) and may still provide sufficient information for fingerprint sensing when the external fingerprint pattern on the external finger skin has a reduced ridge-valley contrast, is somewhat damaged or otherwise is not suitable for providing sufficient fingerprint information in the optical reflective pattern. While the external fingerprint pattern may be duplicated by using artificial materials for invading the fingerprint sensing, the internal fingerprint pattern of a user's finger imprinted in the optical transmissive pattern is extremely difficult to replicate and thus can be used as an anti-spoofing mechanism in the fingerprint sensing.

The details for using the transmissive pattern are explained with reference to FIGS. 43A, 43B, 48A and 48B where 3-D information can be captured based on an internal fingerprint pattern associated with internal finger tissue structures that give rise to the external ridges and valleys of a finger due to the propagation of the scattered light from the internal side of the finger towards the finger skin and transmits the finger skin.

The following provide some specific examples of under-OLED optical sensor module designs for capturing optical reflective and transmissive patterns.

Figure 51A:
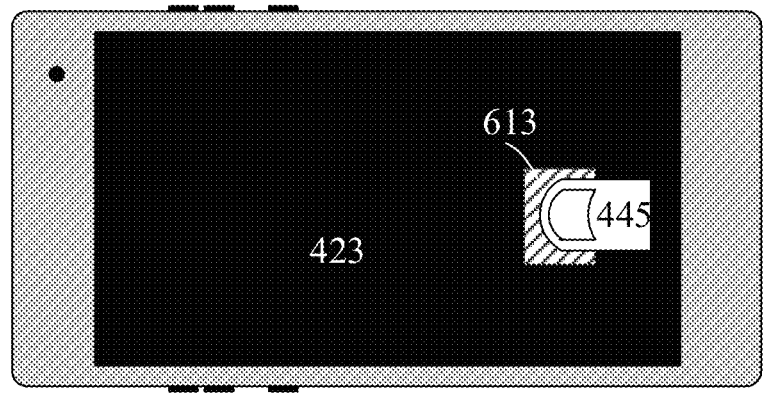
FIGS. 51A-51C show example designs of under-screen optical sensor modules.
Figure 51B:
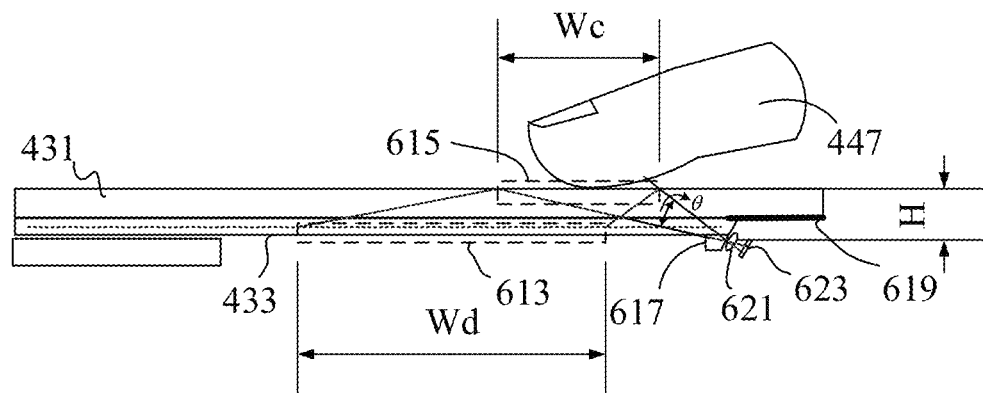
Figure 51C:
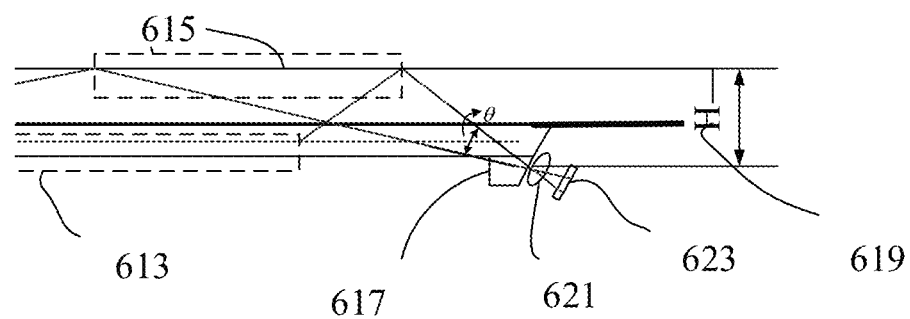

FIGS. 51A, FIG. 51B and FIG. 51C show an example of an under-screen optical sensor module based on optical imaging via a lens for capturing a fingerprint from a finger 445 pressing on the display cover glass 423. FIG. 51C is an enlarged view of the optical sensor module part shown in FIG. 51B. The under-screen optical sensor module as shown in FIG. 51C is placed under the OLED display module 433 includes an optically transparent spacer 617 that is engaged to the bottom surface of the OLED display module 433 to receive the returned light from the sensing zone 615 on the top surface of the top transparent layer 431, an imaging lens 621 that is located between and spacer 617 and the photodetector array 623 to image the received returned light from the sensing zone 615 onto the photodetector array 623. Like the imaging system in the example in FIG. 49B, this imaging system in FIG. 51C for the optical sensor module can experience image distortions and a suitable optical correction calibration can be used to reduce such distortions, e.g., the distortion correction methods described for the system in FIG. 49B.

Similar to the assumptions in FIGS. 50A and 50B, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass top surface, and the total reflection angle is about 73.7° if the finger skin touches the cover glass top surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired part of the cover glass surface in the sensing zone 615. For example, the viewing angle may be aligned to detect the total inner reflection of the OLED display assembly. Specifically, the viewing angle θ is aligned to sense the effective sensing zone 615 on the cover glass surface. The effective sensing cover glass surface 615 may be viewed as a mirror so that the photodetector array effectively detects an image of a viewing zone or the fingerprint illumination zone 613 in the OLED display that is projected by the sensing cover glass surface 615 onto the photodetector array. If the OLED pixels in the viewing zone/fingerprint illumination zone 613 are turned on to emit light, the photodiode/photodetector array 623 can receives the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometrics of the optical detection path are known, the fingerprint image distortion caused in the optical path in the optical sensor module can be corrected.

Consider, as a specific example, that the distance H in FIG. 51B from the detection module central axis to the cover glass top surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top transparent layer 431.

Figure 52:
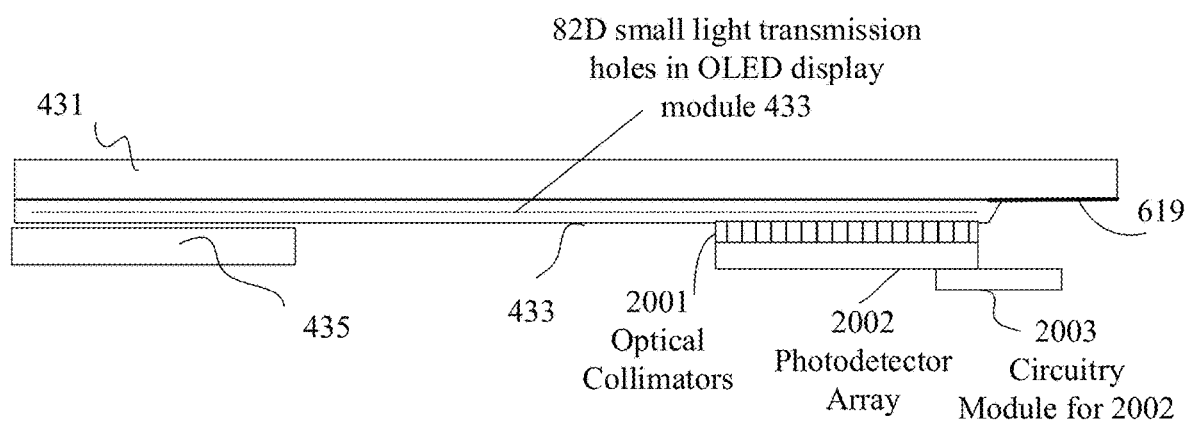
FIGS. 52, 53A, and 53B illustrate examples of various designs for fingerprint sensing using an under-screen optical sensor module using an array of optical collimators or pinholes for directing signal light carrying fingerprint information to the optical sensor array.

FIG. 52 shows an under-OLED screen optical sensor module that includes an optical collimator array 2001 of optical collimators placed on top of a photodetector array 2002 for directing signal light carrying fingerprint information into different photodetectors on the photodetector array 2002. A circuitry module 2003 is coupled to the photodetector array 2002 to operate the photodetector array 2002 and to receive the output signals from photodetectors on the photodetector array 2002. The OLED display module 433 includes small light transmission holes 82D, e.g., holes in the TFT layer of the OLED display module, to allow the light from the top surface of the top transparent layer 431 to pass through the OLED display module 433 to reach the under-screen optical sensor module. The collimator array 2001 may use collimators in various designs, e.g., waveguide based image transmitters, an optical fiber array (with core or coreless), a micro lens array, a pinhole array and others. The collimators in the array 2001 are designed to limit the numerical aperture of the sampled image. Each pixel of the collimator array 2001 can be regarded as an optical detection needle. The photodiode array 2002 may be a CMOS sensor array, a CCD sensor array, a photodiode array or other photo sensing array.

In operation, the OLED pixels illuminate the cover glass 431. The light reflected from the cover glass 431 is diffracted by the holes of the TFT structure in the OLED display module 433. The collimator array 2001 samples the useful part of the diffracted light and selects a portion of the light that fits the small numerical aperture of each collimator to transmit to the photodiode array 2002 to form the image of the sensing area.

Figure 53A:
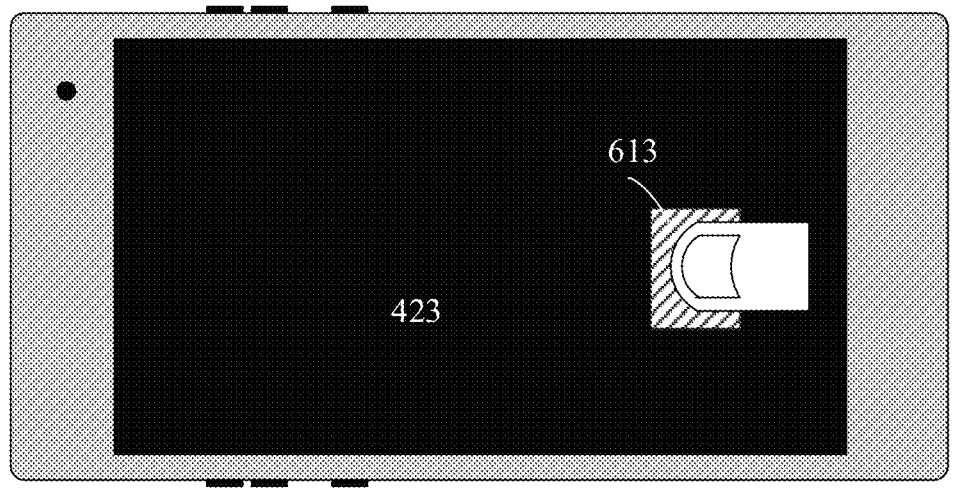
Figure 53B:
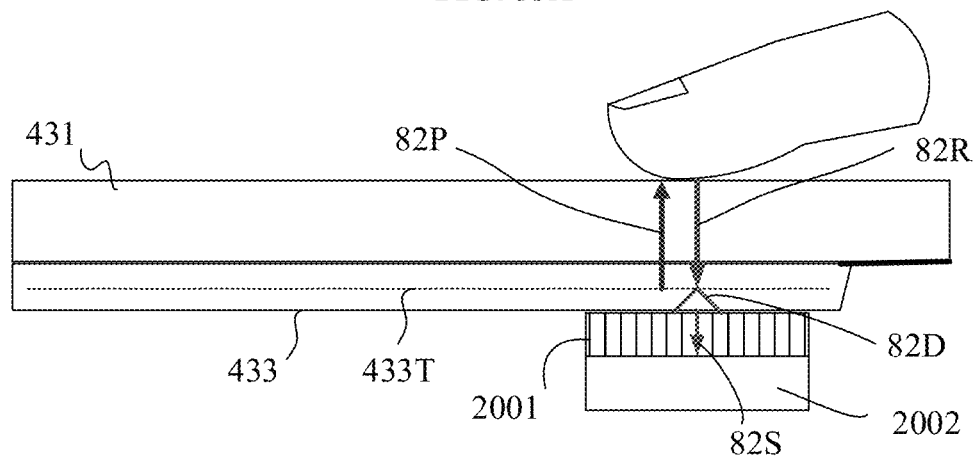

FIGS. 53A-53B show the operation of the optical sensor module in FIG. 52. The OLED pixels in the illumination zone 613 in the OLED display module 433 shine light beam 82P to the finger in contact with the sensing zone 615 on the cover glass 431. The finger and the cover glass 431 reflect a light beam 82R. The small holes in the TFT substrate diffract the light beam 82R to form light beam 82D. Proper collimator units in the collimator array 2001 select light 82S from the light beam 82D and guide it into the proper photodetector elements of photodetector array 2002. In some OLED displays, part of the light may be directly shined towards the sensor module and may be eliminated by calibration.

Figure 54:
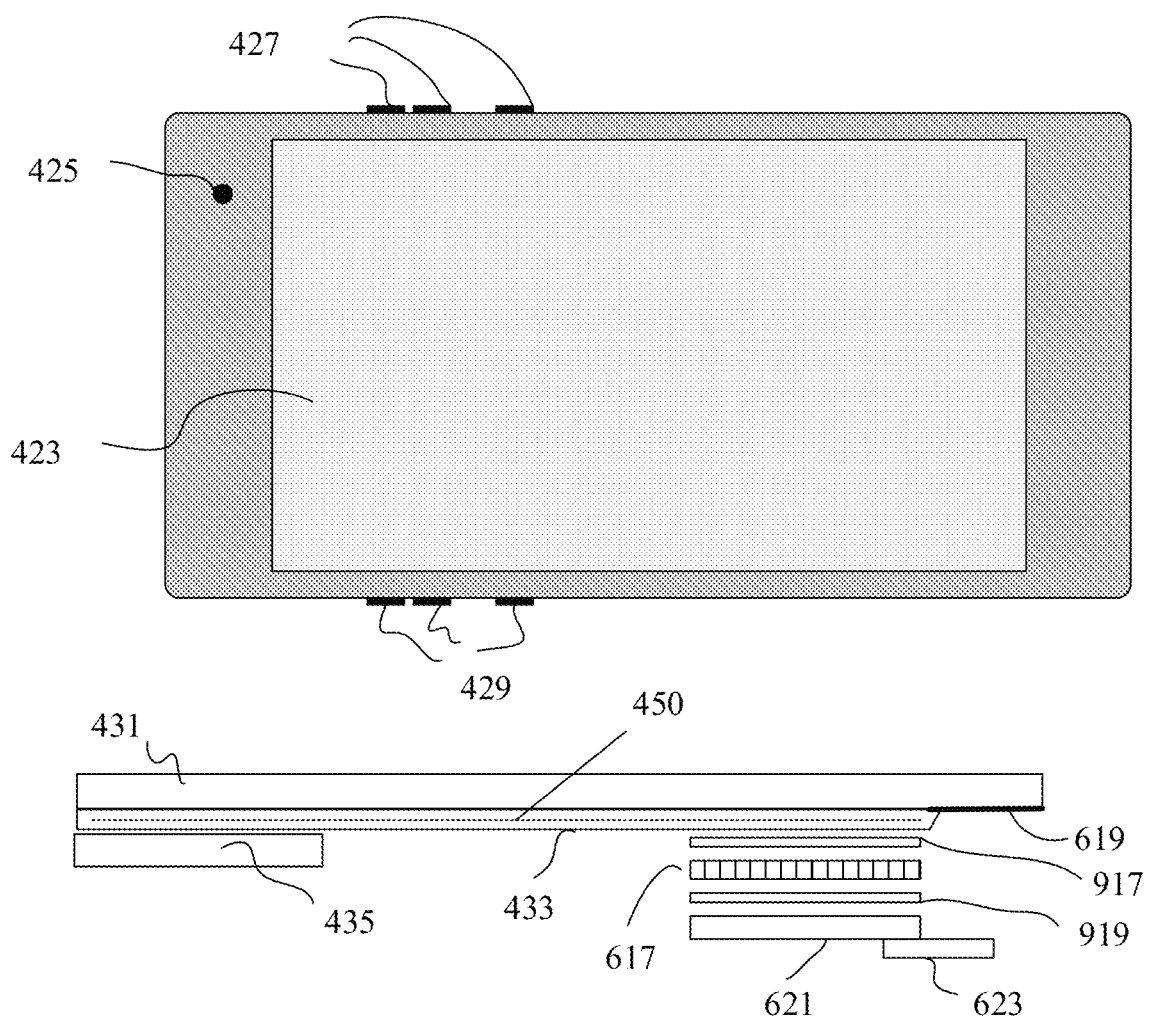
FIG. 54 illustrates improved optical imaging resolution based on a pinhole camera effect in designing the optical sensor module.

FIG. 54 shows another example for using the pinhole camera effect to improve the optical imaging resolution. The OLED display module layer 433 under the top transparent layer 431 includes, among others, OLED layers including an array of OLED pixels that emit light for displaying images and have electrodes and wiring structure optically acting as an array of holes and light scattering objects. The array of holes in the OLED layers is shown as small light transmitting holes 450 inside the OLED display module layer 433 and allows transmission of light from the top transparent layer 431 through the OLED layers to reach the optical sensor module 621 for fingerprint sensing. In this example, the optical sensor module includes several layers: a spacer 917 below the OLED display module layer 433 and above the pinhole array 617, a protection material 919 below the pinhole array 617 and above the photo detector array 621, and a circuit board 623. The object optical distance is decided by the total material thickness from sensing surface to the pinhole plane, including the optical thickness of the display module 433 thickness, the spacer 917 thickness, any filter coating thickness, any air gap thickness, and any glue material thickness. The image optical distance is decided by the total material thickness from the pinhole plane to the photo detector array, including the protection material thickness, any filter coating thickness, any air gaps thickness, any glue material thickness. The image magnification is decided by the image optical distance comparing with the object optical distance. The detection mode can be optimized by setting a proper magnification. For example, the magnification may be set to be less than 1, such as, 0.7, or 0.5 etc. In some device designs, the spacer and the pinhole array layer may be combined into a single component. In other designs, the pinhole array and the protection layer may be combined to a single component so as to pre-define the center coordinates of each pinhole.

In real time fingerprint sensing, the environmental influence is present and undesired effect of the background light to the performance the under-screen optical sensor module can be mitigated in different techniques, including implementing optical filtering in the optical path to the optical sensor array to reduce the background light, designing the receiving optics for the optical sensor array to reduce the background light, or controlling the operations of the optical sensor module and signal processing to further reduce the effect of the background light to the optical sensing performance. Those different techniques may be used individually or in combination to meet the desired device performance.

In the disclosed optical sensing technology, in addition to using the OLED-emitted light from the OLED display module, one or more extra light sources can be used to illuminate the finger to be detected to improve the optical fingerprint sensing, e.g., by improving the signal to noise ratio in the detection. This inclusion of one or more extra illumination light sources to increase the optical signal level of the optical sensing signal carrying the fingerprint or other useful information beyond the signal level caused by the returned OLED display light for improving the optical sensing sensitivity can be used alone or in a combination with above disclosed techniques for reducing the amount of background light that enters the optical sensor array in an under-screen optical sensor module.

In this regard, an electronic device capable of detecting a fingerprint by optical sensing can be designed to include a device screen that provides touch sensing operations and includes a display panel structure having light emitting display pixels where each pixel is operable to emit light for forming a portion of a display image, a top transparent layer formed over the device screen as an interface for being touched by a user for the touch sensing operations and for transmitting the light from the display structure to display images to a user, and one or more extra illumination light sources located to provide additional illumination light to the top transparent layer formed over the device screen as the interface for being touched by a user. Such a device can further include an optical sensor module located below the display panel structure to receive light that is emitted by at least a portion of the light emitting display pixels of the display structure and by the one or more extra illumination light sources and is returned from the top transparent layer to detect a fingerprint, the optical sensor module including an optical sensor array that detects an image in the received light in the optical sensor module. In implementations, such as in various OLED screens, the display panel structure includes openings or holes between the light emitting display pixels of the display panel structure to allow the returned light to pass through the display panel structure to reach the optical sensor module, and the optical sensor module includes an array of optical collimators or an array of pinholes to collect the returned light from the display panel structure and to separate light from different locations in the top transparent layer while directing the collected returned light to the optical sensor array.

In some implementations, one or more extra light sources 614 can be attached to or glued into the same position or region of the viewing zone 613 to provide additional illumination to the sensing zone 615, thus increasing the light intensity in optical sensing operations. The extra light sources 614 may be of an expanded type, or be a collimated type so that all the points within the effective sensing zone 615 is illuminated. The extra light sources 614 may be a single element light source or an array of light sources. Furthermore, the OLED pixels in the viewing zone or the fingerprint illumination zone 613 in the OLED display module 433 may be operated a higher brightness level during the optical fingerprint sensing operation above the brightness level used for displaying images in the OLED display to boost the illumination level for the optical sensing operation.

Figure 55:
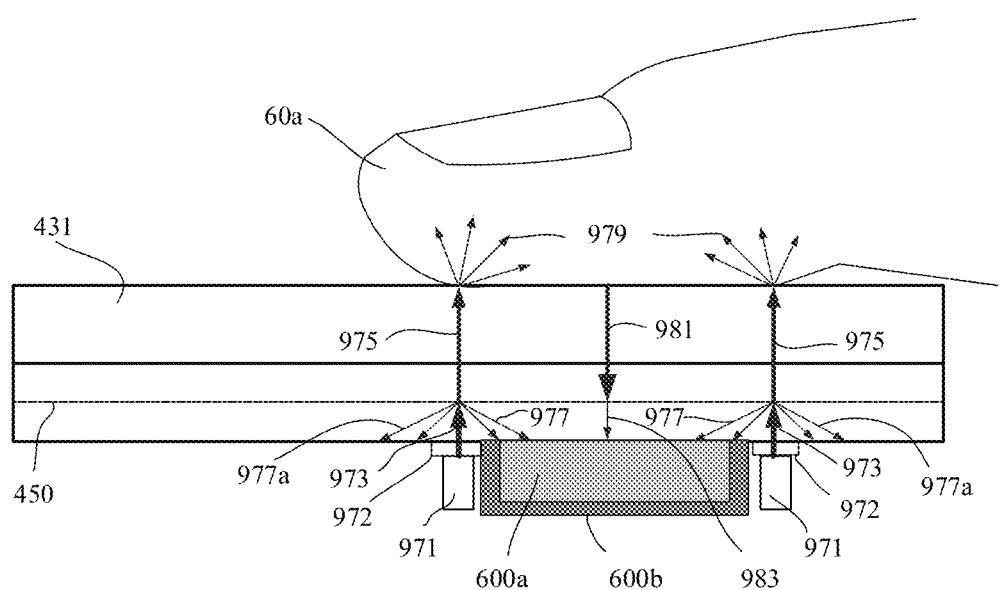
FIGS. 55 and 56 show behaviors different optical signals in an example of an under-screen optical sensor module having extra illumination light sources to supplement the fingerprint sensing illumination by the OLED display light.
Figure 56:
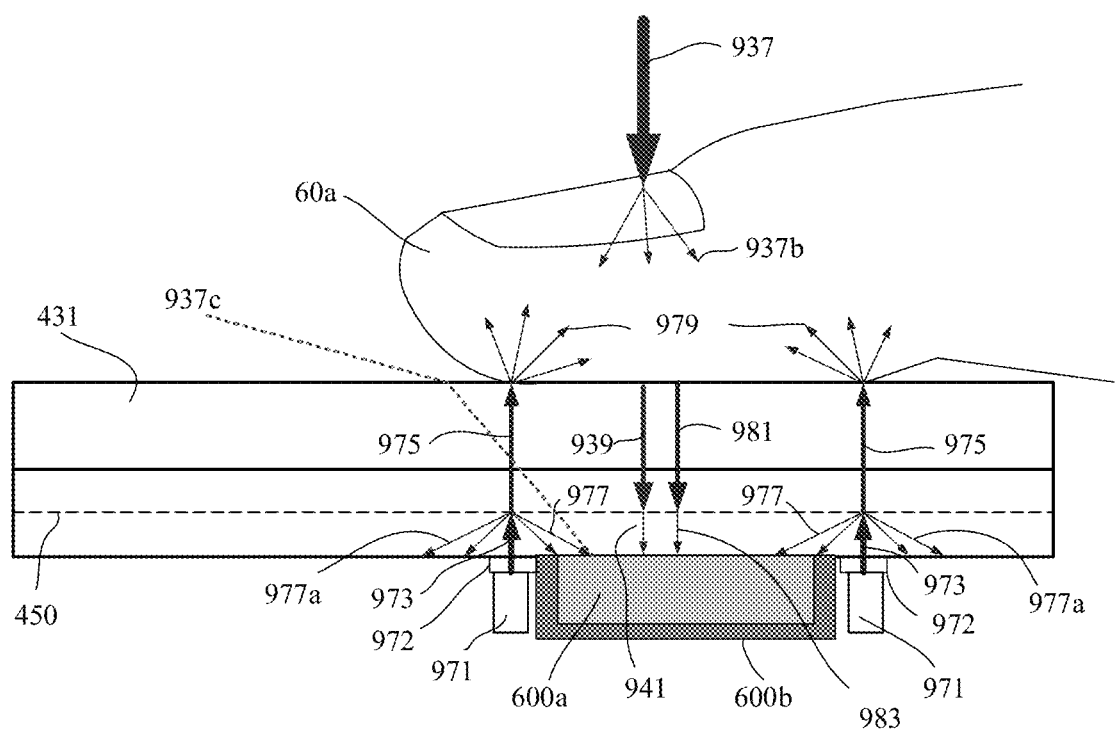

FIGS. 55 and 56 show optical behaviors of various optical signals in an example of an under-screen optical sensor module having extra illumination light sources to supplement the optical fingerprint sensing illumination provided by the OLED display light.

The example in FIGS. 55 and 56 includes extra light sources 971 that are assembled in or adjacent the optical sensor module and are located generally under the designated fingerprint sensing area provided by the top transparent layer 431. Specifically, in this example, two or more extra light sources 971 are placed outside the optical sensor module 600a and are outside the packaging walls 600b. Each extra light source 971 may be one light source or include multiple sources, for example, LED light sources. The extra light sources 971 may be operable to emit light at one single wavelength or at multiple wavelengths (for example, green LED, red LED, near IR LED). The extra light sources 971 may be modulated to produce modulated illumination light or be operated to turn on their emission at different phases. At the output port of each extra light source 971, a proper coupling material 972 is provided between each extra light source 971 and the OLED display module. The coupling material 972 may include a suitable optically transparent material to allow the probe light 973 from the extra light source 971 to be coupled into the display towards the finger on the cover 431 surface. In some implementations, it may be desirable to avoid large output angles of the probe light 973 in the display and the coupling material 972 may be configured to limit the probe light's numeral aperture. The coupling material 972 may be a low index material such as an air gap and may be structured to have a desired output aperture that limits the output angle of the probe light 973 in the display.

The small holes 450 in the TFT layers of the OLED display module scatter the probe light beam 973 into various directions. As shown in FIG. 55, some scattered light 977 propagates towards the optical sensor module 660a at large angles and is less likely to enter the optical sensor module due to the absorption or blocking by the small aperture of the receiving optics of the optical sensor module 660a. Some scattered light 977*a* propagates towards other directions that are away from the aperture of the optical sensor module 660*a* and thus does not affect the optical sensing. Notably, a portion of the probe light 973 from each extra light source 971 passes through the TFT layers as the probe light 975 towards the top surface of the top transparent layer 431. This probe light 975 can interact with the finger over the top cover 431 in two ways for optical fingerprint sensing. First, a portion of the probe light 975 may be reflected back as explained in FIGS. 50A and 50B to the optical sensor module 600*a* as an optical reflective pattern representing the external fingerprint pattern formed by the ridges and valleys. Second, another portion of the probe light 975 can be coupled into the finger 60*a* by optical transmission as explained in FIGS. 50A and 50B with reference to the scattered light 191 towards the under-screen optical sensor module to carry an optical transmissive pattern associated with the fingerprint pattern and the internal tissue structures as explained in FIG. 43B. The tissues in the finger 60*a* scatter the probe light 975 to produce scattered probe light 979 in various directions, including back scattered probe light 981 with the optical transmissive pattern for optical fingerprint sensing. The back scattered probe light 981 propagates back through the top transparent layer 431 to enter the TFT layers towards the optical sensor module 600*a*. The TFT layers refract or scatter the back scattered probe light 981, a portion of which becomes the probe light component 983 that can be detected by the photo-detector array in the optical sensor module 600*a*.

As explained with respect to FIG. 55, the back scattered probe light 981 from the probe light 979 propagates through the finger skin, the fingerprint ridge area and valley area manifest light signals with a spatial varying brightness pattern in an optical transmissive pattern due to interactions with the internal finger tissues associated with the externa ridges and valleys of the finger and this brightness contrast forms part of the fingerprint pattern and is caused by the finger tissue absorption, refraction, and reflection, by finger skin structure shading, and by reflectance difference at the finger skin-display cover glass interface. Because of the complicated mechanism of the fingerprint contrast, the fingerprint can be detected even if the finger is dry, wet, or dirty.

FIG. 56 further shows that background light present at the device can generally include two different portions the environmental or background light 937 incident to the finger 60*a* and environmental or background light 937*c* incident to the top transparent layer 431 without entering the finger 60*a*. Since the environmental or background light 937 propagates into finger 60*a*, the finger tissues scatter the received background light 937 as scattered background light 937*b* in different directions and mixes with the probe light 979. Some of the scattered light 939 in the scattered background light 937*b* propagates back towards the optical sensor module 600*a* through the finger 60*a*. A portion of the environmental light 937*c* that does not go through the finger 60*a*, if is permitted to enter the optical sensor module 600*a*, it could adversely impact the optical sensing operation of the optical sensor module 600*a*. Therefore, it is desirable to reduce or eliminate the amount of the environmental light from entering the optical sensor module 600*a* by optical filtering, by the design of the receiving optics or by controlling the operation and signal processing of the optical sensor module as discussed above.

As an example, the scattered light 939 in the scattered background light 937*b* propagates towards the optical sensor module 600*a* through the finger 60*a* and thus carrying an optical transmissive pattern due to interactions with the finger including internal tissues associated with the external ridges and valleys of the finger. In some implementations, this light 939 from the environmental or background light may be detected for optical fingerprint sensing based on its optical transmissive pattern.

Figure 57:
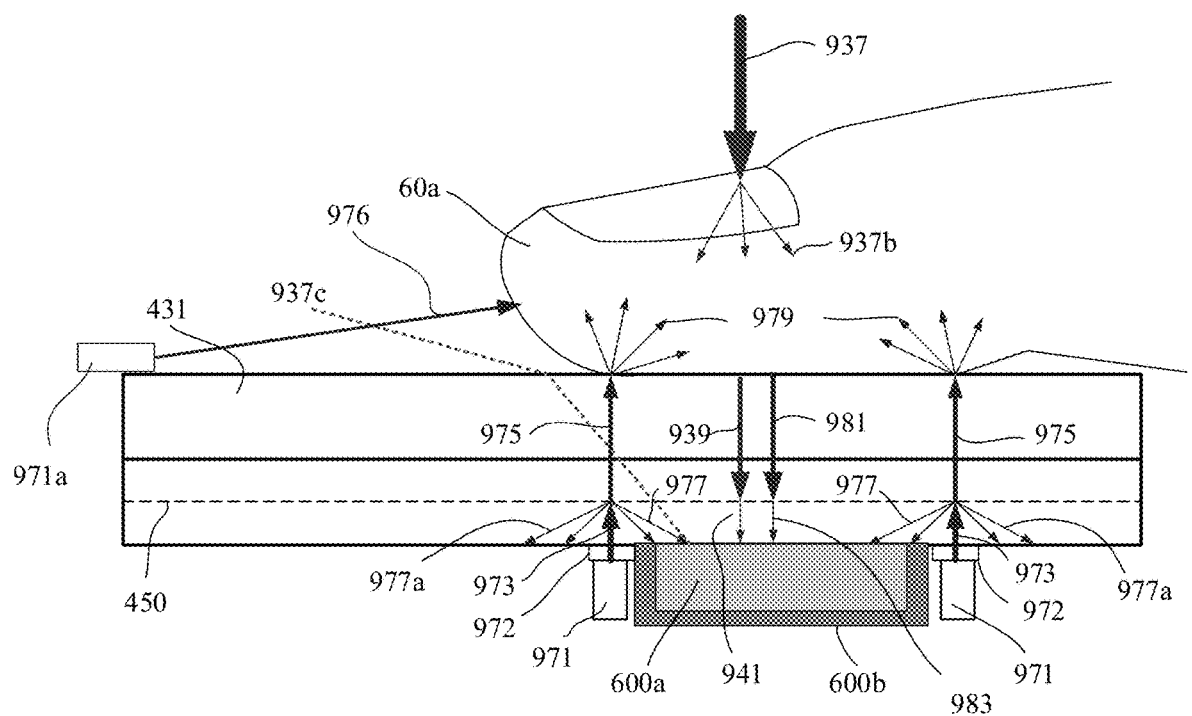
FIGS. 57 through 59 show examples of under-OLED optical sensor module designs for placing extra illumination light sources to obtain optical transmissive patterns by directing the illumination light to transmit through a finger under the detection.
Figure 58:
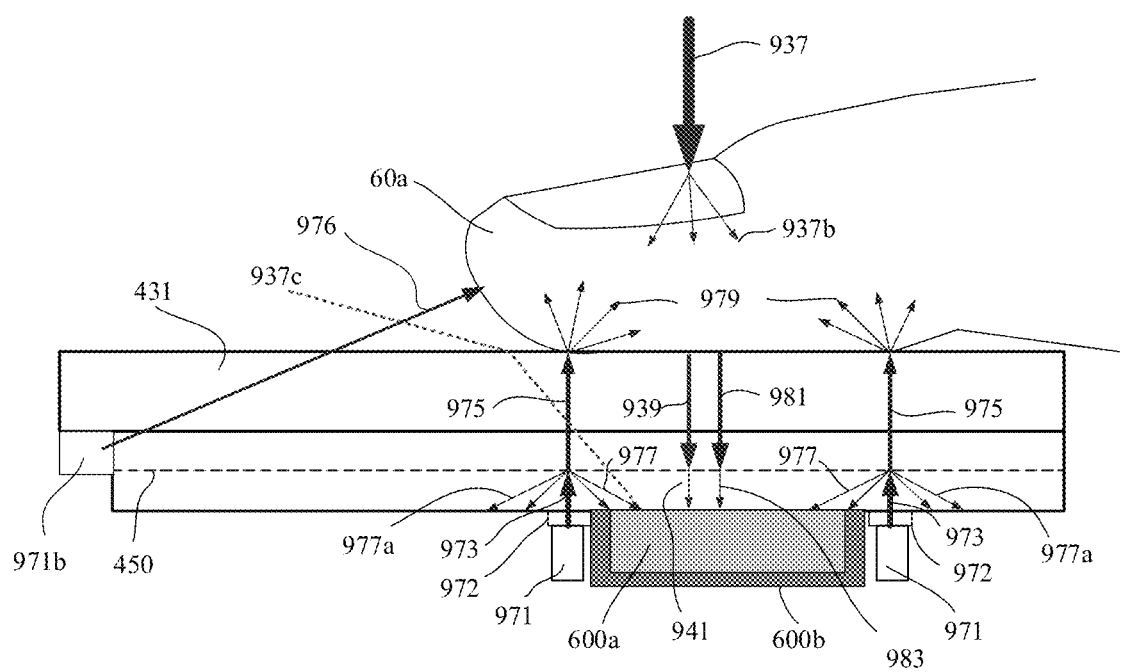
Figure 59:
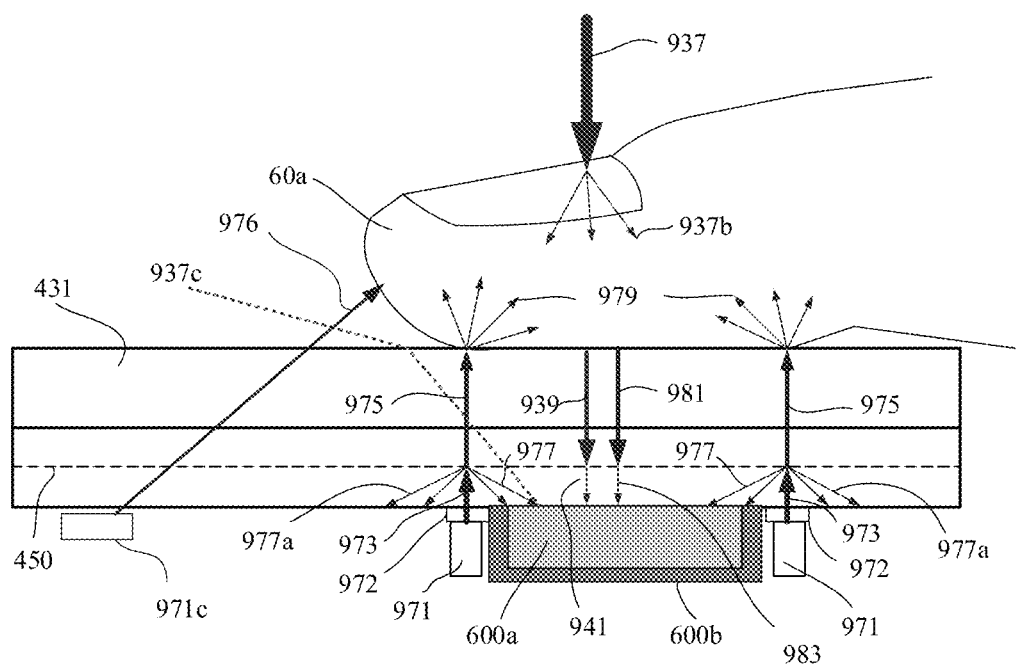

FIGS. 57, 58 and 59 show that extra illumination light sources may be placed at various locations outside the optical sensor module to direct the illumination beams into a finger in different directions to provide different shadowing in the captured optical transmissive patterns.

In FIG. 57, at least one extra illumination light source 971*a* is placed above the display panel and the top transparent layer 431 and is away from the designed fingerprint sensing area to direct the illumination beam 937 to the finger in the designated fingerprint sensing area above the top transparent layer 431 to enter the finger and to cause scattering inside the finger which contributes to the part of the signal 981 with an optical transmissive pattern for the optical fingerprint sensing. Two or more such light sources 971*a* may be so placed. FIG. 57 further shows that extra illumination light sources 971 are also placed under the designated fingerprint sensing area as explained in FIGS. 55 and 56.

In FIG. 58, at least one extra illumination light source 971*b* is placed below the top transparent layer 431 and is away from the designed fingerprint sensing area to direct the illumination beam 937 to one side of the finger in the designated fingerprint sensing area above the top transparent layer 431 to enter the finger and to cause scattering inside the finger which contributes to the part of the signal 981 with an optical transmissive pattern for the optical fingerprint sensing. In this example, the one extra illumination light source 971*b* is placed side by side with the display panel below the top transparent layer 431. Two or more such light sources 971*b* may be so placed. FIG. 58 further shows that extra illumination light sources 971 are also placed under the designated fingerprint sensing area as explained in FIGS. 55 and 56.

In FIG. 59, at least one extra illumination light source 971*c* is placed below the display panel and is away from the designed fingerprint sensing area to direct the illumination beam 937 to one side of the finger in the designated fingerprint sensing area above the top transparent layer 431 to enter the finger and to cause scattering inside the finger which contributes to the part of the signal 981 with an optical transmissive pattern for the optical fingerprint sensing. Two or more such light sources 971*c* may be so placed. FIG. 59 further shows that extra illumination light sources 971 are also placed under the designated fingerprint sensing area as explained in FIGS. 55 and 56.

When extra illumination light sources are provided for optical sensing, the illumination power for optical sensing is no longer limited by the optical power from the OLED display light. Such extra illumination light sources can be designed to provide sufficient illumination for optical sensing to improve the optical detection signal to noise ration to offset the environmental light influence. In implantations, the extra illumination light sources can be modulated without affecting the display function and lifetime. In addition, the extra illumination light sources can be flashed with high output power for a short time during the fingerprint sensing so as to obtain optimized detection. Furthermore, the use of extra illumination light sources can provide flexibility in the determination of whether a detected finger is a live finger so that fake fingerprint detection can be avoided. For example, green LEDs and near IR LEDs may be used as extra light sources to also assist the live finger detection where finger tissues absorb the green light strongly so that the finger image manifests a desired large brightness gradient and the near IR light illuminates all through the finger so that the finger image brightness appears more uniform. For another example, extra illumination light sources can be used to provide optical fingerprint sensing based on optical transmissive patterns by optical transmission of the probe illumination light through the internal tissues associated with the external finger ridges and valleys.

The optical imaging optics of the optical sensor module under the display panel structure can be implemented in various ways as shown by some of the examples above, including using a lens with a folded optical path to form an imaging system for the under-screen optical sensor module and using an array of optical collimators for imaging without an imaging lens. Notably, an imaging module having at least one imaging lens designed to achieve the optical imaging of the illuminated touched portion of a finger onto the optical sensor array in the under-screen optical sensor module. The lensing effect of the imaging module is in part for controlling the spatial spreading of the returned light that may spatially scramble returned light from different locations on the touched portion of the finger at the optical sensor array so that the spatial information on the returned light corresponding to the fingerprint pattern on a finger can be preserved by the imaging lens with a desired spatial imaging resolution when the imaging lens directs the returned light to reach the optical sensor array. The spatial imaging resolution of an imaging module having a single imaging lens or an assembly of two or more imaging lenses is proportional to the numerical aperture of the imaging module. Accordingly, a high-resolution imaging lens requires a large numerical aperture and thus a lens with a large diameter. This aspect of a lens-based imaging module inevitably requires a bulking lens system to produce a high-resolution imaging system. In addition, a given imaging lens has a limited field of view which increases as the focal length decreases and decreases as the focal length increases.

In many fingerprint sensing applications such as optical fingerprint sensors implemented under a display screen in a mobile device, it is desirable to have a compact imaging system with a high spatial imaging resolution and a large field of view. In view of the trade-offs in various imaging features of a lens-based imaging system discussed above, a compact optical imaging system for optical fingerprint sensing is provided below by combining a lens-based imaging system to achieve a high spatial imaging resolution via the lens and a reduced size in the captured image at the optical detector array to reduce the size the optical detector array via the same lens. The pinhole is placed in front of the lens to produce a field of view in optical imaging by effectuating a pinhole camera while without requiring a large diameter lens. A conventional pinhole camera can include a small aperture for optical imaging and can produce a large field of view while suffering a limited image brightness due to the small aperture and a low spatial imaging resolution. A combination of an imaging lens and a pinhole camera, when properly designed, can benefit from the high spatial imaging resolution of the imaging lens and the large field of view of the pinhole camera.

Figure 60:
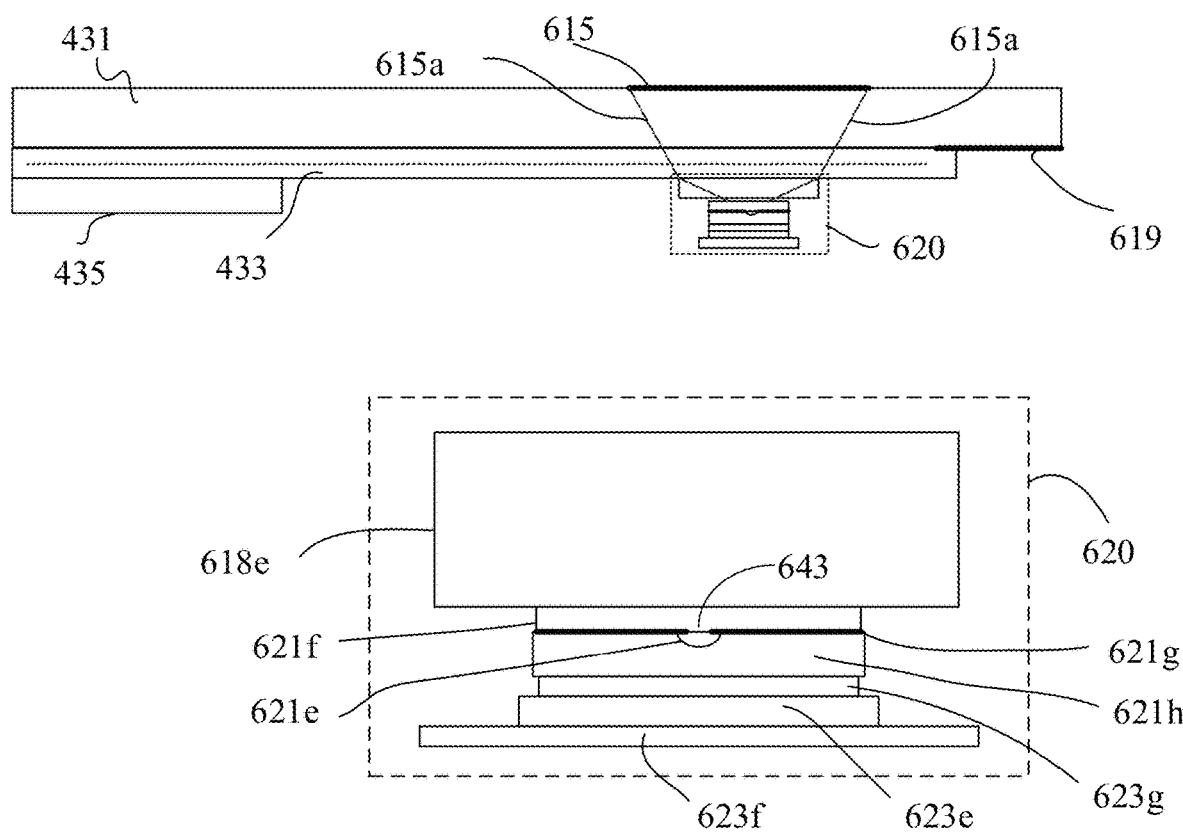
FIG. 60 shows an example of an under-screen optical sensor module based on a pinhole-lens assembly.

FIG. 60 shows one example of an optical sensor module 620 placed under an OLED display screen where a pinhole and a lens used to form the optical imaging system for the optical sensor module 620. In this example, the optical sensing module 620 is a compact module by using a micro lens 621e with a small diameter that can be about the same size of the pinhole so slightly larger than the pinhole. The micro lens 621e is engaged to a pinhole structure 621g that is optically opaque and may be a layer of a blackened or metal material formed on a surface of a pinhole substrate 621f of an optically transparent material with an opening as the pinhole 643. The micro lens 621e is placed on the lower side of the pinhole substrate 621f. In operation, the optical layers above the pinhole 643 in the pinhole structure 621g are structured to produce a large optical field of view in collecting the returned light from the OLED display panel and to transmit the collected light towards the optical sensor array 623e. The optical detectors in the optical sensor array 623e respond to the received optical pattern to produce detector signals and a detector circuit module 623f is coupled to the optical sensor array 623e to receive and process the detectors signals. Detector circuit module 623f may include, in some implementations, a flexible printed circuit (FPC). The micro lens 621e receives the transmitted light from the pinhole and to focus the received light onto the optical sensor array 623e for optical imaging at an enhanced spatial imaging resolution at the optical sensor array 623e when compared to a lower spatial imaging resolution of the pinhole in projecting light onto the optical sensor array 623e without the micro lens 621e. In this design, the low resolution of the pinhole is compensated by using the micro lens 621e and the limited field of view of the micro lens 621e is compensated by the large field of view of the pinhole 643.

In the illustrated example of using the pinhole-lens assembly for optical imaging in FIG. 60, the object plane of the pinhole-lens assembly is near the top effective sensing zone 615 on the top surface of the transparent layer 431 such as a cover glass for the touch sensing OLED display panel and the imaging plane of the pinhole-lens assembly is the receiving surface of the optical detectors of the optical sensor array 623e. In addition to the pinhole substrate 621f, an optically transparent spacer 618e with a refractive index lower than that of the pinhole substrate 621f is provided between the pinhole substrate 621f and the OLED display panel. This use of a lower index material above the pinhole substrate 621f is part of the optical design to achieve a large field of view for receiving light from the OLED display panel. In some implementations, the lower-index spacer 618e may be an air gap. This design provides an optical interface of two different optical materials between lower-index spacer 618e and the higher-index pinhole substrate 621f and the optical refraction at this interface converts a large field of view (FOV) (e.g., around 140 degree in some cases) of incident light from the OLED display panel in the lower-index spacer 618e into a smaller FOV in the higher-index pinhole substrate 621f. Accordingly, the output light rays produced by the pinhole-lens assembly have a relatively small FOV.

This design of reducing the FOV is advantageous in several aspects. First, the optical input FOV in the lower-index spacer 618e of the optical sensor module 620 is a large FOV. Second, the actual FOV handled at by the pinhole-lens assembly located below the higher-index pinhole substrate 621f is a reduced FOV with respect to the optical input FOV so that light rays with large incident angles are limited by this reduced FOV. This is beneficial because image distortions caused by light rays at large incident angles at the pinhole-lens assembly are reduced by this reduced FOV. In addition, this reduced FOV at the pinhole-lens assembly reduces the undesired pinhole shading effect that would distort the brightness distribution of the image at the optical sensor array.

Different from a convention pinhole camera with uses a pinhole with a diameter around 40 microns in some pinhole camera designs, the pinhole 643 is designed to have a diameter much larger than the typical size of a pinhole in a pinhole camera, e.g., greater than 100 microns, or 200 microns (e.g., 250 microns) in some designs. In this combination of the lens and the pinhole, the use of the high-index material for the pinhole substrate 612f just above the pinhole 643 and the use of the lower-index layer 618e above the pinhole substrate 612f allows the pinhole 643 to have a diameter much larger than the typical size of a pinhole in a pinhole camera while still achieving a large FOV. For example, in some implementations, the diameter of the pinhole 643 may be about the same as or similar to the radius of curvature of the curve surface of the lens 621e when structured as a half ball lens with a flat surface facing the pinhole 643 and a partial spherical surface that directs the light from the pinhole 643 towards the photodetector array 621e.

Additional design features can also be implemented to improve the overall optical performance and the compactness of the optical imaging system based on the pinhole-lens assembly. For example, additional optical layers can be placed between the lens-pinhole assembly and the photodiode array 623e. In this example, an optically transparent spacer 621h and a protection material 623g are provided in the light path from the pinhole-lens assembly to the optical sensor array 623e. In some implementations, the spacer 621h may be a low-index layer such as an air gap, and the protection material 623g may be a layer covering the top of the optical detectors of the optical sensor array 623e and having a refractive index higher than that of the spacer 621h. The layers 621h and 623g can be structured to reduce or eliminate the imaging distortion at the optical sensor array 623e. When light is refracted at media interfaces, the non-linearity in the directions of refracted rays exists and creates image distortions at the optical sensor array 623e. Such distortions become more pronounced when the incident angles are large. To reduce such distortions, the optical thickness ratio of spacer 621h and 623g can be selected in light of the optical structure of the pinhole-lens assembly and the optical objective field of the pinhole-lens assembly (e.g., the optical layers from the top sensing surface of the top glass layer 431 to the pinhole substrate 621f).

Optical distortions occur at each interface of different optical materials along the optical path of light from the top of the OLED display panel to the optical sensor array 623e. One design technique for reducing such optical distortions is to provide optically matching structures on lower side of the pinhole-lens assembly (i.e., the optical layers on the imaging side of the pinhole-lens assembly) to corresponding to optical structures on the upper side of the pinhole-lens assembly (i.e., the optical layers on the object side of the pinhole-lens assembly) so that an optical distortion incurred at one interface along the optical path from the OLED panel to the pinhole-lens assembly in the object side of the pinhole-lens assembly is countered or offset by optical refraction at a matching interface along the optical path from the pinhole-lens assembly to the optical sensor array 623e in the imaging side of the pinhole-lens assembly. The optical matching layers in the imaging side of the pinhole-lens assembly are designed by taking into account of the optical power of the lens in the pinhole-lens assembly.

As discussed above, undesired background or environmental light may adversely affect the optical sensing operation and can be reduced by various techniques. Techniques for reducing the effect of the environment light can also be used to improve the performance of such an under-screen optical sensor module based on the pinhole-lens assembly.

For example, the use of a light shielding package outside the optical sensor module can be also applied to an under-screen optical sensor module based on the pinhole-lens assembly. FIG. 61 shows an example in which the sensor module 620 is integrated into a package 620a to block the environmental light from entering the optical sensor array. A window is formed in the protection layer of the display. The module 620 and 620a is installed under the protection layer. A spacer material 631 may be applied to modify the view of the display and provide protection of the display. If the spacer 618e is an air gap, the sensor module does not contact the display directly so that the display is not affected during the usage.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for implementing optical fingerprint sensing in an electronic device having a display panel and a top transparent layer over the display panel, the apparatus comprising:

an optical sensor module for being placed underneath an extended section of the top transparent layer and located adjacent to one end of the display panel, the extended section of the top transparent layer extending beyond the one end of the display panel; the optical sensor module including one or more probe light sources to produce probe light to illuminate an object above or in contact with the top transparent layer for optical sensing, and an optical sensor array including optical detectors to detect reflected light from the object above or in contact with the top transparent layer to detect both a first signal to provide a first indication of whether the object is a finger of an authorized user and a second different signal to provide a separate second indication of whether the object is a finger of an authorized user; and an optical sensor controller coupled to the optical sensor module to control operations of the one or more probe light sources and the optical sensor array to trigger capturing of different images of the object including an image of the object when the object is above the top transparent layer without contacting the top transparent layer as part of the first signal and another image of the object when the object is in contact with the top transparent layer as part of the second signal.

2. The apparatus as in claim 1, wherein:
the optical sensor controller processes the captured images of the object, including both the captured image of the object when the object is above the top transparent layer without contacting the top transparent layer as part of the first signal and the other captured image of the object when the object is in contact with the top transparent layer as part of the second signal, to determine whether the object is a finger of an authorized user for the electronic device.

3. The apparatus as in claim 1, wherein:
the one or more probe light sources of the optical sensor module are configured to emit the probe light at an optical wavelength that penetrates into a human skin surface,
the optical sensor array captures images formed by the probe light at the optical wavelength that penetrates into a human skin surface and containing tissue structures below the skin surface, and
the optical sensor controller processes a captured image of the object at the optical wavelength that penetrates into a human skin surface containing tissue structures below the skin surface to include information on the tissue structures below the skin surface as part of determination of whether the object is a finger of an authorized user for the electronic device to provide anti-spoof fingerprint sensing.

4. The apparatus as in claim 1, wherein:
the one or more probe light sources of the optical sensor module are configured to emit the probe light at an optical wavelength that penetrates into a human skin surface,
the optical sensor array captures images formed by the probe light at the optical wavelength that penetrates into a human skin surface and containing tissue structures below the skin surface, and images representing a surface pattern of the skin surface such as a fingerprint pattern of ridges and valleys of a finger, and
the optical sensor controller processes the images formed by the probe light at the optical wavelength that penetrates into a human skin surface and containing tissue structures below the skin surface, and the images representing a surface pattern of the skin surface such as a fingerprint pattern of ridges and valleys of a finger to form a 3-dimensional profile for determination of whether the object is a finger of an authorized user for the electronic device to provide anti-spoof fingerprint sensing.

5. The apparatus as in claim 1, wherein:
the optical sensor controller coupled to the optical sensor module is operable to trigger capturing of different images of the object when object is above the top transparent layer without contacting the top transparent layer and is approaching the top transparent layer, when the object is in contact with the top transparent layer, and when the object is moving away from the top transparent layer.

6. The apparatus as in claim 1, wherein:
the one or more probe light sources of the optical sensor module are structured to emit the probe light at two or more different optical wavelengths at which a human live finger exhibits different optical properties; and
the optical sensor controller is structured to measure returned probe light at the two or more different wavelengths to compare an extinction ratios of the probe light at the two or more different wavelengths to determine whether the object is a finger from a live person.

7. The apparatus as in claim 1, wherein:
the optical sensor module placed underneath the extended section of the top transparent layer is structured to project the probe light from the one or more probe light sources over an area above the display panel to allow capturing of returned probe light from an object in the area above the display panel to capture images of the object when the object is not in contact with the top transparent layer.

8. The apparatus as in claim 1, wherein:
the display panel is operated to display a marked fingerprint sensing area visible to a user below the area where the probe light is projected to indicate to the user where to place a finger for fingerprint sensing, and
the marked fingerprint sensing area is adjacent to the optical sensor module to allow the optical sensor module to receive returned probe light while a user finger is above the marked fingerprint sensing area and further allows the optical sensor module to capture returned light from a portion of a user finger when in contact with the marked fingerprint sensing area.

9. The apparatus as in claim 1, comprising:
a trigger sensor separate from the optical sensor module and located underneath the top transparent layer, the trigger sensor being structured to sense presence of an object before the object touches the top transparent layer and to trigger a first optical fingerprint sensing operation by the optical sensor module while the object is not in contact with the top transparent layer,
wherein the optical sensor controller processes captured optical images from the first optical fingerprint sensing operation by the optical sensor module to determine whether the object is a finger of an authorized user for the electronic device and an access is denied when the determination based on the first optical fingerprint sensing operation is negative, and
wherein, when the determination based on the first optical fingerprint sensing operation is positive, the optical sensor module is operated to perform a second optical fingerprint sensing operation by capturing fingerprint images when the object contacts the top transparent layer to further determine whether the object is a finger of an authorized user for the electronic device and the access is granted only after the determination of the second optical fingerprint sensing operation is positive.

10. The apparatus as in claim 1, comprising:
a support transparent layer formed below the top transparent layer and engaged to the top transparent layer, the support transparent layer including an opening underneath the extended section of the top transparent layer and is located adjacent to the one end of the display panel,
wherein the optical sensor module is placed inside the opening of the support transparent layer underneath the extended section of the top transparent layer.

11. An apparatus for implementing optical fingerprint sensing module in an electronic device, comprising:
an optical sensor module placed underneath a top transparent layer and a display panel of the electronic device, the optical sensor module including one or more probe light sources to produce probe light to illuminate an object above or in contact with the top transparent layer for optical sensing, and an optical sensor array including optical detectors to detect reflected light from the object above or in contact with the top transparent layer to detect both a first signal to provide a first indication of whether the object is a finger of an authorized user and a second different signal to provide a separate second indication of whether the object is a finger of an authorized user; and an optical sensor controller coupled to the optical sensor module to control operations of the one or more probe light sources and the optical sensor array to trigger capturing of different images of the object including an image of the object when the object is above the top transparent layer without contacting the top transparent layer as part of the first signal and another image of the object when the object is in contact with the top transparent layer as part of the second signal.

12. The apparatus as in claim 11, wherein:
the optical sensor controller processes the captured images of the object, including both the captured image of the object when the object is above the top transparent layer without contacting the top transparent layer as part of the first signal and the other captured image of the object when the object is in contact with the top transparent layer as part of the second signal, to determine whether the object is a finger of an authorized user for the electronic device.

13. The apparatus as in claim 11, wherein:
the top transparent layer includes a designated fingerprint sensing area for a user to place a finger for fingerprint sensing;
the optical sensor module is located underneath the designated fingerprint sensing area to receive light from the top transparent layer to detect a fingerprint, wherein the optical sensor module includes an optical sensor array of optical detectors to convert the received light that carries a fingerprint pattern of the user into detector signals representing the fingerprint pattern;
the device further includes extra illumination light sources located outside the optical sensor module at different locations to produce different illumination probe beams to illuminate the designated fingerprint sensing area on the top transparent layer in different illumination directions, each extra illumination light source structured to produce probe light in an optical spectral range with respect to which tissues of a human finger exhibit optical transmission to allow probe light in each illumination probe beam to enter a user finger over the designated fingerprint sensing area on the top transparent layer to produce scattered probe light by scattering of tissues inside the finger that propagates towards and passes the top transparent layer to carry both fingerprint pattern information and different fingerprint topographical information associated with the different illumination directions, respectively, caused by transmission through internal tissues of ridges and valleys of the finger; and
the device further includes a probe illumination control circuit coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both the fingerprint pattern information and the different fingerprint topographical information associated with the different illumination directions, respectively.

14. The apparatus as in claim 13, wherein:
each extra illumination light source further emits second probe light at a second different wavelength; and
the device includes a controller that processes optical detector signals from the optical sensor module from sensing the probe light and the second probe light to determine whether a detected fingerprint is from a finger of a live person.

15. The apparatus as in claim 13, wherein:
the extra illumination light sources include a first illumination light source and a second illumination light source that are placed in opposite directions with respect the designated fingerprint sensing area on the top transparent layer so the illumination probe beams from the first and second illumination light sources are directed to the designated fingerprint sensing area in opposite directions.

16. The apparatus as in claim 13, comprising:
additional extra illumination light sources located below the display panel and underneath the designated fingerprint sensing area on the top transparent layer to produce additional illumination probe light beams to illuminate the designated fingerprint sensing area to cause optical reflection at a user finger in contact with the designated fingerprint sensing area towards the optical sensor module for fingerprint sensing.

17. The apparatus as in claim 11, wherein:
the optical sensor module includes:
a pinhole layer located between the display panel and the optical sensor array and structured to include a pinhole that is structured to produce a large optical field of view in collecting the light and to transmit the collected light towards the optical sensor array, and
a lens located between the pinhole layer and the optical sensor array to receive the transmitted light from the pinhole and to focus the received light onto the optical sensor array for optical imaging at an enhanced spatial imaging resolution at the optical sensor array when compared to a lower spatial imaging resolution when using the pinhole to project light onto the optical sensor array without the lens.

18. The apparatus as in claim 11, wherein:
the display panel is a liquid crystal display (LCD) screen that provides touch sensing operations and includes a LCD display panel structure to display images and a peripheral opaque border surrounding a central area of the LCD display panel structure and covering a narrow peripheral border of the LCD display panel structure, wherein the LCD display panel structure includes backlighting module to produce backlight for displaying the images in the central area of the LCD display panel structure within the peripheral opaque border;
the top transparent layer is formed over the LCD screen as an interface for being touched by a user for the touch sensing operations and for transmitting the light from the display structure to display images to a user and for transmitting the probe light for optical sensing;
the device further includes an illumination probe light source that produces probe light to illuminate a sensing area of the top transparent layer for optical sensing; and
the optical sensor module is located below the LCD screen and positioned underneath the peripheral opaque border to be spatially offset from central area of the LCD display panel structure to receive returned probe light that passes through the LCD screen for optical sensing, and wherein the LCD display panel structure includes one or more extra transmission holes or regions within an area that is at least partially covered by the peripheral border and is positioned above the optical sensor module to allow probe light to pass through the LCD display panel structure to reach the optical sensor module for optical sensing.

19. The apparatus as in claim 18, wherein:

the LCD display panel includes a peripheral opaque border surrounding a central area of the LCD display panel and covering a narrow peripheral border of the LCD display panel, and the LCD display panel includes one or more extra transmission holes or regions within an area that is at least partially covered by the peripheral border and is positioned above the optical sensor module to allow probe light to pass through the LCD display panel to reach the optical sensor module for optical sensing.

20. The apparatus as in claim 19, wherein:

the optical sensor controller coupled to the optical sensor module is operable to trigger capturing of different images of the object when object is above the top transparent layer without contacting the top transparent layer and is approaching the top transparent layer, when the object is in contact with the top transparent layer, and when the object is moving away from the top transparent layer.

\* \* \* \* \*